US012360628B2

(12) United States Patent
Van Ostrand et al.

(10) Patent No.: US 12,360,628 B2
(45) Date of Patent: *Jul. 15, 2025

(54) ACTIVATION OF DIFFERENT SUBSETS OF DRIVE-SENSE CIRCUITS IN ACCORDANCE WITH DIFFERENT MODES OF OPERATION OF A TOUCH-BASED DEVICE

(71) Applicant: SigmaSense, LLC., Austin, TX (US)

(72) Inventors: Daniel Keith Van Ostrand, Leander, TX (US); Michael Shawn Gray, Elgin, TX (US); Patrick Troy Gray, Cedar Park, TX (US); Richard Stuart Seger, Jr., Belton, TX (US)

(73) Assignee: SigmaSense, LLC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,675

(22) Filed: Mar. 18, 2024

(65) Prior Publication Data

US 2024/0220048 A1 Jul. 4, 2024

Related U.S. Application Data

(63) Continuation of application No. 18/317,297, filed on May 15, 2023, now Pat. No. 11,934,608, which is a (Continued)

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/041662* (2019.05); (Continued)

(58) Field of Classification Search
CPC ............... G06F 3/04164; G06F 3/0445; G06F 3/041662; G06F 3/0446; G06F 3/0412; G06F 2203/04108
See application file for complete search history.

(56) References Cited

U.S. PATENT DOCUMENTS

| | | |
|---|---|---|
| 5,437,178 A | 8/1995 | Esin et al. |
| 6,218,972 B1 | 4/2001 | Groshong |

(Continued)

FOREIGN PATENT DOCUMENTS

| | | |
|---|---|---|
| CN | 103995626 A | 8/2014 |
| CN | 104182105 A | 12/2014 |

(Continued)

OTHER PUBLICATIONS

Baker; How delta-sigma ADCs work, Part 1; Analog Applications Journal; Oct. 1, 2011; 6 pgs.

(Continued)

*Primary Examiner* — Deeprose Subedi
(74) *Attorney, Agent, or Firm* — Garlick & Markison; Timothy W. Markison; Shayne X. Short

(57) ABSTRACT

A touch screen display is operable to operate in a first mode during a first temporal period based on activating exactly one set of drive-sense circuits of a plurality of sets of drive-sense circuits to generate a corresponding one set of sensed signals during the first temporal period, and processing the corresponding one set of sensed signals to generate first proximal interaction data for the first temporal period. The touch screen display is operable to operate in a second mode during a second temporal period after the first temporal period based on activating more than one set of drive-sense circuits of the plurality of sets of drive-sense circuits to generate a corresponding more than one set of sensed signals during the second temporal period, and processing the set of sensed signals to generate second proximal interaction data for the second temporal period.

20 Claims, 125 Drawing Sheets drive-sense circuit 28

Related U.S. Application Data continuation of application No. 17/656,316, filed on Mar. 24, 2022, now Pat. No. 11,709,563.

(60) Provisional application No. 63/263,049, filed on Oct. 26, 2021.

(52) U.S. Cl.
CPC .......... *G06F 3/0445* (2019.05); *G06F 3/0446* (2019.05); *G06F 2203/04108* (2013.01)

(56) References Cited

U.S. PATENT DOCUMENTS

| | | | |
|---|---|---|---|
| 6,665,013 | B1 | 12/2003 | Fossum et al. |
| 7,476,233 | B1 | 1/2009 | Wiener et al. |
| 7,528,755 | B2 | 5/2009 | Hammerschmidt |
| 8,031,094 | B2 | 10/2011 | Hotelling |
| 8,089,289 | B1 | 1/2012 | Kremin et al. |
| 8,279,180 | B2 | 10/2012 | Hotelling et al. |
| 8,537,110 | B2 | 9/2013 | Kruglick |
| 8,547,114 | B2 | 10/2013 | Kremin |
| 8,587,535 | B2 | 11/2013 | Oda et al. |
| 8,625,726 | B2 | 1/2014 | Kuan |
| 8,657,681 | B2 | 2/2014 | Kim |
| 8,966,400 | B2 | 2/2015 | Yeap |
| 8,982,097 | B1 | 3/2015 | Kuzo et al. |
| 9,081,437 | B2 | 7/2015 | Oda |
| 9,201,547 | B2 | 12/2015 | Elias |
| 10,007,335 | B2 | 6/2018 | Lee |
| 10,222,912 | B2 | 3/2019 | Hristov |
| 2003/0052657 | A1 | 3/2003 | Koernle et al. |
| 2005/0235758 | A1 | 10/2005 | Kowal et al. |
| 2011/0063154 | A1 | 3/2011 | Hotelling et al. |
| 2011/0298745 | A1 | 12/2011 | Souchkov |
| 2012/0278031 | A1 | 11/2012 | Oda |
| 2013/0278447 | A1 | 10/2013 | Kremin |
| 2014/0327644 | A1 | 11/2014 | Mohindra |
| 2015/0091847 | A1 | 4/2015 | Chang |
| 2015/0346889 | A1* | 12/2015 | Chen .................. G06F 3/04166 345/174 |
| 2016/0188049 | A1 | 6/2016 | Yang et al. |
| 2018/0157354 | A1 | 6/2018 | Blondin et al. |
| 2018/0275824 | A1 | 9/2018 | Li |
| 2022/0155938 | A1 | 5/2022 | Hirai |

FOREIGN PATENT DOCUMENTS

| | | | |
|---|---|---|---|
| CN | 104536627 | A | 4/2015 |
| CN | 107771273 | A | 3/2018 |
| EP | 2284637 | A1 | 2/2011 |

OTHER PUBLICATIONS

Brian Pisani, Digital Filter Types in Delta-Sigma ADCs, Application Report SBAA230, May 2017, pp. 1-8, Texas Instruments Incorporated, Dallas, Texas.

European Patent Office; Extended European Search Report; Application No. 19853507.2; Jun. 13, 2023; 7 pgs.

* cited by examiner communication system 10 computing device 14 computing device 18 drive-sense circuit 28 display 83 with in-cell touch sensors transparent electrode (ITO) layer with thin film transistors display 83-1 with on-cell touch sensors no touch self capacitance = $C_p$ touch self capacitance = $C_p + C_f$ no touch mutual capacitance = $C_{m\_0}$ touch mutual capacitance = $C_{m\_1} < C_{m\_0}$ $C_{m\_1} = C_{m\_0} // (C_{f1} + C_{f2})$ electrode capacitance electrode impedance analog reference signal 122 analog reference signal 122 no touch with touch with touch with pen & touch computing device 14-b computing device 14-a no touch near bezel-less touch screen display 240 touch screen circuitry
246

DSC = drive-sense circuit near bezel-less touch screen
display 240-1 multiple near bezel-less touch screen displays 250 no touch it = cv
c= Q/v series Ct = C1*C2/(C1 + C2)
parallel Ct = C1 + C2 i2Cm_0 > i2Cm_1, v is constant, t is constant, thus Cm_0 < Cm_1 touch large touch screen display 270 large touch screen display 270 large touch screen display 270 electrode grids
6528.A – 6528.D electrode grid 6528.i

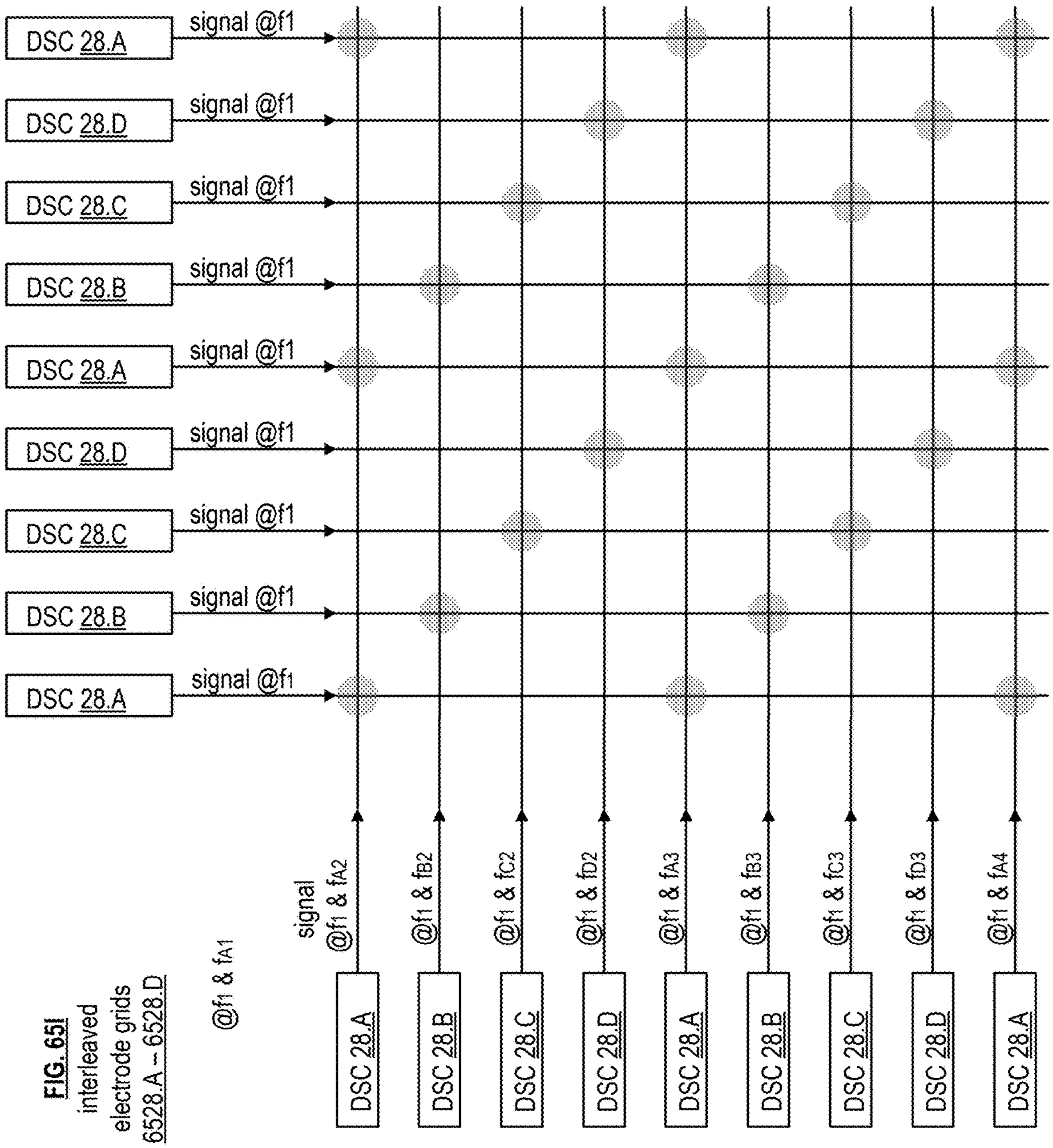
FIG. 65I interleaved electrode grids 6528.A ~ 6528.D base sensing mode:
only electrode grid A
activated enhanced sensing mode 6614: all electrode grids activated enhanced sensing mode 6614:
only electrode grid A and electrode grid C activated enhanced sensing mode 6614:
only electrode grid B and electrode grid D activated interleaved electrode grids
6528.A – 6528.D electrode grid control module 6530 electrode grid control module 6530 row digital processing circuitry 7512 column digital processing circuitry 7514 row digital processing circuitry 7512 column digital processing circuitry 7514

ACTIVATION OF DIFFERENT SUBSETS OF DRIVE-SENSE CIRCUITS IN ACCORDANCE WITH DIFFERENT MODES OF OPERATION OF A TOUCH-BASED DEVICE

CROSS-REFERENCE TO RELATED APPLICATIONS

The present U.S. Utility patent application claims priority pursuant to 35 U.S.C. § 120 as a continuation of U.S. Utility application Ser. No. 18/317,297, entitled "ACTIVATION OF DIFFERENT SUBSETS OF DRIVE-SENSE CIRCUITS IN ACCORDANCE WITH DIFFERENT MODES OF OPERATION OF A TOUCH-BASED DEVICE", filed May 15, 2023, which is a continuation of U.S. Utility application Ser. No. 17/656,316, entitled "TOUCH-BASED DEVICE WITH INTERLACED ELECTRODE GRIDS", filed Mar. 24, 2022, now U.S. Pat. No. 11,709,563 issued on Jul. 25, 2023, which claims priority pursuant to 35 U.S.C. § 119(e) to U.S. Provisional Application No. 63/263,049, entitled "TOUCH-BASED DEVICE WITH INTERLACED ELECTRODE GRIDS", filed Oct. 26, 2021, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touch-screens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touch screen. As yet another example, the computing device processes the sensor signals to determine various data points in a production line of a product.

BRIEF DESCRIPTION OF THE SEVERAL VIEWS OF THE DRAWING(S)

FIG. 65I is a schematic block diagram illustrating example frequency components of signals transmitted by drive-sense circuits of a plurality of electrode grids in accordance with various embodiments;

DETAILED DESCRIPTION OF THE INVENTION

Figure 1:
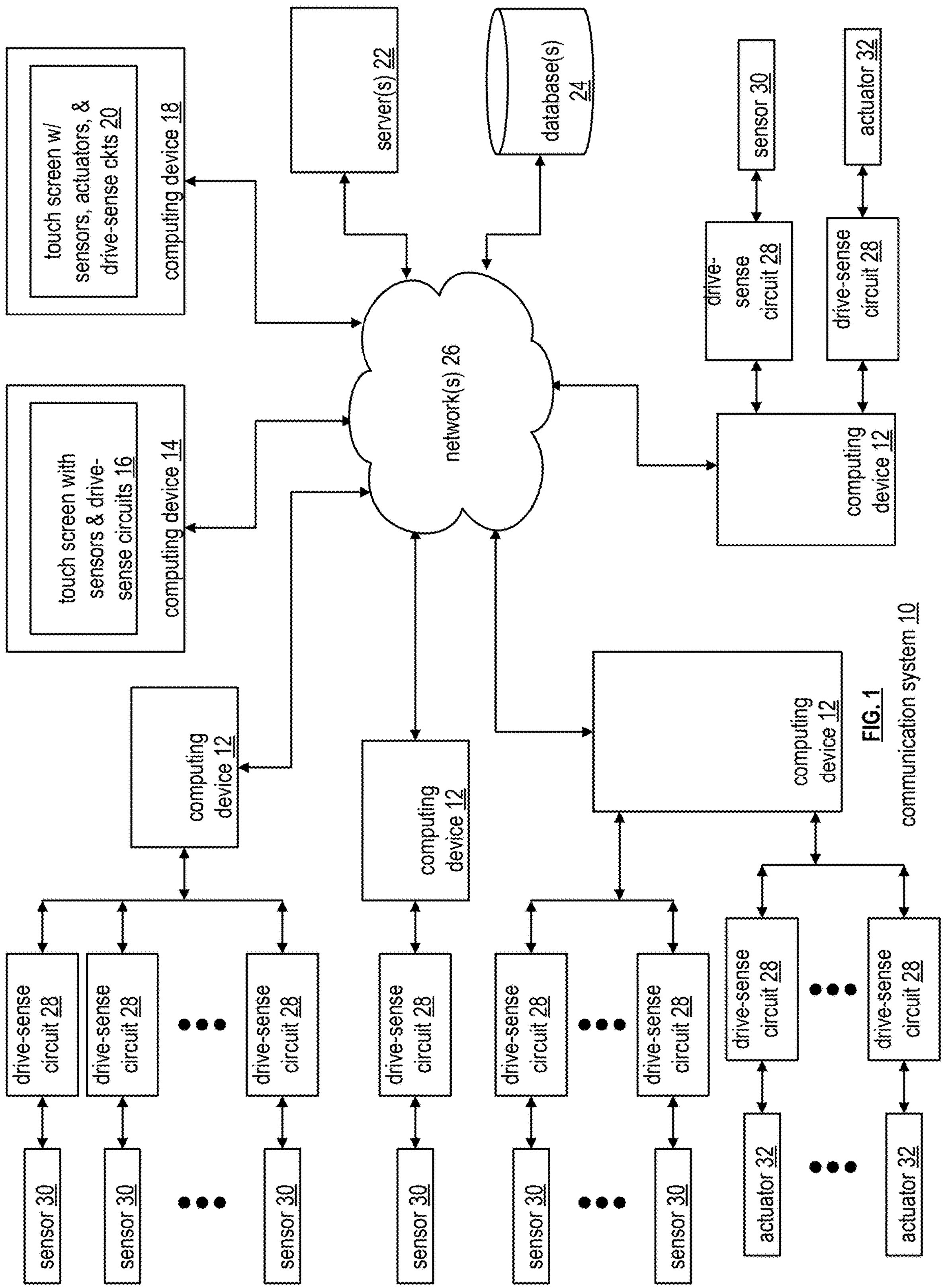
FIG. 1 is a schematic block diagram of an embodiment of a communication system in accordance with various embodiments.

FIG. 1 is a schematic block diagram of an embodiment of a communication system 10 that includes a plurality of computing. devices 12-10, one or more servers 22, one or more databases 24, one or more networks 26, a plurality of drive-sense circuits 28, a plurality of sensors 30, and a plurality of actuators 32. Computing devices 14 include a touch screen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a standalone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to; (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a senor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device **12-*x* is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-*x*. For example, the sensor 30 may be a piezoelectric microphone and the actuator 32** may be a piezoelectric speaker.

Figure 2:
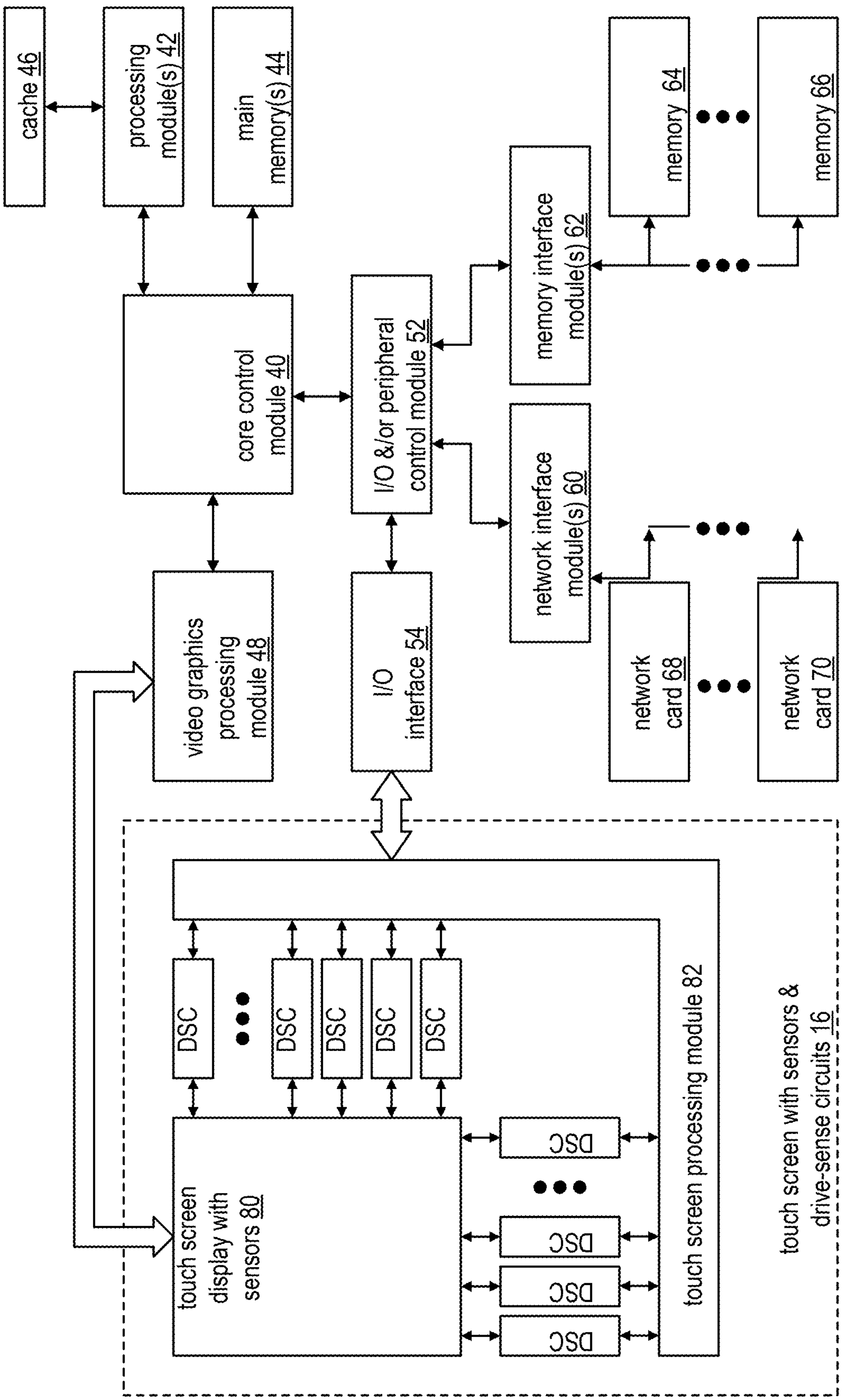
FIG. 2 is a schematic block diagram of an embodiment of a computing device in accordance with various embodiments.

FIG. 2 is a schematic block diagram of an embodiment of a computing device 12 (e.g., any one of 12-1 through **12-*x*). The computing device 12 includes a touch screen 16, a core control module 40, one or more processing modules 42, one or more main memories 44, cache memory 46, a video graphics processing module 48, a display 50, an Input- Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52** are one module, such as a chipset, a quick path interconnect (QPI), and/or an ultra-path interconnect (UPI).

The touch screen 16 includes a touch screen display 80, a plurality of sensors 30, a plurality of drive-sense circuits (DSC), and a touch screen processing module 82. In general, the sensors (e.g., electrodes, capacitor sensing cells, capacitor sensors, inductive sensor, etc.) detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

Figure 3:
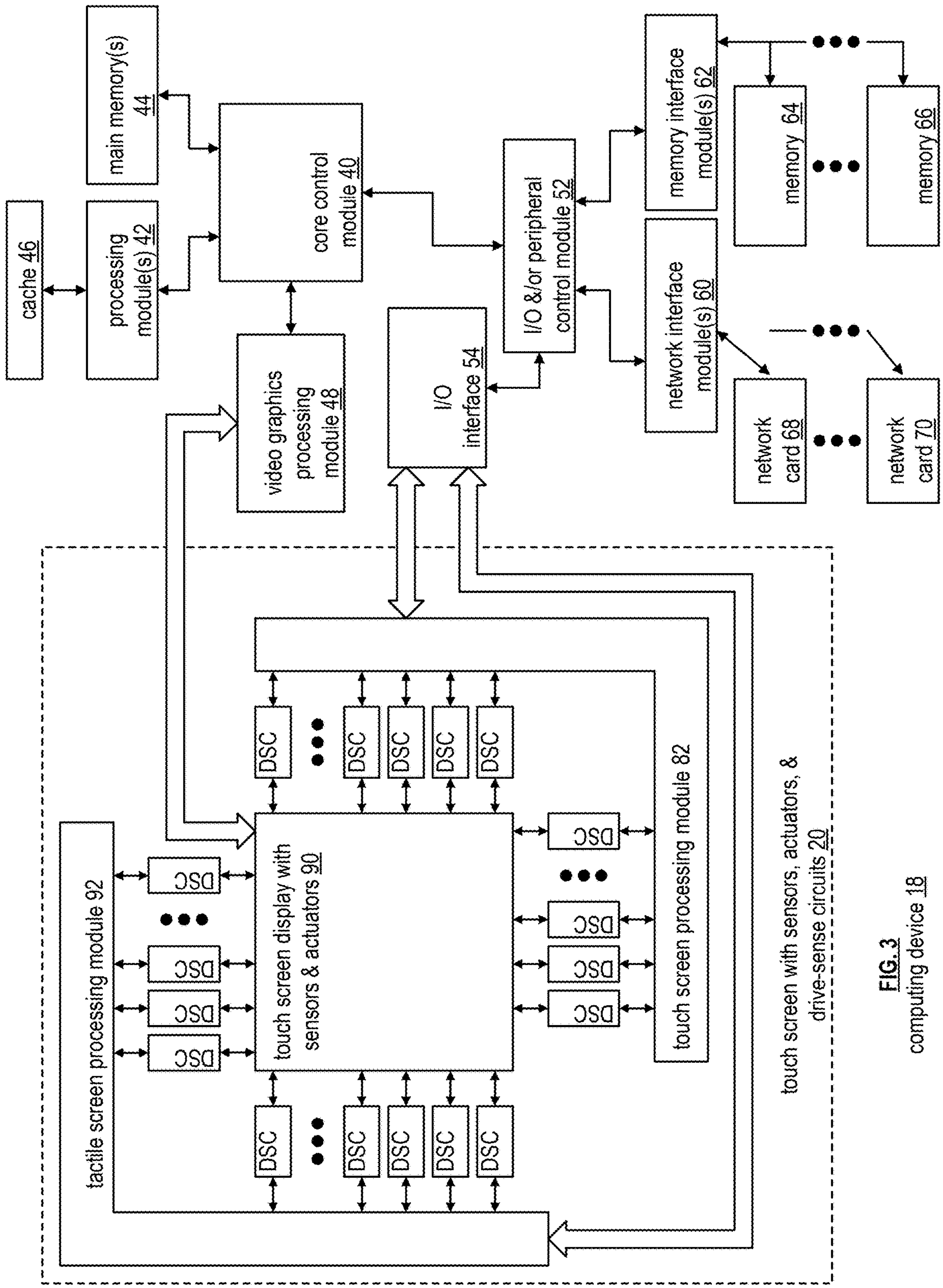
FIG. 3 is a schematic block diagram of another embodiment of a computing device in accordance with various embodiments.

FIG. 3 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touch screen processing module 82, and a tactile screen processing module 92.

Computing device 18 operates similarly to computing device 14 of FIG. 2 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

Figure 4:
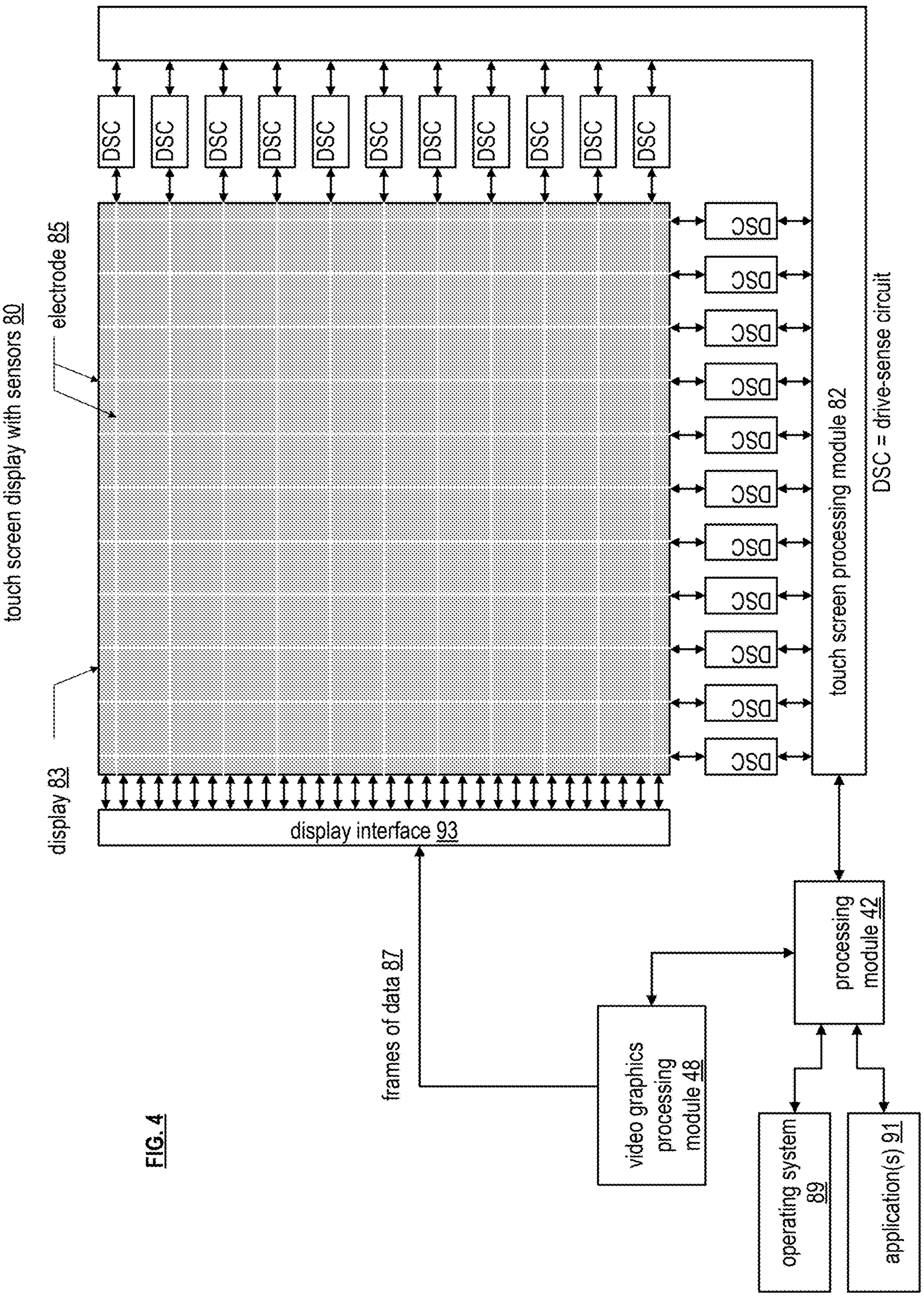
FIG. 4 is a schematic block diagram of an embodiment of a touch screen display in accordance with various embodiments.

FIG. 4 is a schematic block diagram of an embodiment of a touch screen display 80 that includes a plurality of drive-sense circuits (DSC), a touch screen processing module 82, a display 83, and a plurality of electrodes 85. The touch screen display 80 is coupled to a processing module 42, a video graphics processing module 48, and a display interface 93, which are components of a computing device (e.g., 14-18), an interactive display, or other device that includes a touch screen display. An interactive display functions to provide users with an interactive experience (e.g., touch the screen to obtain information, be entertained, etc.). For example, a store provides interactive displays for customers to find certain products, to obtain coupons, to enter contests, etc.

There are a variety of other devices that include a touch screen display. For example, a vending machine includes a touch screen display to select and/or pay for an item. As another example of a device having a touch screen display is an Automated Teller Machine (ATM). As yet another example, an automobile includes a touch screen display for entertainment media control, navigation, climate control, etc.

The touch screen display 80 includes a large display 83 that has a resolution equal to or greater than full high-definition (HD), an aspect ratio of a set of aspect ratios, and a screen size equal to or greater than thirty-two inches. The following table lists various combinations of resolution, aspect ratio, and screen size for the display 83, but it's not an exhaustive list.

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->=7680 | 720->=4320 | 1:1, 2:3, etc. | 2:3 | 50, 55, 60, 65, 70, 75, &/or >80 |

The display 83 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 83 further includes integrated electrodes 85 that provide the sensors for the touch sense part of the touch screen display. The electrodes 85 are distributed throughout the display area or where touch screen functionality is desired. For example, a first group of the electrodes are arranged in rows and a second group of electrodes are arranged in columns. As will be discussed in greater detail with reference to one or more of FIGS. 9-12, the row electrodes are separated from the column electrodes by a dielectric material.

The electrodes 85 are comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

While the display 83 is rendering the frames of video into visible images, the drive-sense circuits (DSC) provide sensor signals to the electrodes 85. When the screen is touched, capacitance of the electrodes 85 proximal to the touch (i.e., directly or close by) is changed. The DSCs detect the capacitance change for effected electrodes and provide the detected change to the touch screen processing module 82.

The touch screen processing module 82 processes the capacitance change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

Figure 5:
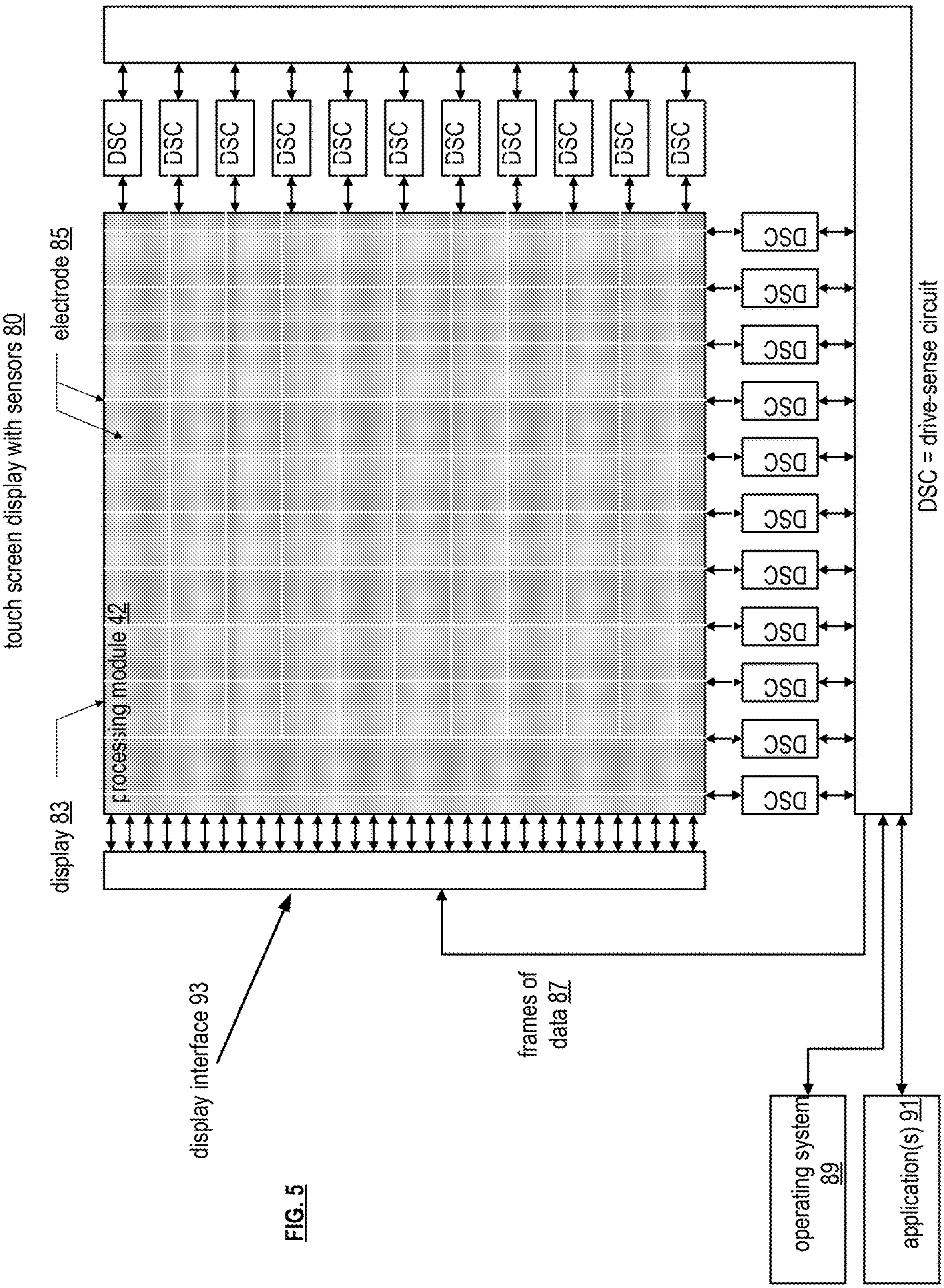
FIG. 5 is a schematic block diagram of another embodiment of a touch screen display in accordance with various embodiments.

FIG. 5 is a schematic block diagram of another embodiment of a touch screen display 80 that includes a plurality of drive-sense circuits (DSC), the processing module 42, a display 83, and a plurality of electrodes 85. The processing module 42 is executing an operating system 89 and one or more user applications 91 to produce frames of data 87. The processing module 42 provides the frames of data 87 to the display interface 93. The touch screen display 80 operates similarly to the touch screen display 80 of FIG. 4 with the above noted differences.

Figure 6:
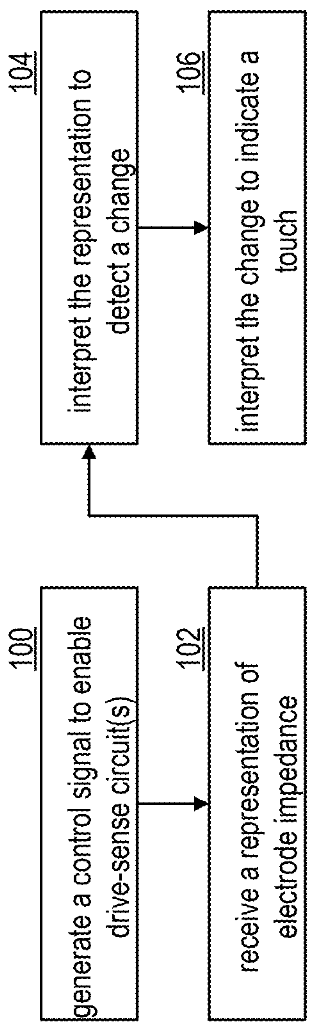
FIG. 6 is a logic diagram of an embodiment of a method for sensing a touch on a touch screen display in accordance with various embodiments.

FIG. 6 is a logic diagram of an embodiment of a method for sensing a touch on a touch screen display that is executed by one or more processing modules (e.g., 42, 82, and/or 48 of the previous figures). The method begins at step 100 where the processing module generate a control signal (e.g., power enable, operation enable, etc.) to enable a drive-sense circuit to monitor the sensor signal on the electrode. The processing module generates additional control signals to enable other drive-sense circuits to monitor their respective sensor signals.

In an example, the processing module enables all of the drive-sense circuits for continuous sensing for touches of the screen. In another example, the processing module enables a first group of drive-sense circuits coupled to a first group of row electrodes and enables a second group of drive-sense circuits coupled to a second group of column electrodes.

The method continues at step 102 where the processing module receives a representation of the impedance on the electrode from a drive-sense circuit. In general, the drive-sense circuit provides a drive signal to the electrode. The impedance of the electrode affects the drive signal. The effect on the drive signal is interpreted by the drive-sense circuit to produce the representation of the impedance of the electrode. The processing module does this with each activated drive-sense circuit in serial, in parallel, or in a serial-parallel manner.

The method continues at step 104 where the processing module interprets the representation of the impedance on the electrode to detect a change in the impedance of the electrode. A change in the impedance is indicative of a touch. For example, an increase in self-capacitance (e.g., the capacitance of the electrode with respect to a reference (e.g., ground, etc.)) is indicative of a touch on the electrode. As another example, a decrease in mutual capacitance (e.g., the capacitance between a row electrode and a column electrode) is also indicative of a touch near the electrodes. The processing module does this for each representation of the impedance of the electrode it receives. Note that the representation of the impedance is a digital value, an analog signal, an impedance value, and/or any other analog or digital way of representing a sensor's impedance.

The method continues at step 106 where the processing module interprets the change in the impedance to indicate a touch of the touch screen display in an area corresponding to the electrode. For each change in impedance detected, the processing module indicates a touch. Further processing may be done to determine if the touch is a desired touch or an undesired touch. Such further processing will be discussed in greater detail with reference to one or more of FIGS. 33-35.

Figure 7:
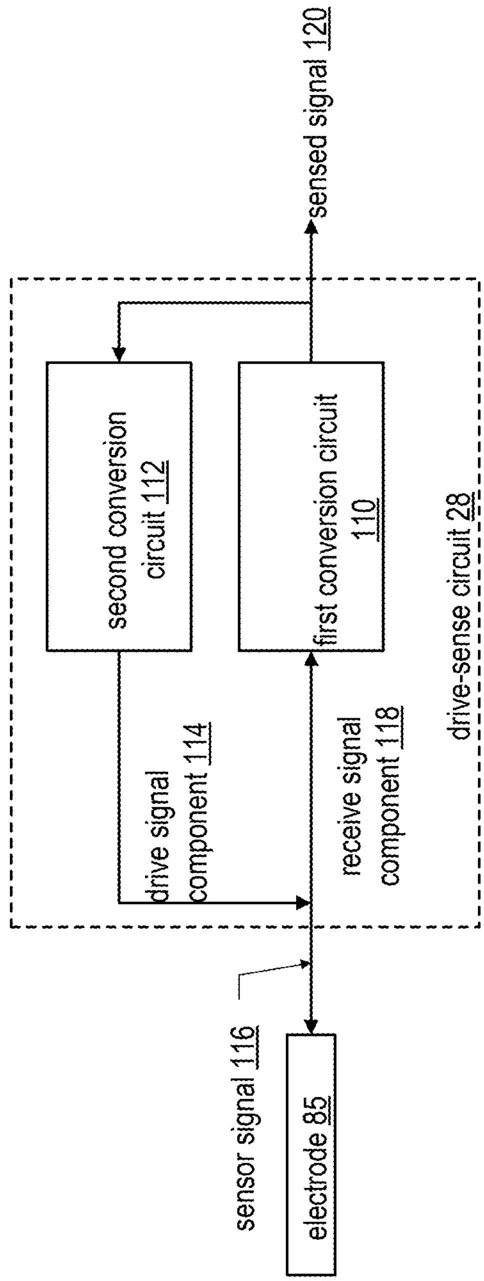
FIG. 7 is a schematic block diagram of an embodiment of a drive sense circuit in accordance with various embodiments.

FIG. 7 is a schematic block diagram of an embodiment of a drive sense circuit 28 that includes a first conversion circuit 110 and a second conversion circuit 112. The first conversion circuit 110 converts a sensor signal 116 into a sensed signal 120. The second conversion circuit 112 generates the drive signal component 114 from the sensed signal 112. As an example, the first conversion circuit 110 functions to keep the sensor signal 116 substantially constant (e.g., substantially matching a reference signal) by creating the sensed signal 120 to correspond to changes in a receive signal component 118 of the sensor signal. The second conversion circuit 112 functions to generate a drive signal component 114 of the sensor signal based on the sensed signal 120 to substantially compensate for changes in the receive signal component 118 such that the sensor signal 116 remains substantially constant.

In an example, the drive signal 116 is provided to the electrode 85 as a regulated current signal. The regulated current (I) signal in combination with the impedance (Z) of the electrode creates an electrode voltage (V), where $V=I*Z$. As the impedance (Z) of electrode changes, the regulated current (I) signal is adjusted to keep the electrode voltage (V) substantially unchanged. To regulate the current signal, the first conversion circuit 110 adjusts the sensed signal 120 based on the receive signal component 118, which is indicative of the impedance of the electrode and change thereof. The second conversion circuit 112 adjusts the regulated current based on the changes to the sensed signal 120.

As another example, the drive signal 116 is provided to the electrode 85 as a regulated voltage signal. The regulated voltage (V) signal in combination with the impedance (Z) of the electrode creates an electrode current (I), where $I=V/Z$. As the impedance (Z) of electrode changes, the regulated voltage (V) signal is adjusted to keep the electrode current (I) substantially unchanged. To regulate the voltage signal, the first conversion circuit 110 adjusts the sensed signal 120 based on the receive signal component 118, which is indicative of the impedance of the electrode and change thereof. The second conversion circuit 112 adjusts the regulated voltage based on the changes to the sensed signal 120.

Figure 8:
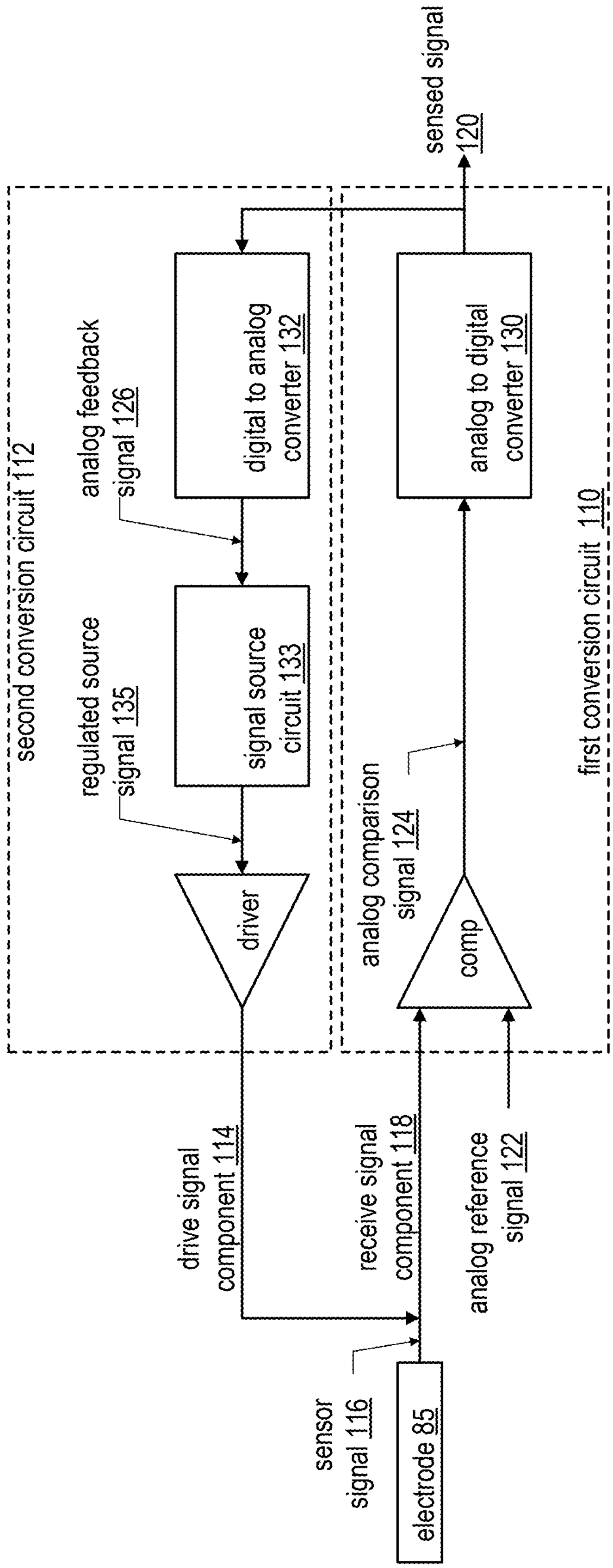
FIG. 8 is a schematic block diagram of another embodiment of a drive sense circuit in accordance with various embodiments.

FIG. 8 is a schematic block diagram of another embodiment of a drive sense circuit 28 that includes a first conversion circuit 110 and a second conversion circuit 112. The first conversion circuit 110 includes a comparator (comp) and an analog to digital converter 130. The second conversion circuit 112 includes a digital to analog converter 132, a signal source circuit 133, and a driver.

In an example of operation, the comparator compares the sensor signal 116 to an analog reference signal 122 to produce an analog comparison signal 124. The analog reference signal 124 includes a DC component and an oscillating component. As such, the sensor signal 116 will have a substantially matching DC component and oscillating component. An example of an analog reference signal 122 will be described in greater detail with reference to FIG. 15.

The analog to digital converter 130 converts the analog comparison signal 124 into the sensed signal 120. The analog to digital converter (ADC) 130 may be implemented in a variety of ways. For example, the (ADC) 130 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 214 may be a sigma-delta DAC, a pulse width modulator DAC, a binary weighted DAC, a successive approximation DAC, and/or a thermometer-coded DAC.

The digital to analog converter (DAC) 132 converts the sensed signal 120 into an analog feedback signal 126. The signal source circuit 133 (e.g., a dependent current source, a linear regulator, a DC-DC power supply, etc.) generates a regulated source signal 135 (e.g., a regulated current signal or a regulated voltage signal) based on the analog feedback signal 126. The driver increases power of the regulated source signal 135 to produce the drive signal component 114.

Figure 9A:
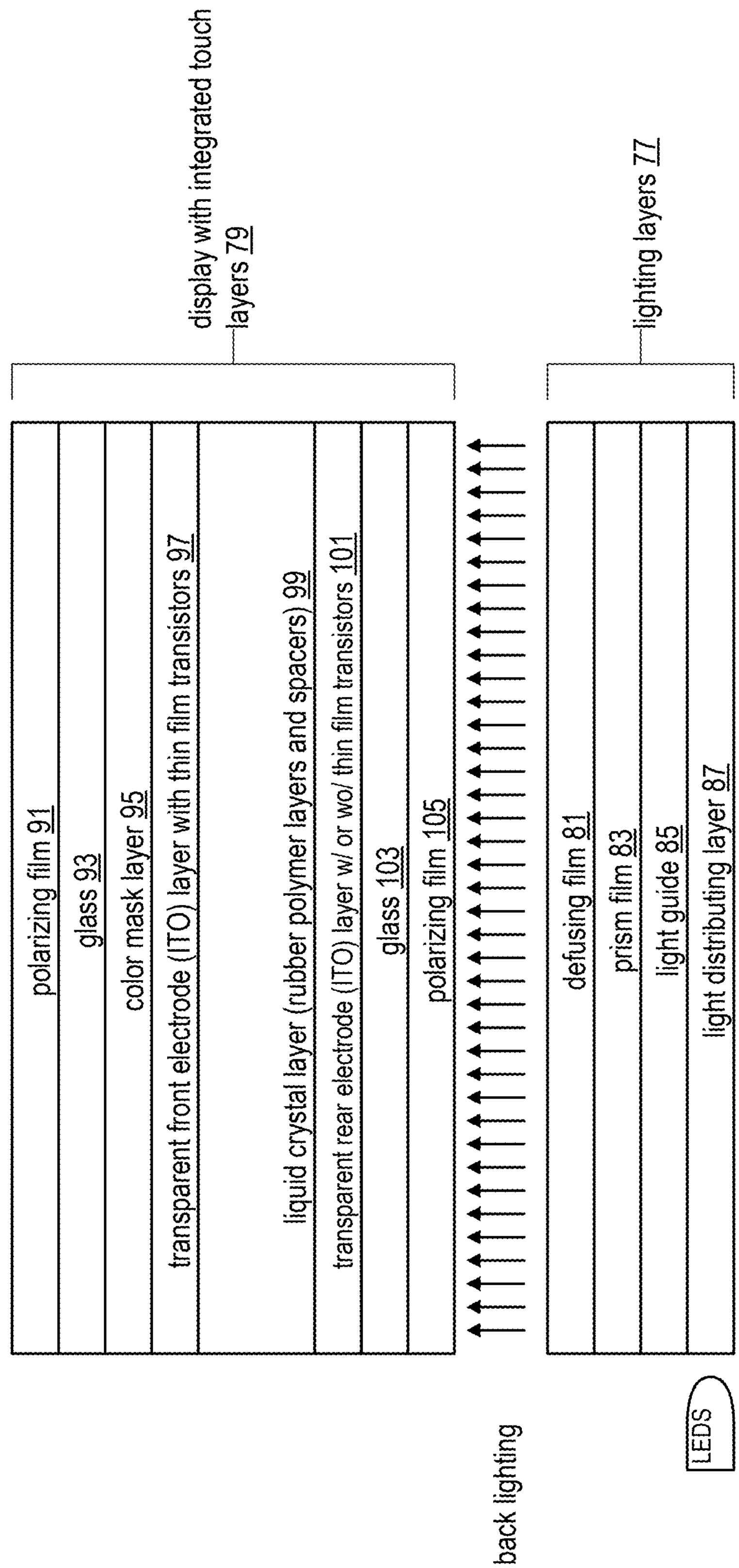
FIG. 9A is a cross section schematic block diagram of an example of a touch screen display with in-cell touch sensors in accordance with various embodiments.

FIG. 9A is a cross section schematic block diagram of an example of a touch screen display 83 with in-cell touch sensors, which includes lighting layers 77 and display with integrated touch sensing layers 79. The lighting layers 77 include a light distributing layer 87, a light guide layer 85, a prism film layer 83, and a defusing film layer 81. The display with integrated touch sensing layers 79 include a rear polarizing film layer 105, a glass layer 103, a rear transparent electrode layer with thin film transistors 101 (which may be two or more separate layers), a liquid crystal layer (e.g., a rubber polymer layer with spacers) 99, a front electrode layer with thin film transistors 97, a color mask layer 95, a glass layer 93, and a front polarizing film layer 91. Note that one or more protective layers may be applied over the polarizing film layer 91.

In an example of operation, arrow of LEDs (light emitted diodes) projects light into the light distributing player 87, which projects the light towards the light guide 85. The light guide includes a plurality of holes that let's some light components pass at differing angles. The prism film layer 83 increases perpendicularity of the light components, which are then defused by the defusing film layer 81 to provide a substantially even back lighting for the display with integrated touch sense layers 79.

The two polarizing film layers 105 and 91 are orientated to block the light (i.e., provide black light). The front and rear electrode layers 97 and 101 provide an electric field at a sub-pixel level to orientate liquid crystals in the liquid crystal layer 99 to twist the light. When the electric field is off, or is very low, the liquid crystals are orientated in a first manner (e.g., end-to-end) that does not twist the light, thus, for the sub-pixel, the two polarizing film layers 105 and 91 are blocking the light. As the electric field is increased, the orientation of the liquid crystals change such that the two polarizing film layers 105 and 91 pass the light (e.g., white light). When the liquid crystals are in a second orientation (e.g., side by side), intensity of the light is at its highest point.

The color mask layer 95 includes three sub-pixel color masks (red, green, and blue) for each pixel of the display, which includes a plurality of pixels (e.g., 1440×1080). As the electric field produced by electrodes change the orientations of the liquid crystals at the sub-pixel level, the light is twisted to produce varying sub-pixel brightness. The sub-pixel light passes through its corresponding sub-pixel color mask to produce a color component for the pixel. The varying brightness of the three sub-pixel colors (red, green, and blue), collectively produce a single color to the human eye. For example, a blue shirt has a 12% red component, a 20% green component, and 55% blue component.

The in-cell touch sense functionality uses the existing layers of the display layers 79 to provide capacitance-based sensors. For instance, one or more of the transparent front and rear electrode layers 97 and 101 are used to provide row electrodes and column electrodes. Various examples of creating row and column electrodes from one or more of the transparent front and rear electrode layers 97 and 101 is discussed in some of the subsequent figures.

Figure 9B:
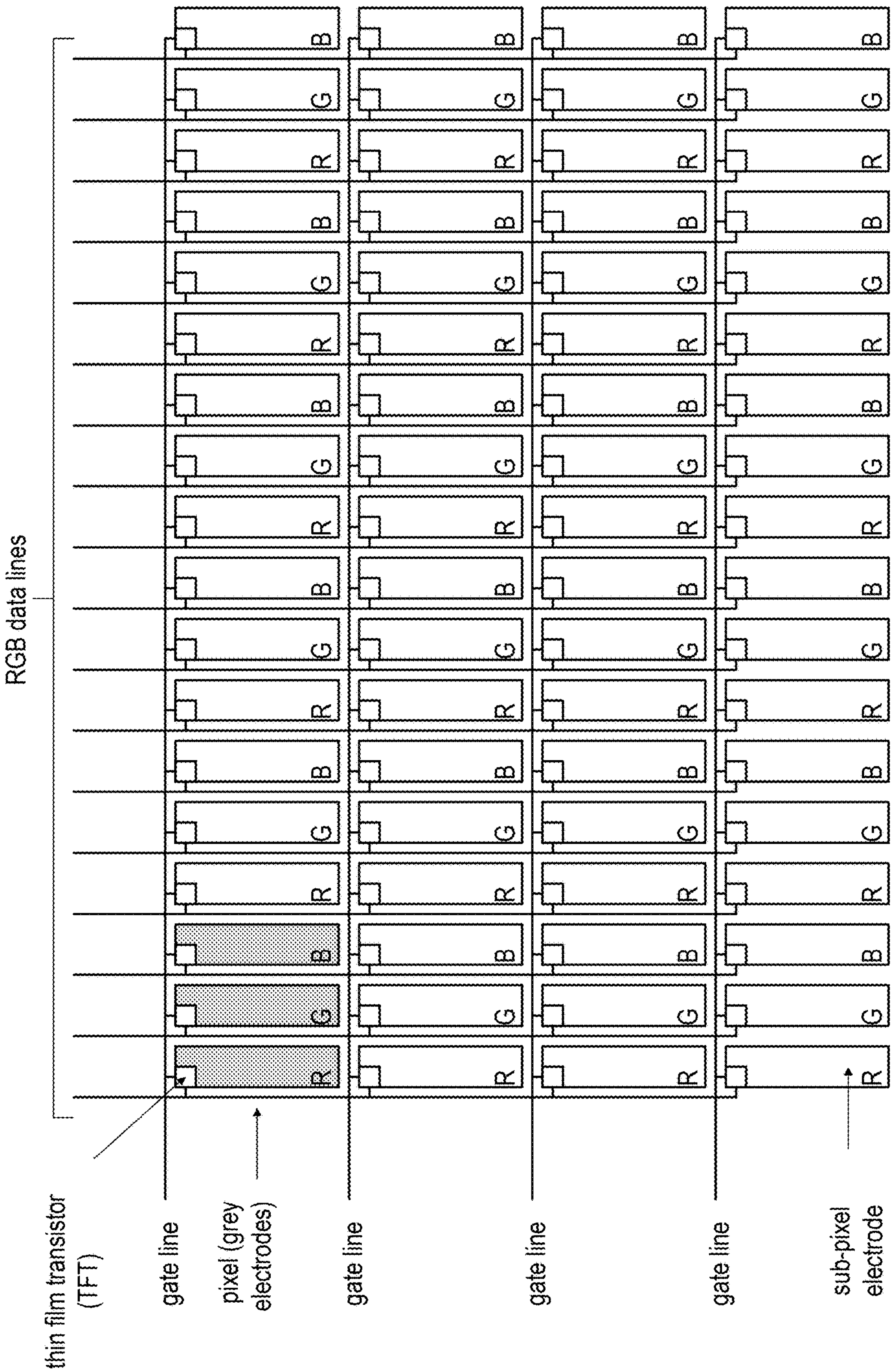
FIG. 9B is a schematic block diagram of an example of a transparent electrode layer with thin film transistors in accordance with various embodiments.

FIG. 9B is a schematic block diagram of an example of a transparent electrode layer 97 and/or 101 with thin film transistors (TFT). Sub-pixel electrodes are formed on the transparent electrode layer and each sub-pixel electrode is coupled to a thin film transistor (TFT). Three sub-pixels (R—red, G—green, and B—blue) form a pixel. The gates of the TFTs associated with a row of sub-electrodes are coupled to a common gate line. In this example, each of the four rows has its own gate line. The drains (or sources) of the TFTs associated with a column of sub-electrodes are coupled to a common R, B, or G data line. The sources (or drains) of the TFTs are coupled to its corresponding sub-electrode.

In an example of operation, one gate line is activated at a time and RGB data for each pixel of the corresponding row is placed on the RGB data lines. At the next time interval, another gate line is activated and the RGB data for the pixels of that row is placed on the RGB data lines. For 1080 rows and a refresh rate of 60 Hz, each row is activated for about 15 microseconds each time it is activated, which is 60 times per second. When the sub-pixels of a row are not activated, the liquid crystal layer holds at least some of the charge to keep an orientation of the liquid crystals.

Figure 9C:
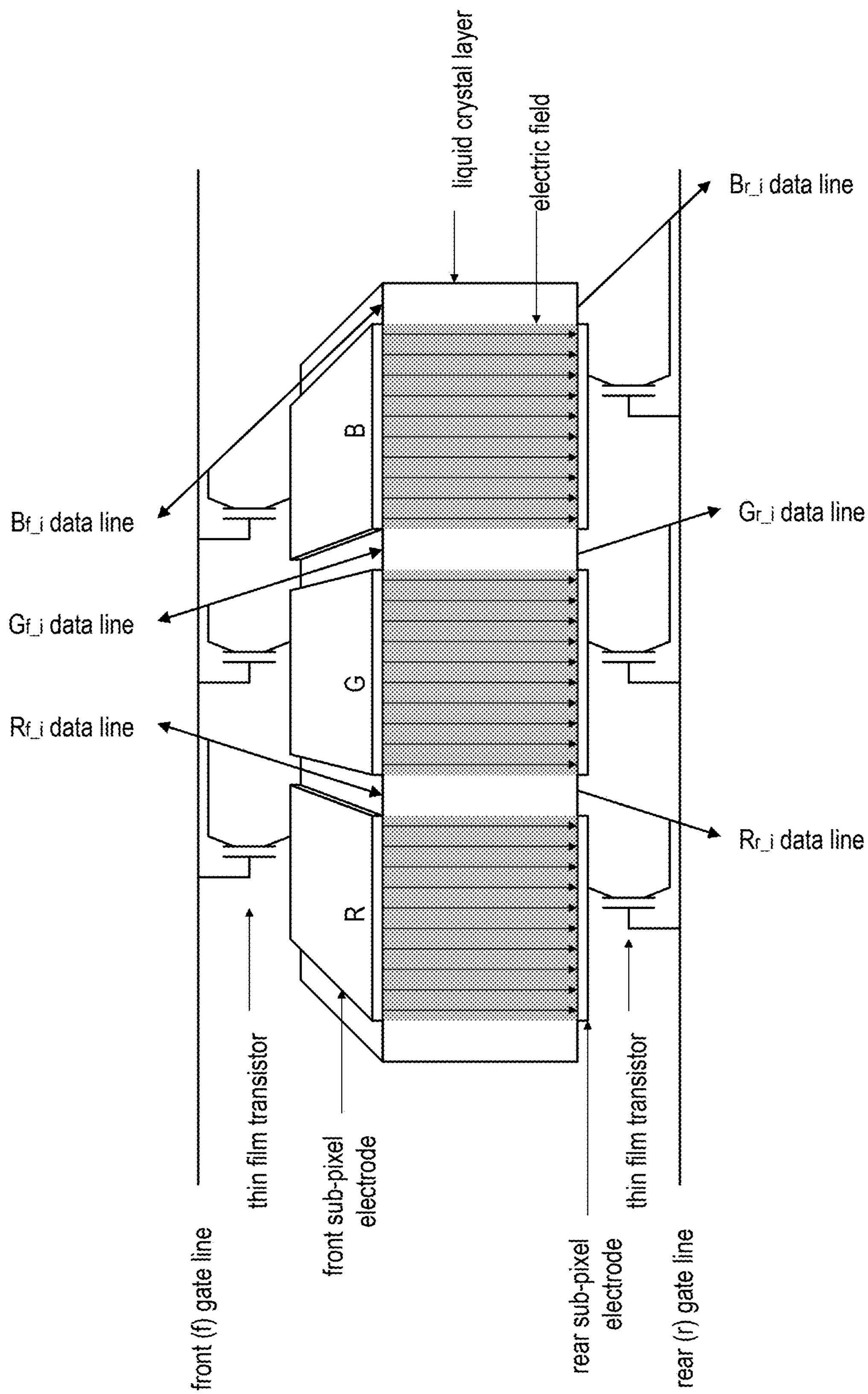
FIG. 9C is a schematic block diagram of an example of a pixel with three sub-pixels in accordance with various embodiments.

FIG. 9C is a schematic block diagram of an example of a pixel with three sub-pixels (R—red, G—green, and B—blue). In this example, the front sub-pixel electrodes are formed in the front transparent conductor layer 97 and the rear sub-pixel electrodes are formed in the rear transparent conductor layer 101. Each front and rear sub-pixel electrode is coupled to a corresponding thin film transistor. The thin film transistors coupled to the top sub-pixel electrodes are coupled to a front (f) gate line and to front R, G, and B data lines. The thin film transistors coupled to the bottom sub-pixel electrodes are coupled to a rear (f) gate line and to rear R, G, and B data lines.

To create an electric field between related sub-pixel electrodes, a differential gate signal is applied to the front and rear gate lines and differential R, G, and B data signals are applied to the front and rear R, G, and B data lines. For example, for the red (R) sub-pixel, the thin film transistors are activated by the signal on the gate lines. The electric field created by the red sub-pixel electrodes is depending on the front and rear Red data signals. As a specific example, a large differential voltage creates a large electric field, which twists the light towards maximum light passing and increases the red component of the pixel.

The gate lines and data lines are non-transparent wires (e.g., copper) that are positioned between the sub-pixel electrodes such that they are hidden from human sight. The non-transparent wires may be on the same layer as the sub-pixel electrodes or on different layers and coupled using vias.

Figure 9D:
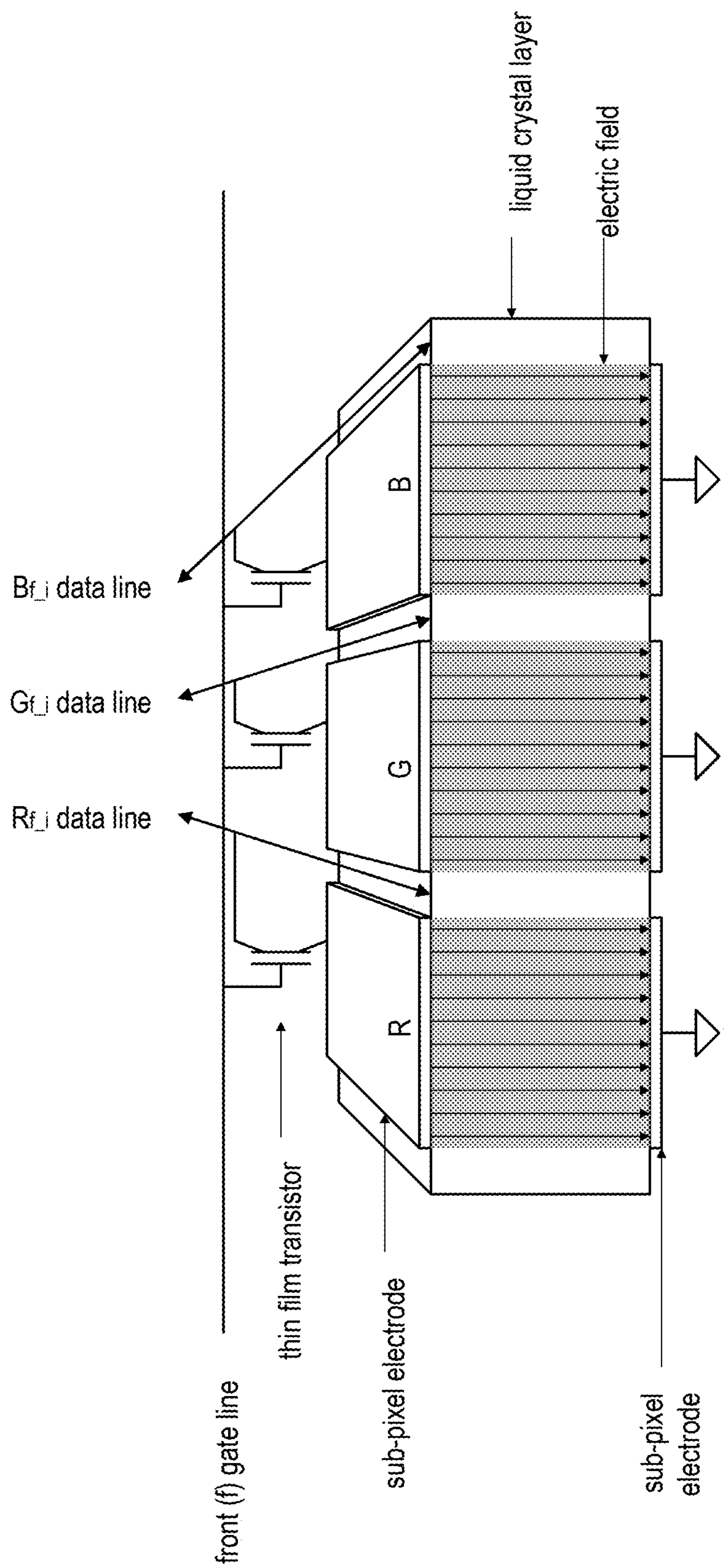
FIG. 9D is a schematic block diagram of another example of a pixel with three sub-pixels in accordance with various embodiments.

FIG. 9D is a schematic block diagram of another example of a pixel with three sub-pixels (R—red, G—green, and B—blue). In this example, the front sub-pixel electrodes are formed in the front transparent conductor layer 97 and the rear sub-pixel electrodes are formed in the rear transparent conductor layer 101. Each front sub-pixel electrode is coupled to a corresponding thin film transistor. The thin film transistors coupled to the top sub-pixel electrodes are coupled to a front (f) gate line and to front R, G, and B data lines. Each rear sub-pixel electrode is coupled to a common voltage reference (e.g., ground, which may be a common ground plane or a segmented common ground plane (e.g., separate ground planes coupled together to form a common ground plane)).

To create an electric field between related sub-pixel electrodes, a single-ended gate signal is applied to the front gate lines and a single-ended R, G, and B data signals are applied to the front R, G, and B data lines. For example, for the red (R) sub-pixel, the thin film transistors are activated by the signal on the gate lines. The electric field created by the red sub-pixel electrodes is depending on the front Red data signals.

Figure 9E:
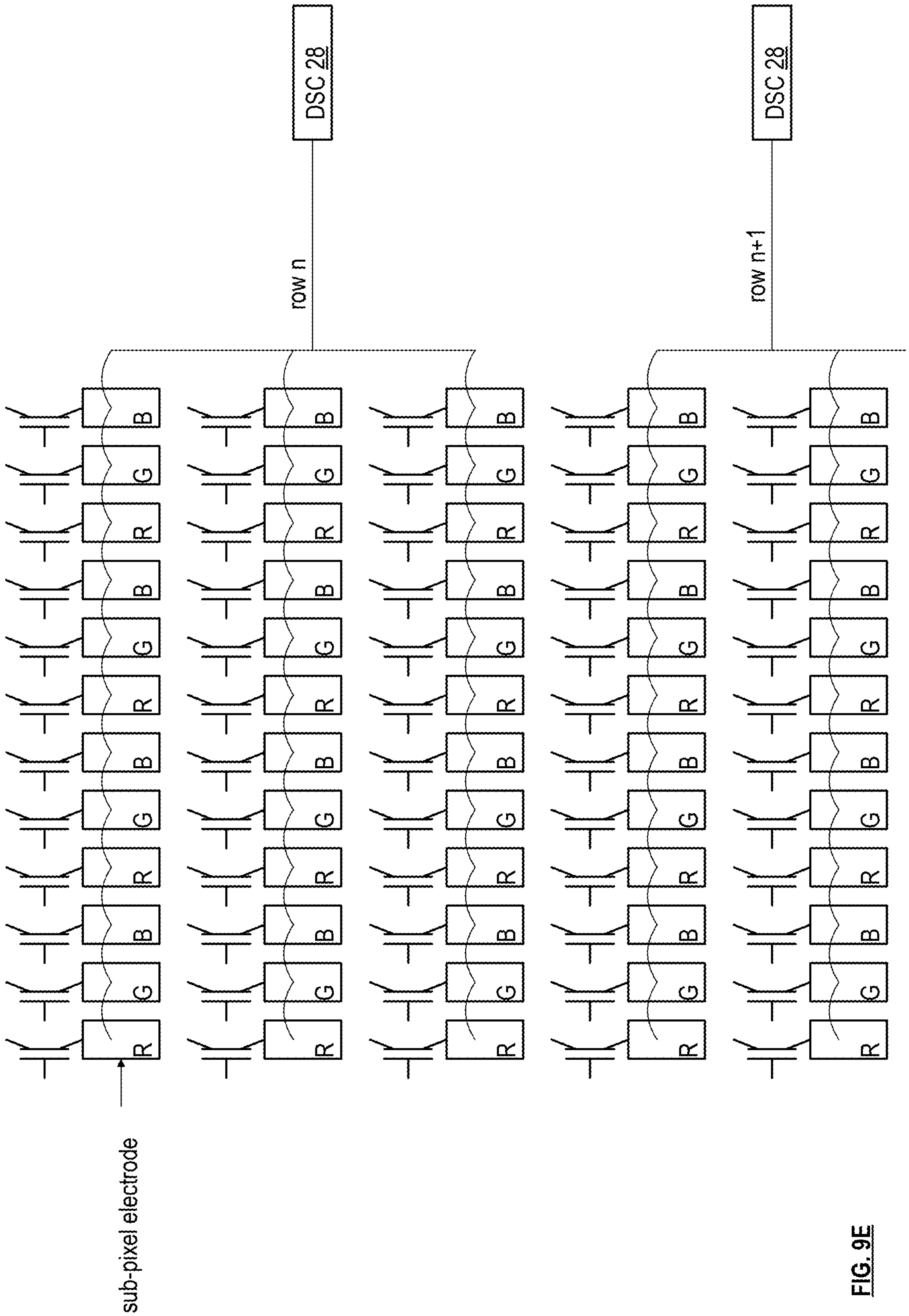
FIG. 9E is a schematic block diagram of an example of sub-pixel electrodes coupled together to form row electrodes of a touch screen sensor in accordance with various embodiments.

FIG. 9E is a schematic block diagram of an example of sub-pixel electrodes of the front or back electrode layer 97 or 101 coupled together to form row electrodes of a touch screen sensor. In this example, 3 rows of sub-pixel electrodes are coupled together by conductors (e.g., wires, metal traces, vias, etc.) to form one row electrode, which is coupled to a drive sense circuit (DSC) 28. More or less rows of sub-pixel electrodes may be coupled together to form a row electrode.

Figure 9F:
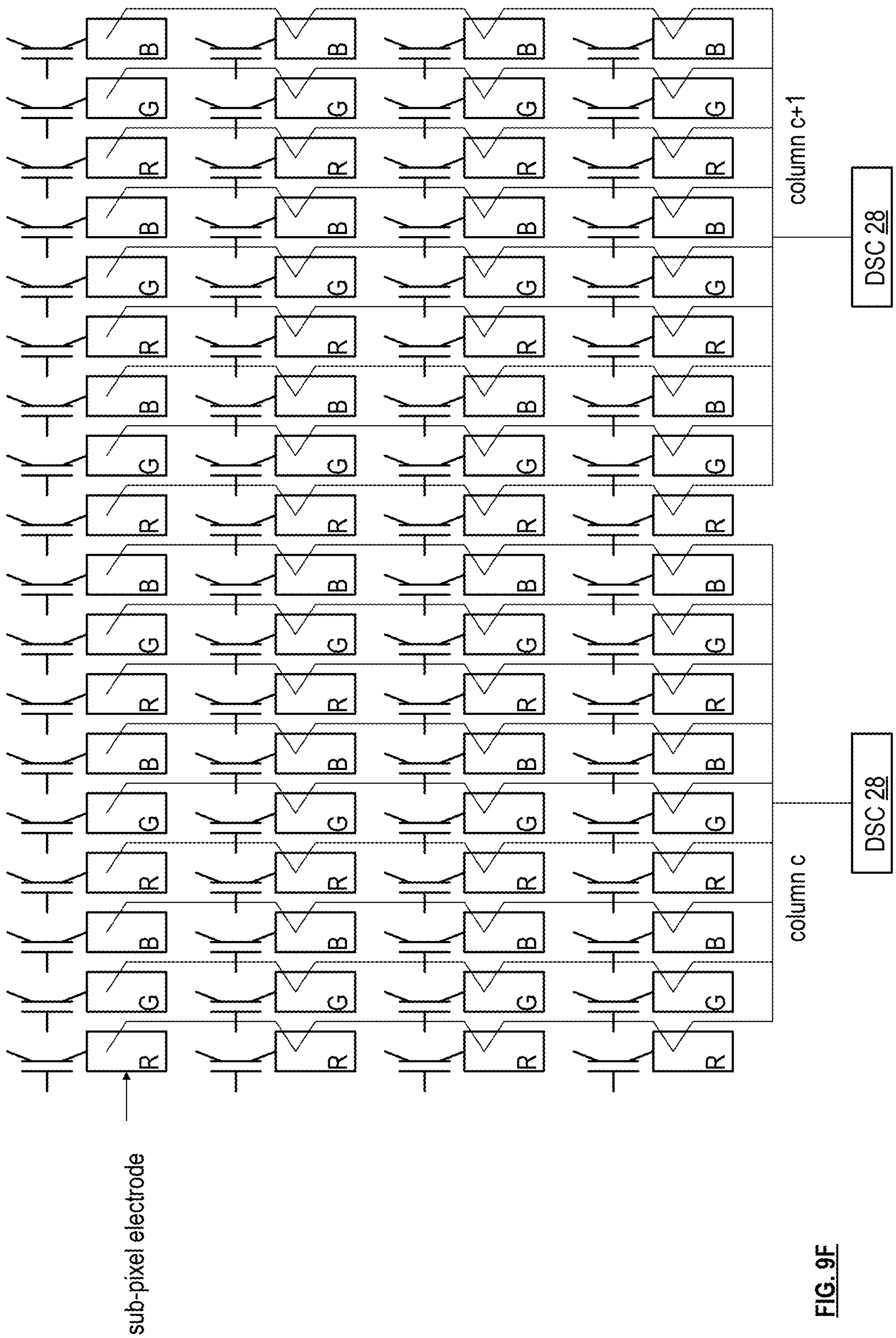
FIG. 9F is a schematic block diagram of an example of sub-pixel electrodes coupled together to form column electrodes of a touch screen sensor in accordance with various embodiments.

FIG. 9F is a schematic block diagram of an example of sub-pixel electrodes front or back electrode layer 97 or 101 coupled together to form column electrodes of a touch screen sensor. In this example, 9 columns of sub-pixel electrodes are coupled together by conductors (e.g., wires, metal traces, vias, etc.) to form one column electrode, which is coupled to a drive sense circuit (DSC) 28. More or less columns of sub-pixel electrodes may be coupled together to form a column electrode.

With respect to FIGS. 9E and 9F, the row electrodes may be formed on one of the transparent conductor layers 97 or 101 and the column electrodes are formed on the other. In this instance, differential signaling is used for display functionality of sub-pixel electrodes and a common mode voltage is used for touch sensing on the row and column electrodes. This allows for concurrent display and touch sensing operations with negligible adverse effect on display operation.

Figure 9G:
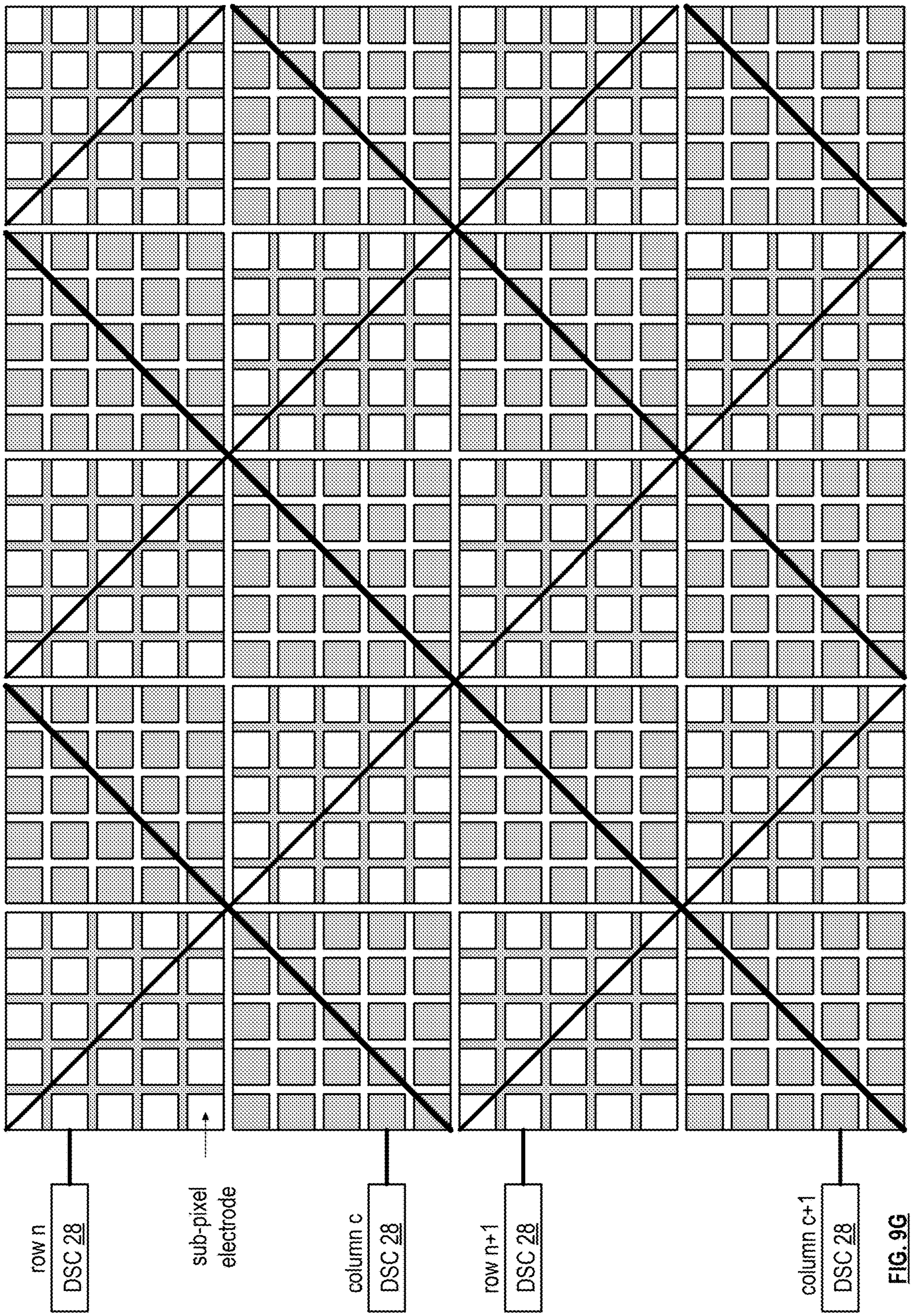
FIG. 9G is a schematic block diagram of an example of sub-pixel electrodes coupled together to form row electrodes and column electrodes of a touch screen sensor in accordance with various embodiments.

FIG. 9G is a schematic block diagram of an example of sub-pixel electrodes coupled together to form row electrodes and column electrodes of a touch screen sensor on one of the transparent conductive layers 97 or 101. In this example, 5×5 sub-pixel electrodes are coupled together to form a square (or diamond, depending on orientation), or other geometric shape. The 5 by 5 squares are then cross coupled together to form a row electrode or a column electrode.

In this example, white sub-pixel sub-electrodes with a grey background are grouped to form a row electrode for touch sensing and the grey sub-pixels with the white background are grouped to form a column electrode. Each row electrode and column electrode is coupled to a drive sense circuit (DSC) 28. As shown, the row and column electrodes for touch sensing are diagonal. Note that the geometric shape of the row and column electrodes may be of a different configuration (e.g., zig-zag pattern, lines, etc.) and that the number of sub-pixel electrodes per square (or other shape) may include more or less than 25.

Figure 9H:
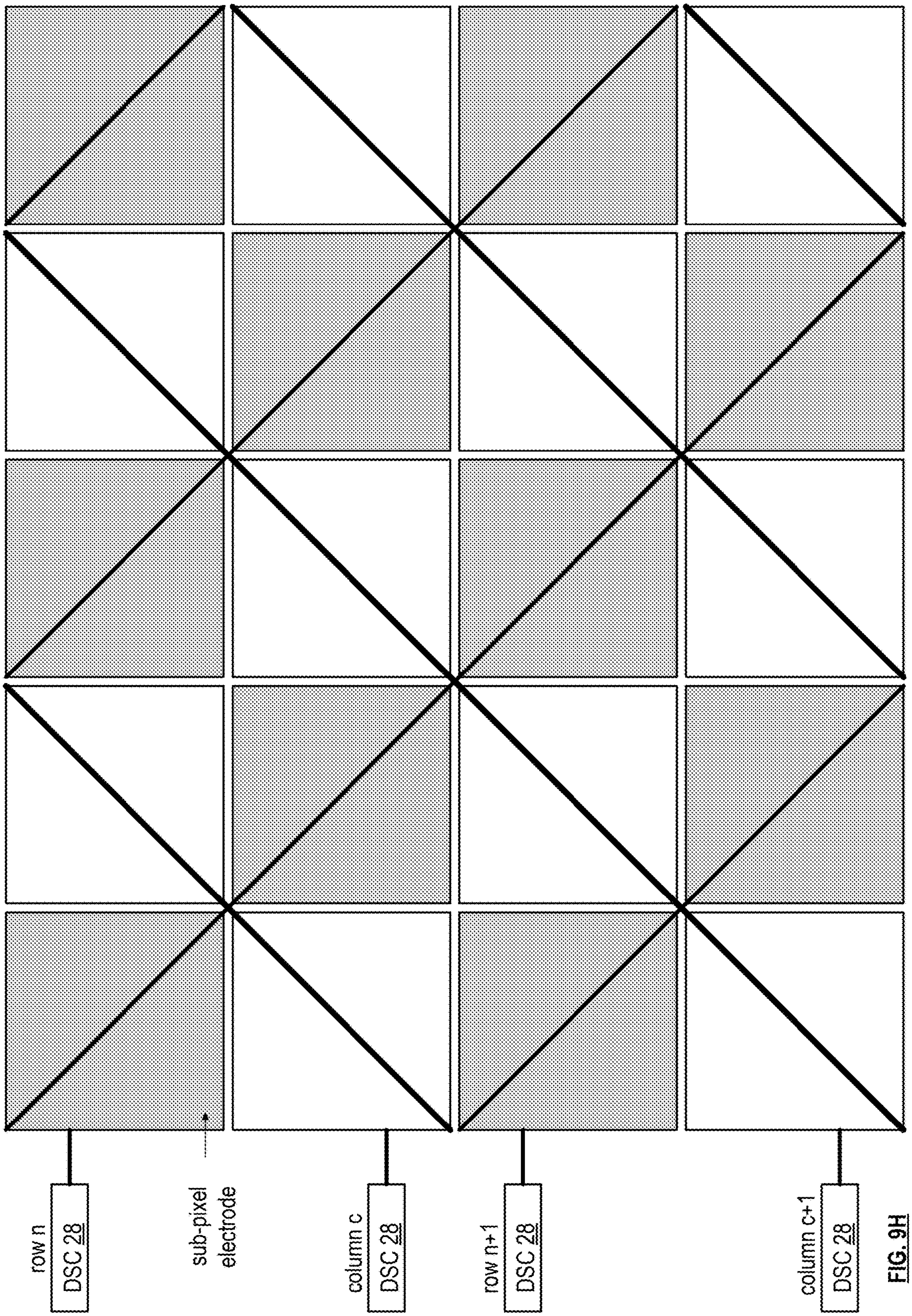
FIG. 9H is a schematic block diagram of an example of a segmented common ground plane forming row electrodes and column electrodes of a touch screen sensor in accordance with various embodiments.

FIG. 9H is a schematic block diagram of an example of a segmented common ground plane forming row electrodes and column electrodes of a touch screen sensor on the rear transparent conductive layer 101. In this instance, each square (or other shape) corresponds to a segment of a common ground plane that services a group of sub-pixel electrodes on the front transparent layer 97. The squares (or other shape) are coupled together to form row electrodes and column electrodes. The white segmented common ground planes are coupled together to form column electrodes and the grey segmented common ground planes are coupled together to form row electrodes. By implementing the on-cell touch screen row and column electrodes in the common ground plane, display and touch sense functionalities may be concurrently executed with negligible adverse effects on the display functionality.

Figure 9I:
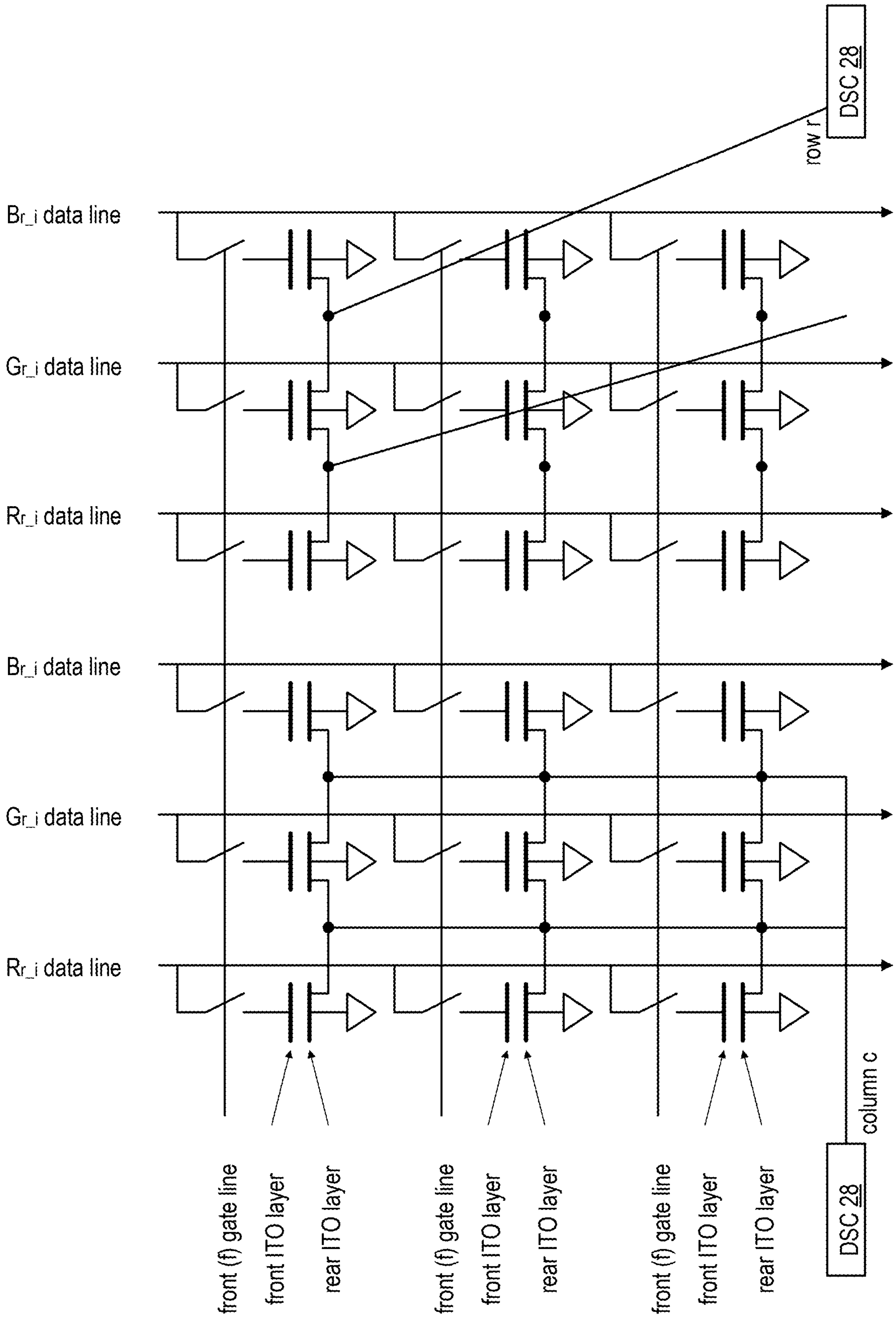
FIG. 9I is a schematic block diagram of another example of sub-pixel electrodes coupled together to form row and column electrodes of a touch screen sensor in accordance with various embodiments.

FIG. 9I is a schematic block diagram of another example of sub-pixel electrodes coupled together to form row and column electrodes of a touch screen sensor. In this example, a sub-pixel is represented as a capacitor, with the top plate being implemented in the front ITO layer 97 and the bottom plate being implemented in the back ITO layer 101, which is implemented as a common ground plan. The thin film transistors are represented as switches. In this example, 3×3 sub-pixel electrodes on the rear ITO layer are coupled together to form a portion of a row electrode for touch sensing or a column electrode for touch sensing. With each of the drive sense circuits 28 injecting a common signal for self-capacitance sensing, the common signal has negligible adverse effects on the display operation of the sub-pixels.

Figure 9J:
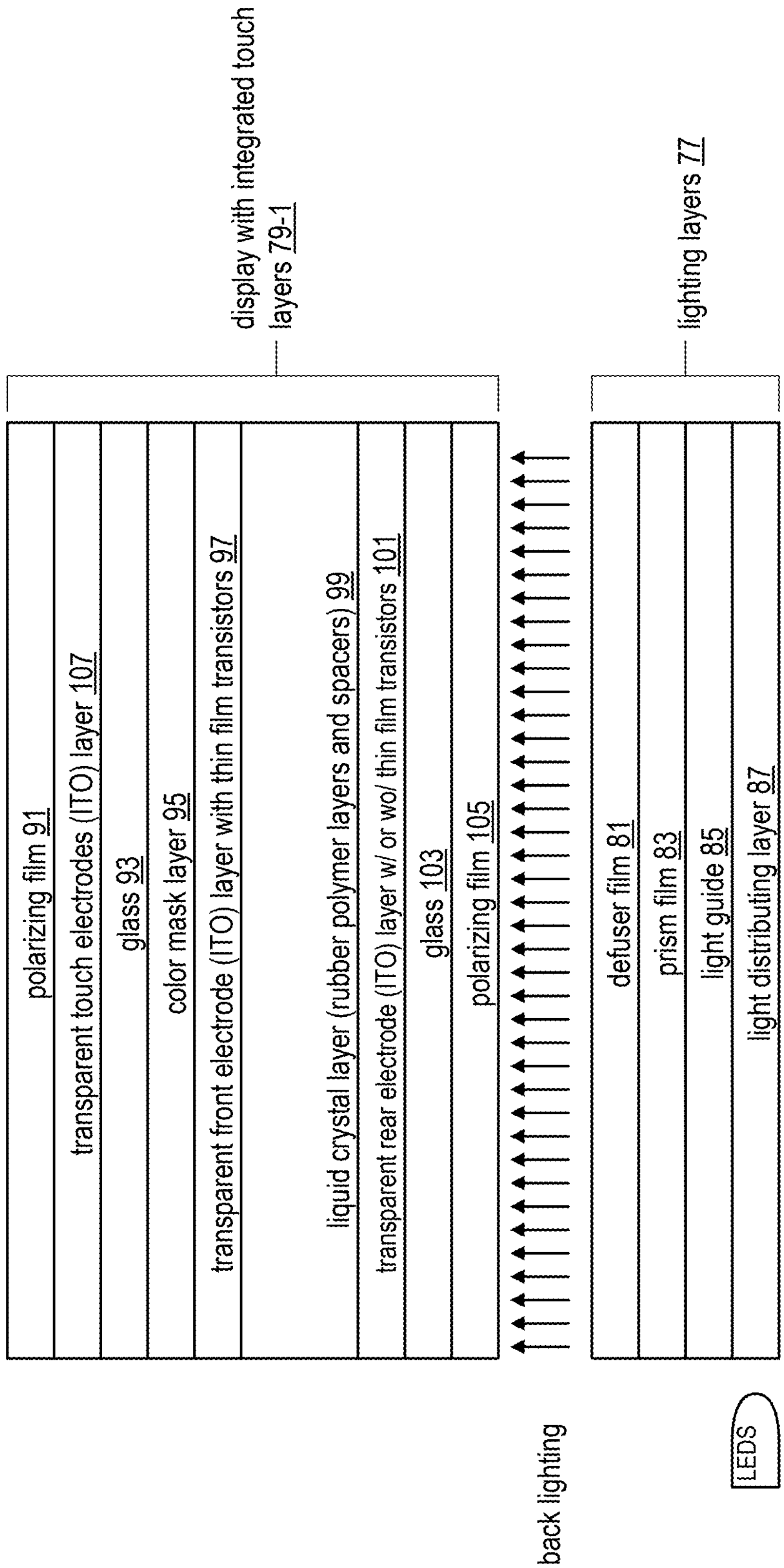
FIG. 9J is a cross section schematic block diagram of an example of a touch screen display with on-cell touch sensors in accordance with various embodiments.

FIG. 9J is a cross section schematic block diagram of an example of a touch screen display 83-1 with on-cell touch sensors, which includes lighting layers 77 and display with integrated touch sensing layers 79. The lighting layers 77 include a light distributing layer 87, a light guide layer 85, a prism film layer 83, and a defusing film layer 81. The display with integrated touch sensing layers 79 include a rear polarizing film layer 105, a glass layer 103, a rear transparent electrode layer with thin film transistors 101 (which may be two or more separate layers), a liquid crystal layer (e.g., a rubber polymer layer with spacers) 99, a front electrode layer with thin film transistors 97, a color mask layer 95, a glass layer 93, a transparent touch layer 107, and a front polarizing film layer 91. Note that one or more protective layers may be applied over the polarizing film layer 91.

The lighting layer 77 and the display with integrated touch sensing layer 79-1 function as described with reference to FIG. 9A for generating a display. A difference lies in how on-cell touch sensing of this embodiment in comparison to the in-cell touch sensing of FIG. 9A. In particular, this embodiment includes an extra transparent conductive layer 107 to provide, or assist, with capacitive-based touch sensing. For example, the extra transparent conductive layer 107 includes row and column electrodes as shown in FIG. 9H. As another example, the extra transparent conductive layer 107 includes row electrodes or column electrodes and another one of the conductive layers 97 or 101 includes the other electrodes (e.g., column electrodes if the extra transparent layer includes row electrodes).

Figure 10A:
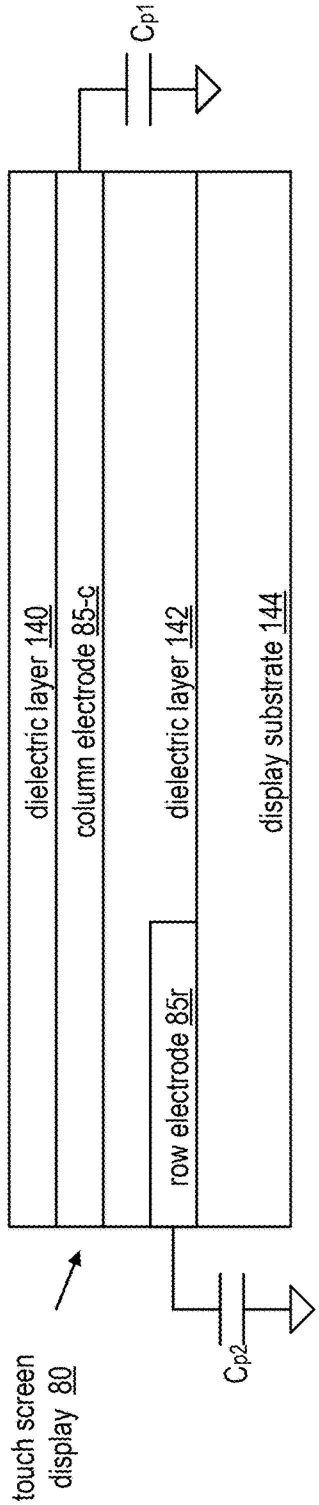
FIG. 10A is a cross section schematic block diagram of an example of self-capacitance with no-touch on a touch screen display in accordance with various embodiments.

FIG. 10A is a cross section schematic block diagram of a touch screen display 80 without a touch of a finger or a pen. The cross section is taken parallel to a column electrode 85-*c* and a perpendicular to a row electrode 85-*r*. The column electrode 85-*c* is positioned between two dielectric layers 140 and 142. Alternatively, the column electrode 85-*c* is in the second dielectric layer 142. The row electrode 85-*r* is positioned in the second dielectric layer 142. Alternatively, the row electrode 85-*r* is positioned between the dielectric layer 142 and the display substrate 144. As another alternative, the row and column electrodes are in the same layer. In one or more embodiments, the row and column electrodes are formed as discussed in one or more of FIGS. 9A-9J.

Each electrode 85 has a self-capacitance, which corresponds to a parasitic capacitance created by the electrode with respect to other conductors in the display (e.g., ground, conductive layer(s), and/or one or more other electrodes). For example, row electrode 85-*r* has a parasitic capacitance $C_{p2}$ and column electrode 85-*c* has a parasitic capacitance Cri. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic capacitance.

As shown, the touch screen display 80 includes a plurality of layers 140-144. Each illustrated layer may itself include one or more layers. For example, dielectric layer 140 includes a surface protective film, a glass protective film, and/or one or more pressure sensitive adhesive (PSA) layers. As another example, the second dielectric layer 142 includes a glass cover, a polyester (PET) film, a support plate (glass or plastic) to support, or embed, one or more of the electrodes 85-*c* and 85-*r*, a base plate (glass, plastic, or PET), and one or more PSA layers. As yet another example, the display substrate 144 includes one or more LCD layers, a back-light layer, one or more reflector layers, one or more polarizing layers, and/or one or more PSA layers.

Figure 10B:
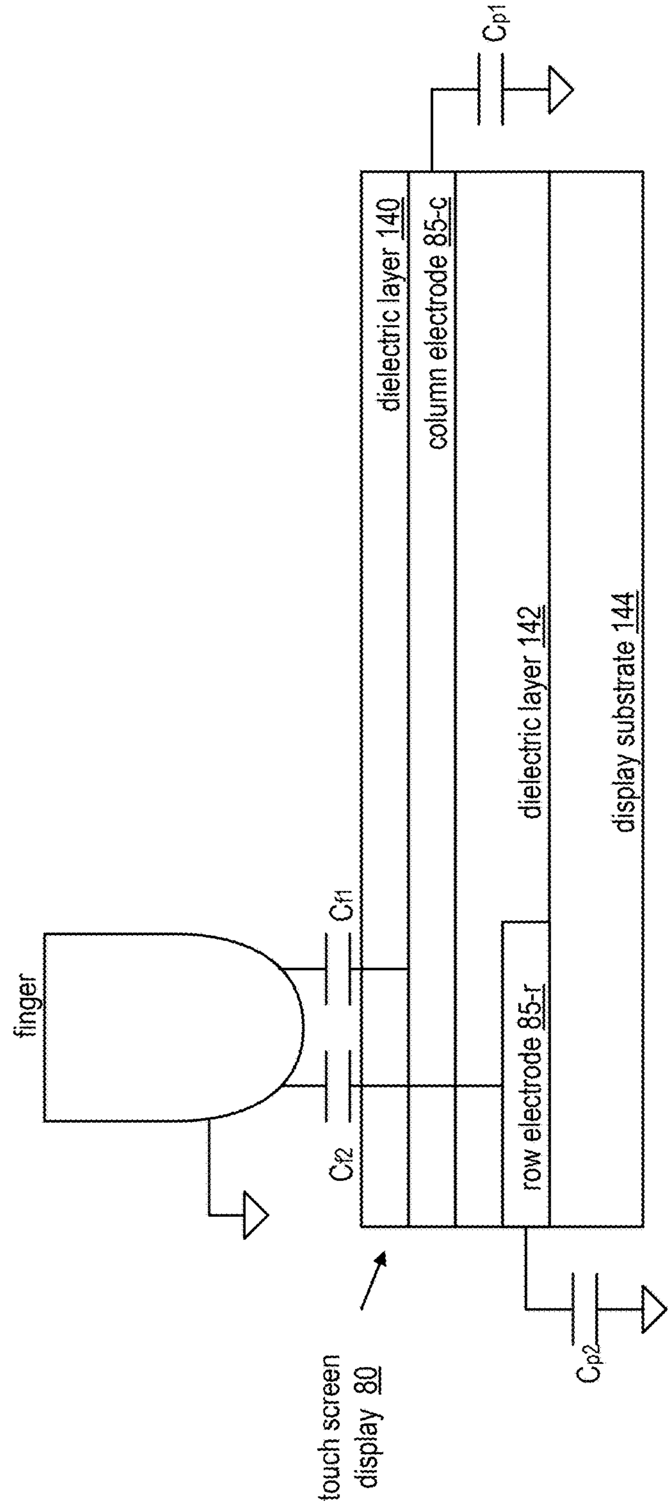
FIG. 10B is a cross section schematic block diagram of an example of self-capacitance with a touch on a touch screen display in accordance with various embodiments.

FIG. 10B is a cross section schematic block diagram of a touch screen display 80, which is the same as in FIG. 9. This figure further includes a finger touch, which changes the self-capacitance of the electrodes. In essence, a finger touch creates a parallel capacitance with the parasitic self-capacitances. For example, the self-capacitance of the column electrode 85-*c* is $C_{p1}$ (parasitic capacitance)+$C_{f1}$ (finger capacitance) and the self-capacitance of the row electrode 85-*r* is $C_{p2}+C_{f2}$. As such, the finger capacitance increases the self-capacitance of the electrodes, which decreases the impedance for a given frequency. The change in impedance of the self-capacitance is detectable by a corresponding drive sense circuit and is subsequently processed to indicate a screen touch.

Figure 11:
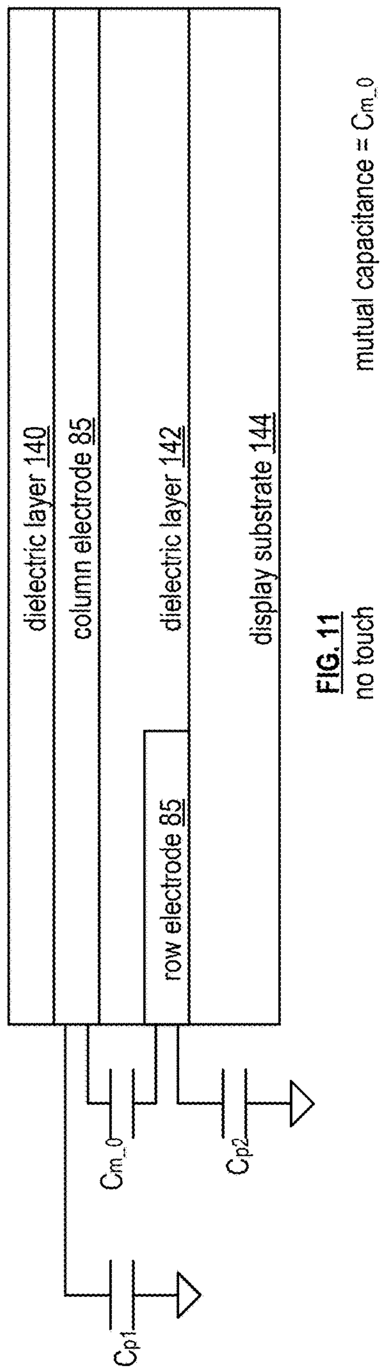
FIG. 11 is a cross section schematic block diagram of an example of self-capacitance and mutual capacitance with no-touch on a touch screen display in accordance with various embodiments.

FIG. 11 is a cross section schematic block diagram of a touch screen display 80, which is the same as in FIG. 9. This figure further includes a mutual capacitance (Cm_0) between the electrodes when a touch is not present.

Figure 12:
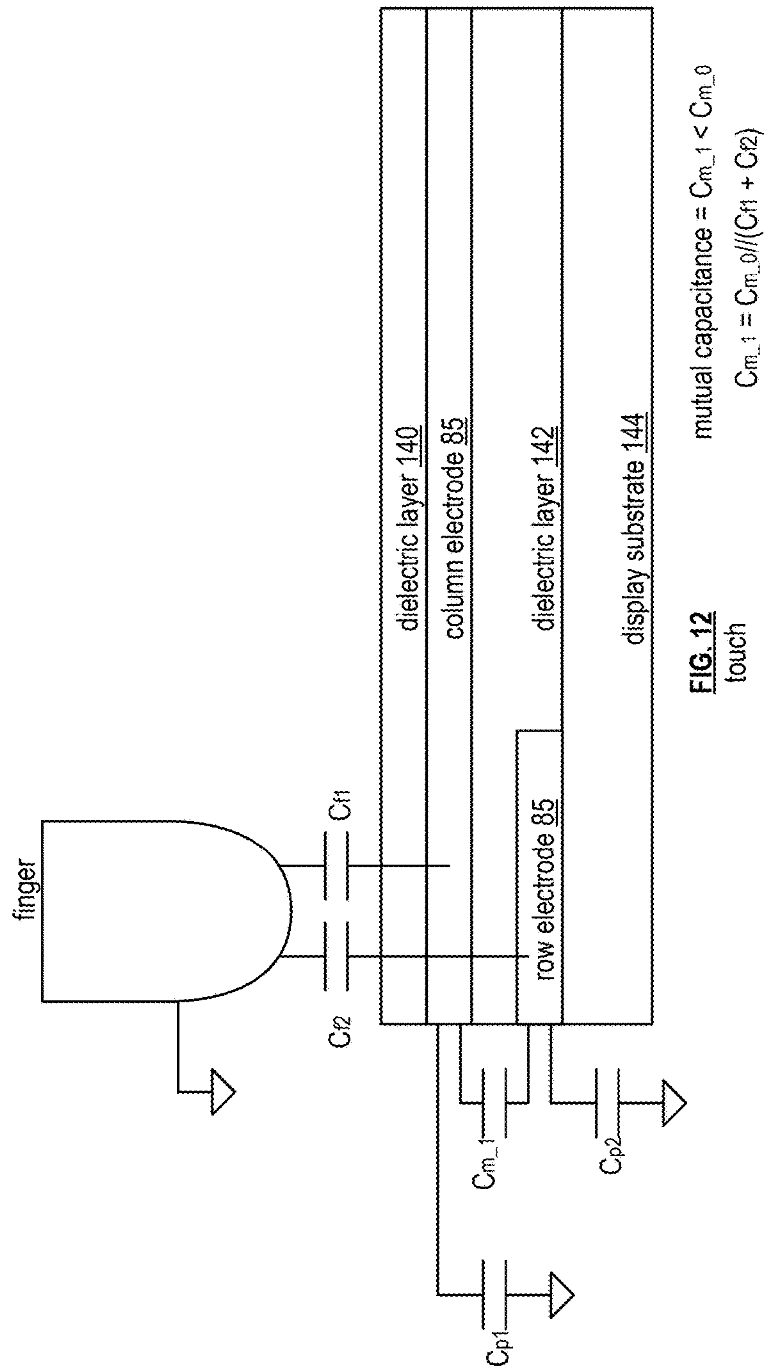
FIG. 12 is a cross section schematic block diagram of an example of self-capacitance and mutual capacitance with a touch on a touch screen display in accordance with various embodiments.

FIG. 12 is a cross section schematic block diagram of a touch screen display 80, which is the same as in FIG. 9. This figure further includes a mutual capacitance (Cm_1) between the electrodes when a touch is present. In this example, the finger capacitance is effectively in series with the mutual capacitance, which decreasing capacitance of the mutual capacitance. As the capacitance decreases for a given frequency, the impedance increases. The change in impedance of the mutual-capacitance is detectable by a corresponding drive sense circuit and is subsequently processed to indicate a screen touch. Note that, depending on the various properties (e.g., thicknesses, dielectric constants, electrode sizes, electrode spacing, etc.) of the touch screen display, the parasitic capacitances, the mutual capacitances, and/or the finger capacitance are in the range of a few pico-Farads to tens of nano-Farads. In equation form, the capacitance (C) equals:

$$C = \epsilon\frac{A}{d} \text{ where A is plate area, } \epsilon \text{ is the dielectric constant}(s), \text{ and } d \text{ is the distance between the plates.}$$

Figure 13:
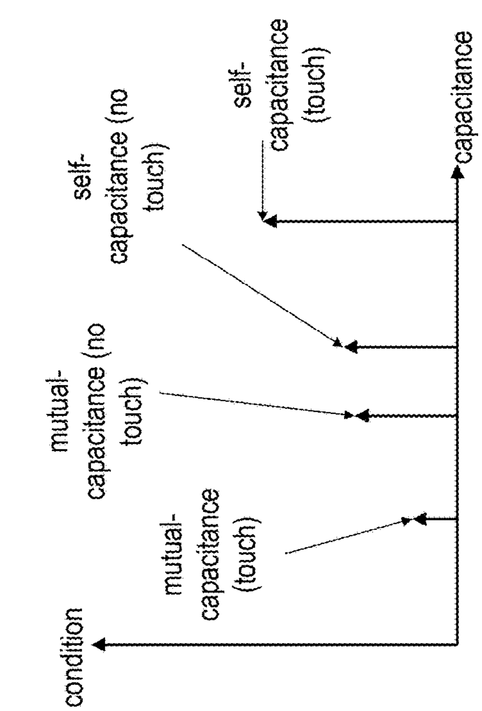
FIG. 13 is an example graph that plots condition verses capacitance for an electrode of a touch screen display in accordance with various embodiments.

FIG. 13 is an example graph that plots condition verses capacitance for an electrode of a touch screen display. As shown, the mutual capacitance decreases with a touch and the self-capacitance increases with a touch. Note that the mutual capacitance and self-capacitance for a no-touch condition are shown to be about the same. This is done merely for ease of illustration. In practice, the mutual capacitance and self-capacitance may or may not be about the same capacitance based on the various properties of the touch screen display discussed above.

Figure 14:
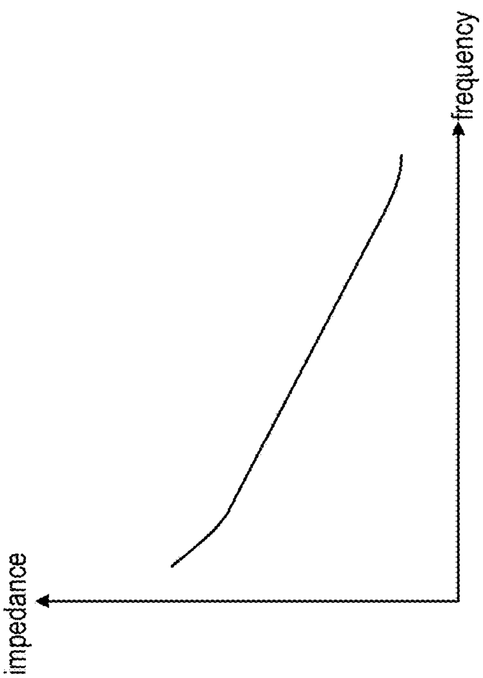
FIG. 14 is an example graph that plots impedance verses frequency for an electrode of a touch screen display in accordance with various embodiments.

FIG. 14 is an example graph that plots impedance verses frequency for an electrode of a touch screen display. Since the impedance of an electrode is primarily based on its capacitance (self and/or mutual), as the frequency increases for a fixed capacitance, the impedance decreases based on ½πfC, where f is the frequency and C is the capacitance.

Figure 15:
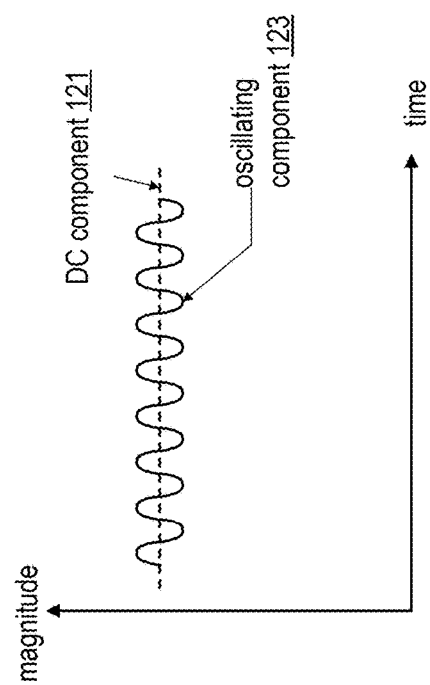
FIG. 15 is a time domain example graph that plots magnitude verses time for an analog reference signal in accordance with various embodiments.

FIG. 15 is a time domain example graph that plots magnitude verses time for an analog reference signal 122. As discussed with reference to FIG. 8, the analog reference signal 122 (e.g., a current signal or a voltage signal) is inputted to a comparator and is compared to the sensor signal 116. The feedback loop of the drive sense circuit 28 functions to keep the senor signal 116 substantially matching the analog reference signal 122. As such, the sensor signal 116 will have a similar waveform to that of the analog reference signal 122.

In an example, the analog reference signal 122 includes a DC component 121 and/or one or more oscillating components 123. The DC component 121 is a DC voltage in the range of a few hundred milli-volts to tens of volts or more. The oscillating component 123 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component).

In another example, the frequency of the oscillating component 123 may vary so that it can be tuned to the impedance of the sensor and/or to be off-set in frequency from other sensor signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

Figure 16:
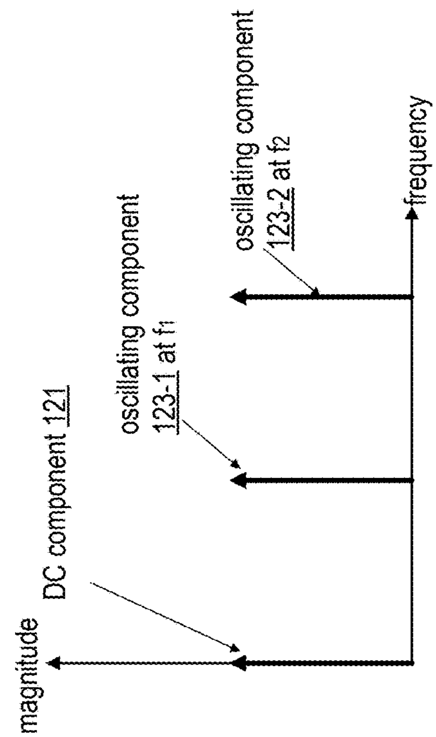
FIG. 16 is a frequency domain example graph that plots magnitude verses frequency for an analog reference signal in accordance with various embodiments.

FIG. 16 is a frequency domain example graph that plots magnitude verses frequency for an analog reference signal 122. As shown, the analog reference signal 122 includes the DC component 121 at DC (e.g., 0 Hz or near 0 Hz), a first oscillating component 123-1 at a first frequency (f1), and a second oscillating component 123-2 at a second frequency (f2). In an example, the DC component is used to measure resistance of an electrode (if desired), the first oscillating component 123-1 is used to measure the impedance of self-capacitance, and the second oscillating component 123-2 is used to measure the impedance of mutual-capacitance. Note that the second frequency may be greater than the first frequency.

Figure 17:
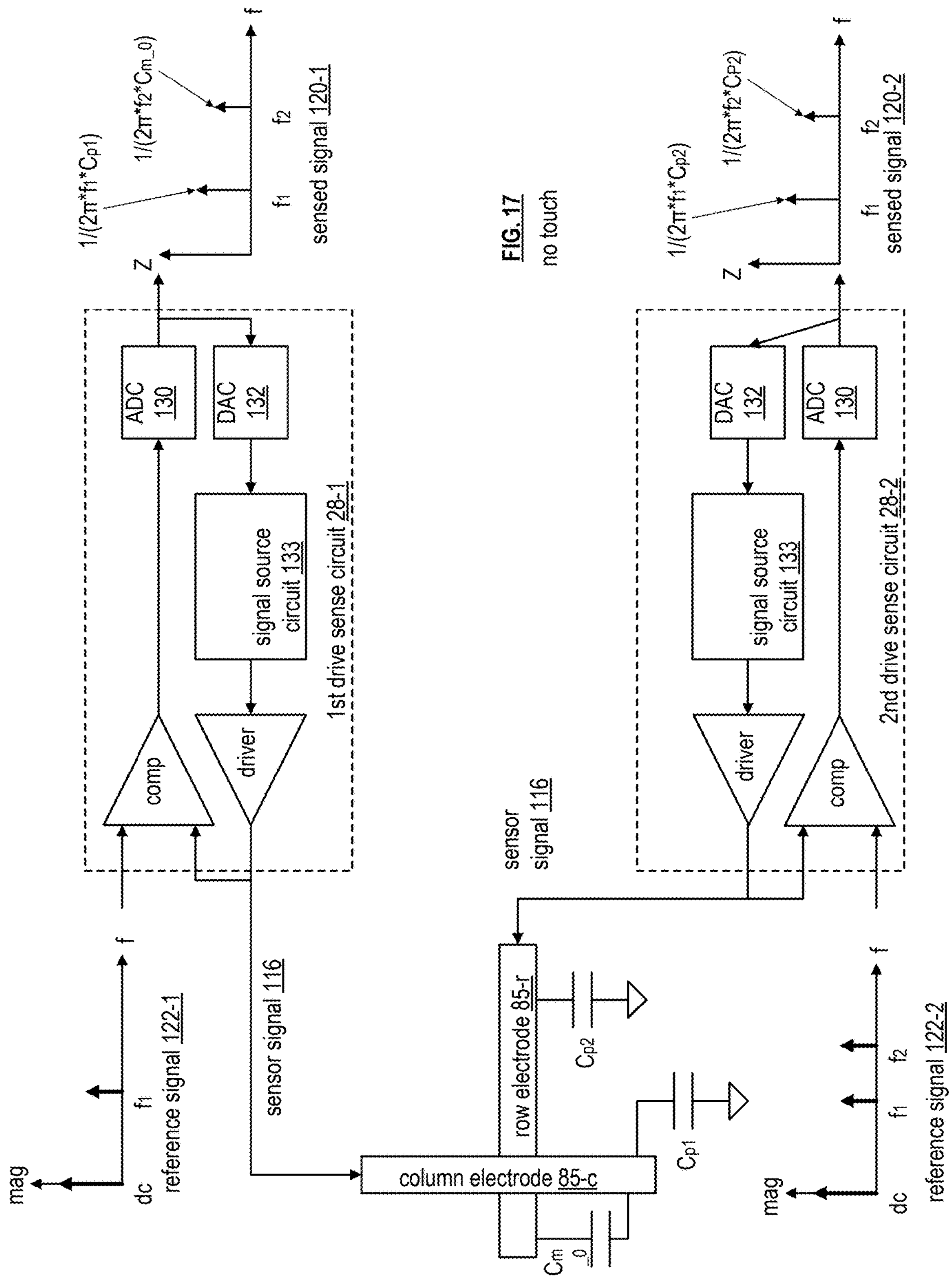
FIG. 17 is a schematic block diagram of an example of a first drive sense circuit coupled to a first electrode and a second drive sense circuit coupled to a second electrode without a touch proximal to the electrodes in accordance with various embodiments.

FIG. 17 is a schematic block diagram of an example of a first drive sense circuit 28-1 coupled to a first electrode 85-*c* and a second drive sense circuit 28-2 coupled to a second electrode 85-*r* without a touch proximal to the electrodes. Each of the drive sense circuits include a comparator, an analog to digital converter (ADC) 130, a digital to analog converter (DAC) 132, a signal source circuit 133, and a driver. The functionality of this embodiment of a drive sense circuit was described with reference to FIG. 8.

As an example, a first reference signal 122-1 (e.g., analog or digital) is provided to the first drive sense circuit 28-1 and a second reference signal 122-2 (e.g., analog or digital) is provided to the second drive sense circuit 28-2. The first reference signal includes a DC component and/or an oscillating at frequency f1. The second reference signal includes a DC component and/or two oscillating components: the first at frequency f1 and the second at frequency f2.

The first drive sense circuit 28-1 generates a sensor signal 116 based on the reference signal 122-1 and provides the sensor signal to the column electrode 85-*c*. The second drive sense circuit generates another sensor signal 116 based on the reference signal 122-2 and provides the sensor signal to the column electrode.

In response to the sensor signals being applied to the electrodes, the first drive sense circuit 28-1 generates a first sensed signal 120-1, which includes a component at frequency $f_1$ and a component a frequency $f_2$. The component at frequency $f_1$ corresponds to the self-capacitance of the column electrode 85-*c* and the component a frequency $f_2$ corresponds to the mutual capacitance between the row and column electrodes 85-*c* and 85-*r*. The self-capacitance is expressed as 1/(2πf1Cp1) and the mutual capacitance is expressed as 1/(2πf2Cm_0).

Also, in response to the sensor signals being applied to the electrodes, the second drive sense circuit 28-1 generates a second sensed signal 120-2, which includes a component at frequency $f_1$ and a component a frequency $f_2$. The component at frequency $f_1$ corresponds to a shielded self-capacitance of the row electrode 85-*r* and the component a frequency $f_2$ corresponds to an unshielded self-capacitance of the row electrode 85-*r*. The shielded self-capacitance of the row electrode is expressed as 1/(2πf1Cp2) and the unshielded self-capacitance of the row electrode is expressed as 1/(2πf2Cp2).

With each active drive sense circuit using the same frequency for self-capacitance (e.g., $f_1$), the row and column electrodes are at the same potential, which substantially eliminates cross-coupling between the electrodes. This provides a shielded (i.e., low noise) self-capacitance measurement for the active drive sense circuits. In this example, with the second drive sense circuit transmitting the second frequency component, it has a second frequency component in its sensed signal, but is primarily based on the row electrode's self-capacitance with some cross coupling from other electrodes carrying signals at different frequencies. The cross coupling of signals at other frequencies injects unwanted noise into this self-capacitance measurement and hence it is referred to as unshielded.

Figure 18:
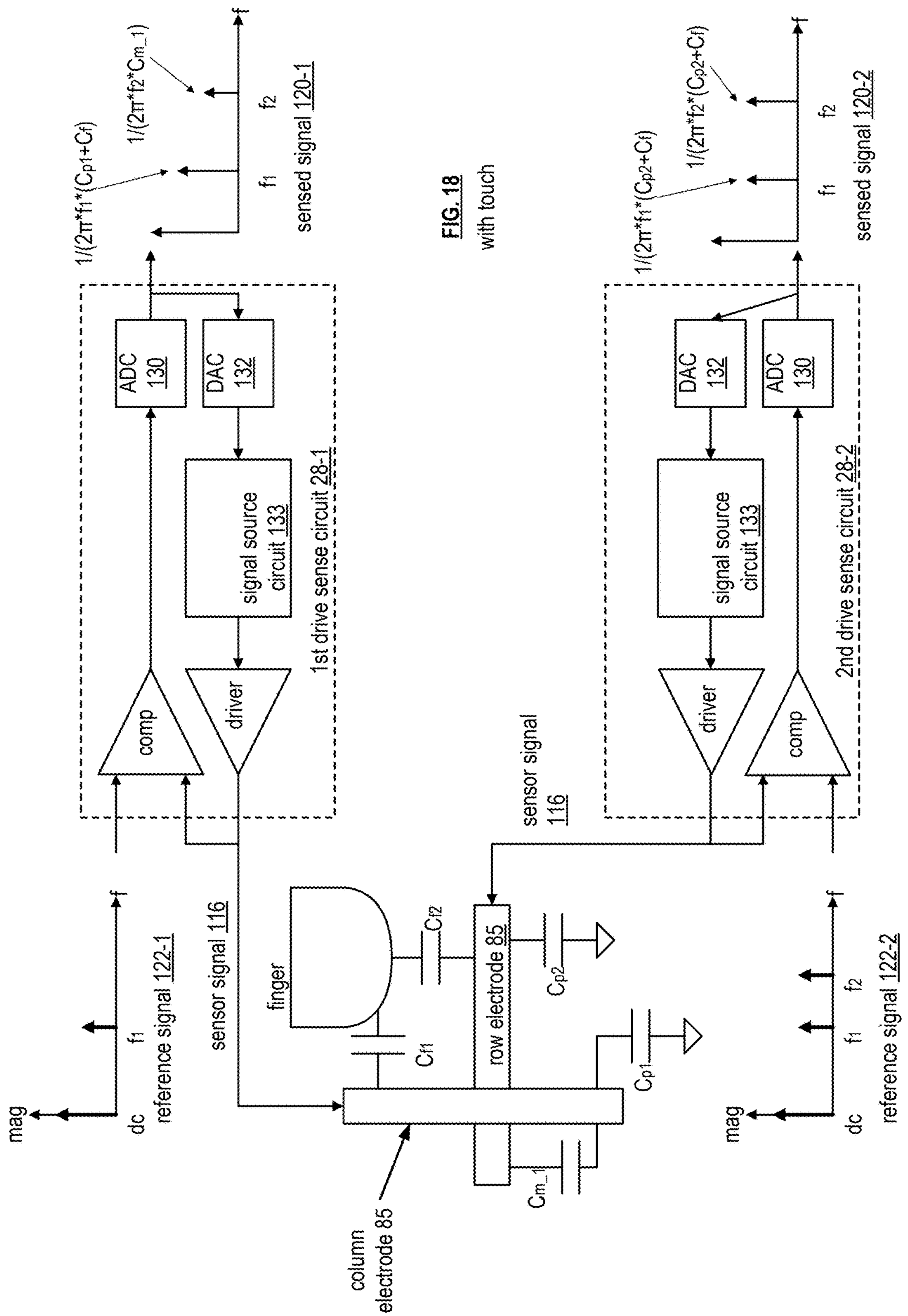
FIG. 18 is a schematic block diagram of an example of a first drive sense circuit coupled to a first electrode and a second drive sense circuit coupled to a second electrode with a finger touch proximal to the electrodes in accordance with various embodiments.

FIG. 18 is a schematic block diagram of an example of a first drive sense circuit 28-1 coupled to a first electrode 85-*c* and a second drive sense circuit 28-2 coupled to a second electrode 85-*r* with a finger touch proximal to the electrodes. This example is similar to the one of FIG. 17 with the difference being a finger touch proximal to the electrodes (e.g., a touch that shadows the intersection of the electrodes or is physically close to the intersection of the electrodes). With the finger touch, the self-capacitance and the mutual capacitance of the electrodes are changed.

In this example, the impedance of the self-capacitance at f1 of the column electrode 85-*c* now includes the effect of the finger capacitance. As such, the impedance of the self-capacitance of the column electrode equals 1/(2πf1*(Cp1+Cf1)), which is included the sensed signal 120-1. The second frequency component at f2 corresponds to the impedance of the mutual-capacitance at f2, which includes the effect of the finger capacitance. As such, the impedance of the mutual capacitance equals 1/(2πf2Cm_1), where $C_{m\_1}=(C_{m\_0}*C_{f1})/(C_{m\_0}+C_{f1})$.

Continuing with this example, the first frequency component at f1 of the second sensed signal 120-2 corresponds to the impedance of the shielded self-capacitance of the row electrode 85-*r* at f1, which is affected by the finger capacitance. As such, the impedance of the capacitance of the row electrode 85-*r* equals 1/(2πf1*(Cp2+Cf2)). The second frequency component at f2 of the second sensed signal 120-2 corresponds to the impedance of the unshielded self-capacitance at f2, which includes the effect of the finger capacitance and is equal to 1/(2πf2*(Cp2+Cf2)).

Figure 19:
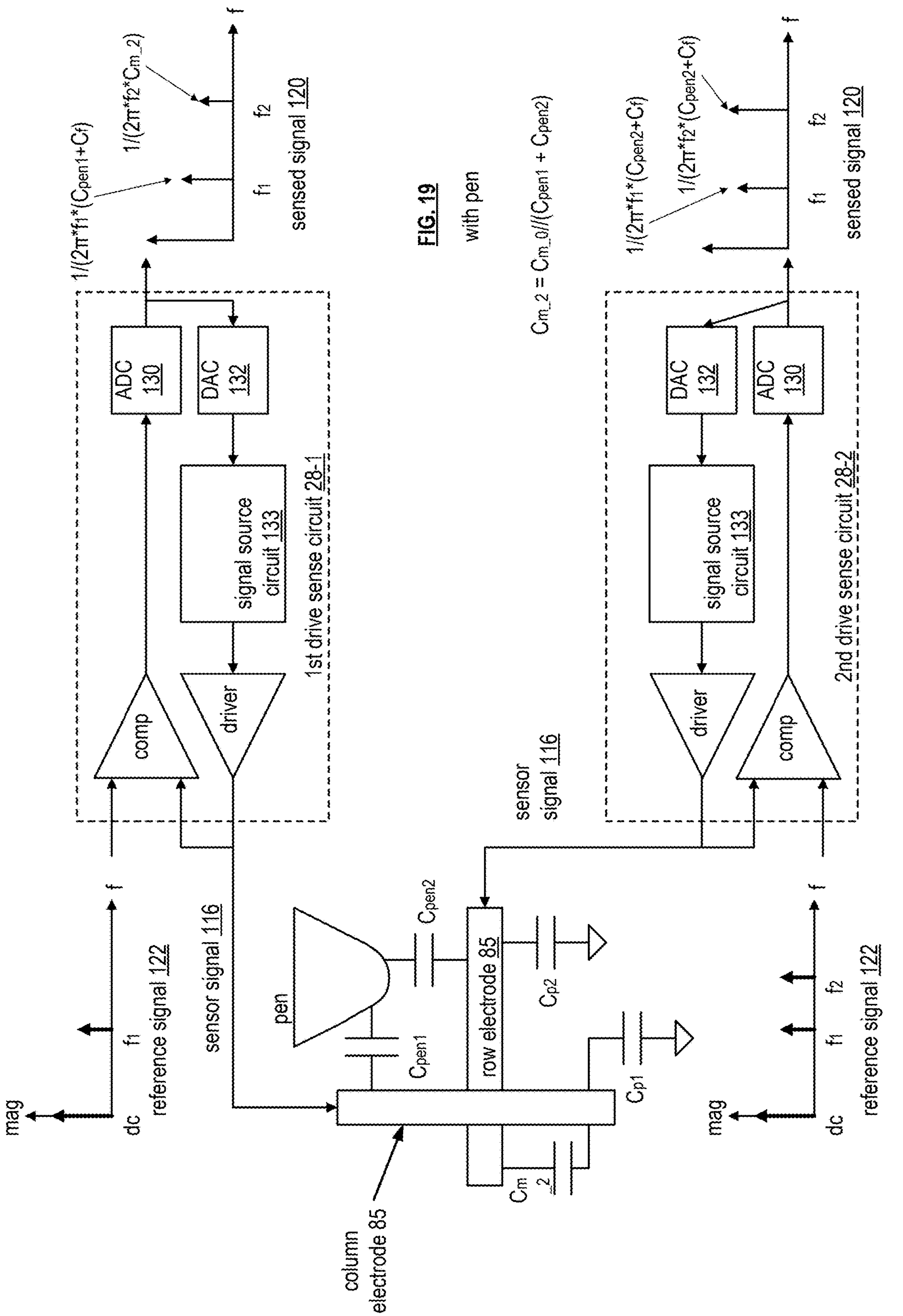
FIG. 19 is a schematic block diagram of an example of a first drive sense circuit coupled to a first electrode and a second drive sense circuit coupled to a second electrode with a pen touch proximal to the electrodes in accordance with various embodiments.

FIG. 19 is a schematic block diagram of an example of a first drive sense circuit 28-1 coupled to a first electrode 85-*c* and a second drive sense circuit 28-2 coupled to a second electrode 85-*r* with a pen touch proximal to the electrodes. This example is similar to the one of FIG. 17 with the difference being a pen touch proximal to the electrodes (e.g., a touch that shadows the intersection of the electrodes or is physically close to the intersection of the electrodes). With the pen touch, the self-capacitance and the mutual capacitance of the electrodes are changed based on the capacitance of the pen Cpen1 and $C_{pen2}$.

In this example, the impedance of the self-capacitance at f1 of the column electrode 85-*c* now includes the effect of the pen's capacitance. As such, the impedance of the self-capacitance of the column electrode equals 1/(2πf1*(Cp1+Cpen1)), which is included the sensed signal 120-1. The second frequency component at f2 corresponds to the impedance of the mutual-capacitance at f2, which includes the effect of the pen capacitance. As such, the impedance of the mutual capacitance equals 1/(2πf2Cm_2), where $C_{m\_2}=(C_{m\_0}*C_{pen2})/(C_{m\_0}+C_{pen1})$.

Continuing with this example, the first frequency component at f1 of the second sensed signal 120-2 corresponds to the impedance of the shielded self-capacitance of the row electrode 85-*r* at 13, which is affected by the pen capacitance. As such, the impedance of the shielded self-capacitance of the row electrode 85-*r* equals 1/(2πf1*(Cp2+Cpen2)). The second frequency component at f2 of the second sensed signal 120-2 corresponds to the impedance of the unshielded self-capacitance at f2, which includes the effect of the pen capacitance and is equal to 1/(2πf2*(Cp2+Cpen2)). Note that the pen capacitance is represented as two capacitances, but may be one capacitance value or a plurality of distributed capacitance values.

Figure 20:
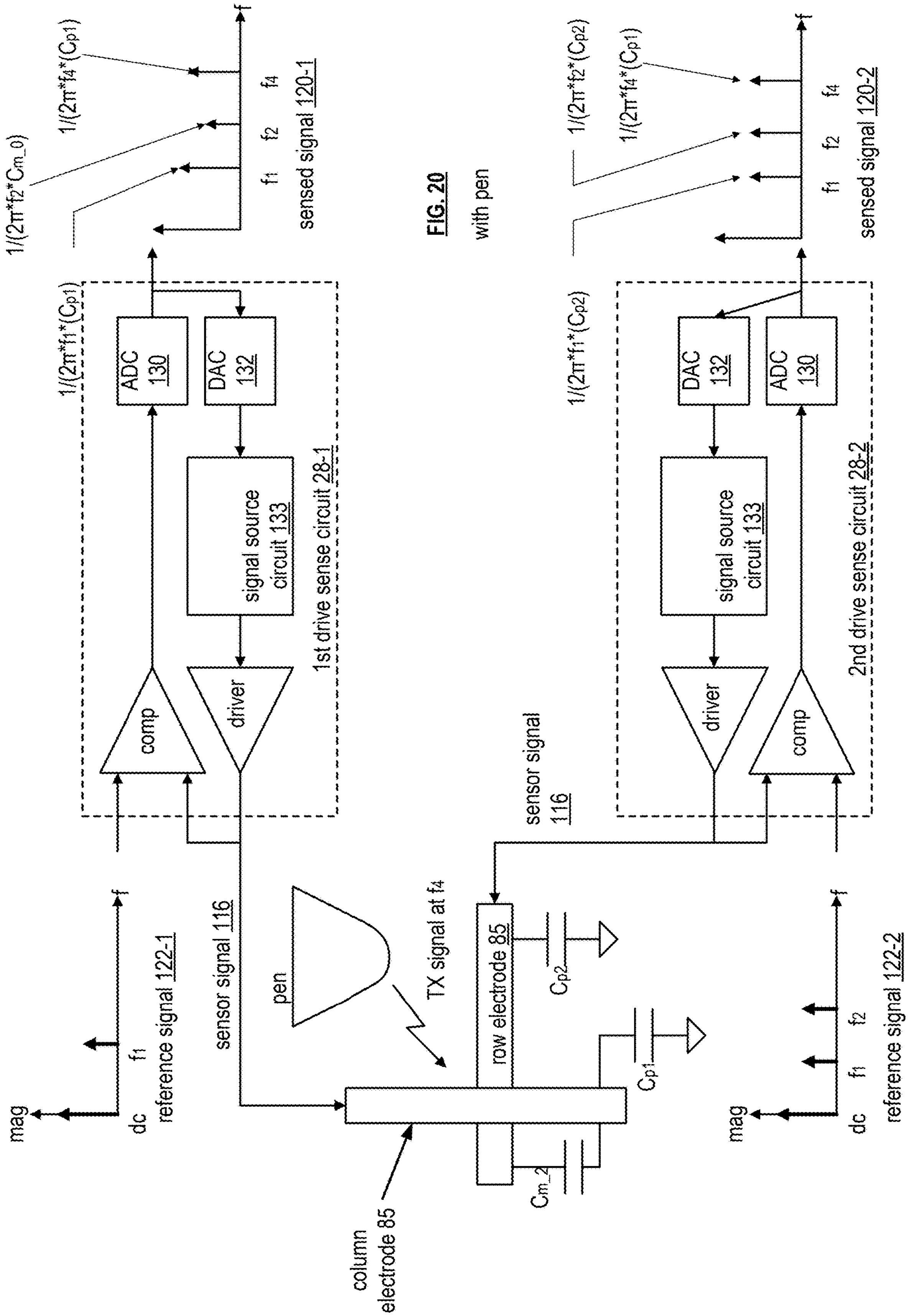
FIG. 20 is a schematic block diagram of another example of a first drive sense circuit coupled to a first electrode and a second drive sense circuit coupled to a second electrode with a pen touch proximal to the electrodes in accordance with various embodiments.

FIG. 20 is a schematic block diagram of an example of a first drive sense circuit 28-1 coupled to a first electrode 85-*c* and a second drive sense circuit 28-2 coupled to a second electrode 85-*r* with a pen proximal to the electrodes. Each of the drive sense circuits include a comparator, an analog to digital converter (ADC) 130, a digital to analog converter (DAC) 132, a signal source circuit 133, and a driver. The functionality of this embodiment of a drive sense circuit was described with reference to FIG. 8. The pen is operable to transmit a signal at a frequency of f4, which affects the self and mutual capacitances of the electrodes 85.

In this example, a first reference signal 122-1 is provided to the first drive sense circuit 28-1. The first reference signal includes a DC component and/or an oscillating component at frequency f1. The first oscillating component at f1 is used to sense impedance of the self-capacitance of the column electrode 85-*c*. The first drive sense circuit 28-1 generates a first sensed signal 120-1 that includes three frequency dependent components.

The first frequency component at f1 corresponds to the impedance of the self-capacitance at f1, which equals 1/(2πf1Cp1). The second frequency component at f2 corresponds to the impedance of the mutual-capacitance at f2, which equals 1/(2πf2Cm_0). The third frequency component at f4 corresponds to the signal transmitted by the pen.

Continuing with this example, a second reference signal 122-2 is provided to the second drive sense circuit 28-2. The second analog reference signal includes a DC component and/or two oscillating components: the first at frequency f1 and the second at frequency f2. The first oscillating component at f1 is used to sense impedance of the shielded self-capacitance of the row electrode 85-*r* and the second oscillating component at f2 is used to sense the unshielded self-capacitance of the row electrode 85-*r*. The second drive sense circuit 28-2 generates a second sensed signal 120-2 that includes three frequency dependent components. The first frequency component at f1 corresponds to the impedance of the shielded self-capacitance at f3, which equals 1/(2πf1Cp2). The second frequency component at f2 corresponds to the impedance of the unshielded self-capacitance at f2, which equals 1/(2πf2Cp2). The third frequency component at f4 corresponds to signal transmitted by the pen.

As a further example, the pen transmits a sinusoidal signal having a frequency of $f_4$. When the pen is near the surface of the touch screen, electromagnetic properties of the signal increase the voltage on (or current in) the electrodes proximal to the touch of the pen. Since impedance is equal to voltage/current and as a specific example, when the voltage increases for a constant current, the impedance increases. As another specific example, when the current increases for a constant voltage, the impedance increases. The increase in impedance is detectable and is used as an indication of a touch.

Figure 21:
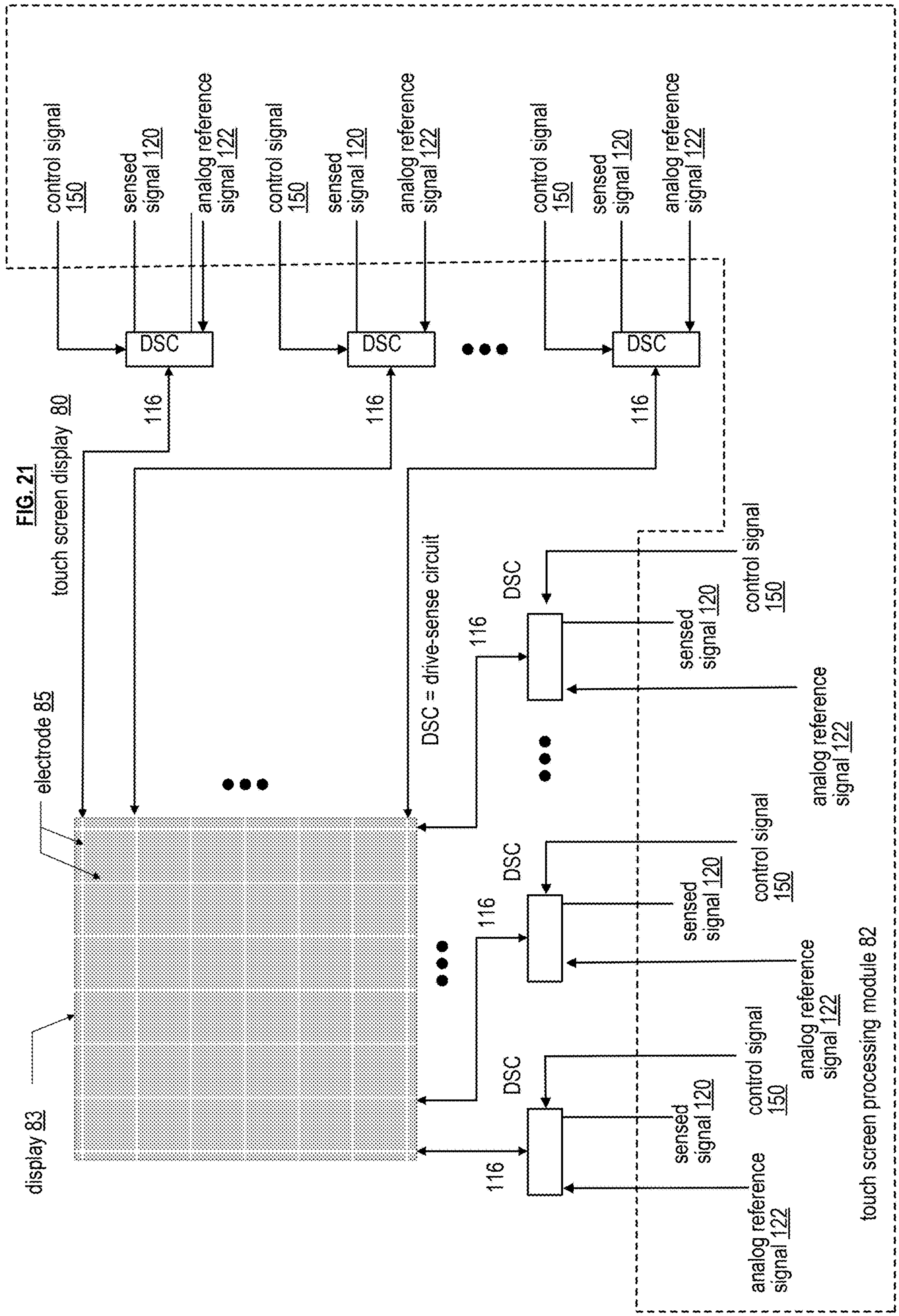
FIG. 21 is a schematic block diagram of another embodiment of a touch screen display in accordance with various embodiments.

FIG. 21 is a schematic block diagram of another embodiment of a touch screen display 80 that includes the display 83, the electrodes 85, a plurality of drive sense circuits (DSC), and the touch screen processing module 82, which function as previously discussed. In addition, the touch screen processing module 82 generates a plurality of control signals 150 to enable the drive-sense circuits (DSC) to monitor the sensor signals 120 on the electrodes 85. For example, the processing module 82 provides an individual control signal 150 to each of the drive sense circuits to individually enable or disable the drive sense circuits. In an embodiment, the control signal 150 closes a switch to provide power to the drive sense circuit. In another embodiment, the control signal 150 enables one or more components of the drive sense circuit.

The processing module 82 further provides analog reference signals 122 to the drive sense circuits. In an embodiment, each drive sense circuit receives a unique analog reference signal. In another embodiment, a first group of drive sense circuits receive a first analog reference signal and a second group of drive sense circuits receive a second analog reference signal. In yet another embodiment, the drive sense circuits receive the same analog reference signal. Note that the processing module 82 uses a combination of analog reference signals with control signals to ensure that different frequencies are used for oscillating components of the analog reference signal.

The drive sense circuits provide sensed signals 116 to the electrodes. The impedances of the electrodes affect the sensed signal, which the drive sense circuits sense via the received signal component and generate the sensed signal 120 therefrom. The sensed signals 120 are essentially representations of the impedances of the electrodes, which are provided to the touch screen processing module 82.

The processing module 82 interprets the sensed signals 122 (e.g., the representations of impedances of the electrodes) to detect a change in the impedance of one or more electrodes. For example, a finger touch increases the self-capacitance of an electrode, thereby decreasing its impedance at a given frequency. As another example, a finger touch decreases the mutual capacitance of an electrode, thereby increasing its impedance at a given frequency. The processing module 82 then interprets the change in the impedance of one or more electrodes to indicate one or more touches of the touch screen display 80.

Figure 22:
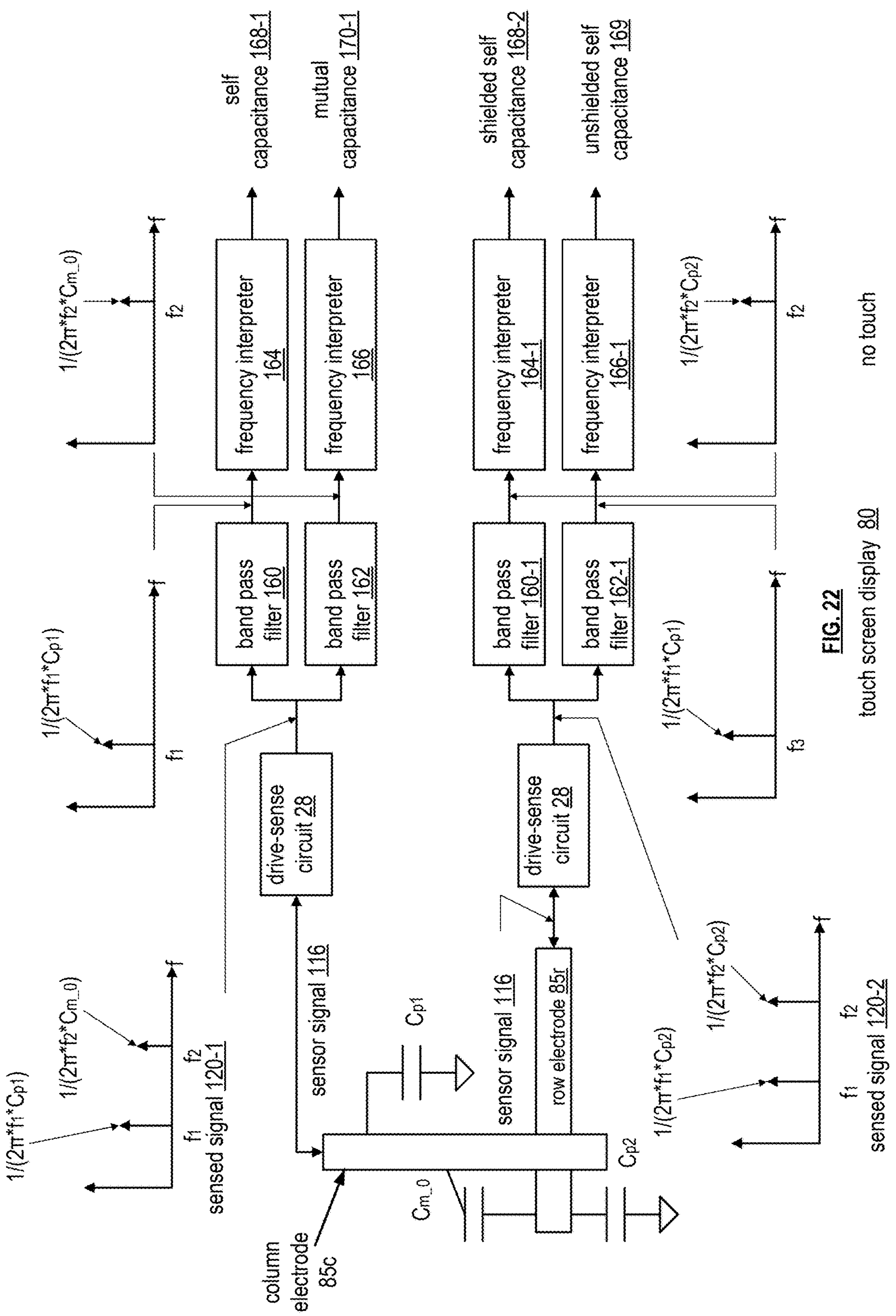
FIG. 22 is a schematic block diagram of a touchless example of a few drive sense circuits and a portion of the touch screen processing module of a touch screen display in accordance with various embodiments.

FIG. 22 is a schematic block diagram of a touchless example of a few drive sense circuits 28 and a portion of the touch screen processing module 82 of a touch screen display 80. The portion of the processing module 82 includes band pass filters 160, 162, 160-1, & 160-2, self-frequency interpreters 164 & 164-1, and 166 & 166-1. As previously discussed, a first drive sense circuit is coupled to column electrode 85*c* and a second drive sense circuit is coupled to a row electrode 85*r*.

The drive sense circuits provide sensor signals 116 to their respective electrodes 85 and produce therefrom respective sensed signals 120. The first sensed signal 120-1 includes a first frequency component at $f_1$ that corresponds to the self-capacitance of the column electrode 85*c* and a second frequency component at $f_2$ that corresponds to the mutual capacitance of the column electrode 85*c*. The second sensed signal 120-2 includes a first frequency component at $f_1$ that corresponds to the shielded self-capacitance of the row electrode 85*r* and/or a second frequency component at $f_2$ that corresponds to the unshielded self-capacitance of the row electrode 85*r*. In an embodiment, the sensed signals 120 are frequency domain digital signals.

The first bandpass filter 160 passes (i.e., substantially unattenuated) signals in a bandpass region (e.g., tens of Hertz to hundreds of thousands of Hertz, or more) centered about frequency $f_1$ and attenuates signals outside of the bandpass region. As such, the first bandpass filter 160 passes the portion of the sensed signal 120-1 that corresponds to the self-capacitance of the column electrode 85*c*. In an embodiment, the sensed signal 116 is a digital signal, thus, the first bandpass filter 160 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 164 receives the first bandpass filter sensed signal and interprets it to render a self-capacitance value 168-1 for the column electrode. As an example, the frequency interpreter 164 is a processing module, or portion thereof, that executes a function to convert the first bandpass filter sensed signal into the self-capacitance value 168-1, which is an actual capacitance value, a relative capacitance value (e.g., in a range of 0-100), or a difference capacitance value (e.g., is the difference between a default capacitance value and a sensed capacitance value). As another example, the frequency interpreter 164 is a look up table where the first bandpass filter sensed signal is an index for the table.

The second bandpass filter 162 passes, substantially unattenuated, signals in a second bandpass region (e.g., tens of Hertz to hundreds of thousands of Hertz, or more) centered about frequency $f_2$ and attenuates signals outside of the bandpass region. As such, the second bandpass filter 160 passes the portion of the sensed signal 120-1 that corresponds to the mutual-capacitance of the column electrode 85*c* and the row electrode 85*r*. In an embodiment, the sensed signal 116 is a digital signal, thus, the second bandpass filter 162 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 166 receives the second bandpass filter sensed signal and interprets it to render a mutual-capacitance value 170-1. As an example, the frequency interpreter 166 is a processing module, or portion thereof, that executes a function to convert the second bandpass filter sensed signal into the mutual-capacitance value 170-1, which is an actual capacitance value, a relative capacitance value (e.g., in a range of 0-100), and/or a difference capacitance value (e.g., is the difference between a default capacitance value and a sensed capacitance value). As another example, the frequency interpreter 166 is a look up table where the first bandpass filter sensed signal is an index for the table.

For the row electrode 85*r*, the drive-sense circuit 28 produces a second sensed signal 120-2, which includes a shielded self-capacitance component and/or an unshielded self-capacitance component. The third bandpass filter 160-1 is similar to the first bandpass filter 160 and, as such passes signals in a bandpass region centered about frequency $f_1$ and attenuates signals outside of the bandpass region. In this example, the third bandpass filter 160-1 passes the portion of the second sensed signal 120-2 that corresponds to the shielded self-capacitance of the row electrode 85*r*.

The frequency interpreter 164-1 receives the second bandpass filter sensed signal and interprets it to render a second and shielded self-capacitance value 168-2 for the row electrode. The frequency interpreter 164-1 may be implemented similarly to the first frequency interpreter 164 or an integrated portion thereof. In an embodiment, the second self-capacitance value 168-2 is an actual capacitance value, arelative capacitance value (e.g., in a range of 0-100), or a difference capacitance value (e.g., is the difference between a default capacitance value and a sensed capacitance value).

The fourth bandpass filter 162-2, if included, is similar to the second bandpass filter 162. As such, it passes, substantially unattenuated, signals in a bandpass region centered about frequency $f_2$ and attenuates signals outside of the bandpass region. In this example, the fourth bandpass filter 162-2 passes the portion of the second sensed signal 120-2 that corresponds to the unshielded self-capacitance of the row electrode 85*r*.

The frequency interpreter 166-1, if included, receives the fourth bandpass filter sensed signal and interprets it to render an unshielded self-capacitance value 168-2. The frequency interpreter 166-1 may be implemented similarly to the first frequency interpreter 166 or an integrated portion thereof. In an embodiment, the unshielded self-capacitance value 170-2 is an actual capacitance value, a relative capacitance value (e.g., in a range of 0-100), or a difference capacitance value (e.g., is the difference between a default capacitance value and a sensed capacitance value). Note that the unshielded self-capacitance may be ignored, thus band pass filter 162-1 and frequency interpreter 166-1 may be omitted.

Figure 23:
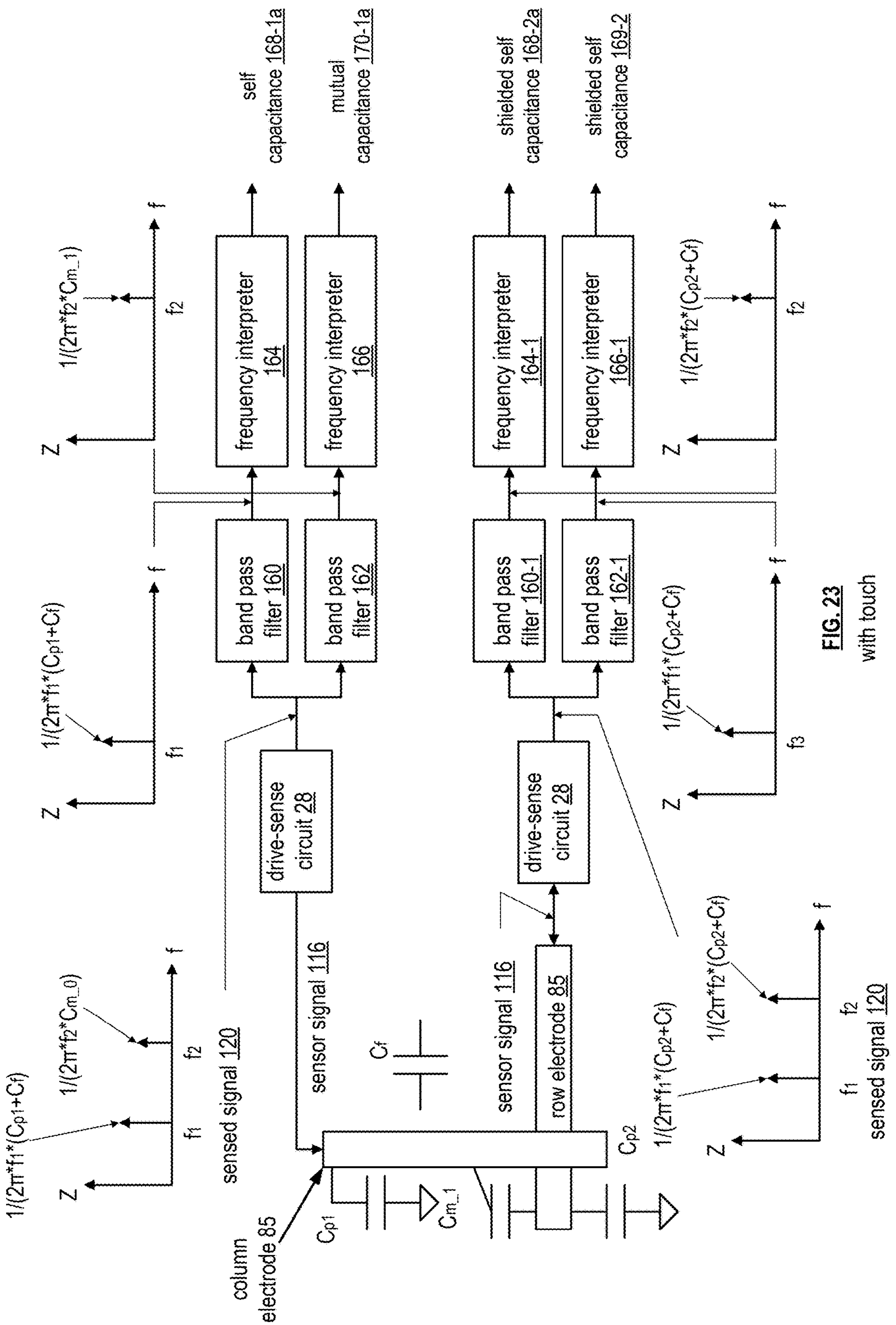
FIG. 23 is a schematic block diagram of a finger touch example of a few drive sense circuits and a portion of the touch screen processing module of a touch screen display in accordance with various embodiments.

FIG. 23 is a schematic block diagram of a finger touch example of a few drive sense circuits and a portion of the touch screen processing module of a touch screen display that is similar to FIG. 22, with the difference being a finger touch as represented by the finger capacitance $C_f$. In this example, the self-capacitance and mutual capacitance of each electrode is affected by the finger capacitance.

The effected self-capacitance of the column electrode 85*c* is processed by the first bandpass filter 160 and the frequency interpreter 164 to produce a self-capacitance value 168-1*a*. The mutual capacitance of the column electrode 85*c* and row electrode is processed by the second bandpass filter 162 and the frequency interpreter 166 to produce a mutual-capacitance value 170-1*a*.

The effected shielded self-capacitance of the row electrode 85*r* is processed by the third bandpass filter 160-1 and the frequency interpreter 164-1 to produce a self-capacitance value 168-2*a*. The effected unshielded self-capacitance of the row electrode 85*r* is processed by the fourth bandpass filter 162-1 and the frequency interpreter 166-1 to produce an unshielded self-capacitance value 170-2*a*.

Figure 24:
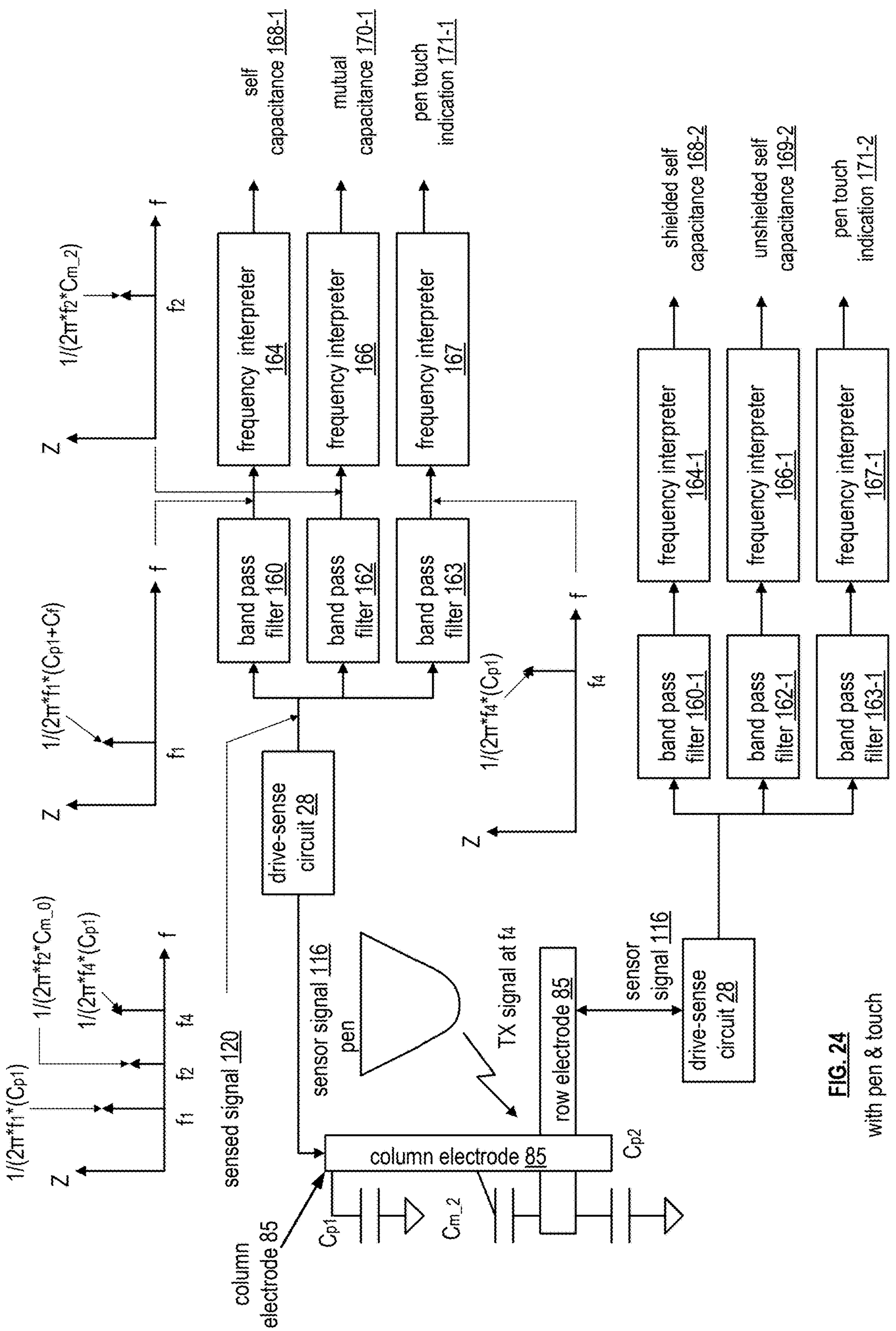
FIG. 24 is a schematic block diagram of a pen touch example of a few drive sense circuits and a portion of the touch screen processing module of a touch screen display in accordance with various embodiments.

FIG. 24 is a schematic block diagram of a pen touch example of a few drive sense circuits and a portion of the touch screen processing module of a touch screen display that is similar to FIG. 22, with the difference being a pen touch as represented by the pen capacitance $C_{pen}$. In this example, the self-capacitance and mutual capacitance of each electrode is affected by the pen capacitance.

The effected self-capacitance of the column electrode 85*c* is processed by the first bandpass filter 160 and the frequency interpreter 164 to produce a self-capacitance value 168-1*a*. The effected mutual capacitance of the column electrode 85*c* and row electrode 85*r* is processed by the second bandpass filter 162 and the frequency interpreter 166 to produce a mutual-capacitance value 170-1*a*.

The effected shielded self-capacitance of the row electrode 85*r* is processed by the third bandpass filter 160-1 and the frequency interpreter 164-1 to produce a shielded self-capacitance value 168-2*a*. The effected unshielded self-capacitance of the row electrode 85*r* is processed by the fourth bandpass filter 162-1 and the frequency interpreter 166-1 to produce an unshielded self-capacitance value 170-2*a*.

Figure 25:
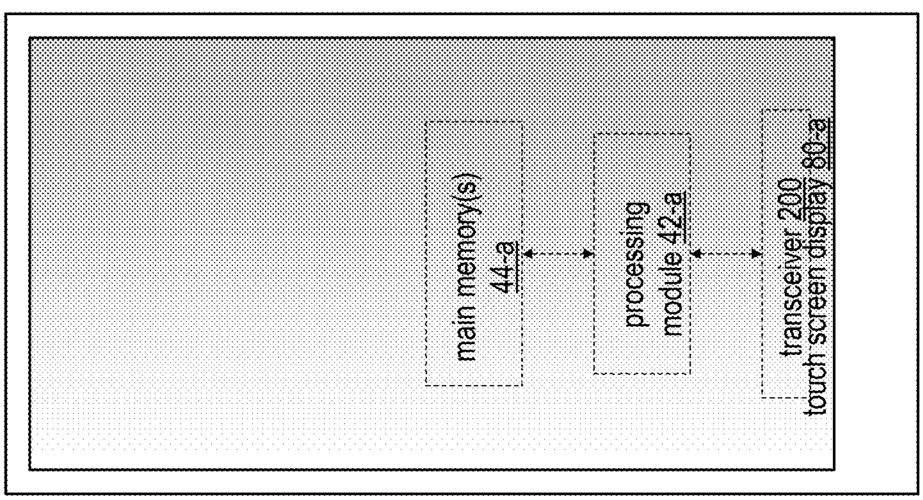
FIG. 25 is a schematic block diagram of an embodiment of a computing device having touch screen display in accordance with various embodiments.

FIG. 25 is a schematic block diagram of an embodiment of a computing device 14-*a* having touch screen display 80-*a*. The computing device 14-*a* is a cell phone, a personal video device, a tablet, or the like and the touch screen display has a screen size that is equal to or less than 15 inches. The computing device 14-*a* includes a processing module 42-*a*, main memory 44-*a*, and a transceiver 200. An embodiment of the transceiver 200 will be discussed with reference to FIG. 27. The processing module 42-*a* and the main memory 44-*a* are similar to the processing module 42 and the main memory 44 of the computing device 14 of FIG. 2.

Figure 26:
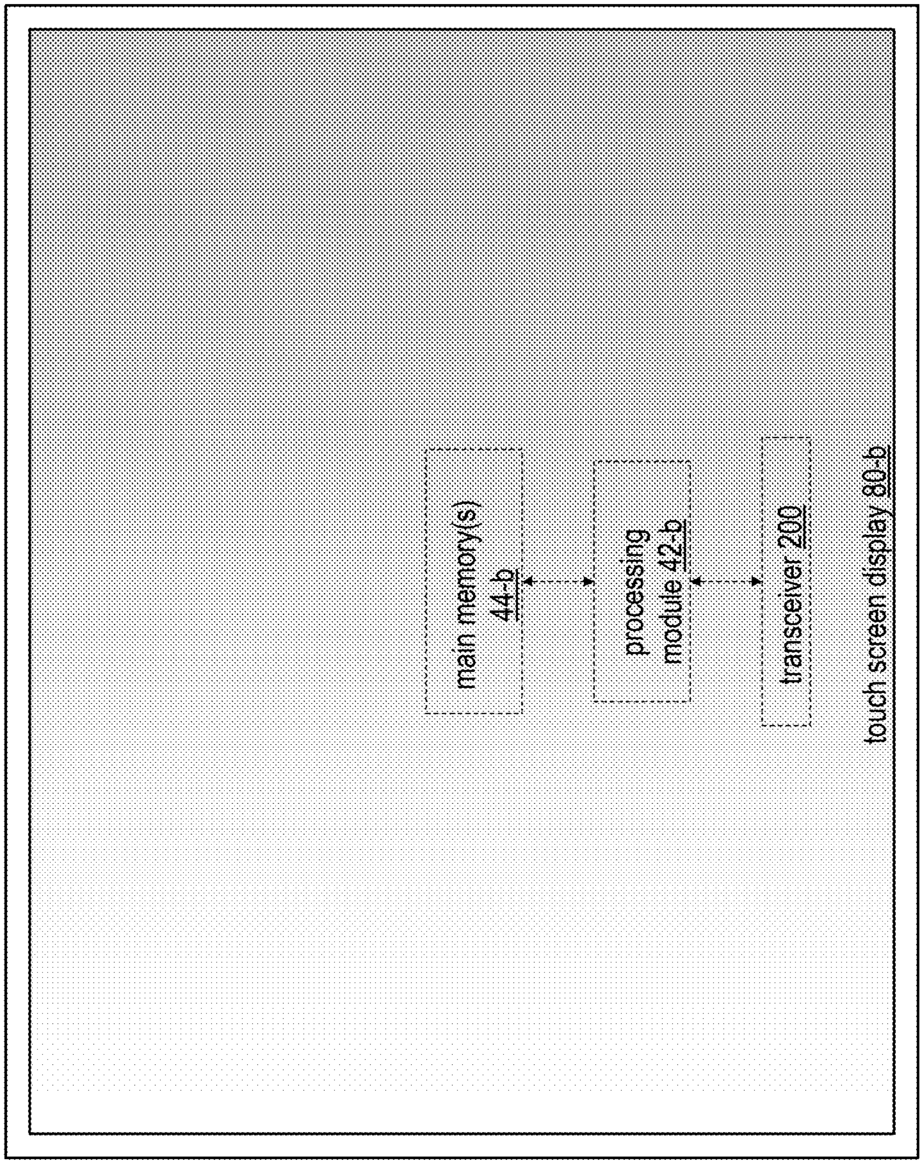
FIG. 26 is a schematic block diagram of another embodiment of a computing device having touch screen display in accordance with various embodiments.

FIG. 26 is a schematic block diagram of another embodiment of a computing device 14-*b* having touch screen display 80-*b*. The computing device 14-*b* is a computer, an interactive display, a large tablet, or the like and the touch screen display 80-*b* has a screen size that is greater than 15 inches. The computing device 14-*b* includes a processing module 42-*b*, main memory 44-*b*, and a transceiver 200. An embodiment of the transceiver 200 will be discussed with reference to FIG. 27. The processing module 42-*b* and the main memory 44-*b* are similar to the processing module 42 and the main memory 44 of the computing device 14 of FIG. 2.

Figure 27:
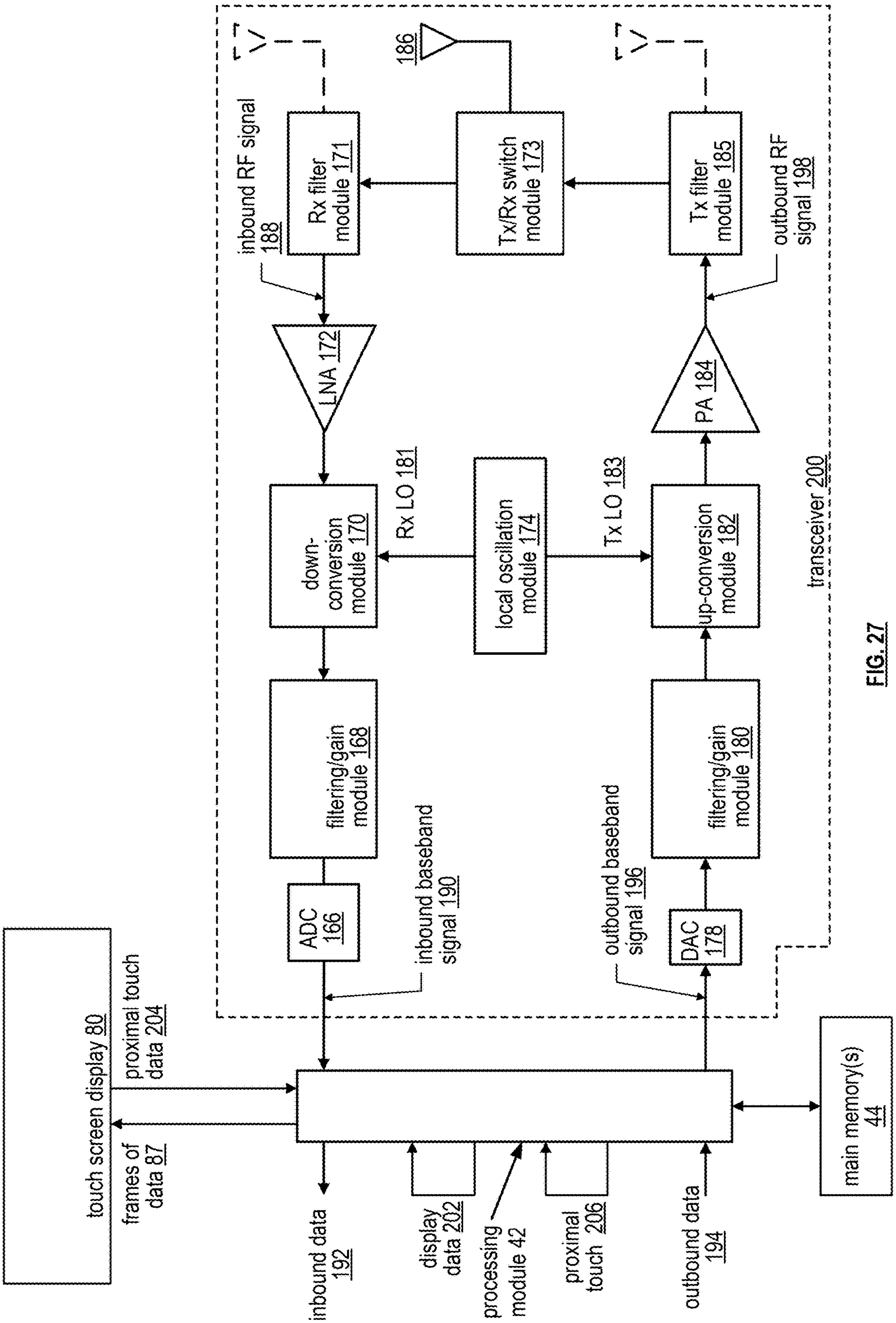
FIG. 27 is a schematic block diagram of another embodiment of a computing device having touch screen display in accordance with various embodiments.

FIG. 27 is a schematic block diagram of another embodiment of a computing device 14-*a* and/or 14-*b* that includes the processing module 42 (e.g., a and/or b), the main memory 44 (e.g., a and/or b), the touch screen display 80 (e.g., a and/or b), and the transceiver 200. The transceiver 200 includes a transmit/receive switch module 173, a receive filter module 171, a low noise amplifier (LNA) 172, a down conversion module 170, a filter/gain module 168, an analog to digital converter (ADC) 166, a digital to analog converter (DAC) 178, a filter/gain module 170, an up-conversion module 182, a power amplifier (PA) 184, a transmit filter module 185, one or more antennas 186, and a local oscillation module 174. In an alternate embodiment, the transceiver 200 includes a transmit antenna and a receiver antenna (as shown using dashed lines) and omit the common antenna 186 and the transmit/receive (Tx/Rx) switch module 173.

In an example of operation using the common antenna 186, the antenna receives an inbound radio frequency (RF) signal, which is routed to the receive filter module 171 via the Tx/Rx switch module 173 (e.g., a balun, a cross-coupling circuit, etc.). The receive filter module 171 is a bandpass or low pass filter that passes the inbound RF signal to the LNA 172, which amplifies it.

The down conversion module 170 converts the amplified inbound RF signal into a first inbound symbol stream corresponding to a first signal component (e.g., RX 1adj) and into a second inbound symbol stream corresponding to the second signal component (e.g., RX 2adj). In an embodiment, the down conversion module 170 mixes in-phase (I) and quadrature (Q) components of the amplified inbound RF signal (e.g., amplified RX 1adj and RX 2adj) with in-phase and quadrature components of receiver local oscillation 181 to produce a mixed I signal and a mixed Q signal for each component of the amplified inbound RF signal. Each pair of the mixed I and Q signals are combined to produce the first and second inbound symbol streams. In this embodiment, each of the first and second inbound symbol streams includes phase information (e.g., +/−Δθ[phase shift] and/or θ(t) [phase modulation]) and/or frequency information (e.g., +/−Δf [frequency shift] and/or f(t) [frequency modulation]). In another embodiment and/or in furtherance of the preceding embodiment, the inbound RF signal includes amplitude information (e.g., +/−ΔA [amplitude shift] and/or A(t) [amplitude modulation]).

The filter/gain module 168 filters the down-converted inbound signal, which is then converted into a digital inbound baseband signal 190 by the ADC 166. The processing module 42 converts the inbound symbol stream(s) into inbound data 192 (e.g., voice, text, audio, video, graphics, etc.) in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the processing module converts a single inbound symbol stream into the inbound data for Single Input Single Output (SISO) communications and/or for Multiple Input Single Output (MISO) communications and converts the multiple inbound symbol streams into the inbound data for Single Input Multiple Output (SIMO) and Multiple Input Multiple Output (MIMO) communications.

In an example, the inbound data 192 includes display data 202. For example, the inbound RF signal 188 includes streaming video over a wireless link. As such, the inbound data 192 includes the frames of data 87 of the video file, which the processing module 42 provides to the touch screen display 80 for display. The processing module 42 further processes proximal touch data 204 (e.g., finger or pen touches) of the touch screen display 80. For example, a touch corresponds to a command that is to be wirelessly sent to the content provider of the streaming wireless video.

In this example, the processing module interprets the proximal touch data 204 to generate a command (e.g., pause, stop, etc.) regarding the streaming video. The processing module processes the command as outbound data 194 e.g., voice, text, audio, video, graphics, etc.) by converting it into one or more outbound symbol streams (e.g., outbound baseband signal 196) in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the processing module converts the outbound data into a single outbound symbol stream for Single Input Single Output (SISO) communications and/or for Multiple Input Single Output (MISO) communications and converts the outbound data into multiple outbound symbol streams for Single Input Multiple Output (SIMO) and Multiple Input Multiple Output (MIMO) communications.

The DAC 178 converts the outbound baseband signal 196 into an analog signal, which is filtered by the filter/gain module 180. The up-conversion module 182 mixes the filtered analog outbound baseband signal with a transmit local oscillation 183 to produce an up-converted signal. This may be done in a variety of ways. In an embodiment, in-phase and quadrature components of the outbound baseband signal are mixed with in-phase and quadrature components of the transmit local oscillation to produce the up-converted signal. In another embodiment, the outbound baseband signal provides phase information (e.g., +/−Δθ [phase shift] and/or θ(t) [phase modulation]) that adjusts the phase of the transmit local oscillation to produce a phase adjusted up-converted signal. In this embodiment, the phase adjusted up-converted signal provides the up-converted signal. In another embodiment, the outbound baseband signal further includes amplitude information (e.g., A(t) [amplitude modulation]), which is used to adjust the amplitude of the phase adjusted up converted signal to produce the up-converted signal. In yet another embodiment, the outbound baseband signal provides frequency information (e.g., +/−Δf [frequency shift] and/or f(t) [frequency modulation]) that adjusts the frequency of the transmit local oscillation to produce a frequency adjusted up-converted signal. In this embodiment, the frequency adjusted up-converted signal provides the up-converted signal. In another embodiment, the outbound baseband signal further includes amplitude information, which is used to adjust the amplitude of the frequency adjusted up-converted signal to produce the up-converted signal. In a further embodiment, the outbound baseband signal provides amplitude information (e.g., +/−ΔA [amplitude shift] and/or A(t) [amplitude modulation) that adjusts the amplitude of the transmit local oscillation to produce the up-converted signal.

The power amplifier 184 amplifies the up-converted signal to produce an outbound RF signal 198. The transmit filter module 185 filters the outbound RF signal 198 and provides the filtered outbound RF signal to the antenna 186 for transmission, via the transmit/receive switch module 173. Note that processing module may produce the display data from the inbound data, the outbound data, application data, and/or system data.

Figure 28:
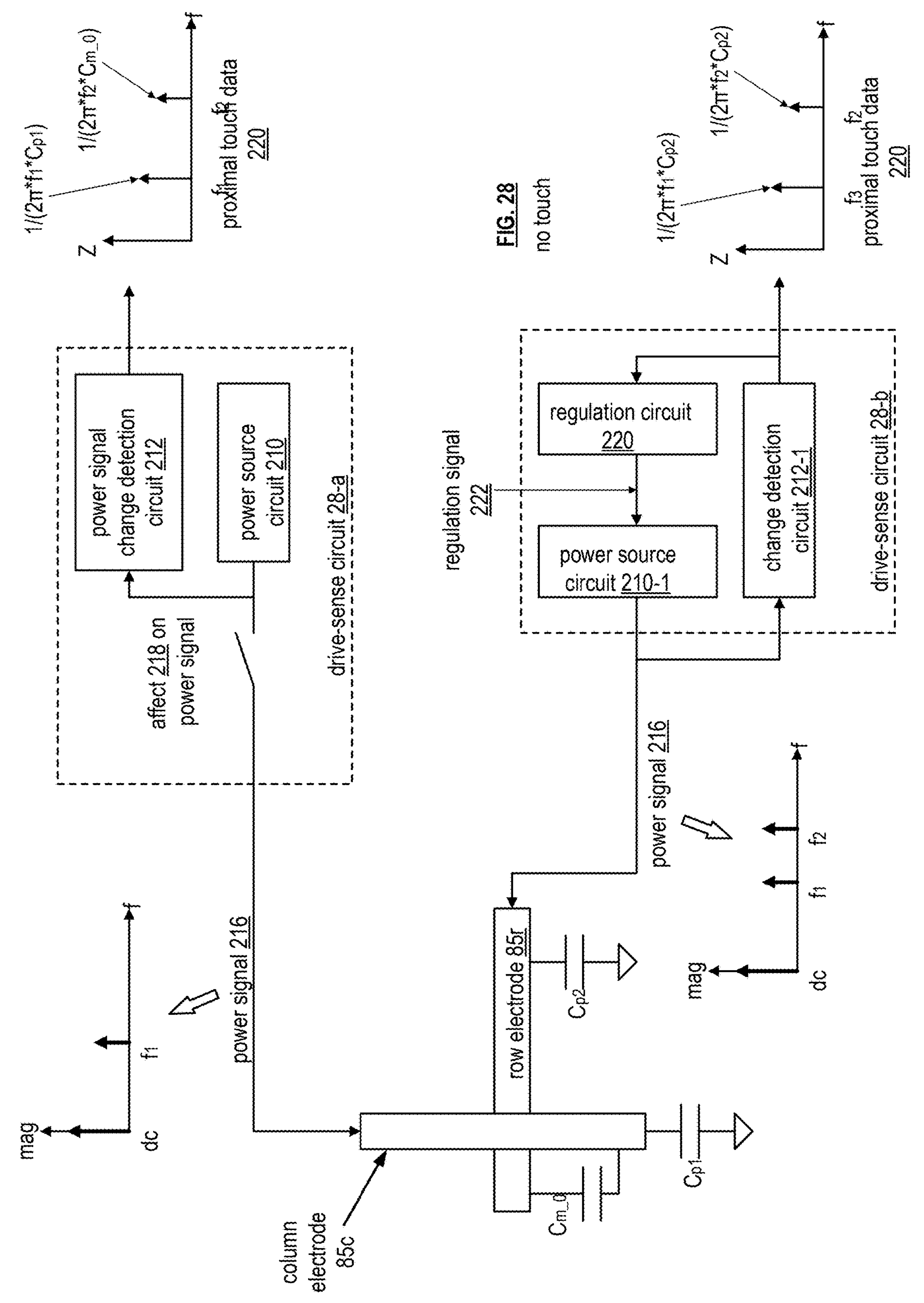
FIG. 28 is a schematic block diagram of another example of a first drive sense circuit coupled to a first electrode and a second drive sense circuit coupled to a second electrode without a touch proximal to the electrodes in accordance with various embodiments.

FIG. 28 is a schematic block diagram of another example of a first drive sense circuit 28-*a* coupled to a column electrode 85*c* and a second drive sense circuit 28-*b* coupled to a row electrode 85*r* without a touch proximal to the electrodes. The first drive sense circuit 28-*a* includes a power source circuit 210 and a power signal change detection circuit 212. The second drive sense circuit 28-*b* includes a power source circuit 210-1, a power signal change detection circuit 212-1, and a regulation circuit 220.

The power source circuit 210 of the first drive sense circuit 28-*a* is operably coupled to the column electrode 85*c* and, when enabled (e.g., from a control signal from the processing module 42, power is applied, a switch is closed, a reference signal is received, etc.) provides a power signal 216 to the column electrode 85*c*.

The power source circuit 210 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provides a desired power level to the sensor and substantially matches impedance of the sensor. The power source circuit 110 generates the power signal 116 to include a DC (direct current) component and/or an oscillating component.

When receiving the power signal 216, the impedance of the electrode affects 218 the power signal. When the power signal change detection circuit 212 is enabled, it detects the affect 218 on the power signal as a result of the impedance of the electrode. For example, the power signal is a 1.5 voltage signal and, under a first condition, the sensor draws 1 milliamp of current, which corresponds to an impedance of 1.5 K Ohms. Under a second conditions, the power signal remains at 1.5 volts and the current increases to 1.5 milliamps. As such, from condition 1 to condition 2, the impedance of the electrode changed from 1.5 K Ohms to 1 K Ohms. The power signal change detection circuit 212 determines the change and generates a sensed signal, or proximal touch data 204 therefrom.

The power source circuit 210-1 of the second drive sense circuit 28-*b* is operably coupled to the row electrode 85*r* and, when enabled (e.g., from a control signal from the processing module 42, power is applied, a switch is closed, a reference signal is received, etc.) provides a power signal 216 to the electrode 85*r*. The power source circuit 210-1 may be implemented similarly to power source circuit 210 and generates the power signal 216 to include a DC (direct current) component and/or an oscillating component.

When receiving the power signal 216, the impedance of the row electrode 85*r* affects the power signal. When the change detection circuit 212-1 is enabled, it detects the effect on the power signal as a result of the impedance of the electrode 85*r*. The change detection circuit 210-1 is further operable to generate a sensed signal 120, or proximal touch data 204, that is representative of change to the power signal based on the detected effect on the power signal.

The regulation circuit 152, when its enabled, generates regulation signal 22 to regulate the DC component to a desired DC level and/or regulate the oscillating component to a desired oscillating level (e.g., magnitude, phase, and/or frequency) based on the sensed signal 120. The power source circuit 210-1 utilizes the regulation signal 222 to keep the power signal 216 at a desired setting regardless of the impedance changes of the electrode 85*r*. In this manner, the amount of regulation is indicative of the affect the impedance of the electrode has on the power signal.

In an example, the power source circuit 210-1 is a DC-DC converter operable to provide a regulated power signal 216 having DC and AC components. The change detection circuit 212-1 is a comparator and the regulation circuit 220 is a pulse width modulator to produce the regulation signal 222. The comparator compares the power signal 216, which is affected by the electrode, with a reference signal that includes DC and AC components. When the impedance is at a first level, the power signal is regulated to provide a voltage and current such that the power signal substantially resembles the reference signal.

When the impedance changes to a second level, the change detection circuit 212-1 detects a change in the DC and/or AC component of the power signal 216 and generates the sensed signal 120, which indicates the changes. The regulation circuit 220 detects the change in the sensed signal 120 and creates the regulation signal 222 to substantially remove the impedance change effect on the power signal 216. The regulation of the power signal 216 may be done by regulating the magnitude of the DC and/or AC components, by adjusting the frequency of AC component, and/or by adjusting the phase of the AC component.

Figure 29:
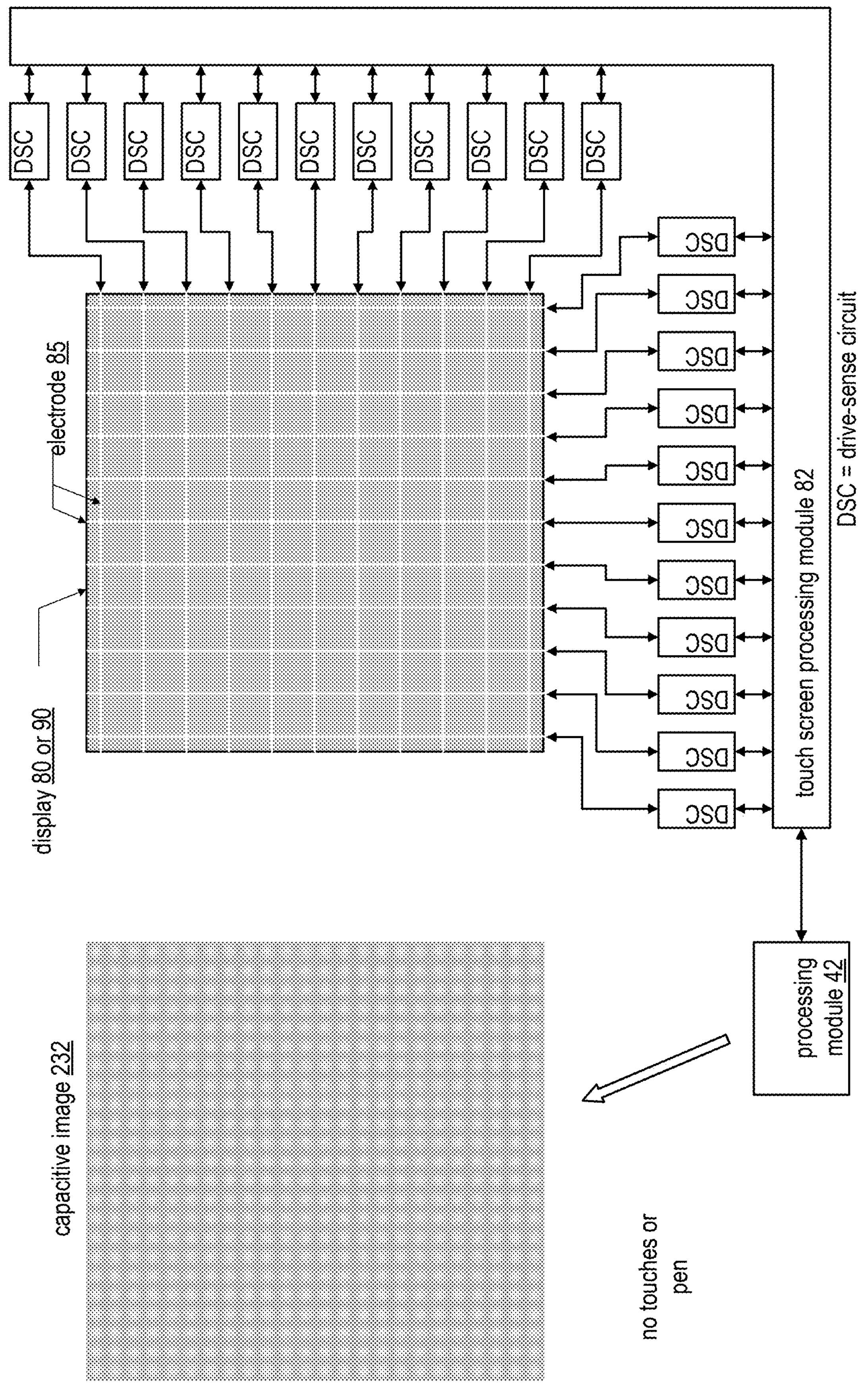
FIG. 29 is a schematic block diagram of an example of a computing device generating a capacitive image of a touch screen display in accordance with various embodiments.

FIG. 29 is a schematic block diagram of an example of a computing device 14 or 18 that includes the components of FIG. 2 and/or FIG. 3. Only the processing module 42, the touch screen processing module 82, the display 80 or 90, the electrodes 85, and the drive sense circuits (DSC) are shown.

In an example of operation, the touch screen processing module 82 receives sensed signals from the drive sense circuits and interprets them to identify a finger or pen touch. In this example, there are no touches.

The touch screen processing module 82 provides touch data (which includes location of touches, if any, based on the row and column electrodes having an impedance change due to the touch(es)) to the processing module 42.

The processing module 42 processes the touch data to produce a capacitive image 232 of the display 80 or 90. In this example, there are no touches, so the capacitive image 232 is substantially uniform across the display. The refresh rate of the capacitive image ranges from a few frames of capacitive images per second to a hundred or more frames of capacitive images per second. Note that the capacitive image may be generated in a variety of ways. For example, the self-capacitance and/or mutual capacitance of each touch cell (e.g., intersection of a row electrode with a column electrode) is represented by a color. When the touch cells have substantially the same capacitance, their representative color will be substantially the same. As another example, the capacitance image is topological mapping of differences between the capacitances of the touch cells.

Figure 30:
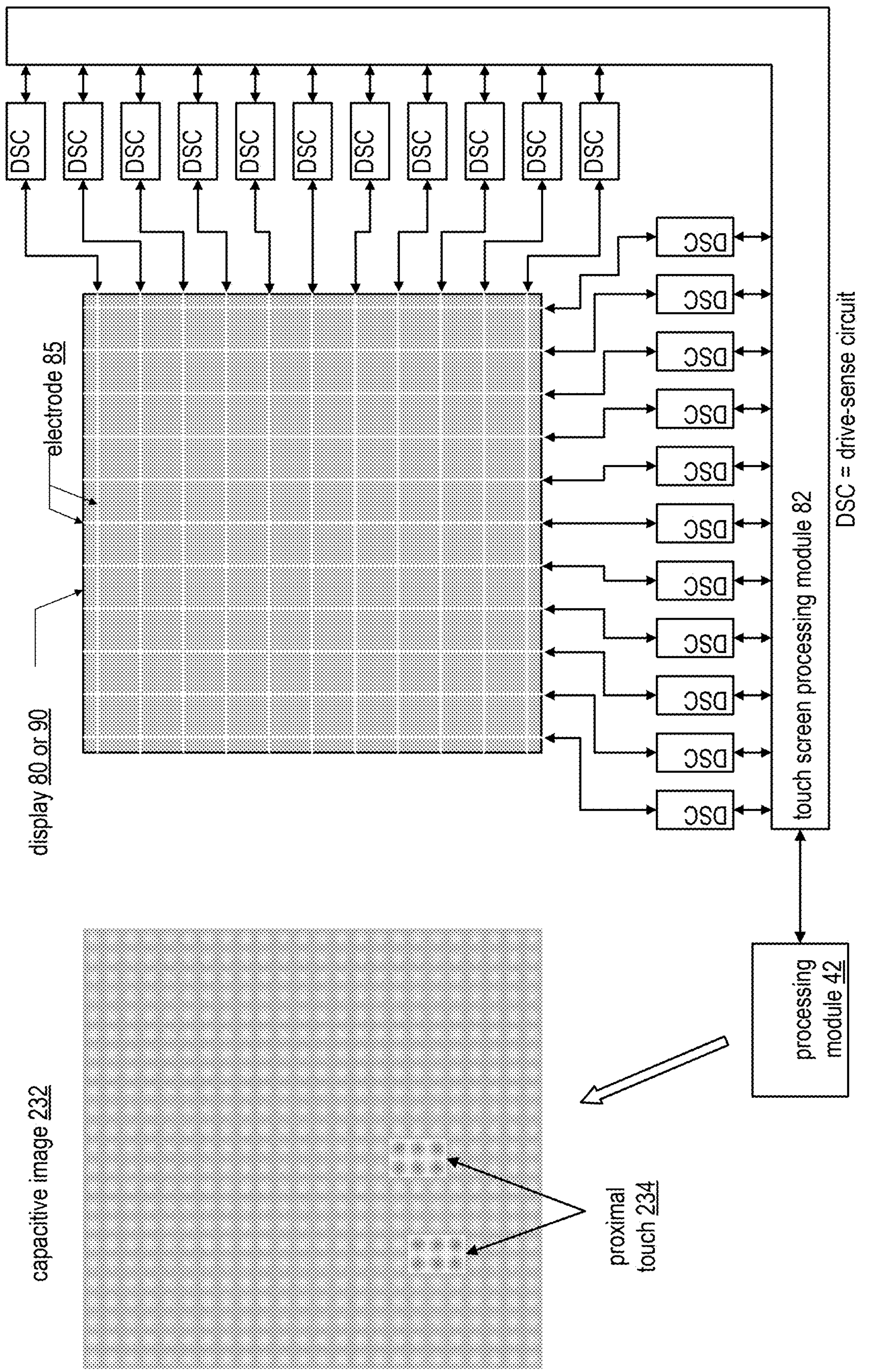
FIG. 30 is a schematic block diagram of another example of a computing device generating a capacitive image of a touch screen display in accordance with various embodiments.

FIG. 30 is a schematic block diagram of another example of a computing device that is substantially similar to the example of FIG. 29 with the exception that the touch data includes two touches. As such, the touch data generated by the touch screen processing module 82 includes the location of two touches based on effected rows and columns. The processing module 42 processes the touch data to determine the x-y coordinates of the touches on the display 80 or 90 and generates the capacitive image, which includes the touches.

Figure 31:
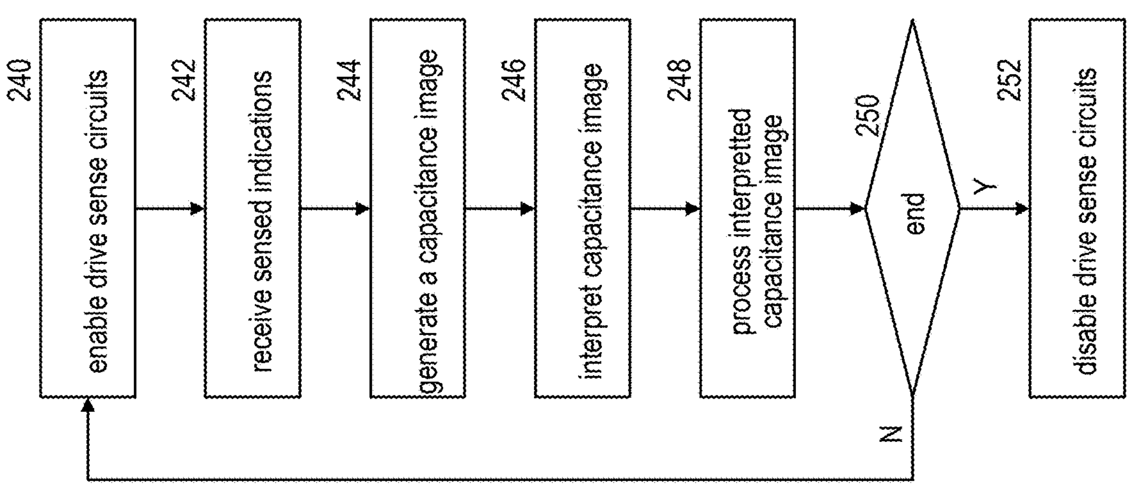
FIG. 31 is a logic diagram of an embodiment of a method for generating a capacitive image of a touch screen display in accordance with various embodiments.

FIG. 31 is a logic diagram of an embodiment of a method for generating a capacitive image of a touch screen display that is executed by the processing module 42 and/or 82. The method begins at step 240 where the processing module enables (for continuous or periodic operation) the drive-sense circuits to provide a sensor signals to the electrodes. For example, the processing module 42 and/or 82 provides a control signal to the drive sense circuits to enable them. The control signal allows power to be supplied to the drive sense circuits, to turn-on one or more of the components of the drive sense circuits, and/or close a switch coupling the drive sense circuits to their respective electrodes.

The method continues at step 242 where the processing module receives, from the drive-sense circuits, sensed indications regarding (self and/or mutual) capacitance of the electrodes. The method continues at step 244 where the processing module generates a capacitive image of the display based on the sensed indications.

As part of step 244, the processing module stores the capacitive image in memory. The method continues at step 246 where the processing module interprets the capacitive image to identify one or more proximal touches (e.g., actual physical contact or near physical contact) of the touch screen display.

The method continues at step 248 where the processing module processes the interpreted capacitance image to determine an appropriate action. For example, if the touch(es) corresponds to a particular part of the screen, the appropriate action is a select operation. As another example, of the touches are in a sequence, then the appropriate action is to interpret the gesture and then determine the particular action.

The method continues at step 250 where the processing module determines whether to end the capacitance image generation and interpretation. If so, the method continues to steps 252 where the processing module disables the drive sense circuits. If the capacitance image generation and interpretation is to continue, the method reverts to step 240.

Figure 32:
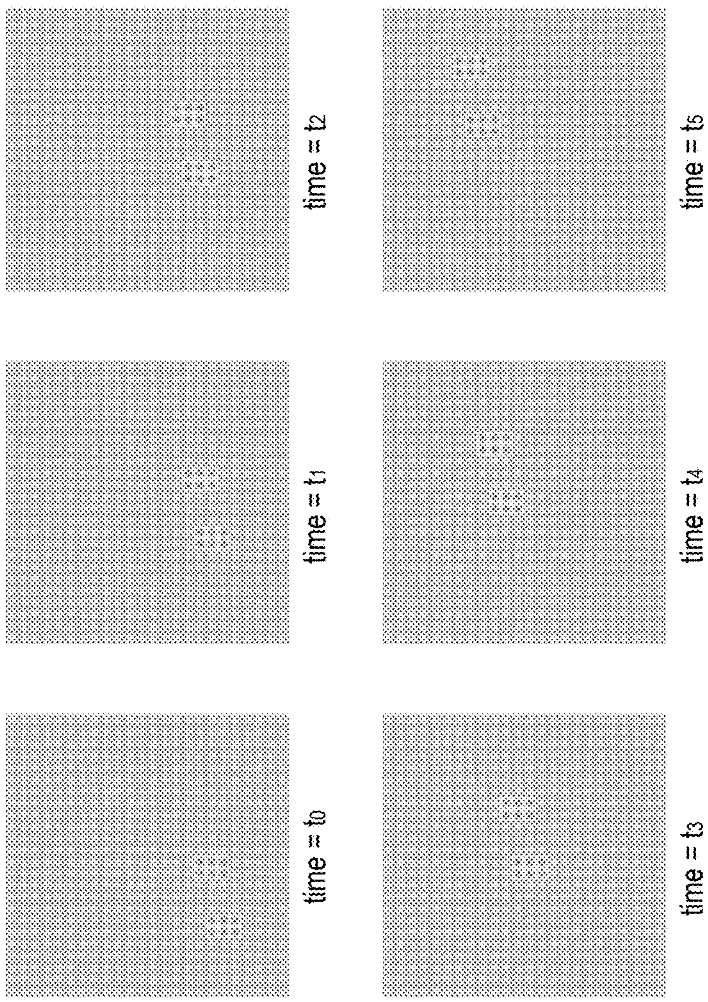
FIG. 32 is a schematic block diagram of an example of generating capacitive images over a time period in accordance with various embodiments.

FIG. 32 is a schematic block diagram of an example of generating capacitive images over a time period. In this example, two touches are detected at time t0 and move across and upwards through the display over times t1 through t5. The movement corresponds to a gesture or action. For instance, the action is dragging a window across and upwards through the display.

Figure 33:
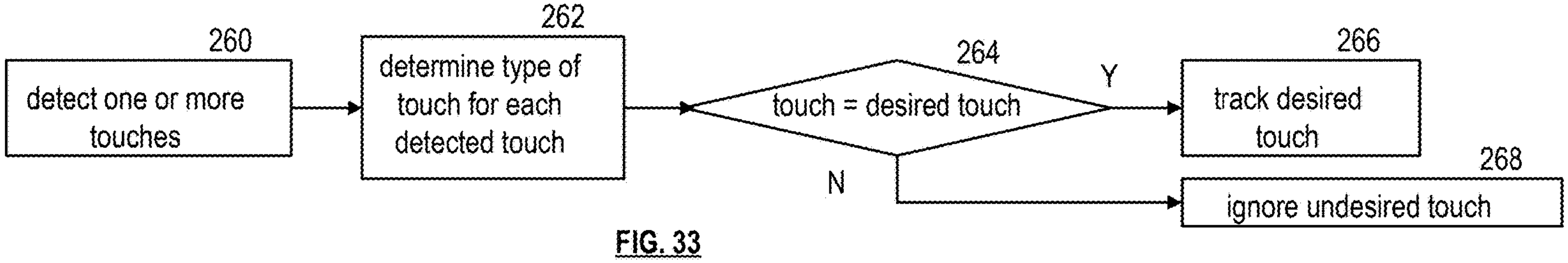
FIG. 33 is a logic diagram of an embodiment of a method for identifying desired and undesired touches using a capacitive image in accordance with various embodiments.

FIG. 33 is a logic diagram of an embodiment of a method for identifying desired and undesired touches using a capacitive image that is executed by processing module 42 and/or 82. The method starts are step 260 where the processing module detects one or more touches. The method continues at step 262 where the processing module determines the type of touch for each detected touch. For example, a desired touch is a finger touch or a pen touch. As a further example, an undesired touch is a water droplet, a side of a hand, and/or an object.

The method continues at step 264 where the processing module determines, for each touch, whether it is a desired or undesired touch. For example, a desired touch of a pen and/or a finger will have a known effect on the self-capacitance and mutual-capacitance of the effected electrodes. As another example, an undesired touch will have an effect on the self-capacitance and/or mutual-capacitance outside of the know effect of a finger and/or a pen. As another example, a finger touch will have a known and predictable shape, as will a pen touch. An undesired touch will have a shape that is different from the known and desired touches.

If the touch is desired, the method continues at step 266 where the processing module continues to monitor the desired touch. If the touch is undesired, the method continues at step 268 where the processing module ignores the undesired touch.

Figure 34:
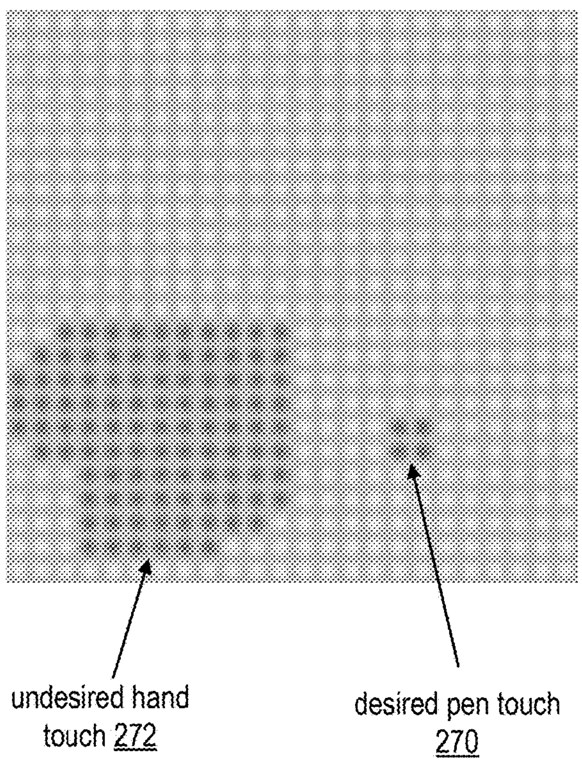
FIG. 34 is a schematic block diagram of an example of using capacitive images to identify desired and undesired touches in accordance with various embodiments.

FIG. 34 is a schematic block diagram of an example of using capacitive images to identify desired and undesired touches. In this example, the desired pen touch 270 will be processed and the undesired hand touch 272 will be ignored.

Figure 35:
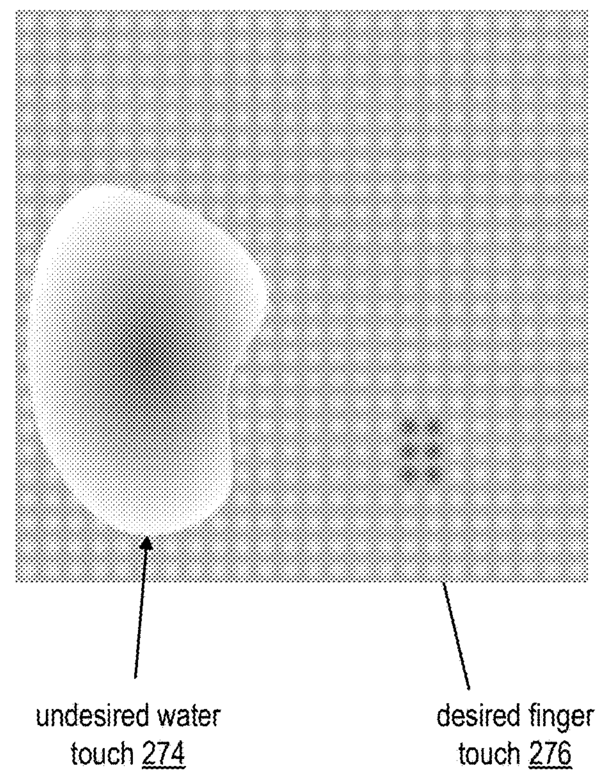
FIG. 35 is a schematic block diagram of another example of using capacitive images to identify desired and undesired touches in accordance with various embodiments.

FIG. 35 is a schematic block diagram of another example of using capacitive images to identify desired and undesired touches. In this example, the desired finger touch 276 will be processed and the undesired water touch 274 will be ignored. The undesired water touch 274 would not produce a change to the self-capacitance of the effected electrodes since the water does not have a path to ground and the same frequency component is used for self-capacitance for activated electrodes.

Figure 36:
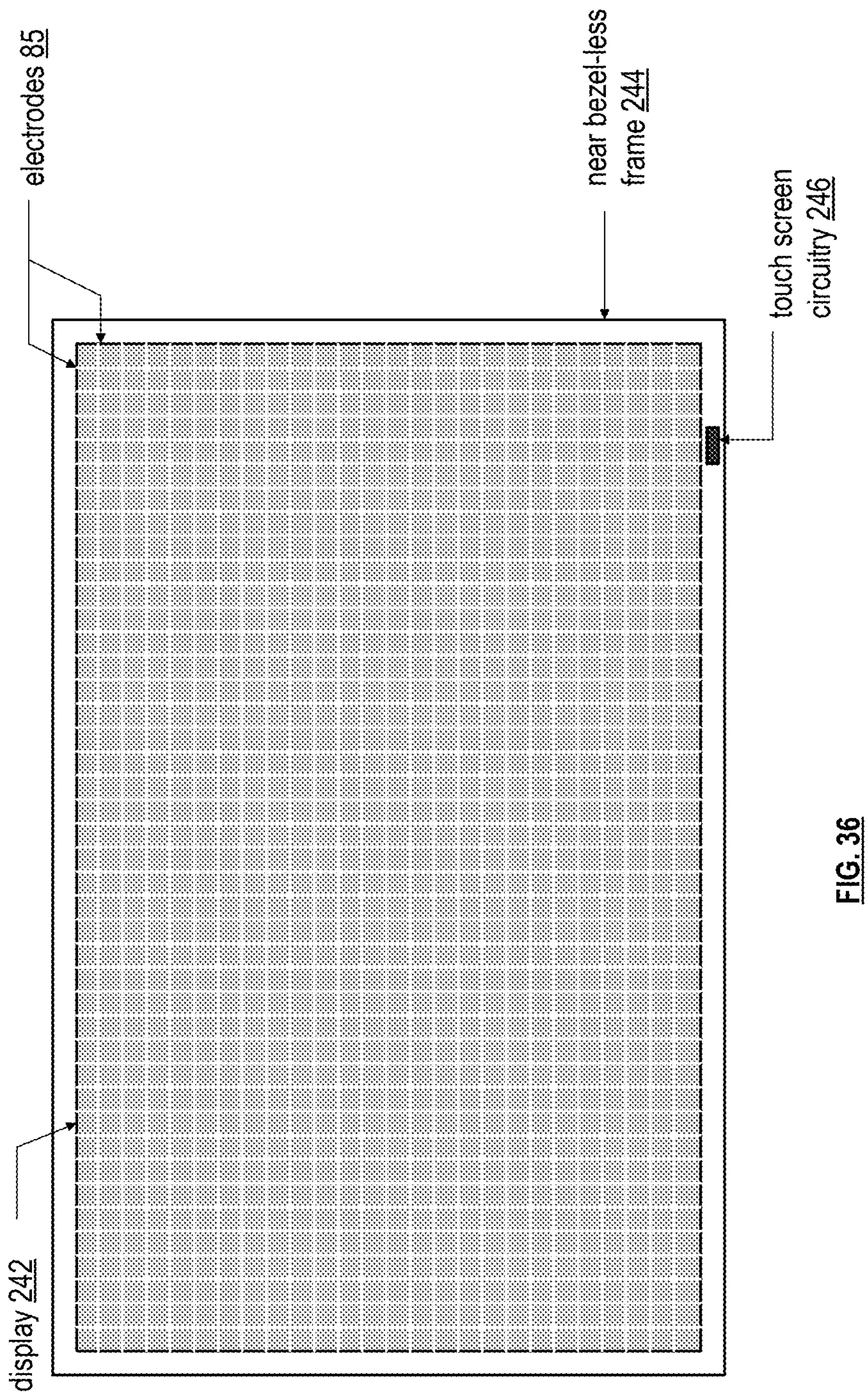
FIG. 36 is a schematic block diagram of an embodiment of a near bezel-less touch screen display in accordance with various embodiments.

FIG. 36 is a schematic block diagram of an embodiment of a near bezel-less touch screen display 240 that includes a display 242, a near bezel-less frame 244, touch screen circuit 246, and a plurality of electrodes 85. The touch screen display 240 is a large screen with a diagonal dimension of 32 inches or more. The near bezel-less frame 244 has a visible width with respect to the display of one inch or less. In an embodiment, the width of the near bezel-less frame 244 is ½ inch or less on two or more sides. The display 242 has properties in accordance with the table of paragraph 107.

An issue with a large display and very small bezel of the frame 244 is running leads to the electrodes 85 from the touch screen circuitry 246. The connecting leads, which are typically conventional wires, need to be located with the frame 244 or they will adversely affect the display. The larger the display, the more electrodes and the more leads that connect to them. To get the connecting leads to fit within the frame, they need to be tightly packed together (i.e., very little space between them). This creates two problems for conventional touch screen circuitry: (1) with conventional low voltage signaling to the electrodes (e.g., signals swinging from rail to rail of the power supply voltage, which is at least 1 volt and typically greater than 1.5), electromagnetic cross-coupling between the leads causing interference between the signal; and (2) the tight coupling of the leads increases the parasitic capacitance of each lead, which increases the power requirements. With conventional touch screen circuitry, the larger the screen, the more cross-coupling interference and more power is required. Because of these issues, display sizes for touch screen displays have been effectively limited to smaller display sizes (e.g., less than 32 inches).

With the touch screen circuitry 246 disclosed herein, effective and efficient large touch screen displays can be practically realized. For instance, the touch screen circuitry 246 uses very low voltage signaling (e.g., 25-250 milli-volt RMS of the oscillating component of the sensor signal or power signal), which reduces power requirements and substantially reduces adverse effects of cross-coupling between the leads. For example, when the oscillating component is a sinusoidal signal at 25 milli-volt RMS and each electrode (or at least some of them) are driven by oscillating components of different frequencies, the cross-coupling is reduced and, what cross-coupled does exist, is easily filtered out. Continuing with the example, with a 25 milli-voltage signal and increased impedance of longer electrodes and tightly packed leads, the power requirement is dramatically reduced. As a specific example, for conventional touch screen circuitry operating with a power supply of 1.5 volts and the touch screen circuitry 246 operating with 25 milli-volt signaling, the power requirements are reduced by as much as 60 times.

Figure 40:
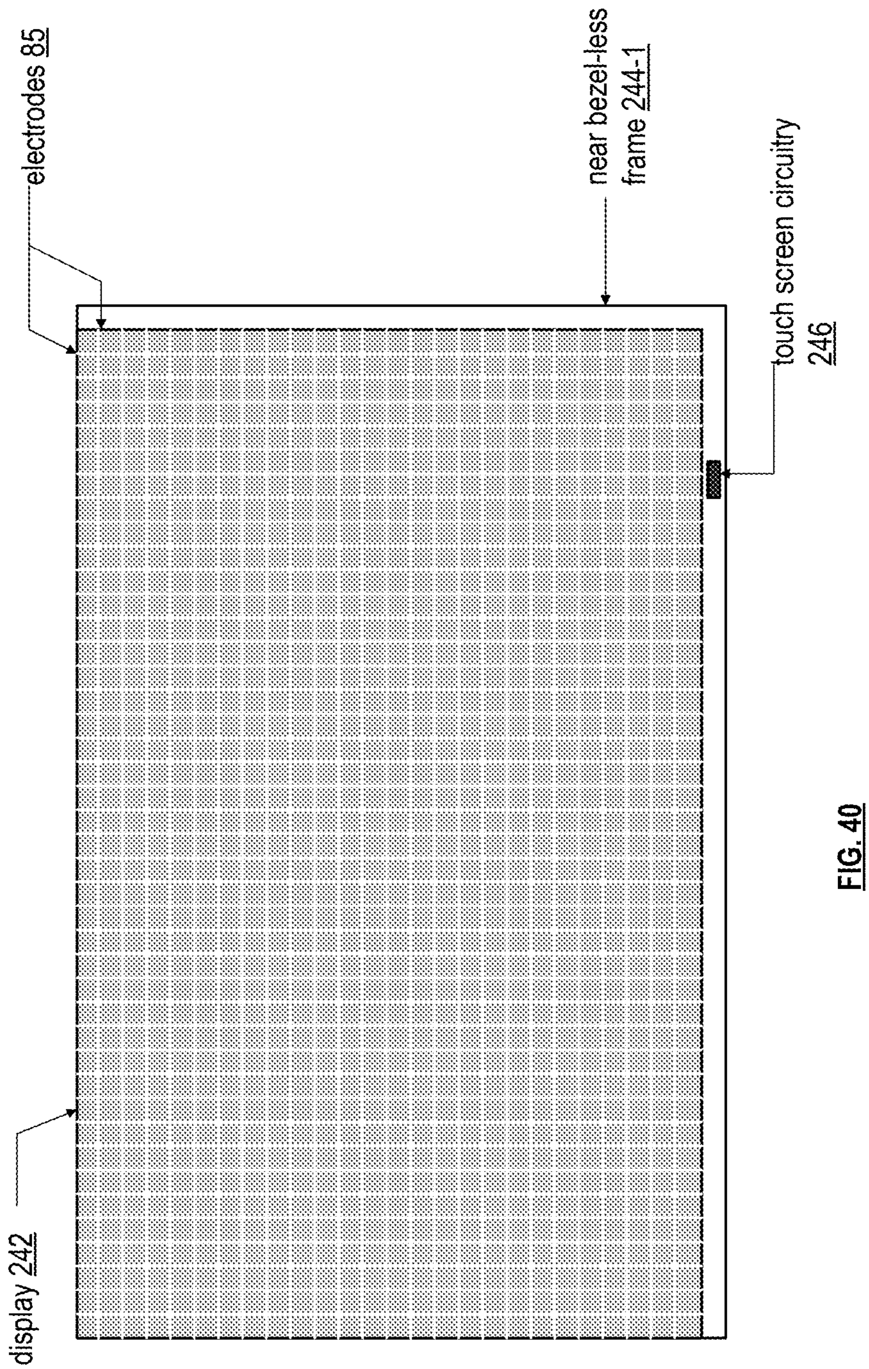
FIG. 40 is a schematic block diagram of another embodiment of a near bezel-less touch screen display in accordance with various embodiments.

In an embodiment, the near bezel-less touch screen display 240 includes the display 242, the near bezel-less frame 244, electrodes 85, and the touch screen circuitry 246, which includes drive sense circuits (DSC) and a processing module. The display 242 is operable to render frames of data into visible images. The near bezel-less frame 244 at least partially encircles the display 242. In this example, the frame 244 fully encircles the frame and the touch screen circuitry 246 is positioned in the bezel area to have about the same number of electrode connections on each side of it. In FIG. 40, as will be subsequently discussed, the frame 244 partially encircles the display 242.

The drive-sense circuits are coupled to the electrodes via connections, which are substantially within the near bezel-less frame. The connections include wires and connectors, which are achieved by welds, crimping, soldering, male-female connectors, etc. The drive-sense circuits are operable to provide and monitor sensor signals of the electrodes 85 to detect impedance and impedance changes of the electrodes. The processing module processes the impedances of the electrodes to determine one or more touches on the touch screen display 240.

In the present FIG. 36, the electrodes 85 are shown in a first arrangement (e.g., as rows) and a second arrangement (e.g., as columns). Other patterns for the electrodes may be used to detect touches to the screen. For example, the electrodes span only part of the way across the display and other electrodes span the remaining part of the display. As another example, the electrodes are patterned at an angle different than 90 degrees with respect to each other.

Figure 37:
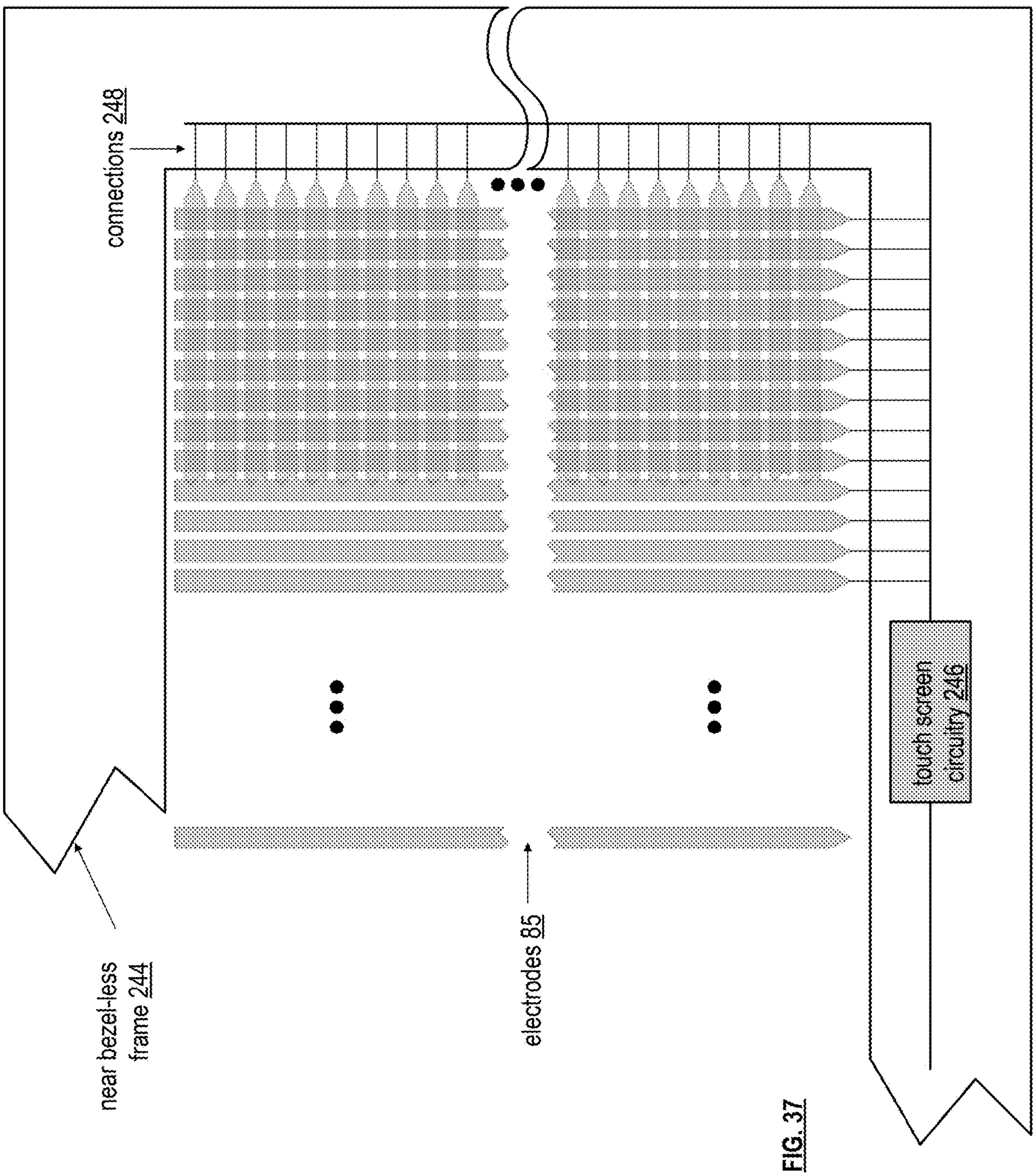
FIG. 37 is a schematic block diagram of another embodiment of a near bezel-less touch screen display in accordance with various embodiments.

FIG. 37 is a schematic block diagram that further illustrates an embodiment of a near bezel-less touch screen display 242. As shown, the touch screen circuit 246 is coupled to the electrodes 85 via a plurality of connectors 248. The electrodes are arranged in rows and columns, are constructive of a transparent conductive material (e.g., ITO) and distributed throughout the display 242. The larger the touch screen display, the more electrodes are needed. For example, a touch screen display includes hundreds to hundreds of thousands, or more, of electrodes.

The connections 248 and the touch screen circuitry 246 are physically located with the near bezel-less frame 244. The more tightly packed the connectors, the thinner the bezel can be. A drive sense circuit of the touch screen circuitry 246 is coupled to an individual electrode 85. Thus, if there are 10,000 electrodes, there are 10,000 drive sense circuits and 10,000 connections. In an embodiment, the connections 248 include traces on a multi-layer printed circuit board, where the traces are spaced at a few microns or less. As another example, the spacing between the connections is a minimum spacing needed to ensure that the insulation between the connections does not break down. Note that the touch screen circuitry 246 may be implemented in multiple integrated circuits that are distributed about the frame 244.

Figure 38:
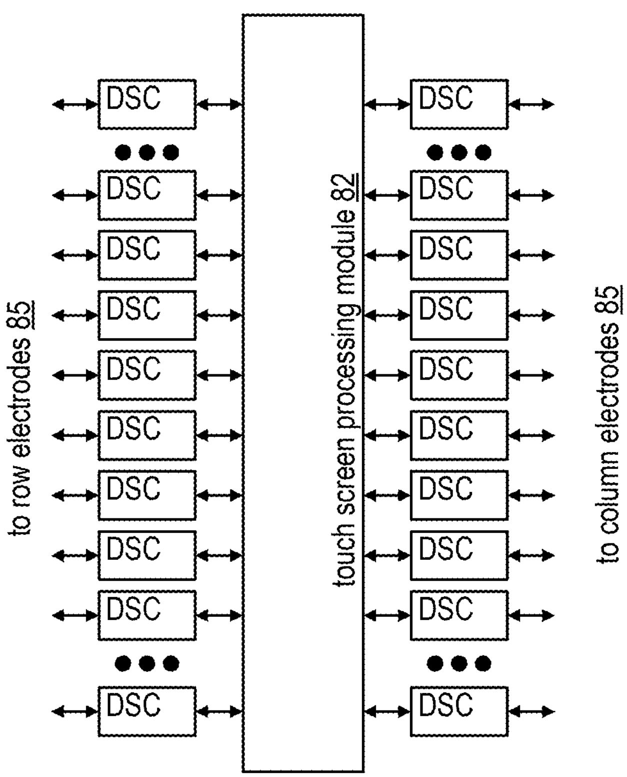
FIG. 38 is a schematic block diagram of an embodiment of touch screen circuitry of a near bezel-less touch screen display in accordance with various embodiments.

FIG. 38 is a schematic block diagram of an embodiment of touch screen circuitry 246 that includes a touch screen processing module 82 and a plurality of drive sense circuits (DSC). Some of the drive sense circuits are coupled to row electrodes and other drive sense circuits are coupled to column electrodes. The touch screen circuitry 246 may be implemented in one or more integrated circuits. For example, the touch screen processing module 82 and a certain number (e.g., a hundred to thousands) of drive sense circuits are implemented one a single die. An integrated circuit may include one or more of the dies. Thus, depending on the number of electrodes in the touch screen display, one or more dies in one or more integrated circuits is needed.

When more than a single die is used, the touch screen circuitry 246 includes more than one processing module 82. In this instance, the processing modules 82 on different dies function as peer processing modules, in that, they communicate with their own drive sense circuits and process the data from the drive sense circuits and then coordinate to provide the process data upstream for further processing (e.g., determining whether touches have occurred, where on the screen, is the touch a desired touch, and what does the touch mean). The upstream processing may be done by another processing module (e.g., processing module 42), as a distributed function among the processing modules 82, and/or by a designed processing module of the processing modules 82.

Figure 39:
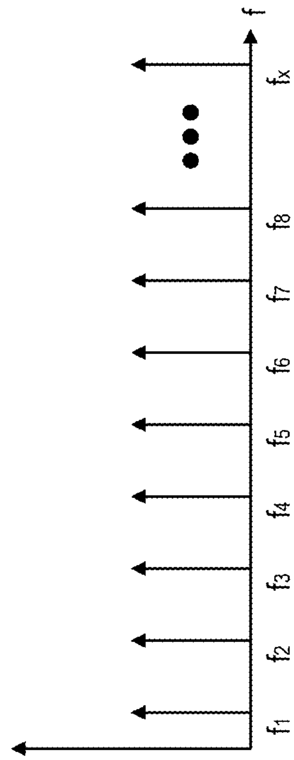
FIG. 39 is a schematic block diagram of an example of frequencies for the various analog reference signals for the drive-sense circuits in accordance with various embodiments.

FIG. 39 is a schematic block diagram of an example of frequencies for the various analog reference signals for the drive-sense circuits. As mentioned above, to reduce the adverse effects of cross-coupling, the drive sense circuits use a common frequency component for self-capacitance measurements and uses different frequencies components for mutual capacitance measurements. In this example, there are x number of equally-spaced different frequencies. The frequency spacing is dependent on the filtering of the sensed signals. For example, the frequency spacing is in the range of 10 Hz to 10's of thousands of Hz. Note that the spacing between the frequencies does not need to be equal or that every frequency needs to be used. Further note that, for very large touch screen displays having tens to hundreds of thousands of electrodes, a frequency reuse pattern may be used.

FIG. 40 is a schematic block diagram of another embodiment of a near bezel-less touch screen display 240-1 that includes the display 242, the electrodes 85, the touch screen display circuitry 246, and a near bezel-less frame 244-1. In this embodiment, the frame 244-1 is on two sides of the display 242; the other two sides are bezel-less. The functionality of the display 242, the electrodes 85, the touch screen display circuitry 246 are as previously discussed.

Figure 41:
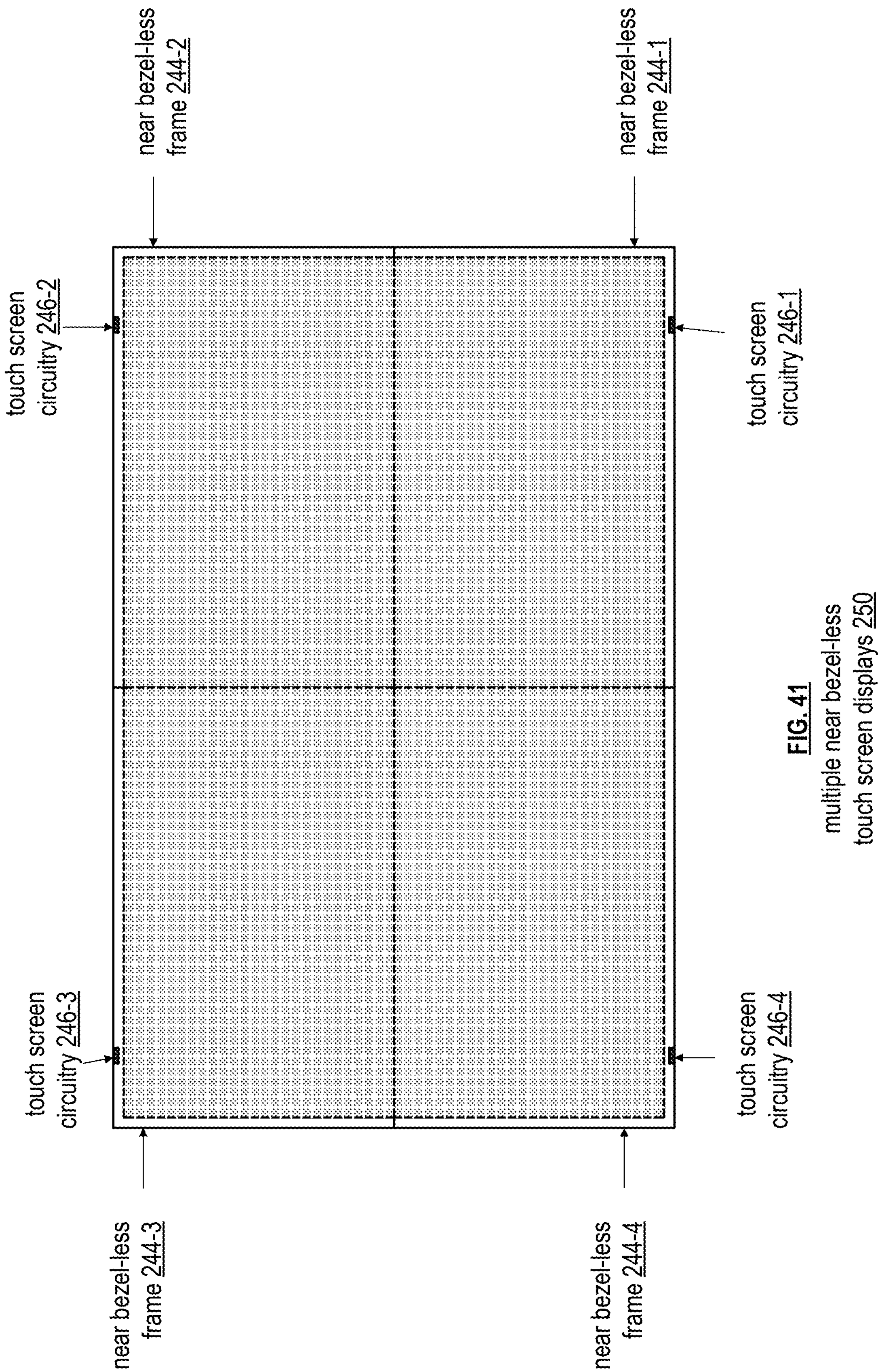
FIG. 41 is a schematic block diagram of another embodiment of multiple near bezel-less touch screen displays in accordance with various embodiments.

FIG. 41 is a schematic block diagram of another embodiment of multiple near bezel-less touch screen displays 250 that includes a plurality of near bezel-less touch screen displays 240-1. Each of the near bezel-less touch screen displays 240-1 have two sides that are bezel-less and two sides that include a near bezel-less frame. The location of the two bezel-less sides can vary such that the displays 240-1 can be positioned to create one large multiple touch screen display 250.

In an alternate embodiment, a near bezel-less touch screen display includes three sides that are bezel-less and one side that includes a near bezel-less frame. The side having the near bezel-less frame is variable to allow different combinations of the near bezel-less touch screen displays to create a large multiple touch screen display.

Figure 42:
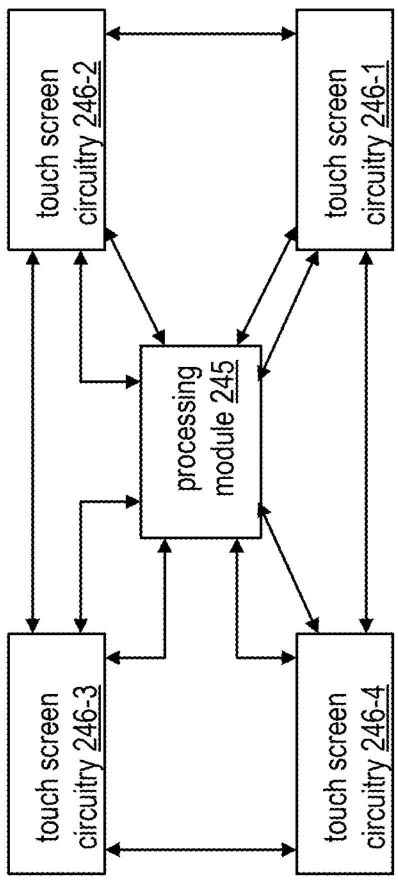
FIG. 42 is a schematic block diagram of an embodiment of processing modules for the multiple near bezel-less touch screen displays of FIG. 41 in accordance with various embodiments.

FIG. 42 is a schematic block diagram of an embodiment of the touch screen circuitry 246 and one or more processing modules for the multiple near bezel-less touch screen displays of FIG. 41. Each of the displays 240-1 includes touch screen circuitry 246-1 through 246-4, which are coupled together and to a centralized processing module 245. Each of the touch screen circuitry 246-1 through 246-4 interacts with the electrodes of its touch screen display 240-1 to produce capacitance information (e.g., self-capacitance, mutual capacitance, change in capacitance, location of the cells having a capacitance change, etc.).

The centralized processing module 245 processes the capacitance information form the touch screen circuitry 246-1 through 246-4 to determine location of a touch, or touches, meaning of the touch(es), etc. In an embodiment, the centralized processing module 245 is processing module 42. In another embodiment, the centralized processing module 245 is one of the processing modules of the touch screen circuitry 246-1 through 246-4. In yet another embodiment, the centralized processing module 245 includes two or more of the processing modules of the touch screen circuitry 246-1 through 246-4 functioning as a distributed processing module.

Figure 43:
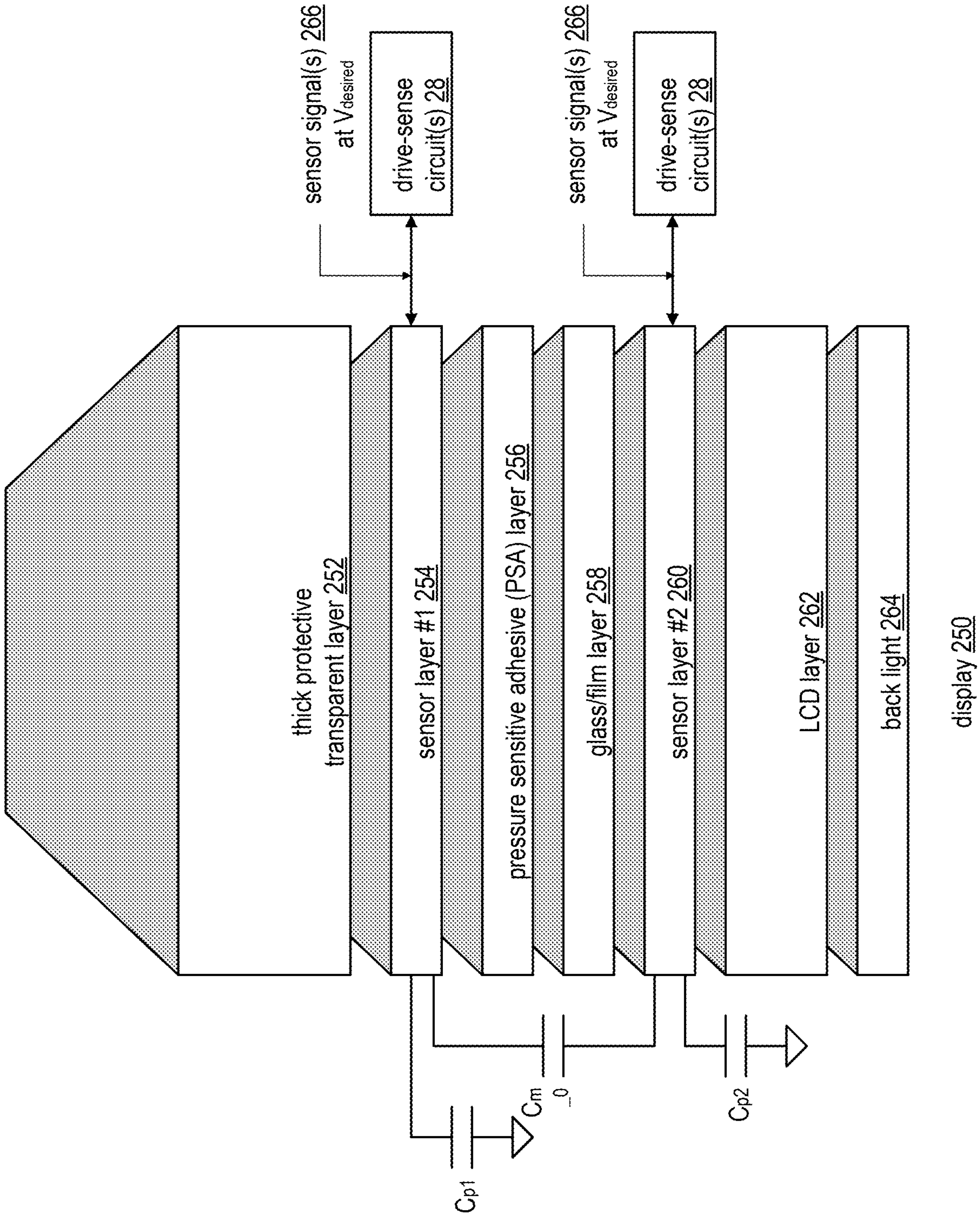
FIG. 43 is a cross section schematic block diagram of an example of a touch screen display having a thick protective transparent layer in accordance with various embodiments.

FIG. 43 is a cross section schematic block diagram of an example of a touch screen display 80 having a thick protective transparent layer 252. The display 80 further includes a first sensor layer 254, one or more pressure sensitive adhesive (PSA) layers 256, a glass/film layer 258, a second sensor layer 260, an LCD layer 262, and a back-light layer 264. A first group of drive sense circuits 28 is coupled to the first sensor layer 254 and a second group of drive sense circuits 28 is coupled to the second sensor layer 260.

The thick protective transparent layer 252 includes one or more layers of glass, film, etc. to protect the display 250 from damaging impacts (e.g., impact force, impact pressure, etc.). In many instances, the thicker the protective transparent layer 252 is, the more protection it provides. For example, the protective transparent layer 252 is at least a ¼ inch thick and, in some applications, is thicker than 1 inch or more.

The protective transparent layer 252 acts as a dielectric for finger capacitance and/or for pen capacitance. The material, or materials, comprising the protective transparent layer 252 will have a dielectric constant (e.g., 5-10 for glass). The capacitance (finger or pen) is then at least partially based on the dielectric constant and thickness of the protective transparent layer 252. In particular, the capacitance (C) equals:

$$C = \epsilon\frac{A}{d} \text{ where A is plate area, } \epsilon \text{ is the dielectric constant}(s), \text{ and } d \text{ is the distance between the plates, which includes the thickness of the protective layer 252.}$$

As such, the thicker the protective transparent layer, the smaller the capacitance (finger and/or pen). As the capacitance decreases, its effect on the self-capacitance of the sensor layers and the effect on the mutual capacitance between the sensor layer is reduced. Accordingly, the drive sense circuits 28 provide the sensor signals 266 at a desired voltage level, which increases as the finger and/or pen capacitance decreases due to the thickness of the protective transparent layer 252. In an embodiment, the first sensor layer includes a plurality of column electrodes and the second sensor layer includes a plurality of row electrodes.

There are a variety of ways to implement a touch sensor electrode. For example, the sensor electrode is implemented using a glass-glass configuration. As another example, the sensor electrode is implemented using a glass-film configuration. Other examples include a film-film configuration, a 2-sided film configuration, a glass and 2-sided film configuration, or a 2-sided glass configuration.

Figure 44:
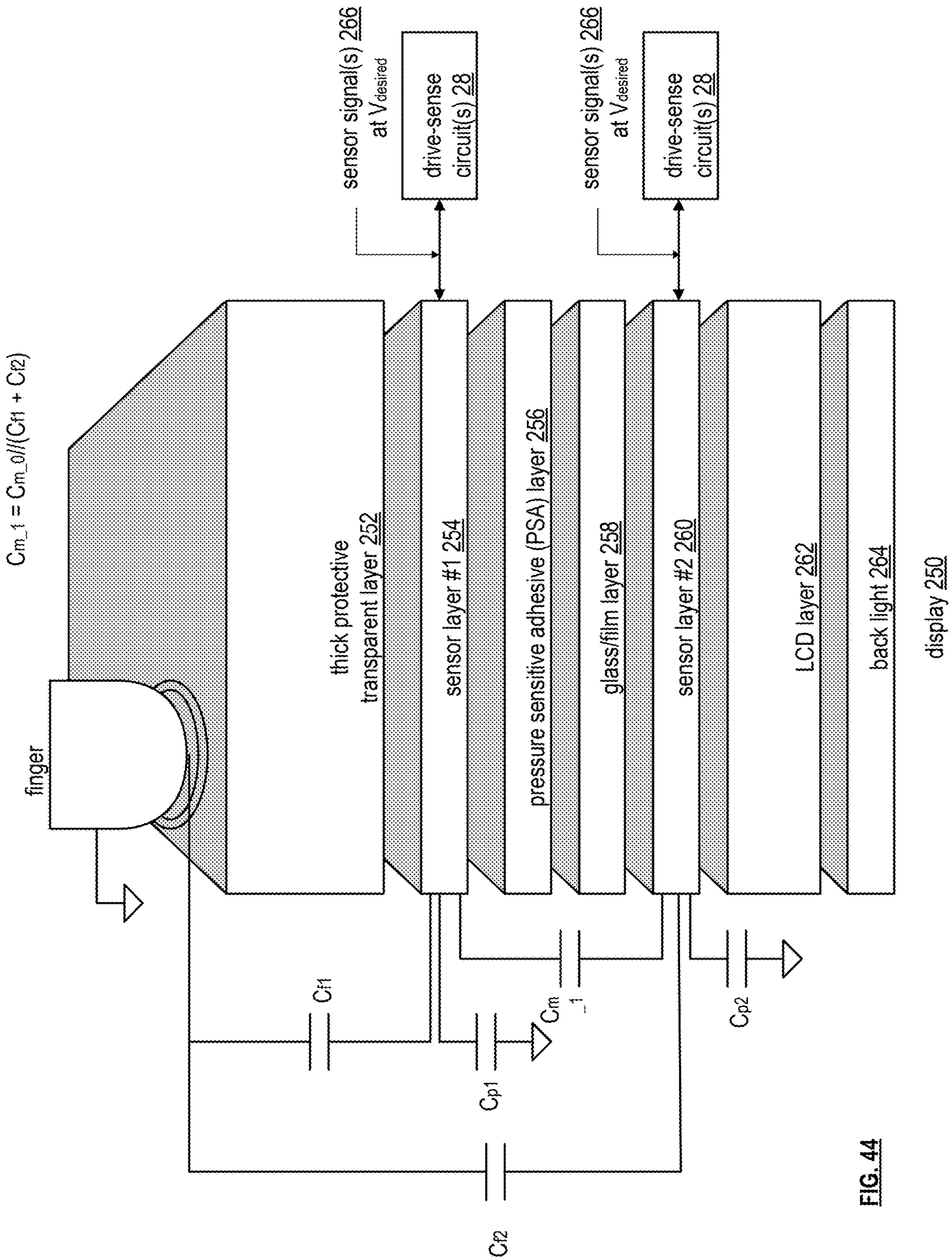
FIG. 44 is a cross section schematic block diagram of another example of a touch screen display having a thick protective transparent layer in accordance with various embodiments.

FIG. 44 is a cross section schematic block diagram that is similar to FIG. 43, with the exception that this figure includes a finger touch. The finger touch provides a finger capacitance with respect the sensor layers 254 and 260. As is shown, the finger capacitance includes a first capacitance component from the finger to the first sensor layer ($C_{f1}$) and a second capacitance component from the finger to the second sensor layer ($C_{f2}$). As previously discussed, the finger capacitance is effectively in parallel with the self-capacitances ($C_{p0}$ and $C_{p1}$) of the sensor layers, which increases the effective self-capacitance and decreases impedance at a given frequency. As also previously discussed, the finger capacitance is effectively in series with the mutual-capacitance ($C_{m\_0}$) of the sensor layers, which decreases the effective mutual-capacitance ($C_{m\_1}$) and increases impedance at a given frequency.

Thus, the smaller the finger capacitance due to a thicker protective layer 252, the less effect it has on the self-capacitance and mutual-capacitance. This can be better illustrated with reference to FIGS. 45-50.

Figure 45:
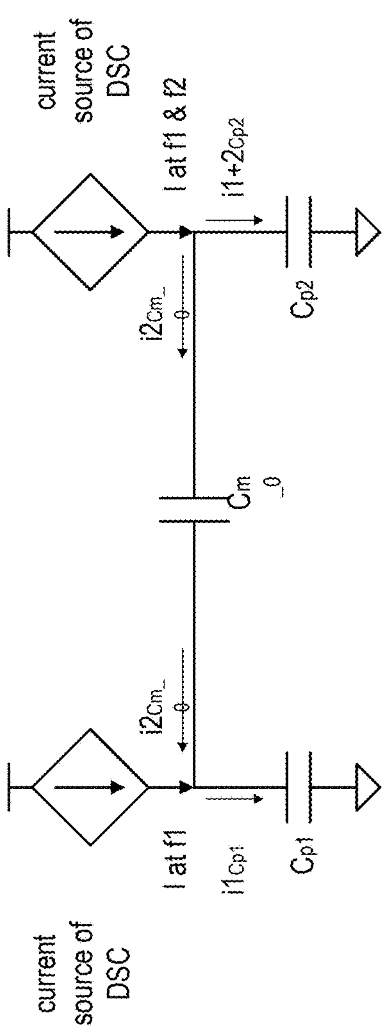
FIG. 45 is a schematic block diagram of an electrical equivalent circuit of two drive sense circuits coupled to two electrodes without a finger touch in accordance with various embodiments.

FIG. 45 is a schematic block diagram of an electrical equivalent circuit of two drive sense circuits coupled to two electrodes without a finger touch. The drive sense circuits are represented as dependent current sources, the self-capacitance of a first electrode is referenced as Cri, the self-capacitance of the second electrode is referenced as $C_{p2}$, and the mutual capacitance between the electrodes is referenced as $C_{m\_0}$. In this example, the current source of the first drive sense circuit is providing a controlled current (I at f1) that includes a DC component and an oscillating component, which oscillates at frequency f1. The current source of the second drive sense circuit is providing a controlled current (I at f1 and at f2) that includes a DC component and two oscillating components at frequency f1 and frequency f2.

The first controlled current (I at f1) has one components: $i1_{Cp1}$ and the second controlled current (I at f1 and f2) has two components: $i1{+}2_{Cp2}$ and $i2_{Cm\_0}$. The current ratio between the two components for a controlled current is based on the respective impedances of the two paths.

Figure 46:
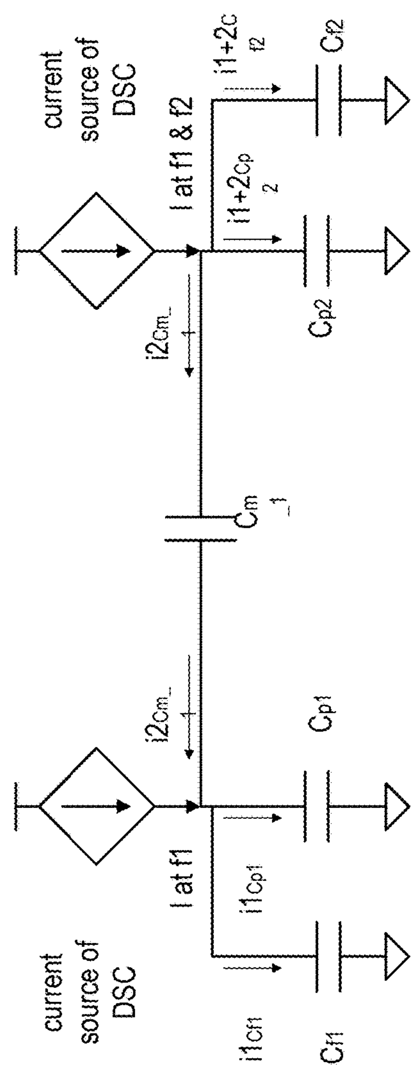
FIG. 46 is a schematic block diagram of an electrical equivalent circuit of two drive sense circuits coupled to two electrodes with a finger touch in accordance with various embodiments.

FIG. 46 is a schematic block diagram of an electrical equivalent circuit of two drive sense circuits coupled to two electrodes as shown in FIG. 45, but this figure includes a finger touch. The finger touch is represented by the finger capacitances (Cn and Cc), which are in parallel with the self-capacitance ($C_{p1}$ and $C_{p2}$). The dependent current sources are providing the same levels of current as in FIG. 45 (I at f1 and I at f1 and f2).

In this example, however, more current is being directed towards the self-capacitance in parallel with the finger capacitance than in FIG. 45. Further, less current is being directed towards the mutual capacitance ($C_{m\_1}$) (i.e., taking charge away from the mutual capacitance, where C=Q/V). With the self-capacitance effectively having an increase in capacitance due to the finger capacitance, its impedance decreases and, with the mutual-capacitance effectively having a decrease in capacitance, its impedance increases.

The drive sense circuits can detect the change in the impedance of the self-capacitance and of the mutual capacitance when the change is within the sensitivity of the drive sense circuits. For example, V=I*Z, I*t=C*V, and Z=½πfC (where V is voltage, I is current, Z is impedance, t is time, C is capacitance, and f is the frequency), thus V=I*½πfC. If the change between C is small, then the change in V will be small. If the change in V is too small to be detected by the drive sense circuit, then a finger touch will go undetected. To reduce the chance of missing a touch due to a thick protective layer, the voltage (V) and/or the current (I) can be increased. As such, for small capacitance changes, the increased voltage and/or current allows the drive sense circuit to detect a change in impedance. As an example, as the thickness of the protective layer increases, the voltage and/or current is increased by 2 to more than 100 times.

Figure 47:
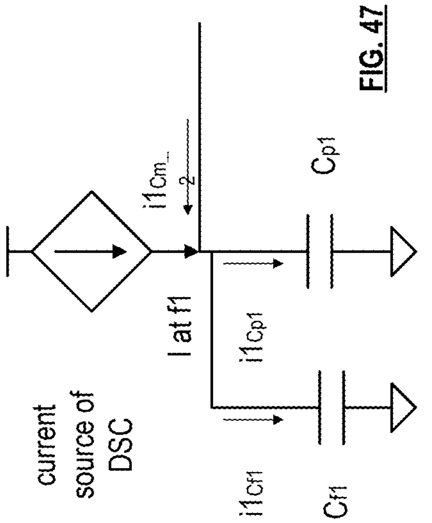
FIG. 47 is a schematic block diagram of an electrical equivalent circuit of a drive sense circuit coupled to an electrode without a finger touch in accordance with various embodiments.

FIG. 47 is a schematic block diagram of an electrical equivalent circuit of a drive sense circuit coupled to an electrode without a finger touch. This similar to FIG. 45, but for just one drive sense circuit and one electrode. Thus, the current source of the first drive sense circuit is providing a controlled current (I at f1) that includes a DC component and an oscillating component, which oscillates at frequency f1 and the first controlled current (I at f1) has two components: $i1_{Cp1}$ and $i1_{Cf1}$.

Figure 48:
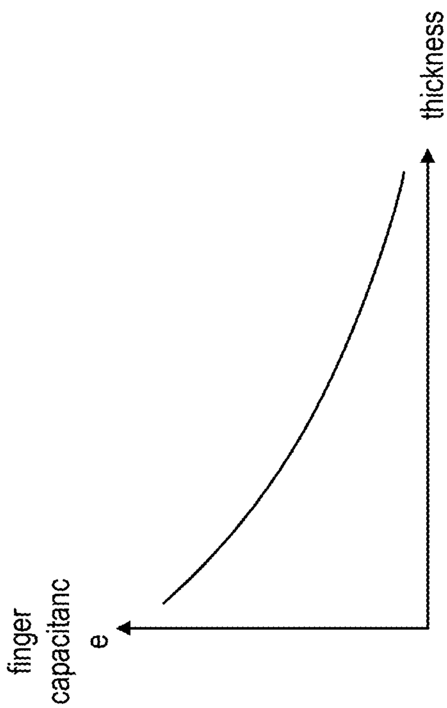
FIG. 48 is an example graph that plots finger capacitance verses protective layer thickness of a touch screen display in accordance with various embodiments.

FIG. 48 is an example graph that plots finger capacitance verses protective layer thickness of a touch screen display 250. As shown, as the thickness increases, the finger capacitance decreases. This effects changes in the mutual-capacitance as shown in FIG. 49 and in self-capacitance as shown in FIG. 50.

Figure 49:
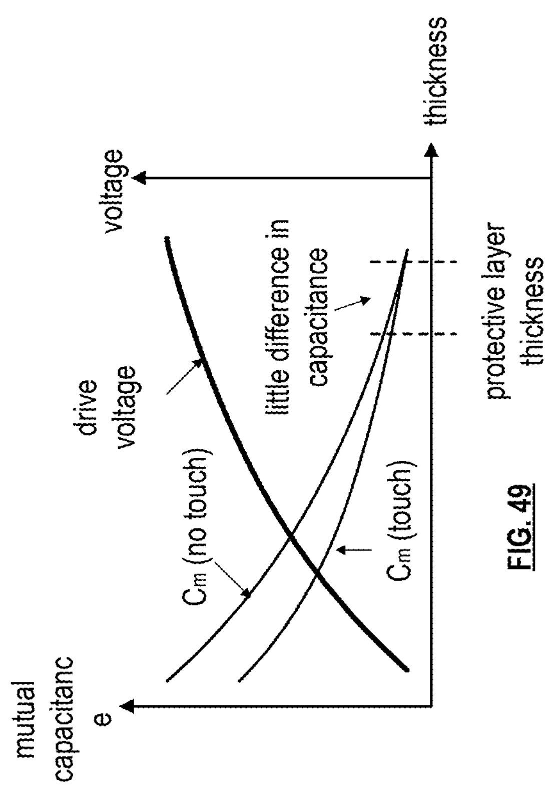
FIG. 49 is an example graph that plots mutual capacitance verses protective layer thickness and drive voltage verses protective layer thickness of a touch screen display in accordance with various embodiments.

FIG. 49 is an example graph that plots mutual capacitance verses protective layer thickness and drive voltage verses protective layer thickness of a touch screen display 150. As shown, as the thickness increases, the difference between the mutual capacitance without a touch and mutual capacitance with a touch decreases. In order for the decreasing difference to be detected, the voltage (or current) sourced to the electrode increases substantially inversely proportion to the decrease in finger capacitance.

Figure 50:
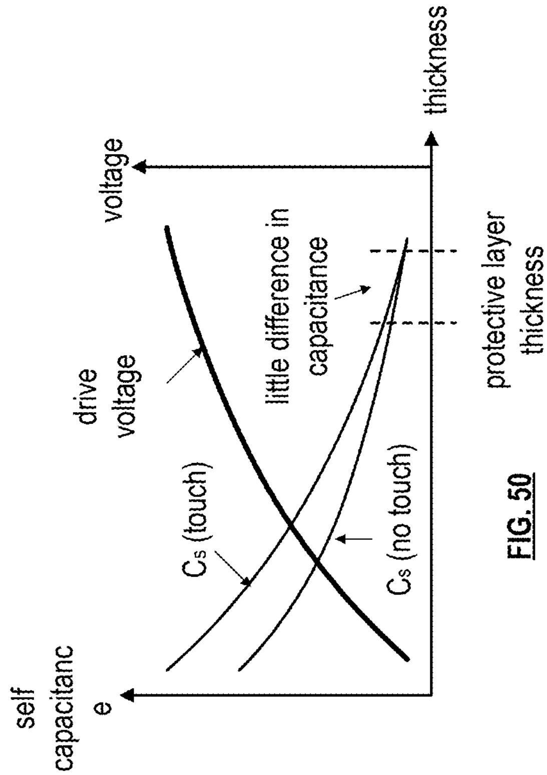
FIG. 50 is an example graph that plots self-capacitance verses protective layer thickness and drive voltage verses protective layer thickness of a touch screen display in accordance with various embodiments.

FIG. 50 is an example graph that plots self-capacitance verses protective layer thickness and drive voltage verses protective layer thickness of a touch screen display 150. As shown, as the thickness increases, the difference between the self-capacitance without a touch and self-capacitance with a touch decreases. In order for the decreasing difference to be detected, the voltage (or current) sourced to the electrode increases substantially inversely proportion to the decrease in finger capacitance.

Figure 51:
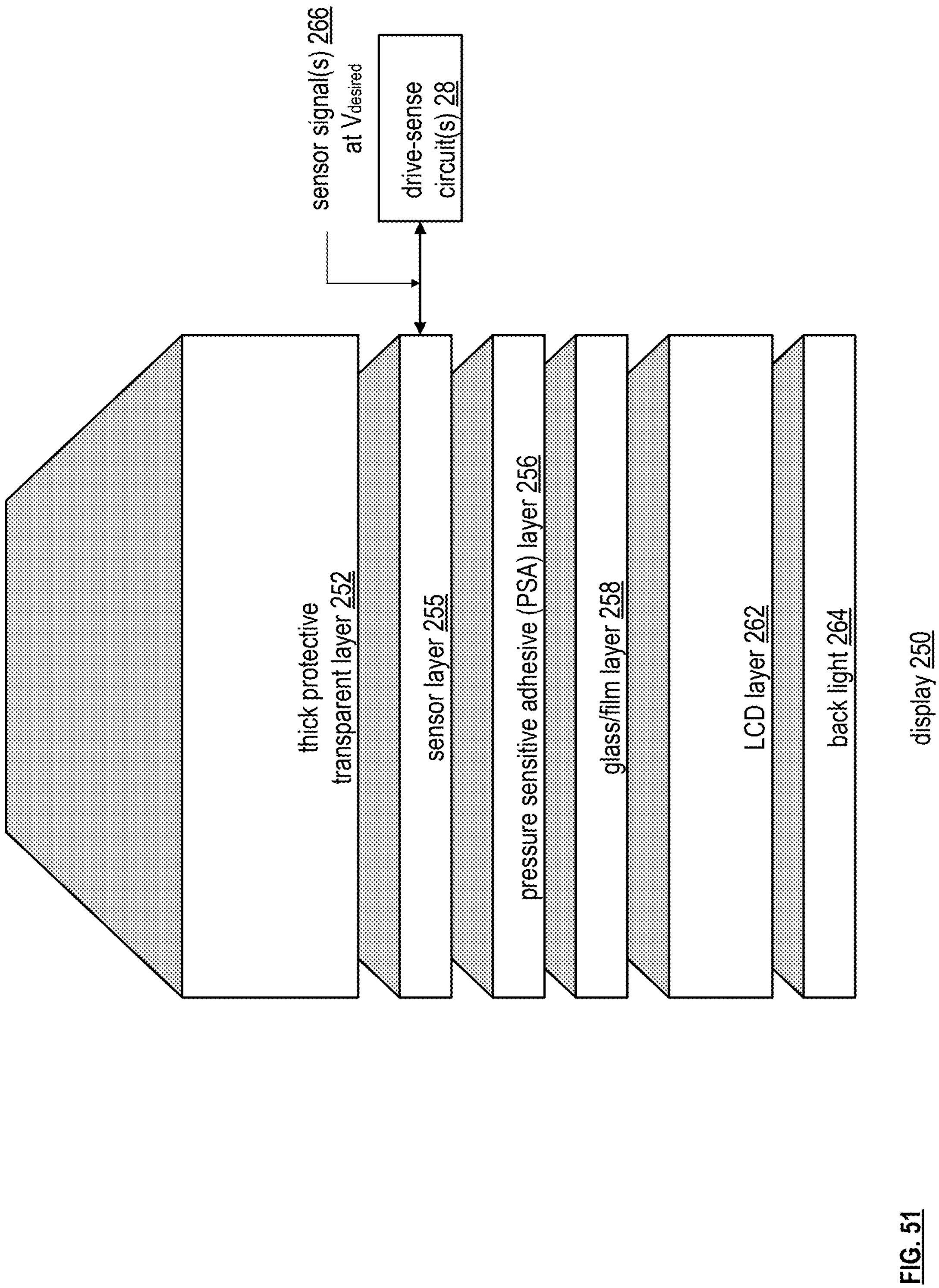
FIG. 51 is a cross section schematic block diagram of another example of a touch screen display having a thick protective transparent layer in accordance with various embodiments.

FIG. 51 is a cross section schematic block diagram of another example of a touch screen display 250 having a thick protective transparent layer 252. This embodiment is similar to the embodiment of FIG. 43 with the exception that this embodiment includes a single sensor layer 255. The sensor layer 255 may be implemented in a variety of ways. For example, the sensor layer 255 includes a plurality of capacitor sensors. As another example, the sensor layer includes a voltage applied to the corners of the layer to detect touches (i.e., surface capacitance touch sensor).

Figure 52:
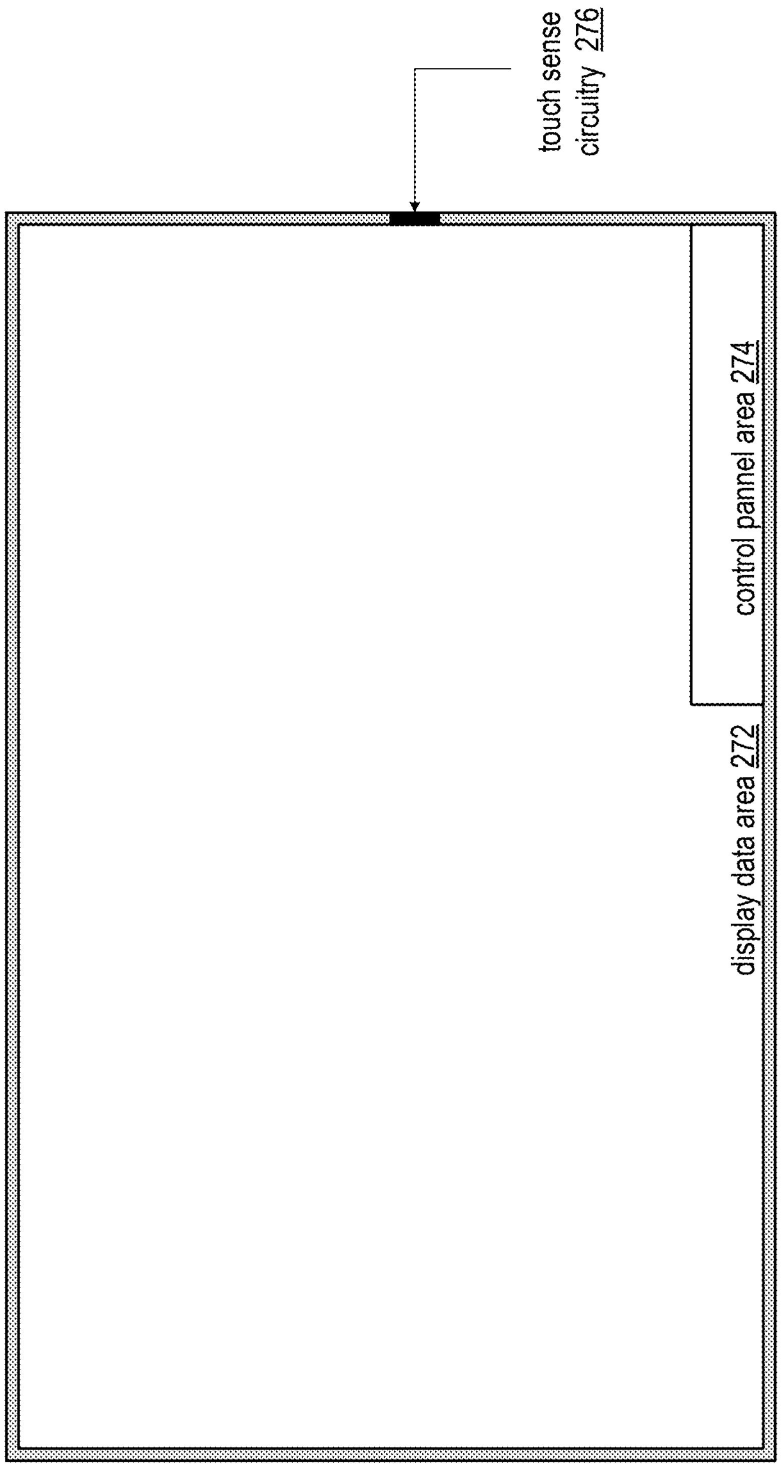
FIG. 52 is a schematic block diagram of an embodiment of a large touch screen display with an on-screen control panel in accordance with various embodiments.

FIG. 52 is a schematic block diagram of an embodiment of a large touch screen display 270 with an on-screen control panel area 274, a display data area 272, and touch sense circuitry 276. The display 270 has properties in accordance with the table of paragraph 107 and has a variety of applications. For example, the large touch screen display 270 is utilized as a touch screen white board. As another example, the large touch screen display is used as a menu for selecting a variety of service options and/or shopping options at a service center (e.g., a store, a mall, etc.).

The control panel area 274 is a virtual control panel and may be located anywhere on the display 270. When the control panel is active, it appears in the control panel area 274 and provides for a variety of control functions, which include, but are not limited to, store, change colors, change an application, start, stop, pause, fast-forward, highlight, etc. When the control panel is not active, the control panel area 274 becomes part of the display area.

The display data area 272 displays frames of data. The frames of data include frames of a video, independent frames of images, jump from one image to another, white board drawings, each edit creates a new frame, time interval of data capture on white board for a frame of data, have a background for white board, etc.

The touch screen circuitry 276 is physically positioned in the bezel area of the display 270 (i.e., in the frame). The touch screen circuitry 276, it's physically positioned in the bezel area of the display, are as previously discussed with reference to one or more of FIGS. 36-42.

Figure 53:
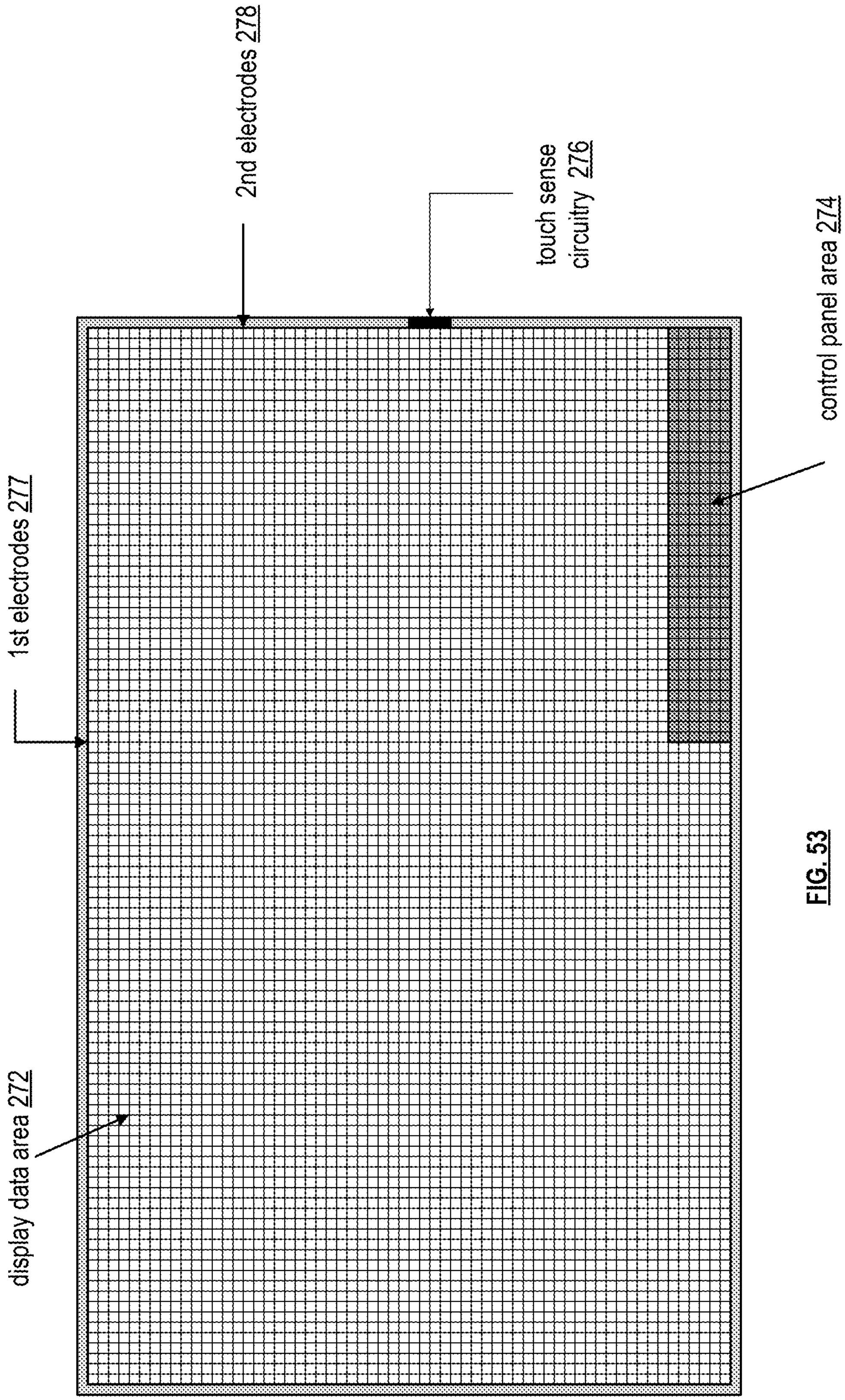
FIG. 53 is a schematic block diagram of another embodiment of a large touch screen display with an on-screen control panel in accordance with various embodiments.

FIG. 53 is a schematic block diagram of another embodiment of a large touch screen display 270 with an on-screen control panel area 274, the display data area 272, the touch screen circuitry 276, a first plurality of electrodes 277, and a second plurality of electrodes 278. The electrodes 277 are arranged in a first orientation (e.g., as columns) throughout the display 270 and electrodes 278 are arranged in a second orientation (e.g., as rows) throughout the display 270.

The touch sense circuitry 276 includes first drive sense circuits, second drive sense circuits, and a processing module. The first drive-sense circuits provide a first sensor signals to the first electrodes 277 and generate therefrom first sensed signals. The second drive-sense circuits provide second sensor signals to the second electrodes 278 and generate therefrom second sensed signals. The processing module receives the first and second sensed signals to determine one or more touches of the display 270.

In a control mode (e.g., the control panel area is activated), the processing module creates display data and control panel data and produce, therefrom, a frame of data. The display data is created to be displayed in the display data area 272 and the control panel data is to be simultaneously displayed in the control panel area 274. The processing module associates a first group of row and column electrodes with the control panel data area. The processing module interprets receive signals components of the sensors signals of the control panel electrodes to identify a proximal touch of the control panel data area and executed a corresponding function and/or command.

The processing module associates a second group of column and row electrodes with the display data area. The processing module interprets receive signals components of the sensors signals of the second group of electrodes to identify a proximal touch within the display data area. Note that the rendering of data in the display data area, rendering of data in the control panel area, sensing a touch in the display data area, sensing a touch in the control panel area, executing a command and/or function associated with a touch in the display data area, and/or executing a control function associated with a touch in the control panel area are done currently. As such, there is not alternating operation between sensing a touch and displaying data.

Figure 54:
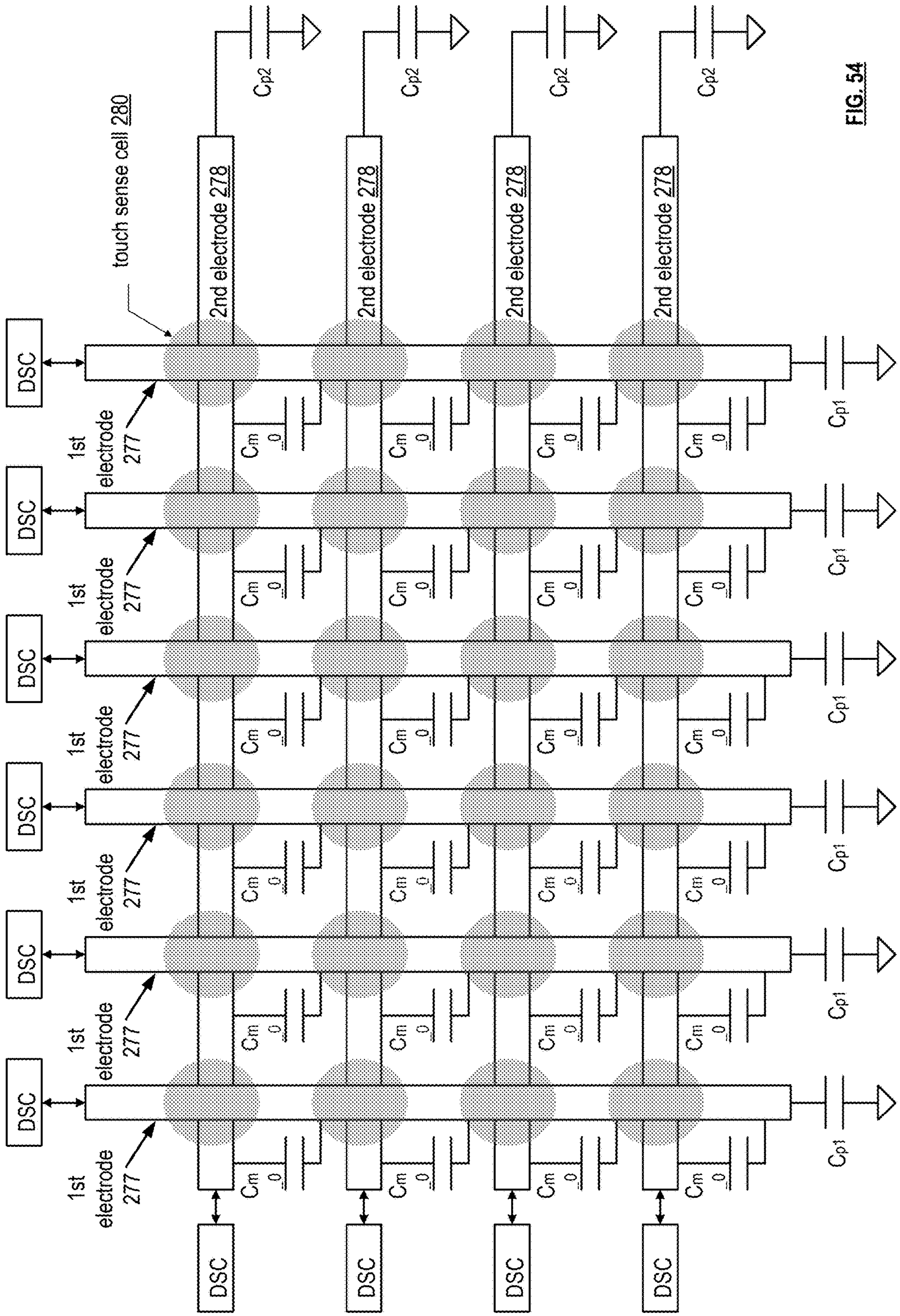
FIG. 54 is a schematic block diagram of an embodiment of a plurality of electrodes creating a plurality of touch sense cells in accordance with various embodiments.

FIG. 54 is a schematic block diagram of an embodiment of a plurality of electrodes creating a plurality of touch sense cells 280 within a display. In this embodiment, a few second electrodes 278 are perpendicular and on a different layer of the display than a few of the first electrodes 277. For each crossing of a first electrode and a second electrode, a touch sense cell 280 is created. At each touch sense cell 280, a mutual capacitance ($C_{m\_0}$) is created between the crossing electrodes. Each electrode also includes a self-capacitance ($C_p$), which is shown as a single parasitic capacitance, but, in some instances, is a distributed R-C circuit.

A drive sense circuit (DSC) is coupled to a corresponding one of the electrodes. The drive sense circuits (DSC) provides sensor signals to the electrodes and determines the loading on the sensors signals of the electrodes. When no touch is present, each touch cell 280 will have a similar mutual capacitance and each electrode of a similar length will have a similar self-capacitance. When a touch is applied on or near a touch sense cell 280, the mutual capacitance of the cell will decrease (creating an increased impedance) and the self-capacitances of the electrodes creating the touch sense cell will increase (creating a decreased impedance). Between these impedance changes, the processing module can detect the location of a touch, or touches.

Figure 55:
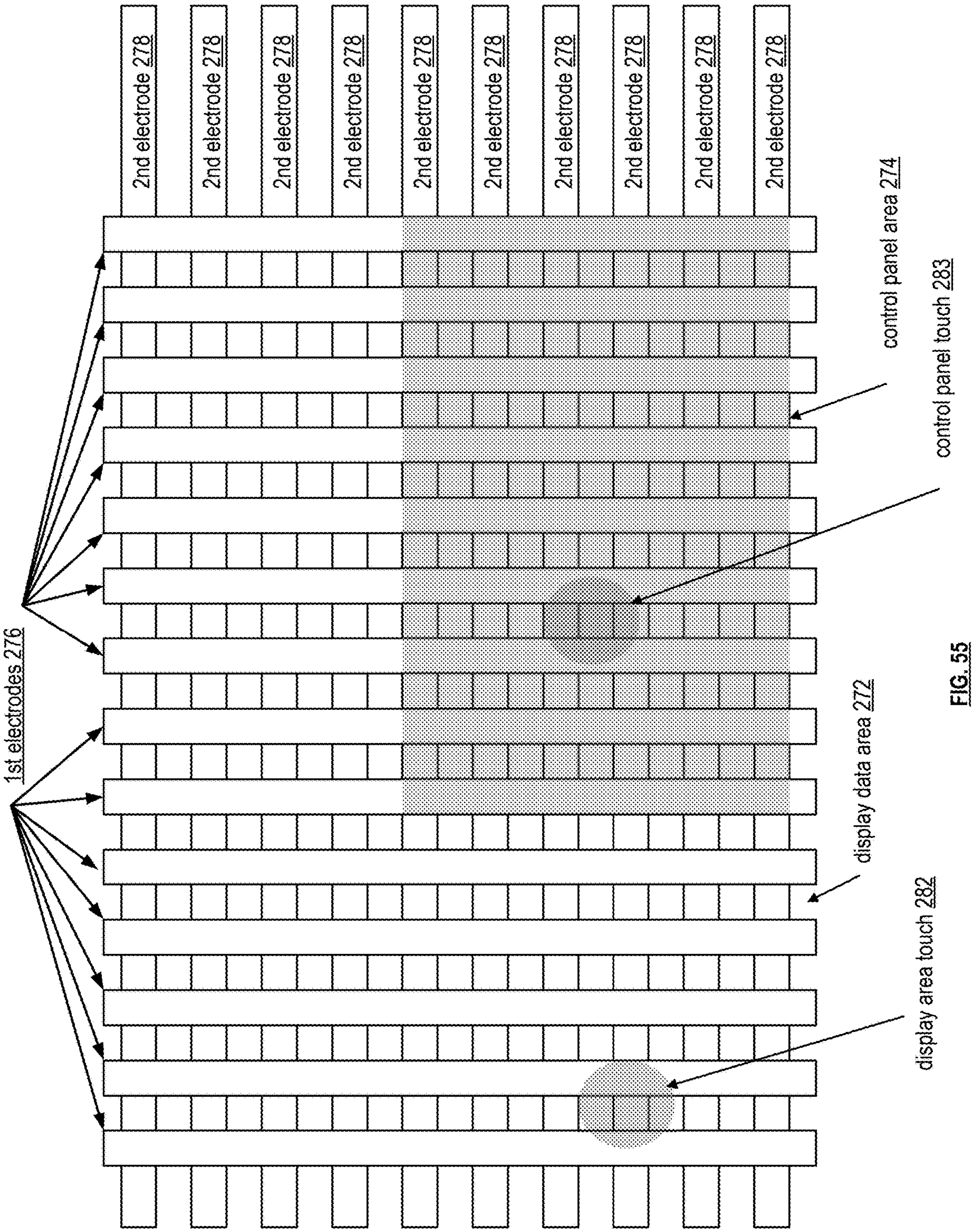
FIG. 55 is a schematic block diagram of another embodiment of a plurality of electrodes creating a display area and a control panel area in accordance with various embodiments.

FIG. 55 is a similar diagram to FIG. 54 with the exceptions that some of the first and second electrodes are within the control panel area 274, other electrodes are in the display data area 272, there is a touch 282 in the display data area, and there is a touch 283 in the control panel area. In this example, the touches are determined by the decreased mutual capacitance of the nearby touch sense cells and by the increased self-capacitance of the effect electrodes. The processing module, knowing which electrodes and hence which touch sense cells are part of the control panel area 274, can readily determine that touch 283 is in the control panel area and that touch 282 is in the display data area 272.

Figure 56:
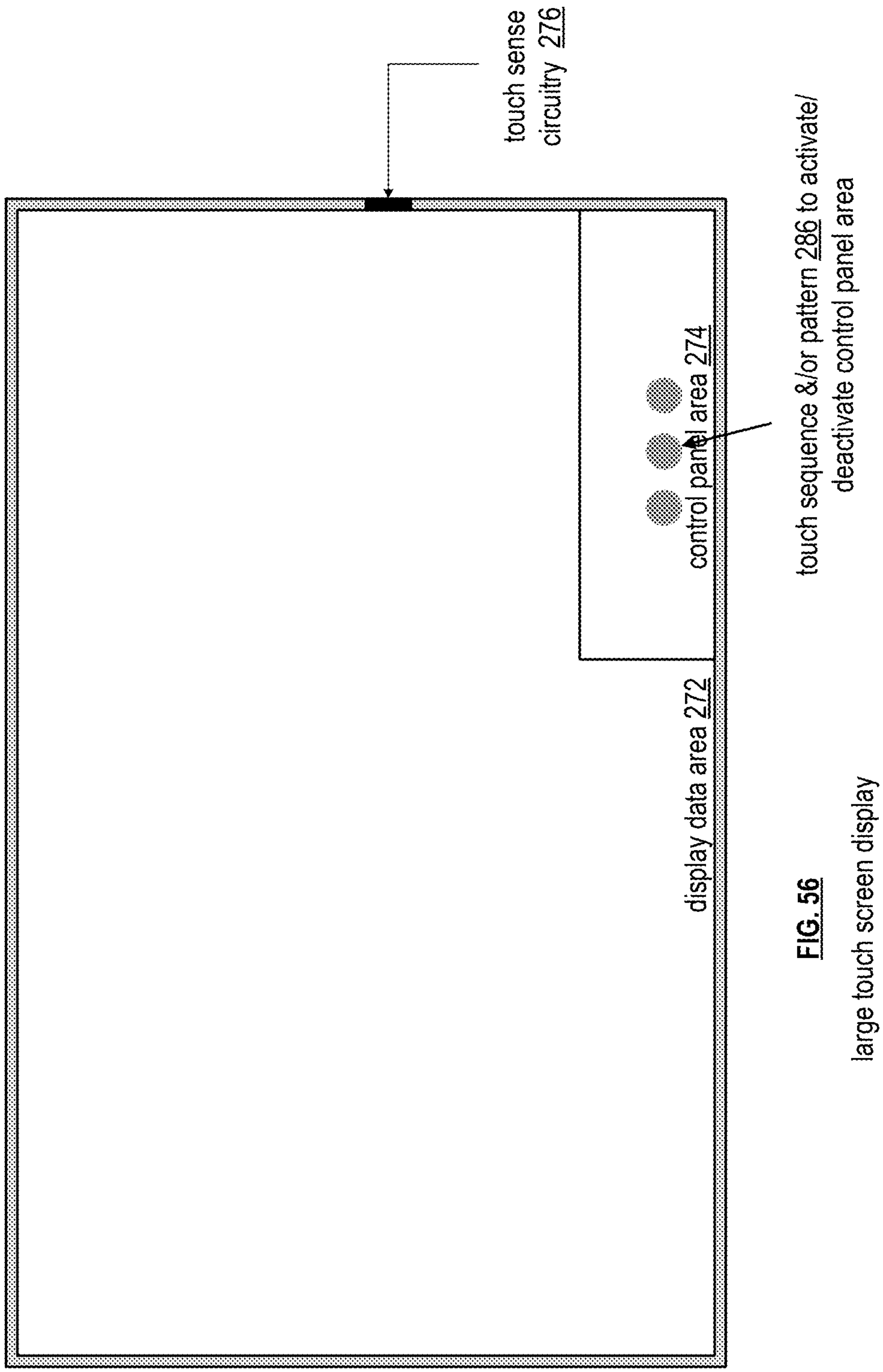
FIG. 56 is a schematic block diagram of an example of activating or deactivating an on-screen control panel on a large touch screen display in accordance with various embodiments.

FIG. 56 is a schematic block diagram of an example of activating or deactivating an on-screen control panel on a large touch screen display 270. As in FIG. 52, the display 270 includes the display data area 272, the control panel area 274, and the touch sense circuitry 276. In this example, a touch sequence and/or a touch pattern 286 within the control panel area 274 is used to activate and/or deactivate the control panel. As a specific example, a three-finger touch making an X or a plus sign is the pattern to activate and/or deactivate the control panel. As another specific example, four consecutive touches in the same position on the display is a sequence to activate and/or deactivate the control panel. In an alternate embodiment, any area of the display is useable to activate and/or deactivate the control panel.

Figure 57:
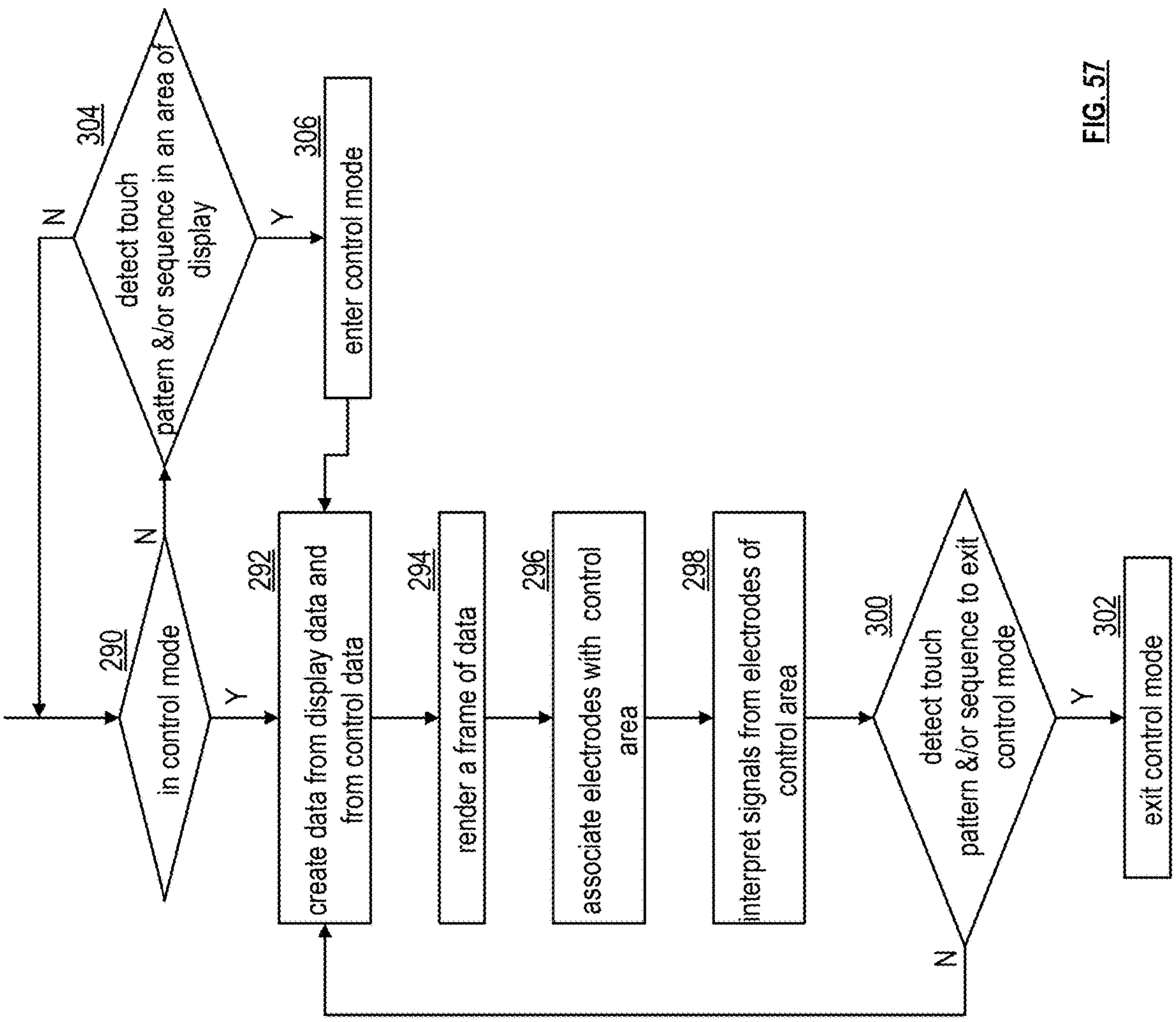
FIG. 57 is a logic diagram of an example of utilizing an on-screen control panel of a large touch screen display in accordance with various embodiments.

FIG. 57 is a logic diagram of an example of utilizing an on-screen control panel of a large touch screen display that is executable by a processing module (e.g., 42 and/or 82). The method begins at step 190 where the processing module determines whether the display 270 is in a control mode (e.g., the control panel is enabled and is visible within the control panel area). If not, the method continues at step 304 where the processing module determines whether a unique touch pattern and/or sequence is detected on the display. If not, the method repeats at step 290.

If the unique touch pattern and/or sequence is detected, the method continues at step 306 where the processing module enters the control mode. In the control mode, the method continues at step 292 where the processing module generates display data and control data. The method continues at step 294 where the processing module generates one or more frames of data from the display data and the control data.

The method continues at step 296 where the processing module associates electrodes with the display data area and the control panel area. The method continues at step 298 where the processing module interprets signals form drive sense circuits coupled to the electrodes that are associated with the control panel area. When a touch is detected in the control panel area, the processing module processes it as a control function or command. When a touch is detected in the display data area, the processing module processes it as a data function or command. For example, the control panel area functions like a mouse or touch pad.

The method continues at step 300 where the processing module determines whether a touch pattern and/or sequence is detected to exit the control mode. If not, the method repeats at step 292. If an exit pattern and/or sequence is detected, the method continues at step 302 where the processing module exits the control mode. When not in the control mode, the entire display is treated as part of the display data area.

Figure 58:
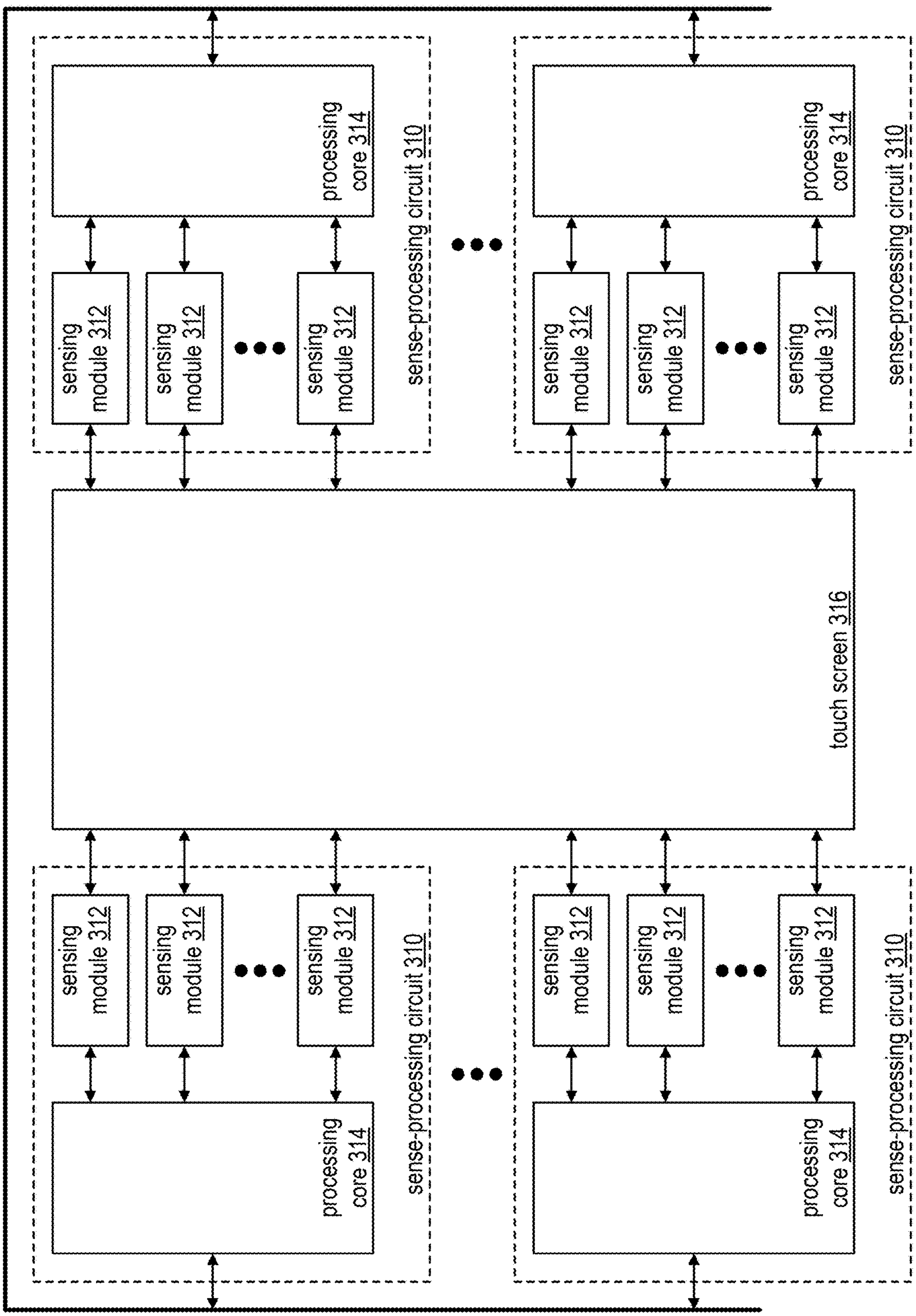
FIG. 58 is a schematic block diagram of an embodiment of a scalable touch screen display in accordance with various embodiments.

FIG. 58 is a schematic block diagram of an embodiment of a scalable touch screen display that includes a touch screen 316 and a plurality of sense-processing circuits 310. A sense-processing circuit 310 includes a plurality of sensing modules 312 and a processing core 314. The touch screen 316 includes a plurality of electrodes (e.g., rows and columns) that are in-cell and/or on-cell with a display.

The sensing modules 312 of each of the sense-processing circuits 310 is coupled to an electrode, or sensor, of the touch screen 316. The processing cores 314 are coupled together via a wired and/or wireless communication bus. Specific embodiments of the sensing modules and the processing cores will be described in greater detail with reference to FIG. 59.

A sense-processing circuit 310 includes a number of sensing modules 312 (e.g., from less than 100 to more than 1,000). Each sense-processing circuit 310 is identical, thus making scaling for large scale touch screen displays commercially viable. For instance, a sense-processing circuit 310 is implemented on a die. An integrated circuit (IC) includes one or more of the sense-processing circuit dies. As such, one or more ICs with one or more dies can be used to provide the touch sense circuitry of a display.

Figure 59:
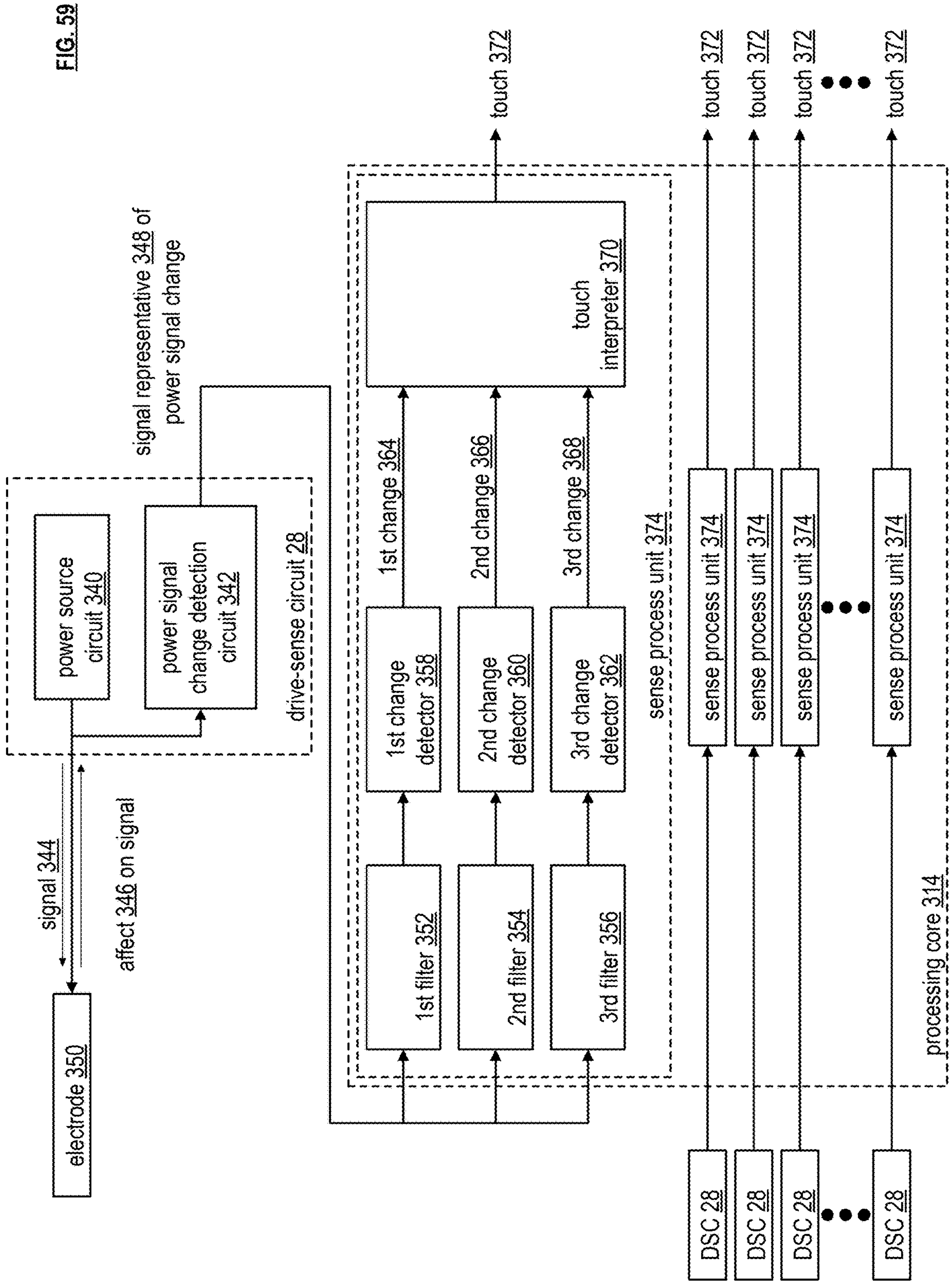
FIG. 59 is a schematic block diagram of an embodiment of a sense-processing circuit of a scalable touch screen display in accordance with various embodiments.

FIG. 59 is a schematic block diagram of an embodiment of a sense-processing circuit 310 that includes a drive sense circuit 28 as a sensing module 312 and a sense process unit 314 implemented within the processing core 314. The processing core 314 includes a processing module, memory, and a communication interface. The communication interface allows the processing core to communicate with other processing cores and/or with processing modules (e.g., 42) of the display and/or of a computing device. For example, the communication interface is one of a PCI connection, a USB connection, a Bluetooth connection, etc.

The drive sense circuit 28 includes a power source circuit 340 and a power signal change detection circuit 342. The power source circuit 340 is operably coupled to the electrode 350 and, when enabled (e.g., from a control signal from the processing core, power is applied, a switch is closed, a reference signal is received, etc.) provides a signal 344 to the electrode 350. The power source circuit 340 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provide a desired power level to the sensor and substantially matches impedance of the sensor. The power source circuit 340 generates the signal 344 to include a DC (direct current) component and/or an oscillating component.

When receiving the signal 344, the impedance of the electrode affects 346 the signal. When the power signal change detection circuit 342 is enabled, it detects the impedance effect 346 on the signal. For example, the signal is a 1.5 voltage signal and, when there is no touch, the electrode draws 1 micro-amp of current, which corresponds to an impedance of 1.5 M Ohms. When a touch is present, the signal remains at 1.5 volts and the current increases to 1.5 micro-amps. As such, the impedance of the electrode changed from 1.5 M Ohms to 1 M Ohms. The power signal change detection circuit 112 determines this change and generates a representative signal 348 of the change to the power signal.

The processing core 314 is configured to include, for each sense process unit 374, a first filter 352, a second filter 354, a third filter 356, a first change detector 358, a second change detector 360, a third change detector 362, and a touch interpreter 370. The first filter 352 is operable to produce a first filtered signal of the signal 348 representation corresponding to self-capacitance of the sensed electrode. The second filter 354 produces a second filtered signal of the signal 348 representation corresponding to mutual capacitance of the sensed electrode. The third filter produces a third filtered signal of the signal 348 representation corresponding to a pen touch of the sensed electrode.

The first change detector 358 determines whether the self-capacitance of the sensed electrode has changed to produce a first change 364. The second change detector 360 determines whether the mutual-capacitance of the sensed electrode has changed to produce a second change 366. The third change detector 362 determines whether the pen-capacitance of the sensed electrode has changed to produce a third change 368.

The touch interpreter 372 determines whether the sensed electrode is experiences a touch based on the first, second, and or third changes. For example, if the touch interpreter 372 determines that the self-capacitance of the sensed electrode has increased, the touch interpreter 372 indicates that the sensed electrode is affected by a touch (e.g., a finger touch). As another example, if the touch interpreter 372 determines that the mutual-capacitance of the sensed electrode has decreased, the touch interpreter 372 indicates that the sensed electrode is affected by a touch (e.g., a finger touch). As yet another example, if the touch interpreter 372 determines that the pen-capacitance of the sensed electrode has increased, the touch interpreter 372 indicates that the sensed electrode is affected by a pen touch.

The other drive-sense circuits 28 in combination with the other sense processing units 374 function as described above for their respective electrodes. The processing core 314 provides the touch information to a processing module, to another sense-processing circuit 310, and/or to itself for further processing to equate the touch information to a particular location on the display and meaning of the touch.

Figure 60:
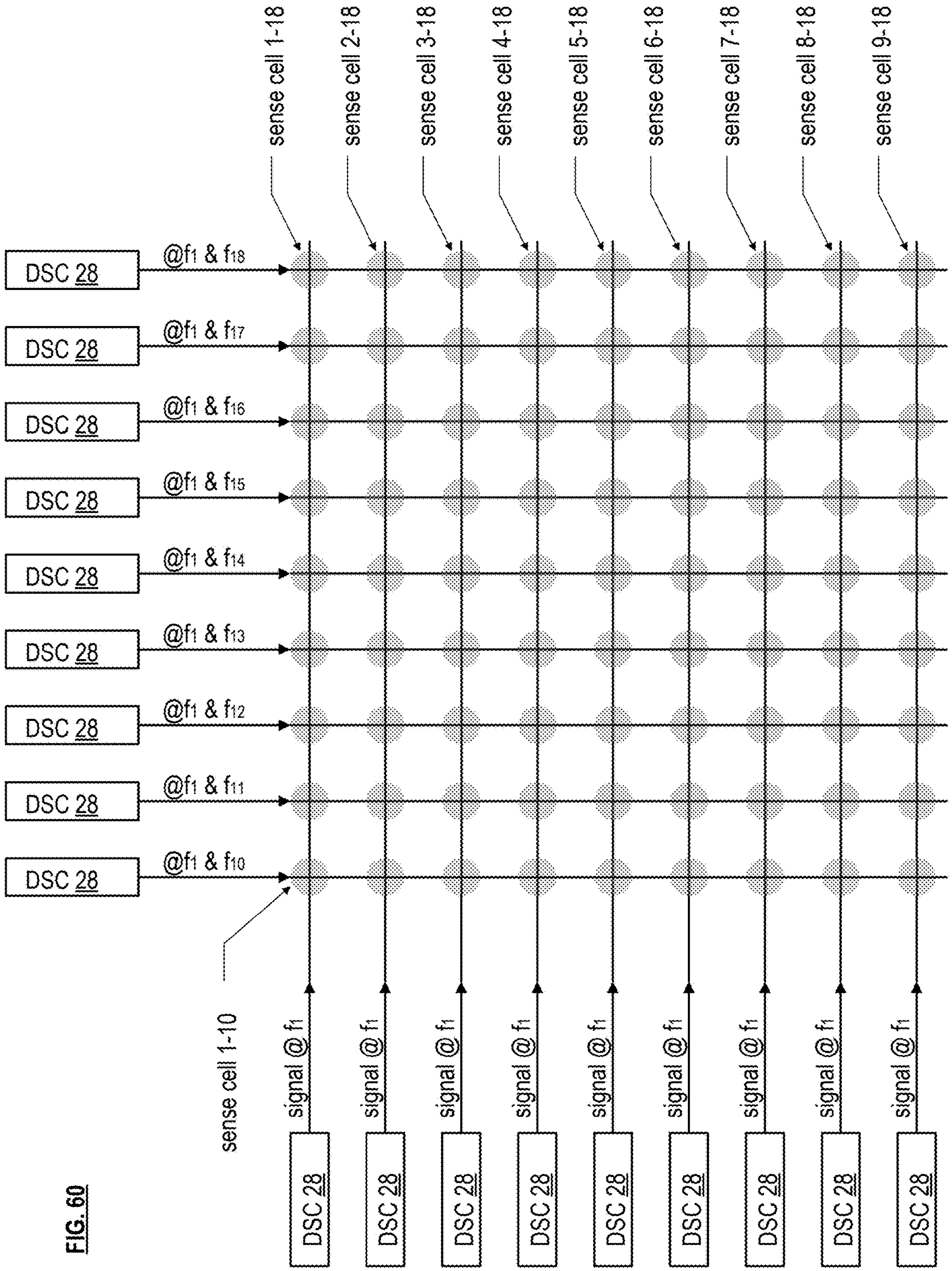
FIG. 60 is a schematic block diagram of an example of frequency dividing for reference signals for drive-sense circuits of a touch screen display in accordance with various embodiments.

FIG. 60 is a schematic block diagram of an example of frequency dividing for reference signals for drive-sense circuits 28 of a touch screen display. In this example, a few row electrodes and a few column electrodes are shown. Each electrode is coupled to a drive sense circuit (DSC) 28. The crossover of a row electrode with a column electrode creates a sense cell. In this example, there are nine row electrodes and nine column electrodes, creating 81 sense cells. To allow for simultaneous self-capacitance sensing and mutual sensing of the electrodes, the drive sense circuits use different frequencies to simulate the electrodes.

For self-capacitance, all of the drive sense circuits use the f1 frequency component. This creates near zero potential difference between the electrodes, thereby eliminating cross coupling between the electrodes. In this manner, the self-capacitance measurements made by the drive sense circuits are effectively shielded (i.e., low noise, yielding a high signal to noise ratio).

For mutual capacitance, the column electrodes also transmit a frequency component at another frequency. For example, the first column DSC 28 transmits it signal with frequency components at f1 and at f10; the second column DSC 28 transmits it signal with frequency components at f1 and at f11; the third column DSC 28 transmits it signal with frequency components at f1 and at f12; and so on. The additional frequency components (f10-f18) allow the row DSCs 28 to determine mutual capacitance at the sense cells.

For example, the first row DSC 28 senses its self-capacitance via its transmitted signal with the f1 frequency component and determines the mutual capacitance of the sense cells 1-10, 1-11, 1-12, 1-13, 1-14, 1-15, 1-16, 1-17, and 1-18. As a specific example, for sense cell 1-10, the first row DSC 28 determines the mutual capacitance between the first row electrode and the first column electrode based on the frequency f10; determines the mutual capacitance between the first row electrode and the second column electrode based on the frequency f11; determines the mutual capacitance between the first row electrode and the third column electrode based on the frequency f12; and so on.

Figure 61:
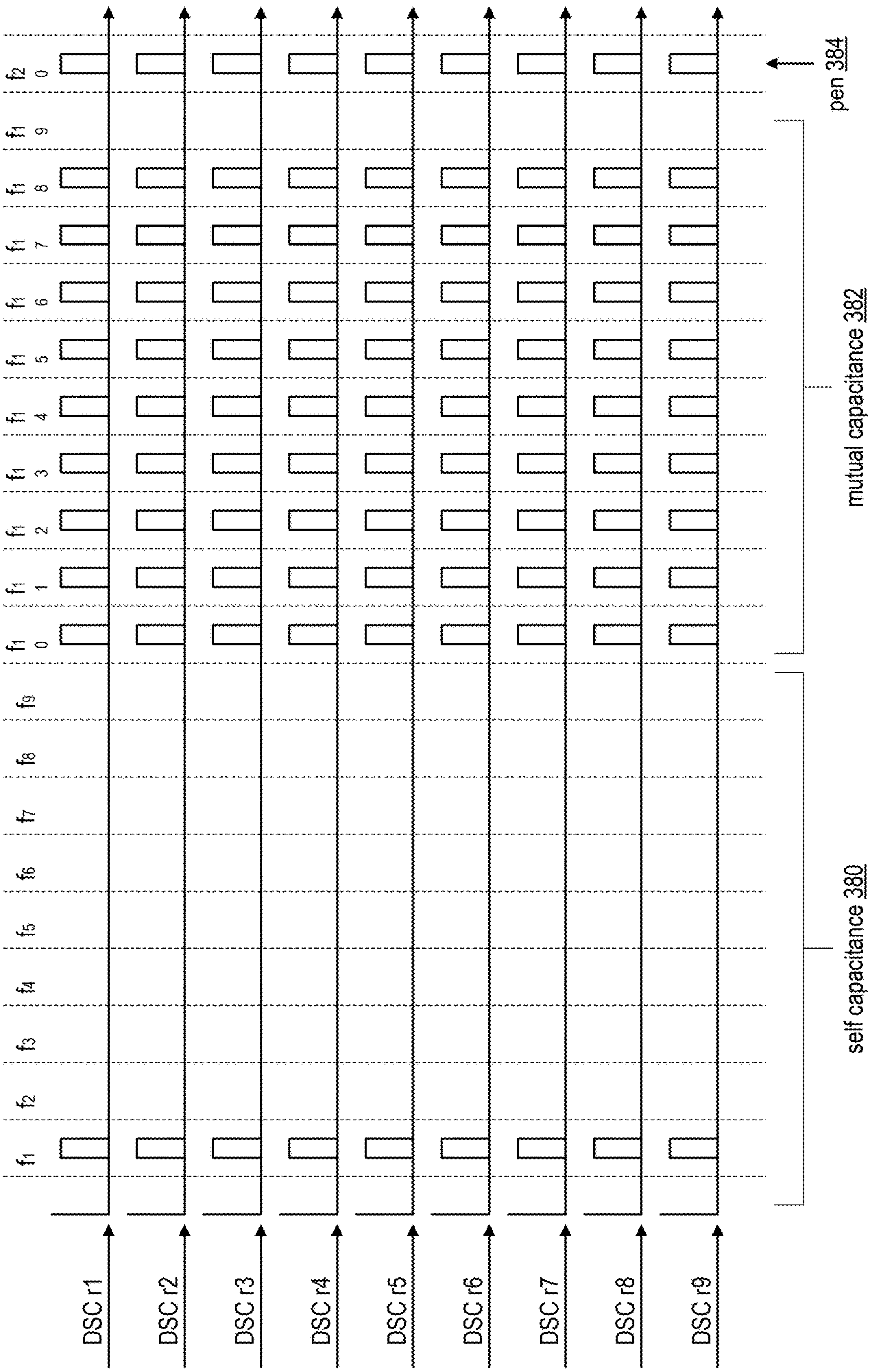
FIG. 61 is a schematic block diagram of an example of bandpass filtering for the frequency dividing of the reference signals for drive-sense circuits of a touch screen display in accordance with various embodiments.

FIG. 61 is a schematic block diagram of an example of bandpass filtering for the frequency dividing of the reference signals for drive-sense circuits affiliated with the row electrodes of FIG. 60. In this example, the filtering in the sense process unit 374 of the processing core 314 affiliated with the row drive sense circuits has bandpass filters to detect signals at f1, f10-f18, and f20 384 (f1 for self-capacitance, f10-f18 for mutual capacitance, and f20 for a pen transmit signal).

As shown, frequency f1 corresponds to the self-capacitance 380 of the row electrodes and frequencies f10-f18 correspond to mutual capacitance 382 of the row electrodes and their corresponding intersecting column electrodes. With concurrent sensing of self-capacitance and mutual capacitance, multiple touches are detectable with a high degree of accuracy.

Figure 62:
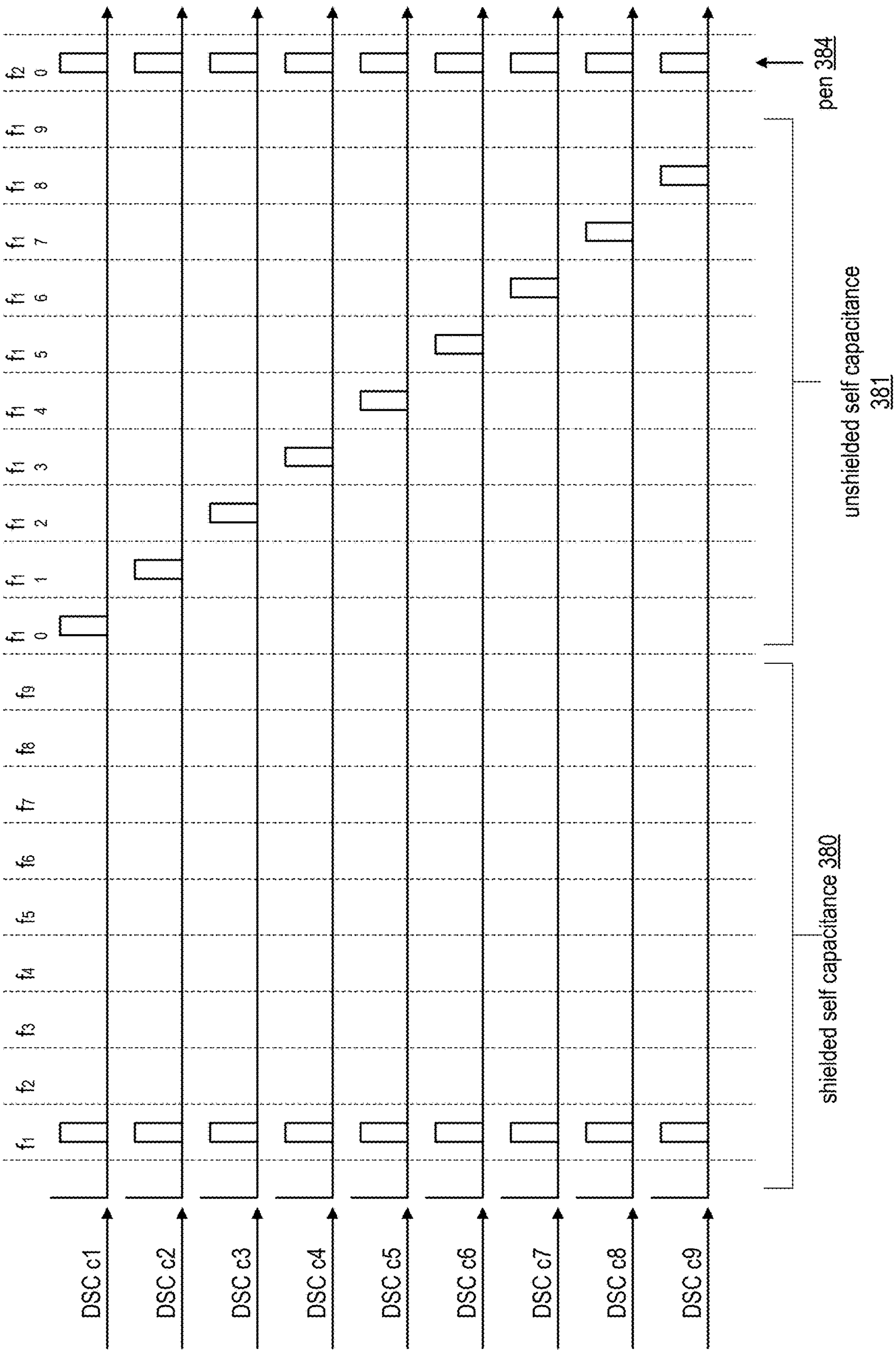
FIG. 62 is a schematic block diagram of another example of bandpass filtering for the frequency dividing of the reference signals for drive-sense circuits of a touch screen display in accordance with various embodiments.

FIG. 62 is a schematic block diagram of another example of bandpass filtering for the frequency dividing of the reference signals for drive-sense circuits affiliated with the column electrodes of FIG. 60. In this example, the filtering in the sense process unit 374 of the processing core 314 affiliated with the drive sense circuits has bandpass filters to detect signals at f1-f9, f10, and f20 384 (for a pen transmit signal).

As shown, frequency f1 corresponds to the shielded self-capacitance 380 of the column electrodes and frequencies f10-f18 correspond to unshielded self-capacitance 381 of the column electrodes. With concurrent sensing of self-capacitance and mutual capacitance, multiple touches are detectable with a high degree of accuracy. Note that there are a variety of combinations for sensing and filtering based on FIGS. 60-62. For example, only self-capacitance of the electrodes could be used to detect location of touches. As another example, the column DCSs could sense and processing the mutual capacitance. As another example, the unshielded self-capacitance is processed to determine levels of interference between the electrodes.

Figure 63:
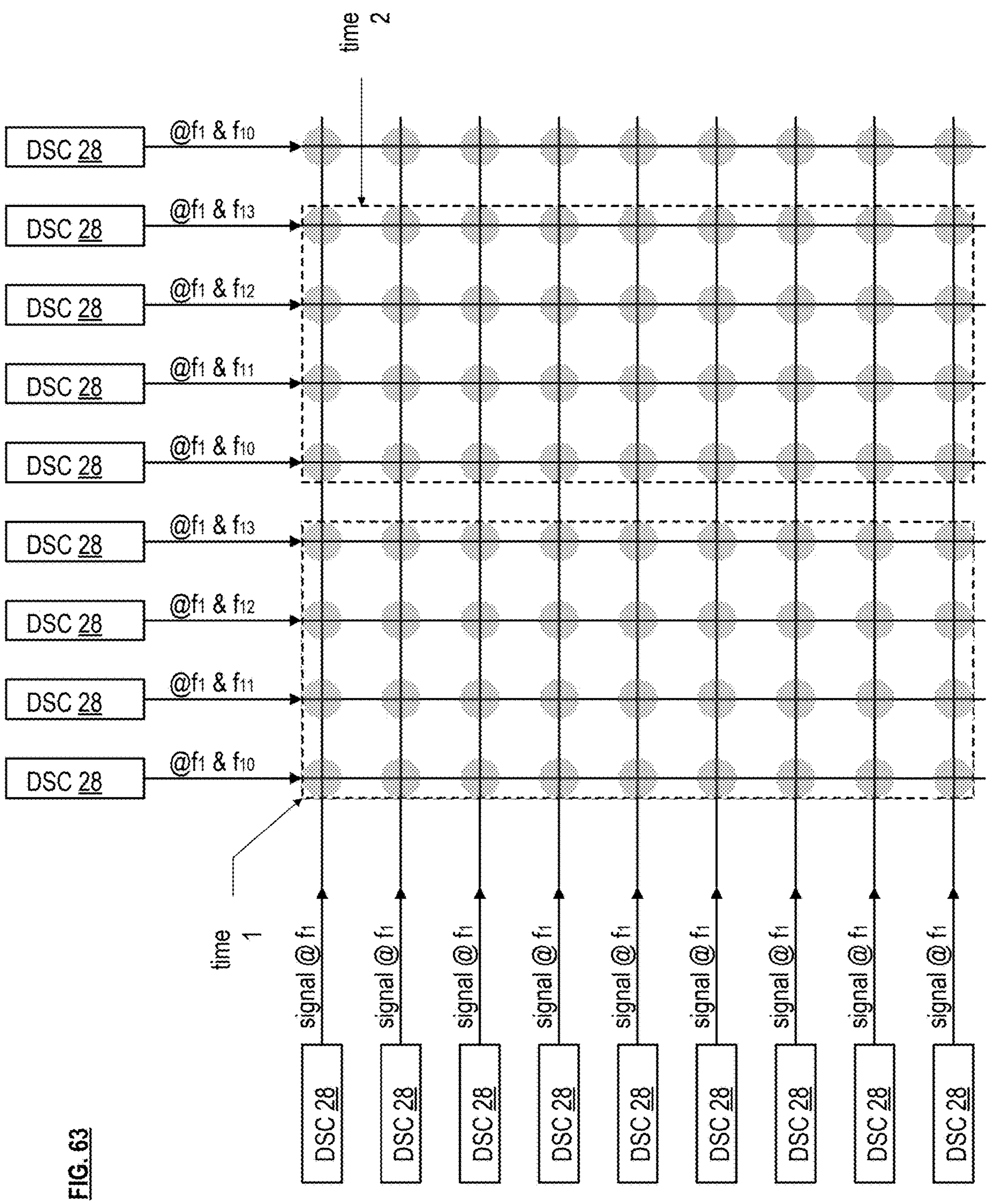
FIG. 63 is a schematic block diagram of an example of frequency and time dividing for reference signals for drive-sense circuits of a touch screen display in accordance with various embodiments.

FIG. 63 is a schematic block diagram of an example of frequency and time dividing for reference signals for drive-sense circuits 28 of a touch screen display. In this example, a few row electrodes and a few column electrodes are shown. Each electrode is coupled to a drive sense circuit (DSC) 28. The crossover of a row electrode with a column electrode creates a sense cell. In this example, there are nine row electrodes and nine column electrodes, creating 81 sense cells. To allow for time-frequency division self-capacitance sensing and mutual sensing of the electrodes, the drive sense circuits affiliated with column electrodes use the same frequency f1 for self-capacitance and use a set of different frequencies (f10-f13) at different times (time 1, time 2) for mutual capacitance. The drive sense circuits affiliated with row electrodes use the same frequency (f1) for each of the different times.

Figure 64A:
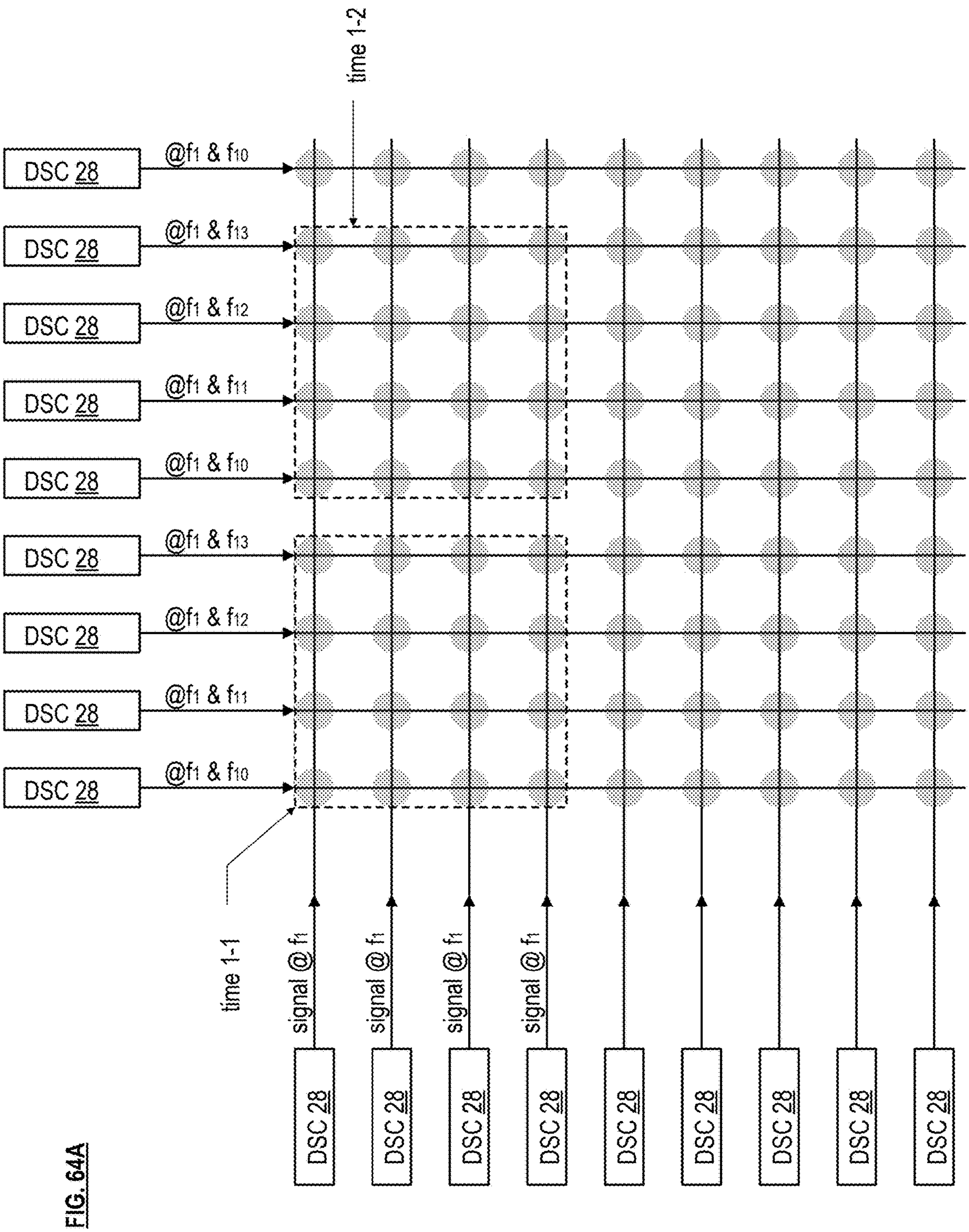
FIGS. 64A and 64B are a schematic block diagram of another example of frequency and time dividing for reference signals for drive-sense circuits of a touch screen display in accordance with various embodiments.
Figure 64B:
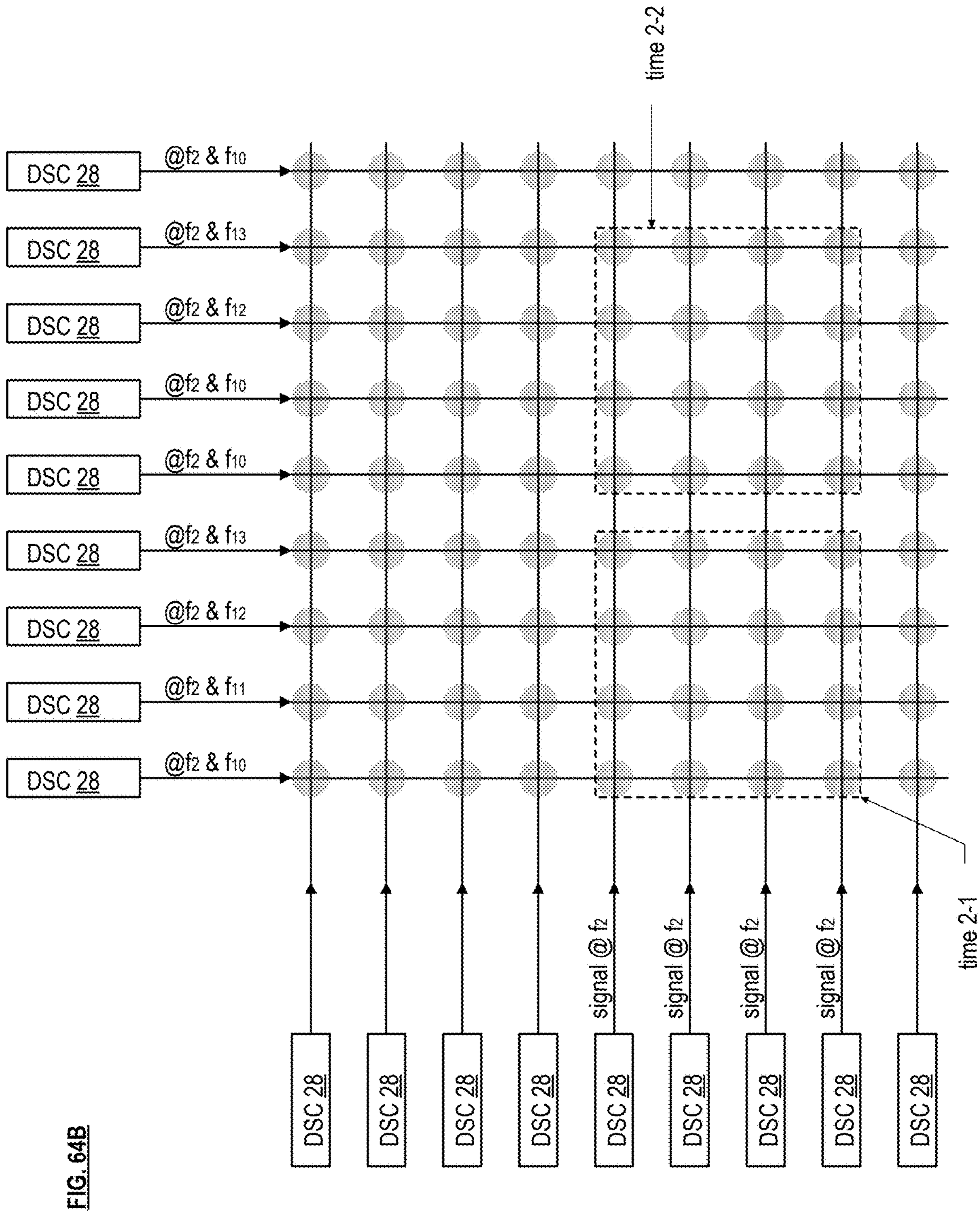

FIGS. 64A and 64B are a schematic block diagram of an example of frequency and time dividing for reference signals for drive-sense circuits (DSCs) 28 of a touch screen display. In this example, a few row electrodes and a few column electrodes are shown. Each electrode is coupled to a drive sense circuit (DSC) 28. The crossover of a row electrode with a column electrode creates a sense cell. In this example, there are nine row electrodes and nine column electrodes, creating 81 sense cells. To allow for time-frequency division self-capacitance sensing and mutual sensing of the electrodes, the drive sense circuits are grouped. Each group uses the same frequency f1 for self-capacitance and uses a set of frequencies f10-f13 for mutual capacitance but at different times.

For example, during time 1-1, the drive sense circuits affiliated with the first four row electrodes 1-4 use frequency f1 for self-capacitance and drive sense circuits affiliated with the first four column electrodes 1-4 use frequency f1 for self-capacitance and frequencies f10-f13 for mutual capacitance. As another example, during time 1-2, the drive sense circuits affiliated with the first four row electrodes 1-4 use frequency f1 for self-capacitance and the drive sense circuits affiliated with the second four column electrodes 5-8 use frequency f1 for self-capacitance and frequencies f5-f8 mutual capacitance.

Continuing with the example in FIG. 64B, during time 2-1, the drive sense circuits affiliated with the second four row electrodes 1-4 use frequency f1 for self-capacitance and drive sense circuits affiliated with the second four column electrodes 5-8 use frequency f1 for self-capacitance and frequencies f10-f13 for mutual capacitance. As another example, during time 2-2, the drive sense circuits affiliated with the second four row electrodes 5-8 use frequency f1 for self-capacitance and the drive sense circuits affiliated with the second four column electrodes 5-8 use frequency f1 for self-capacitance and frequencies f5-f8 mutual capacitance.

Figure 65A:
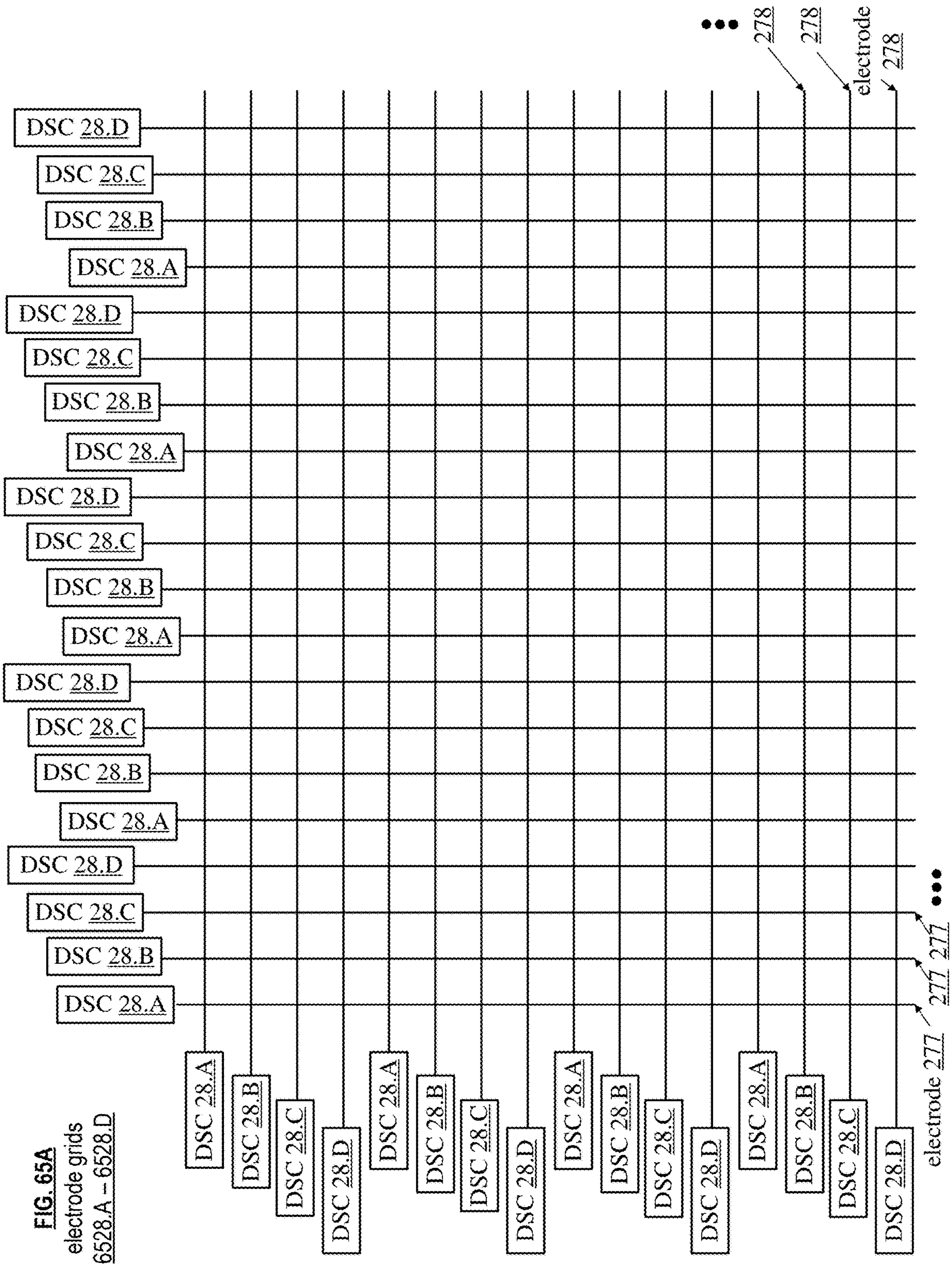
FIG. 65A is a schematic block diagram of an embodiment of a touch screen display that includes a plurality of electrode grids in accordance with various embodiments.

FIG. 65A presents another embodiment of a plurality of DSCs and a plurality of corresponding electrodes of a touch screen display. Some or all features and/or functionality of the touch screen display of FIG. 65A can be utilized to implement any embodiment of a touch screen display 80, a large touch screen display 270, and/or any other embodiment of a touch screen display and/or corresponding computing device 14 and/or 18 described herein.

The plurality of DSCs and a plurality of corresponding electrodes of FIG. 65A can correspond to DSCs and electrodes of a large touch screen display, such as a touch screen display having a size larger than 18 inches. Alternatively or in addition, the spacing between any two electrodes in a given row or column can be 5 mm, approximately 5 mm, or another spacing. The plurality of DSCs and a plurality of corresponding electrodes of FIG. 65A can thus correspond to an illustrative, small portion of the touch screen display, where the full the touch screen display optionally includes many more row and column electrodes, and many more corresponding DSCs.

Achieving the level of touch-detection granularity of a small touch screen device, such as a smart phone device or hand-held touch screen device can be challenging to scale to large devices. The size of electrodes required to accommodate a larger display can create challenges due to added impedance and noise susceptibility. The display data can further create further challenges of a high noise environment. Accurate touch data at high sensing rates is thus desired, but facilitating the level of processing required for the increased number of electrodes, if the same or similar electrode spacing as implemented in smaller devices to facilitate the same touch-detection granularity is utilized, can be further challenging.

FIGS. 65A-65N present a solution to this problem by implementing a plurality of independent, interlaced electrode grids of row and column electrodes that each detect capacitance variations at their own cross points. As illustrated in FIG. 65A, each of the plurality of DCSs and plurality of corresponding electrodes can belong one of a plurality of different electrode grids 6528. The plurality of electrode grids 6528 can correspond to a plurality of interlaced sensor arrays, where each electrode grid 6528 has its own set of row electrodes 278 and column electrodes 277 with corresponding DSCs 28, operable to sense changes in capacitance in its respective array of sense cells formed at the cross points of its own row and column electrodes via some or all features and/or functionality discussed previously.

FIG. 65A illustrates four electrode grids 6528.A-6528.D. In this example, the DSCs 28.A and their corresponding electrodes belong only to electrode grid 6528.A; the DSCs 28.B and their corresponding electrodes belong only to electrode grid 6528.B; the DSCs 28.C and their corresponding electrodes belong only to electrode grid 6528.C; and the DSCs 28.D and their corresponding electrodes belong only to electrode grid 6528.D. Other embodiments can have a different number of electrode grids 6528 that is greater than two. An electrode grid 6528 as used herein can correspond to any corresponding grid of row and column electrodes as described herein, and can optionally be the sole electrode grid integrated within a corresponding touch screen display.

Each of a plurality of proper subsets of the full plurality of row electrodes of the touch screen display can belong to a corresponding one of the set of different electrode grids. The plurality of proper subsets of the full plurality of row electrodes can be mutually exclusive and/or can be collectively exhaustive with respect to the full plurality of row electrodes. Each of a plurality of proper subsets of the full plurality of column electrodes of the touch screen display can belong to a corresponding one of the set of different electrode grids. The plurality of proper subsets of the full plurality of column electrodes can be mutually exclusive and/or can be collectively exhaustive with respect to the full plurality of column electrodes.

Each electrode grid 6528 can optionally have a constant number of other electrodes belonging to other electrode grids between any two closest ones of its row electrodes or column electrodes. In particular, when n electrode grids 6528 are integrated within the touch screen display, exactly n−1 electrodes can be between any two nearest electrodes in an ordering of row electrodes or column electrodes. As illustrated in this example, any pair of nearest row electrodes of a same electrode grid each have exactly three electrodes of other row electrode grids between them, and any pair of nearest row electrodes of a same electrode grid each have exactly three electrodes of other row electrode grids between them.

Each electrode grid can optionally have identical spacing of its own row and/or column electrodes, for example, based on all electrodes across all electrode grids having a fixed spacing and based on having the constant number of electrodes between any two of its electrodes.

The different electrode grids can optionally have the same identical spacing and/or a same number of electrodes (or a number of row electrodes within one of the number of row electrodes all other electrode grids, and/or a number of column electrodes within one of the number of column electrodes all other electrode grids). The electrode grids can optionally be identical other than their integrated placement within the touch screen display, where the electrode grids are offset to enable the equal spacing between the row electrodes and/or the column electrodes across all n electrode grids.

The ordering of row electrodes or column electrodes can dictate that any two neighboring electrodes in the ordering belong to different electrode grids. For example, the two neighboring column electrodes correspond to electrodes at the immediate right and left of a given column electrode, and are guaranteed to be included in different electrode grids from the given column electrode, and optionally each other, for example, based on n being greater than 2. Similarly, the two neighboring row electrodes correspond to electrodes immediately above and below a given row electrode, and are guaranteed to be included in different electrode grids from the given row electrode, and optionally each other, for example, based on n being greater than 2.

The ordering of row electrodes or column electrodes can correspond to a cyclically repeating assignment of each electrode, ordered from top to bottom or from left to right, respectively, to a corresponding one of the set of electrode grids. In some embodiments, a modulo function applied to integer indexes of the row electrodes, increasing by one from top to bottom, can thus dictate assignment of each electrode to a given electrode grid, where the divisor applied to the integer index is equal to n. In this example, if starting from index 0 and increasing by one starting at the topmost row electrode, every row electrode whose index modulo 4 equals 0 belongs to electrode grid 6528.A; every row electrode whose index modulo 4 equals 1 belongs to electrode grid 6528.B; every row electrode whose index modulo 4 equals 2 belongs to electrode grid 6528.C; and every row electrode whose index modulo 4 equals 3 belongs to electrode grid 6528.D. Similarly, a modulo function applied to integer indexes of the column electrodes, increasing by one from left to right, can thus dictate assignment of each electrode to a given electrode grid, where the divisor applied to the integer index is equal to n. In this example, if starting from index 0 and increasing by one starting at the leftmost column electrode, every column electrode whose index modulo 4 equals 0 belongs to electrode grid 6528.A; every row electrode whose index modulo 4 equals 1 belongs to electrode grid 6528.B; every row electrode whose index modulo 4 equals 2 belongs to electrode grid 6528.C; and every row electrode whose index modulo 4 equals 3 belongs to electrode grid 6528.D.

In some embodiments, all row electrodes across all n interlaced electrode grids 6528 can lie upon a same first plane parallel with a plane that includes the display of the touch screen display. Alternatively or in addition, all column electrodes across all n interlaced electrode grids 6528 can all lie upon a second same plane parallel with the plane that includes display of the touch screen display. These two planes for row and column electrodes, respectively, can be offset by a distance orthogonal to the display as discussed previously, for example, as illustrated in FIGS. 10A and 10B. This can be ideal in maintaining a minimal thickness of the touch screen display despite the inclusion of multiple interlaced electrode grids.

In other embodiments, row electrodes across different interlaced electrode grids 6528 are optionally included upon different planes parallel with the display of the touch screen display, where a distance between row electrodes of different electrode grids have a non-zero component in a direction orthogonal to the plane that includes the display. In such embodiments, column electrodes across different interlaced electrode grids 6528 can optionally be included upon different planes parallel with the display of the touch screen display that are distinct from all planes that include the row electrodes, where a distance between column electrodes of different electrode grids have a non-zero component in a direction orthogonal to the plane that includes the display.

Figure 65B:
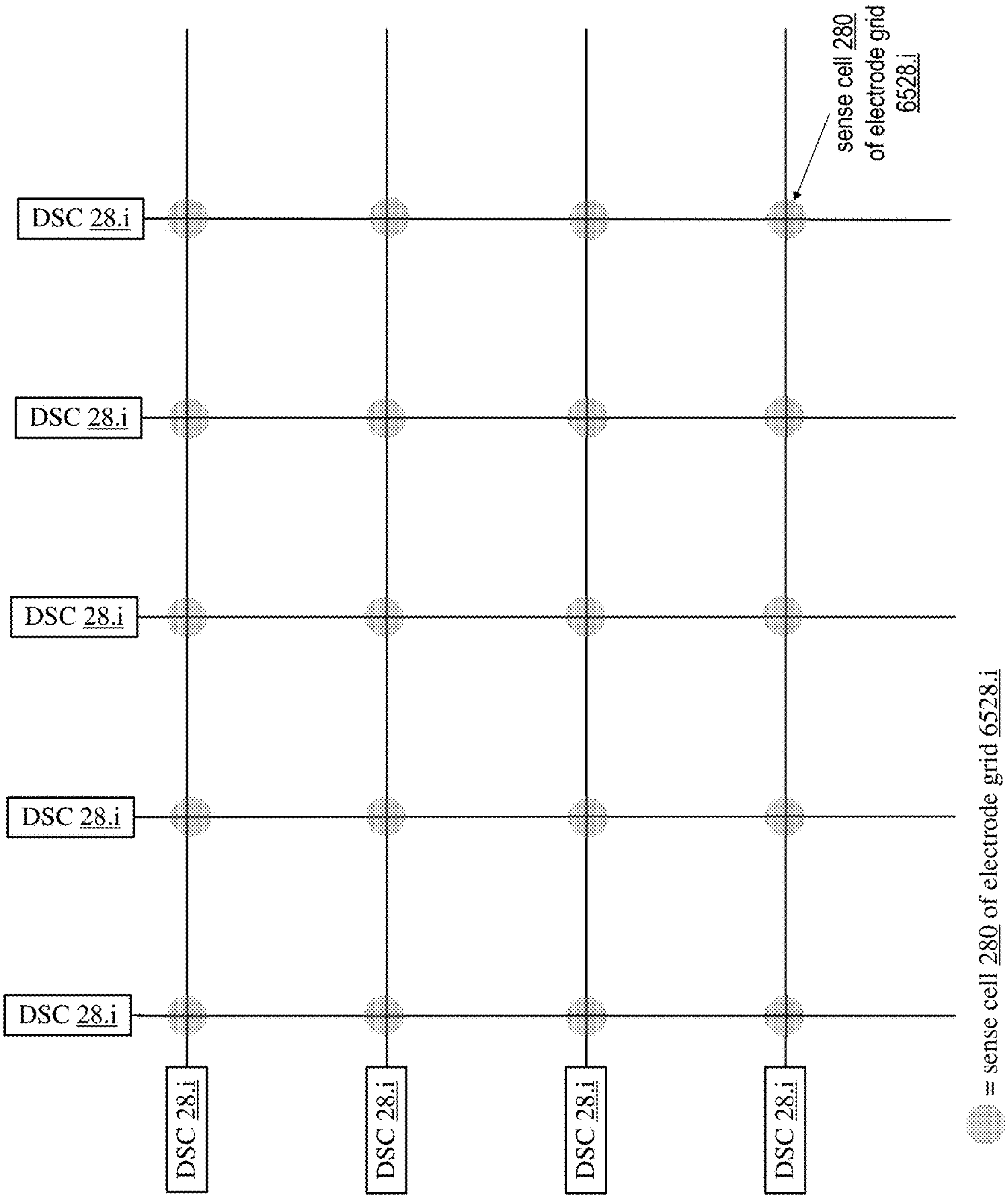
FIG. 65B is a schematic block diagram of an embodiment of a plurality of sense cells of single electrode grid in accordance with various embodiments.

FIG. 65B illustrates at least a portion of a single electrode grid 6528.*i*. Some or all features and/or functionality of the electrode grid 6528.*i* of FIG. 65B can implement some or all different electrode grids 6528, such as some or all electrode grids 6528.A-6528.D of FIG. 65A and/or of any other touch screen display described herein.

As illustrated in FIG. 65B, a given electrode grid 6528.*i* can have its own set of sense cells 280 at cross points of its own respective row and column electrodes. For example, any given electrode grid 6528.*i* is implemented via some or all functionality of any array of electrodes described herein, such as the electrodes 85 and corresponding DCSs 28 of display 83, 80, and/or 90 of FIGS. 21 and/or 29.

Figure 65C:
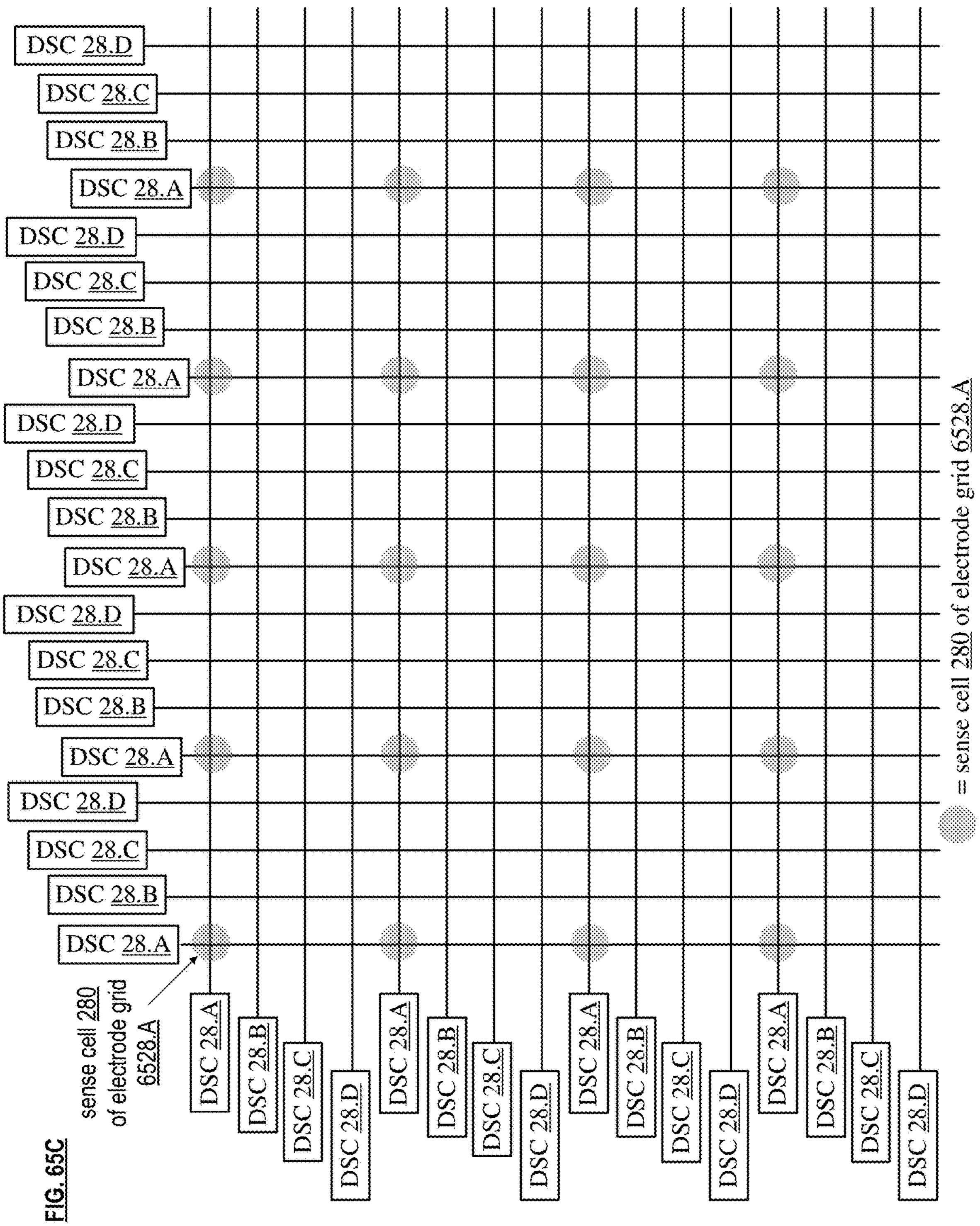
FIGS. 65C-65F are schematic block diagrams each illustrating a plurality of sense cells of a corresponding one electrode grid of a plurality of electrode grids in accordance with various embodiments.
Figure 65D:
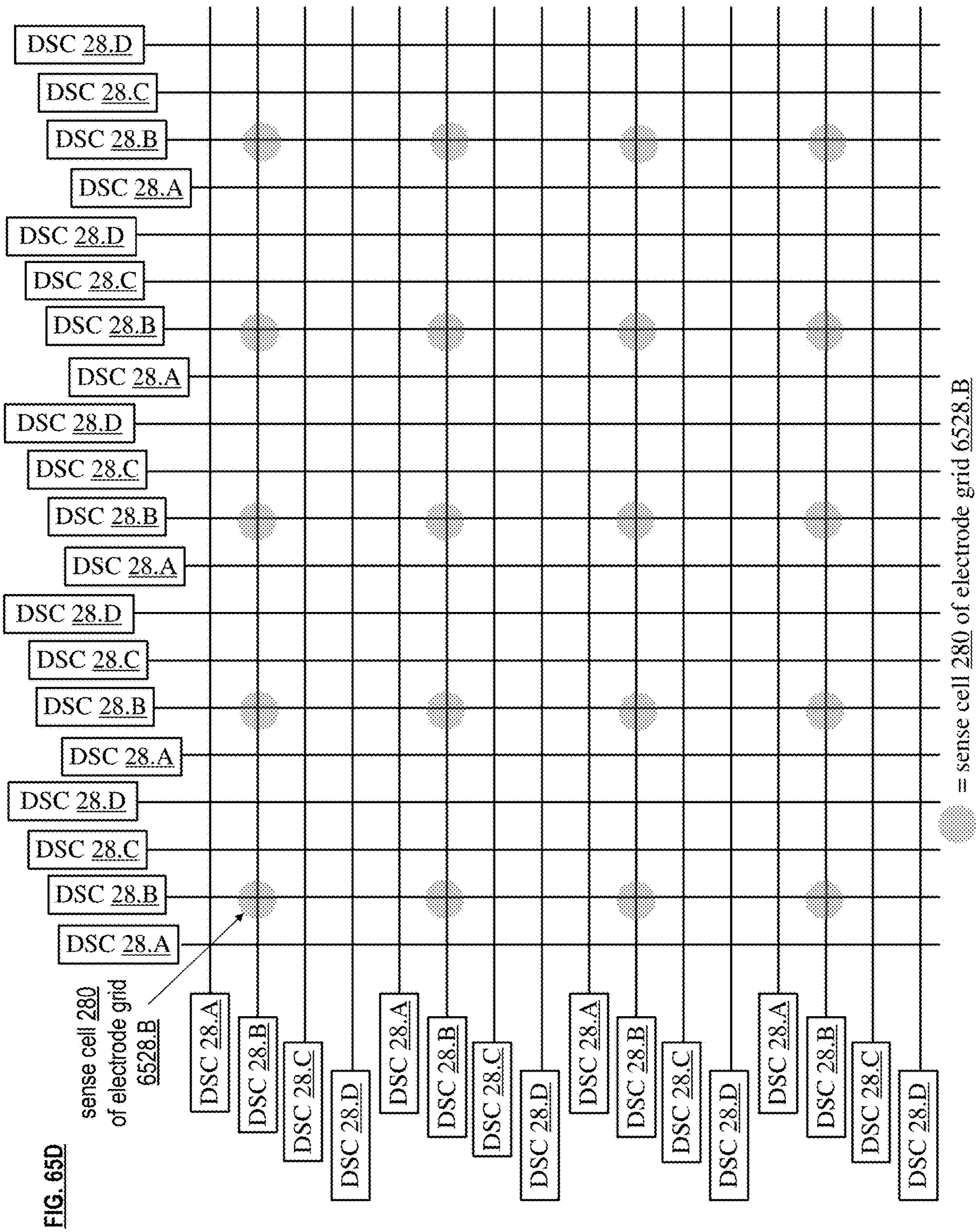
Figure 65E:
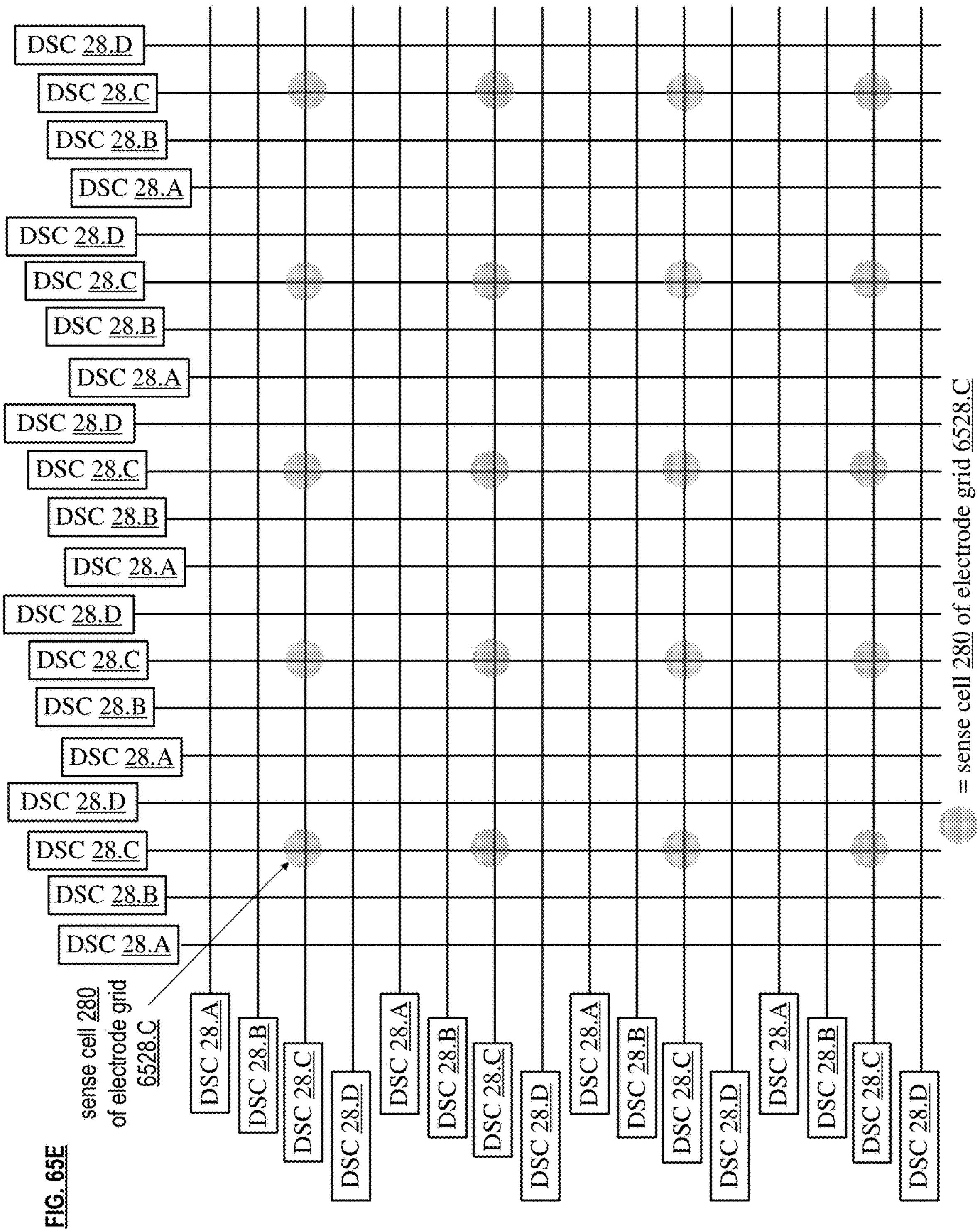
Figure 65F:
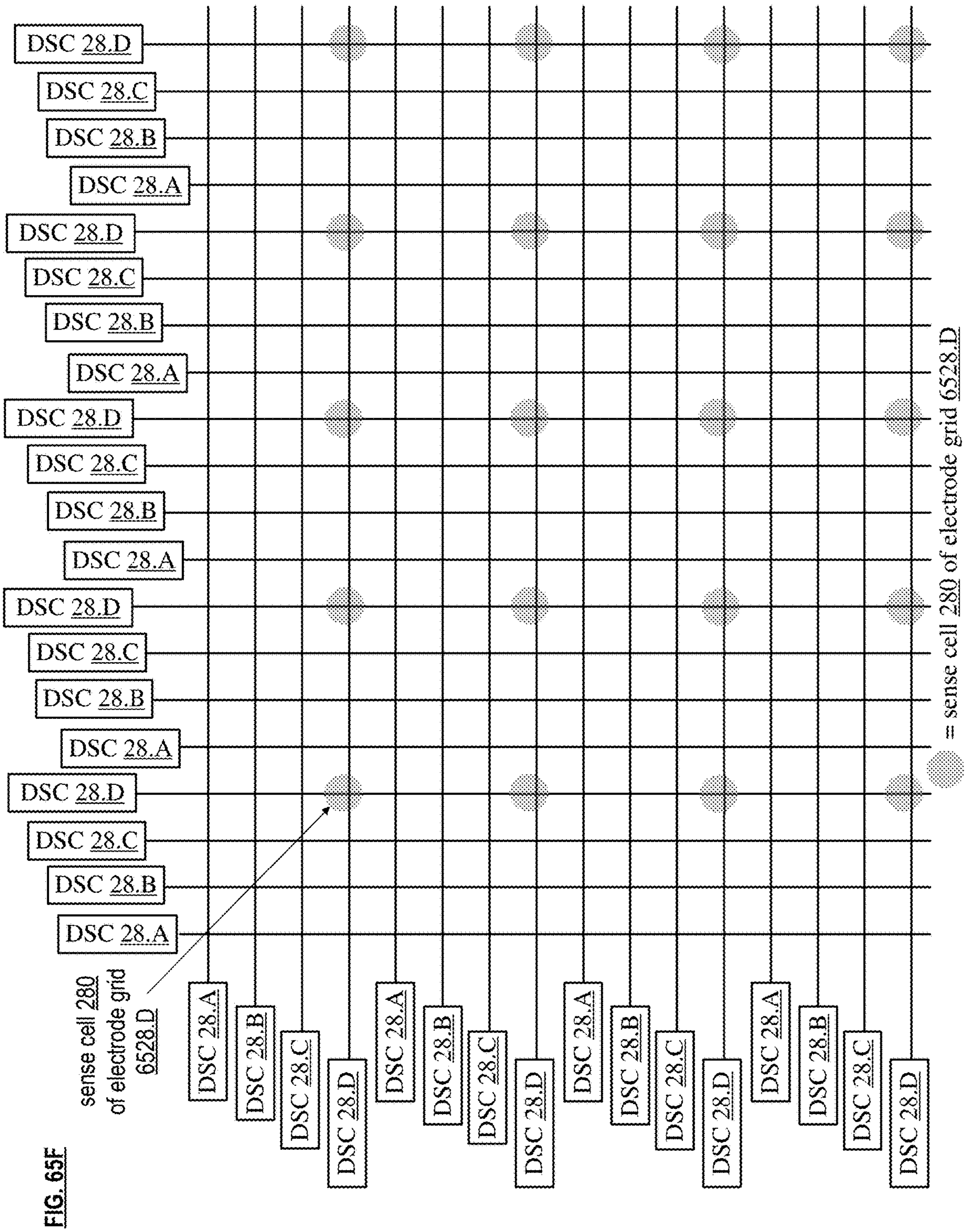

FIGS. 65C-65F illustrate the respective locations of different sense cells of different electrode grids 6528.A-6528.D of FIG. 65A. FIG. 65C illustrates the sense cells formed by cross-points of the row and column electrodes of electrode grid 6528.A. FIG. 65D illustrates the sense cells formed by cross-points of the row and column electrodes of electrode grid 6528.B. FIG. 65E illustrates the sense cells formed by cross-points of the row and column electrodes of electrode grid 6528.C. FIG. 65F illustrates the sense cells formed by cross-points of the row and column electrodes of electrode grid 6528.D. As illustrated in FIGS. 65C-65F, each electrode grid 6528 can have sense cells formed at its own proper subset of a plurality of cross-points across all electrode grids, where these proper subsets are mutually exclusive, as each sense cell belongs to exactly one electrode grid.

Figure 65G:
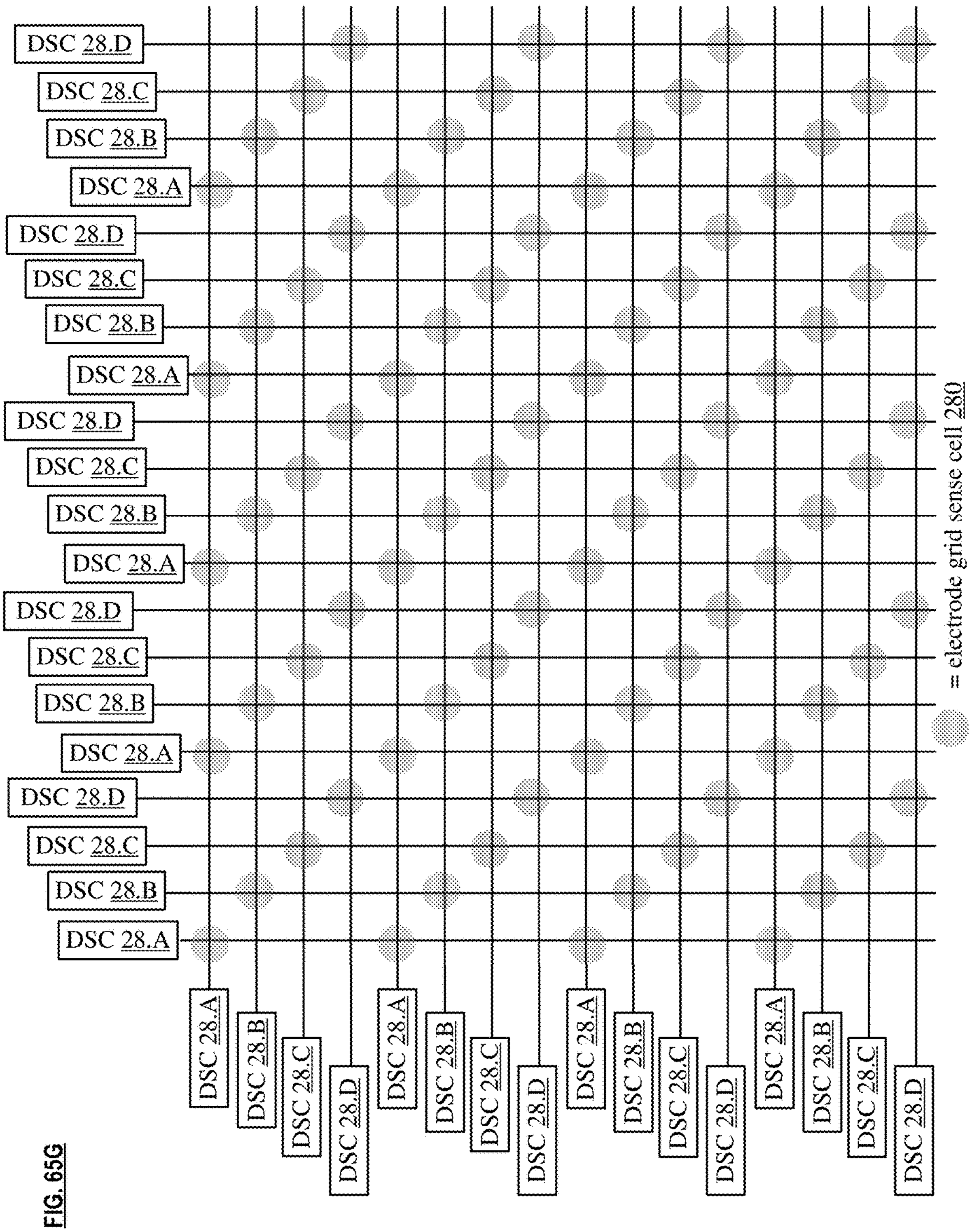
FIG. 65G is a schematic block diagrams illustrating a plurality of sense cells of all electrode grids of a plurality of electrode grids in accordance with various embodiments.

FIG. 65G illustrates the collective plurality of sense cells across all electrode grids.

The collective plurality of sense cells across all electrode grids can optionally fall upon a plurality of diagonal lines, starting from the top left corner. For example, a plurality of segments formed by any smallest spacing between any sense cell with another sense cell fall upon these diagonal lines. The diagonal lines can be non-parallel with lines falling along the plurality of row electrodes and can be non-parallel with lines falling along the plurality of column electrodes. The diagonal lines can form a 45 degree angle with a line parallel to the lengthwise of the column electrodes and can form a 45 degree angle with a line parallel to the lengthwise of the column electrodes, for example, based on a uniform spacing between the plurality of row electrodes being equivalent to a uniform spacing between the plurality of column electrodes.

An offset between the plurality of parallel diagonal lines can be based upon the electrode spacing and the number of electrode grids n. For example, a number of cross points falling upon a line orthogonal to any two closest diagonal lines can intersect up to n/2 cross points.

In different embodiments, a different arrangement of monitored cross-points can be facilitated via different assignments of row and column electrodes to different electrode grids, for example, that is different from the cyclically repeating order-based assignment of the example of FIGS. 65A-65G.

As illustrated in FIG. 65G, the collective plurality of sense cells across all electrode grids of the touch screen display can be included in a proper subset of the full plurality of cross-points. In particular, cross-points formed between row and column electrodes of different electrode grids do not correspond to sense cells of a given electrode grid, and are optionally not monitored due to their electrodes belonging to different electrode grids.

Figure 65H:
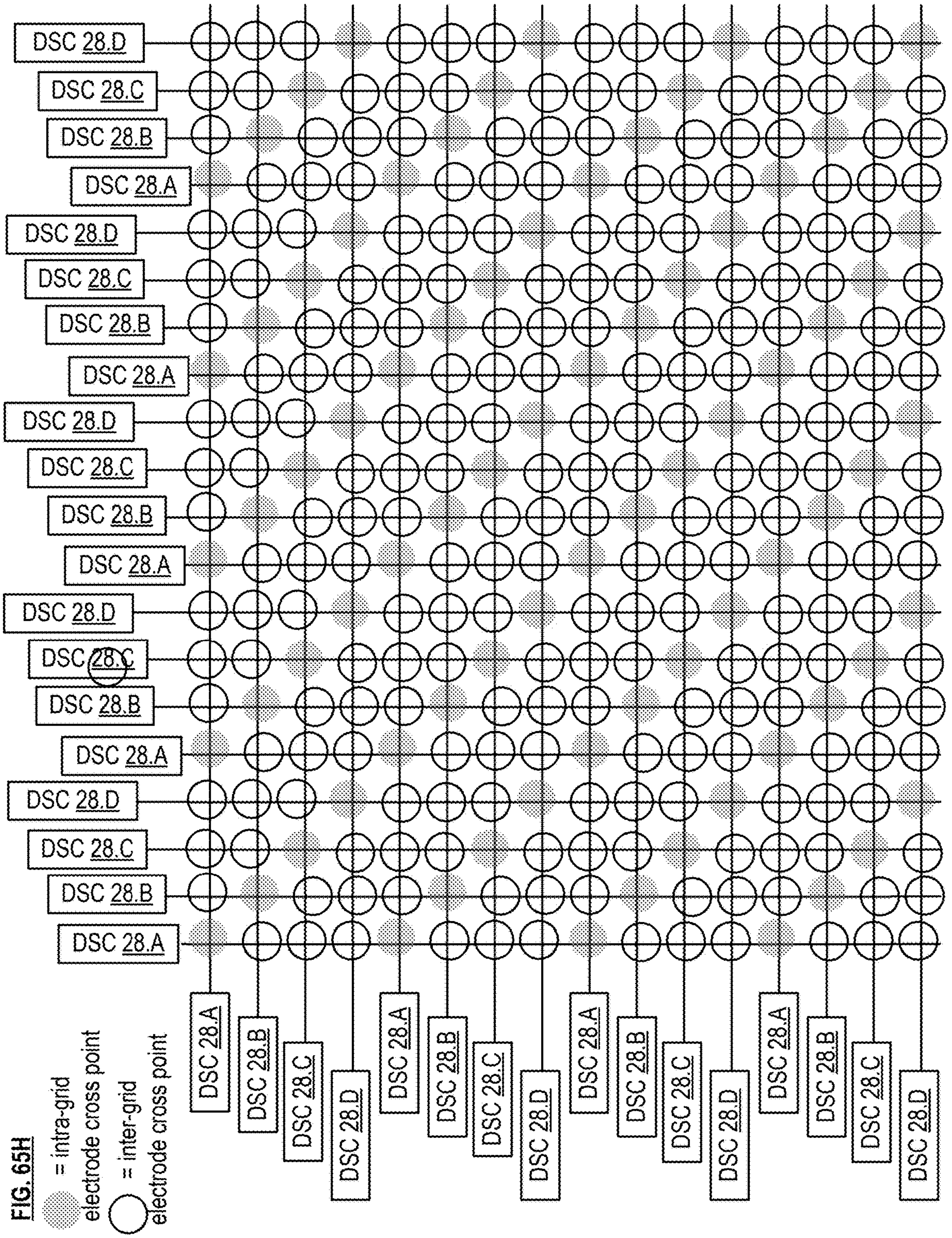
FIG. 65H is a schematic block diagrams illustrating a plurality of intra-grid cross-points and a plurality of inter-grid cross points of a plurality of electrode grids in accordance with various embodiments.

FIG. 65H illustrates this distinction between monitored and unmonitored cross points. Monitored cross-points correspond to all, and/or only, intra-grid cross-points, which can correspond to cross-points formed by row and column electrodes included in the same electrode grid 6528. All other cross points are denoted inter-grid cross points, corresponding to cross-points formed by row and column electrodes included in the different electrode grids 6528. Some or all of these inter-grid cross points are not monitored due to being formed by electrodes from different electrode grids.

FIG. 65I illustrates an embodiment of frequencies emitted by the DCSs of FIG. 65A upon electrodes of FIG. 65A to facilitate the monitoring of cross points by different electrode grids. As discussed previously, the row electrodes can emit signals having a frequency component at a same frequency $f_1$ for detection of self-capacitance. As discussed previously, the row electrodes can be configured to drive mutual capacitance and the column electrodes can be configured to detect mutual capacitance, where the signals emitted by row electrodes further includes a second frequency, such as one of the equally-spaced different frequencies of FIG. 39.

Each of a first set of frequencies $f_{A2}-f_{Ax}$ can be included in signals by some or all of x different row electrodes of electrode grid 6528.A. Each of a second set of frequencies $f_{B2}-f_{Bx}$ can be included in signals by some or all of x different row electrodes of electrode grid 6528.B. Each of a second set of frequencies $f_{C2}$-$f_{Cx}$ can be included in signals by some or all of x different row electrodes of electrode grid 6528.C. Each of a second set of frequencies $f_{D2}-f_{Dx}$ can be included in signals by some or all of x different row electrodes of electrode grid 6528.D.

In some embodiments, a given set of frequencies $f_{i2}$-$f_{ix}$ of a given electrode grid 6528.*i* can be distinct from the set of frequencies of any other electrode grid, for example, where $f_{A2}$, $f_{B2}$, $f_{C2}$, and $f_{D2}$, are all different from each other. For example, a full set of n*(x−1) different frequencies can encompass the frequencies emitted in signals by row electrodes of n different electrode grids 6528. In other embodiments, frequencies can optionally be repeated as discussed in conjunction with FIG. 39, for example, due to the touch screen display being large and due to the use of a large number of electrodes. Such an embodiment can be ideal in enabling flexibility of cross-point monitoring and/or reassignment of DSCs to different electrode grids over time.

This embodiment can still render reduction in overall processing, as DCSs of column electrodes belonging to different electrode grids can be operable to detect different proper subsets of frequencies emitted by different grids. For example, column electrodes of electrode grid 6528.A facilitate monitoring of only its respective cross points via measuring changes in mutual capacitance via monitoring of only the set of frequencies $f_{A2}-f_{AX}$, and not other frequencies emitted in signals of DSCs belonging to other electrode grids. For example, a set of x−1 corresponding bandpass filters are applied to each filter for one of the set of set of frequencies $f_{A2}-f_{Ax}$. Column electrodes of any other given electrode grid 6528.*i* can be operable to similarly monitor only its respective cross points via measuring changes in mutual capacitance via monitoring of only the set of frequencies $f_{i2}$-$f_{ix}$, and not other frequencies emitted in signals of DSCs belonging to other electrode grids.

In other embodiments, it can be ideal to reduce the number of frequencies emitted across all DSCs, where a set of only x−1 frequencies $f_2$-$f_x$ are shared across the different electrode grids. For example, $f_{A2}$, $f_{B2}$, $f_{C2}$, and $f_{D2}$ are all implemented as a same frequency $f_2$; $f_{A3}$, $f_{B3}$, $f_{C3}$, and $f_{D3}$ are all implemented as a same frequency $f_3$ that is different from $f_2$; etc.

In such embodiments, to ensure that a given column electrode cannot detect mutual capacitance induced by electrodes of other electrode grids, the dielectric layer 142 can optionally include other materials and/or circuitry at cross-points of electrodes belonging to different electrode grids to physically disable the presence and/or detection of mutual capacitance at these cross points and/or between these electrodes of different electrode grids, and/or where the dielectric material only separates row and column electrodes of the same electrode grid. Thus, when a given frequency is monitored by a given electrode, its origin can be guaranteed to correspond to the electrode in the corresponding electrode grid. This can be ideal in enabling all electrode grids to be operable simultaneously, while minimizing the number of different frequencies emitted across the electrodes.

In some embodiments, rather than physically limiting the mutual capacitance detection between inter-grid cross points, the different electrode grids can be operable at different time frames, where only one electrode grid is operational at a given time. Such embodiments are discussed in further detail in conjunction with FIGS. 67A-67C.

Figure 65J:
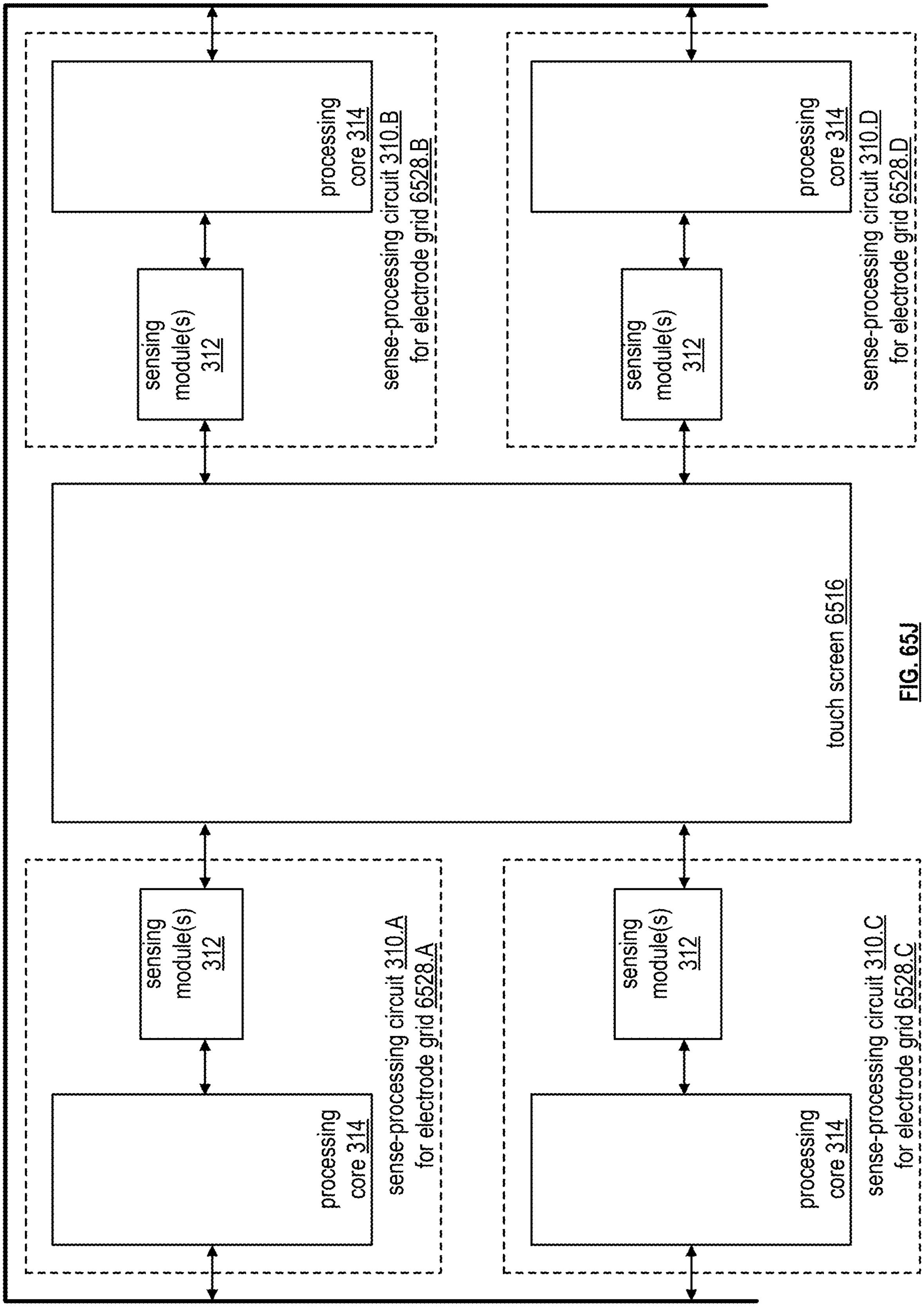
FIG. 65J is a schematic block diagram of a plurality of sense-processing circuits for a plurality of electrode grids of a touch screen display in accordance with various embodiments.

FIG. 65J illustrates an embodiment of a touch screen 6516 coupled to a plurality of sense-processing circuits 314 corresponding to the plurality of different electrode grids. Some or all features and/or functionality of the touch screen 6516 and the plurality of sense-processing circuits 314 of FIG. 65J can be utilized to implement functionality of the touch screen display of FIG. 65A and/or any other touch screen display described herein.

Some or all features and/or functionality of the touch screen 6516 and/or the plurality of sense-processing circuits 314 can be implemented in a same or similar fashion as the touch screen 316 and sense processing circuits 310 discussed in conjunction with FIG. 58. However, rather than corresponding to different contiguous, non-overlapping portions of the touch screen as discussed in conjunction with FIG. 58, the sense-processing circuits 310 correspond to the interlaced electrode grids and thus monitor overlapping regions of the touch screen 65145. In this example, four sense-processing circuits 314 are coupled to touch screen 6516, for example, to only receive and process signals generated via DSCs belonging to the corresponding one of the set of electrode grids 6528.A-6528.D of FIG. 65A.

Figure 75A:
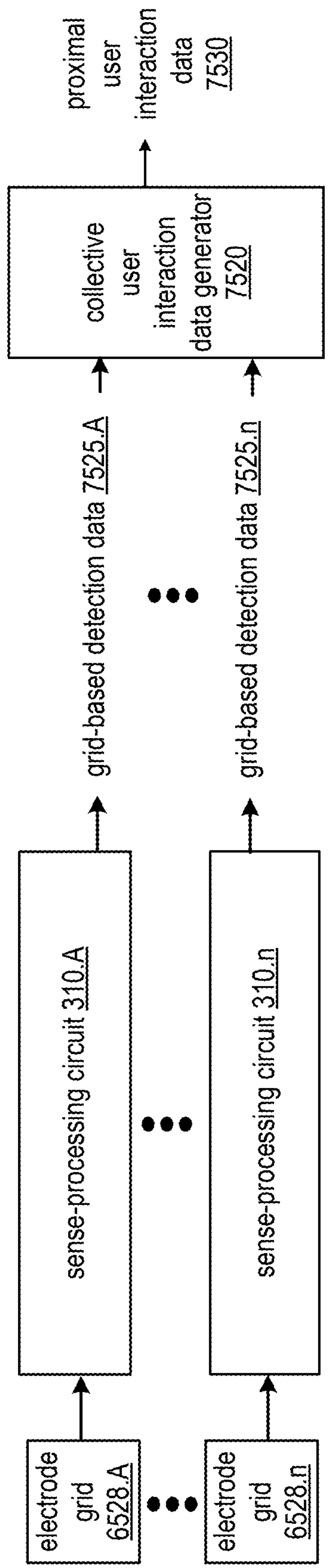
FIG. 75A is a schematic block diagram of a collective user interaction data generator that generates proximal user interaction data based on grid-based detection data generated via a plurality of sense-processing circuits in accordance with various embodiments.

Each sense-processing circuits 314 can generate its own detection data indicating detected variations in capacitance and/or corresponding proximal touches or other user interactions via its own electrode grid of DSCs, which can be collectively be processed to identify and characterize various proximal touches 234, proximal hovering without touching, and/or any other user interaction proximal to the touch screen, for example, via a collective user interaction data generator of FIG. 75A, a processing module 42, and/or other processing resources. Embodiments of sense-processing circuits 310 are discussed in further detail in conjunction with FIGS. 75A-76I.

Figure 65K:
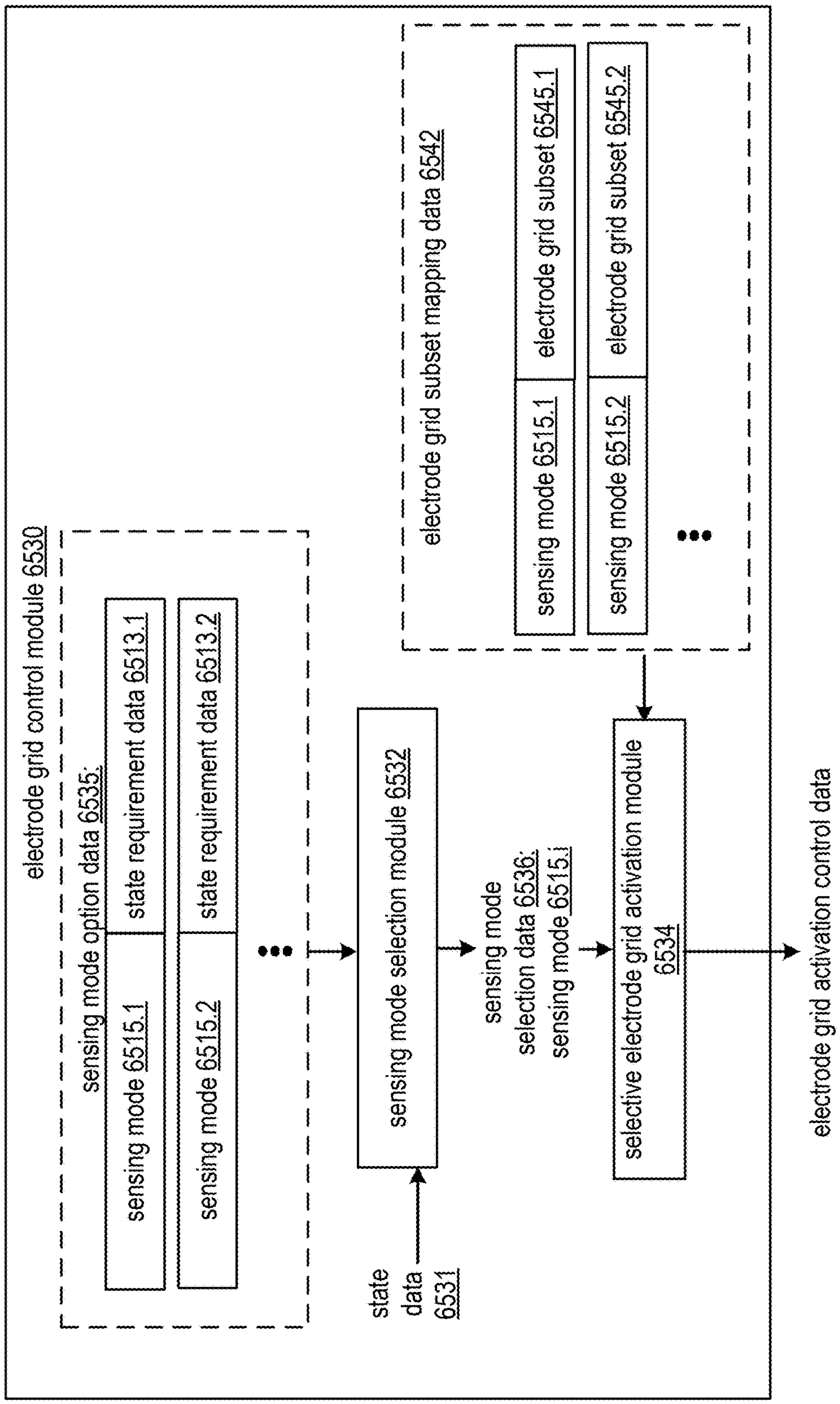
FIG. 65K is a schematic block diagram of an electrode grid control module of a touch screen display in accordance with various embodiments.

FIG. 65K illustrates an embodiment of an electrode grid control module 6530 operable to activate and/or otherwise control functionality of different electrode grids 6528 and/or different individual DSCs of one or more electrode grids 6528. Some or all features and/or functionality of the electrode grid control module 6530 can be utilized to implement Some or all features and/or functionality of the touch screen display of FIG. 65A and/or any other touch screen display described herein.

The electrode grid control module 6530 can be implemented via touch screen processing module 82, another processing module 42, and/or at least one processor and/or at least one memory. For example, at least one memory of the touch screen display stores executable instructions for execution by at least one processor of the touch screen display to cause the at least one processor to perform some or all functionality of the electrode grid control module 6530 described herein.

The touch screen display can be operable to function in accordance with one or more different sensing modes 6515, for example, where different sensing modes are selected and enabled over time via the electrode grid control module 6530. Examples of different sensing modes 6515 of the touch screen display are discussed in further detail in conjunction with FIGS. 66A-74D.

A sensing mode selection module 6532 can select one sensing mode 6515 from sensing mode option data 6535 for operation by the touch screen display at a given time. A one or more later times, the sensing mode selection module 6532 can select a new sensing modes 6515 from sensing mode option data 6535 for operation by the touch screen display at each of these later times.

The sensing mode option data 6535 can indicate state requirement data 6513 for some or all sensing modes 6515 indicating the requirements and/or parameters that, when met, dictate the corresponding sensing mode be selected. For example, the state requirement data 6513 for a given sensing mode 6515 can indicate a requirement of and/or be determined to be met based on: a predetermined scheduling of the sensing mode; detection of a touch-based or touchless user interaction; detection of at least one variation in capacitance that exceeds a threshold amount; lack of detection of a touch-based or touchless user interaction for at least a threshold amount of time; a size of a detected region induced by a detected touch-based or touchless user interaction; a location of detected a touch-based or touchless user interaction with respect to the display and/or with respect to one or more cross-points; a motion of a touch-based or touchless user interaction detected over time; a speed, direction, or shape of the motion of the touch-based or touchless user interaction detected over time; a type of motion of a touch-based or touchless user interaction detected over time; threshold speed, direction, or shape of the motion of the touch-based or touchless user interaction detected over time; a type of an interactable interface element displayed in graphical image data rendered by the display; a location of an interactable interface element displayed in graphical image data rendered by the display; a type of media displayed; a type of application performed to render the graphical image data and/or to facilitate processing of touch-based and/or touchless user interactions with the display; threshold current and/or expected power consumption; threshold current and/or expected processing consumption; threshold current and/or expected resource consumption; threshold current and/or expected health of one or more components of the touch screen display consumption; a time of day, week, month, or year; a type of user input command; the type of sensing mode currently active and/or most recently selected; and/or other requirements and/or parameters.

Some or all sensing modes 6515 and corresponding state requirement data 6513 of the sensing mode option data 6535 can be determined by the electrode grid control module 6530 based on: being stored in memory of the touch screen display, being accessed in memory accessible by the touch screen display; being received via a communication interface; being configured via user input; being automatically generated based on tracking and/or learning user behavior and/or processing resource consumption over time, for example, via at least one machine learning function, via at least one statistical function, or via another processing function; and/or otherwise being determined.

State data 6531 can be detected, received, measured, estimated, and/or otherwise determined by the electrode grid control module 6530. The given state data and/or changes in the state data can dictate the current sensing mode and/or a change in sensing mode based on the state requirement data 6513 of the sensing modes 6515 of the sensing mode option data 6535. For example, a given sensing mode 6515.*i* is selected based on matching and/or otherwise comparing favorably to the corresponding state requirement data 6513, and/or based on more closely matching the state requirement data 6513 of the given sensing mode 6515 than that of other sensing modes 6515.

The state data 6531 at a given time can indicate, can correspond to and/or be generated based on: the current sensing mode; a current incrementing count; time and/or date data; current and/or recent capacitance image data, such as capacitive images 232, generated based on processing changes in capacitance detected at cross-points of one or more electrode grids; proximal user interaction data, such as proximal touch data 204, generated based on processing the current and/or recent capacitance image data over one or more time frames; a type, size, motion, location, speed, and/or direction of the detected proximal user interaction data; the graphical image data being displayed, aspects of a graphical user interface (GUI) and/or other interactable interface elements being displayed in the graphical image data; the type of media being displayed; the type of application being performed dictating the graphical image data and/or dictating processing of the detected user interactions with the display; a received and/or detected user input command; current and/or estimated health, current and/or estimated power consumption, current and/or estimated processing levels, and/or other state data.

A selective electrode grid activation module 6534 can generate electrode grid activation control data 6540 that denotes activation and/or configuration of one or more electrode grids in accordance with the selected sensing mode 6515.

The electrode grid activation control data 6540 can be generated based on electrode grid subset mapping data 6542. The electrode grid subset mapping data 6542 can indicate an electrode grid subset 6545 as a subset of electrode grids in the plurality of electrode grids that be activated for each possible sensing mode 6515. The electrode grid subset mapping data 6542 can alternatively or additionally indicate configuration some or all electrode grids of the electrode grid subset 6545 and/or can alternatively or additionally indicate configuration some or all individual DCSs of one or more electrode grids of the electrode grid subset 6545 The electrode grid subset mapping data 6542 and/or can otherwise indicate activation and/or configuration of one or more particular electrode grids and/or one or more particular DSCs of one or more particular row and/or column electrodes as a mapping and/or as a deterministic function of the given sensing mode 6515 and/or the given state data 6531.

The electrode grid subset mapping data 6542 of the sensing mode option data 6535 can be determined by the electrode grid control module 6530 based on: being stored in memory of the touch screen display, being accessed in memory accessible by the touch screen display; being received via a communication interface; being configured via user input; being automatically generated based on tracking and/or learning user behavior and/or processing resource consumption over time, for example, via at least one machine learning function, via at least one statistical function, or via another processing function; and/or otherwise being determined.

Figure 65L:
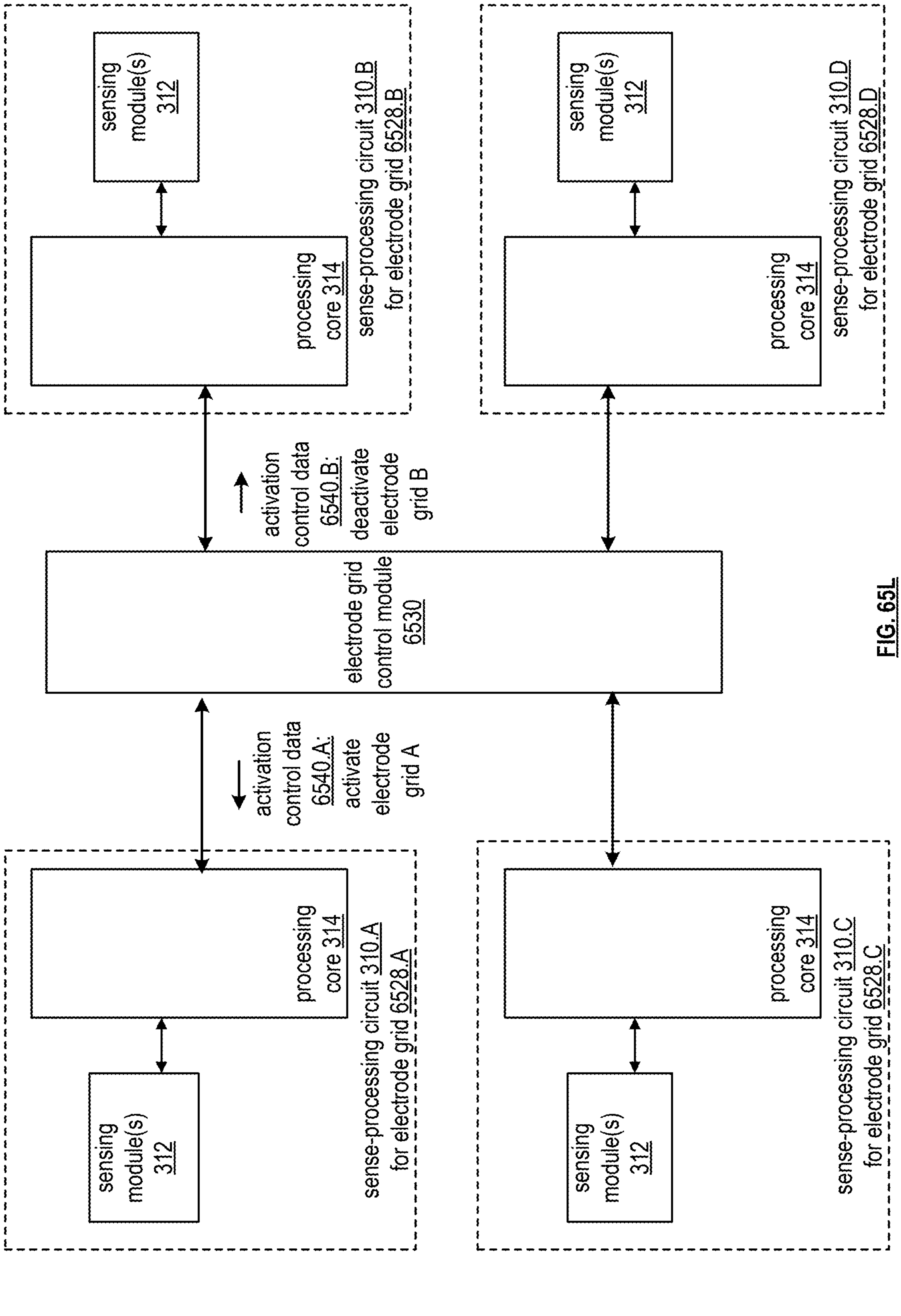
FIG. 65L is a schematic block diagram of an electrode grid control module communicating control data to a plurality of sense-processing circuits for a plurality of electrode grids in accordance with various embodiments.

FIG. 65L illustrates enabling of an example selected sensing mode 6515 by electrode grid control module 6530. Some or all features and/or functionality of the electrode grid control module 6530 can be utilized to implement Some or all features and/or functionality of the touch screen display of FIG. 65A and/or any other touch screen display described herein.

The electrode grid control module 6530 can generate and send electrode grid activation control data 6540 to some or all sense-processing circuits 310, such as the sense-processing circuits 310 of FIG. 65J, of some or all electrodes, for example, to facilitate entering a newly selected sensing mode 6515 as discussed in conjunction with FIG. 65K. As illustrated in FIG. 65L, different portions of the electrode grid activation control data 6540.A and 6540.B are generated as control data for the respective different electrode grids 6528.A and 6528.B for processing via their respective different sense-processing circuits and/or other distinct processing modules controlling these electrode grids. As illustrated in FIG. 65L, electrode grid activation control data 6540 isn't generated for and/or sent to some sense-processing circuits, for example, based on their current mode of operation not necessitating change to enter the newly selected mode of operation.

In this example, the new sensing mode 6515 denotes electrode grid 6528.A be active and electrode grid 6528.B be inactive. For example, in the most recent sensing mode, electrode grid 6528.A was inactive and electrode grid 6528.B was active. The sensing mode 6515 can optionally further denote that electrode grid 6528.C be active and/or electrode grid 6528.D be active or inactive, where their respective activation is not changed from the most recent sensing mode 6515. Electrode grid 6528.A can change from being inactive to being active based on receiving and/or processing the activation control data 6540.A. Electrode grid 6528.B can change from being active to being inactive based on receiving and/or processing the activation control data 6540.B. Electrode grids 6528.C and/or 6528.D remain either active and/or inactive, depending on their participation in the most recent sensing mode 6515.

As used herein, activation of a given electrode grid, or an electrode grid that is activated, corresponds to activating of some or all of its DSCs and/or corresponds to facilitating monitoring of changes in capacitance at some or all of its respective sense cells. For example, for an electrode grid that is activated, all of the DSCs of the given electrode grid 6528 are enabled to drive and sense signals as discussed previously, enabling detection of changes in capacitance across all sense cells of the given electrode grid.

As used herein, deactivation of a given electrode grid, or an electrode grid that is deactivated, corresponds to an electrode grid that is not activated and/or that changes from being activated to no longer being activated. An electrode grid that is deactivated corresponds to of some or all of its DSCs not being activated and/or corresponds to not facilitating monitoring of changes in capacitance at some or all of its respective sense cells. For example, for an electrode grid that is deactivated, none of the DSCs of the given electrode grid 6528 are enabled to drive nor sense signals as discussed previously, and to enable all DSCs of a given electrode grid, disabling detection of changes in capacitance across any sense cells of the given electrode grid.

As used herein, activation of a given DSC, or a DSC that is activated, corresponds to enabling of this DSC's driving and/or sensing capabilities as described herein and/or corresponds to facilitating monitoring of changes in capacitance by the DSC at some or all of its electrode's cross-points with other electrodes.

As used herein, deactivation of a given DSC, or a DSC that is deactivated, corresponds to a DSC that is not activated and/or that changes from being activated to no longer being activated. A DSC that is deactivated corresponding to not enabling this DSC's driving nor sensing/or corresponds to not facilitating any monitoring of changes in capacitance by the DSC at some or all of its electrode's cross-points with other electrodes.

Activated DSCs of a given activated electrode grid can be operable to generate sensed signals indicating detection of changes in capacitance of one or more cross-points shared with other electrodes of the given electrode grid, for example, based on detecting magnitudes of corresponding frequencies, for example, as discussed in conjunction with some or all of FIGS. 10A-28. This can be utilized in conjunction with other activated DSCs of the given electrode grid to collectively enable generation of a capacitive image 232 for the electrode grid, for example, as discussed in conjunction with FIGS. 29-35. A capacitive image 232 generated in a given time frame and/or or across multiple sequential time frames can be processed to generate proximal user interaction data, denoting touches and/or hovering by fingers, hands, pens, other body parts of users or other objects held by users at one or more cross points at a given time, or the respective change and/or motion of these detected body parts and/or objects over time. For example, sense cells with changes in capacitance exceeding a predetermined threshold can denote touch-based and/or touchless user interactions at corresponding locations upon the display. Capacitive images 232 generated in a given time frame and/or or across multiple sequential time frames by different electrode grids can be generated and processed independently for each electrode grid and/or can be collectively processed across the multiple electrode grids to render combined capacitive images 232 denoting changes in capacitance and/or corresponding detected proximal user interaction across the combined set of sense cells of the different electrode grids.

Figure 65M:
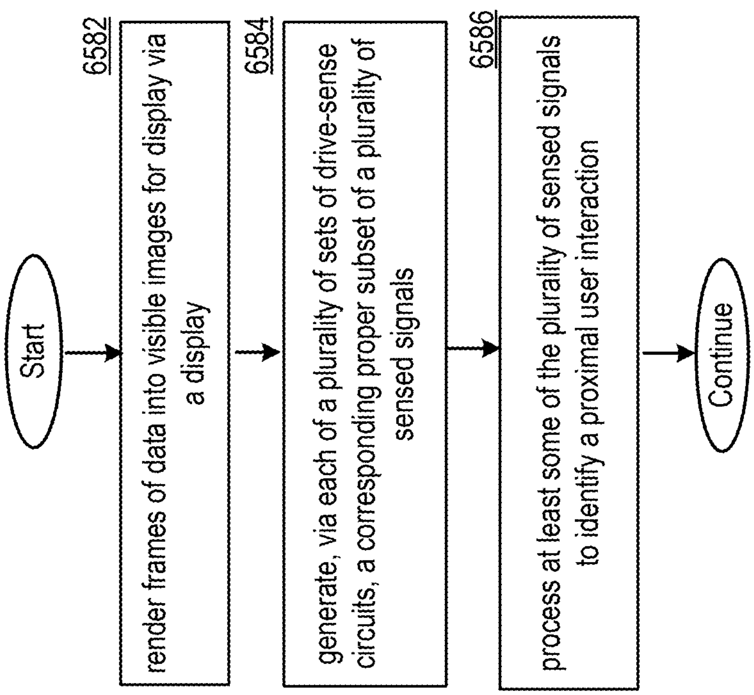
FIG. 65M is a logic diagram of an example method for execution in accordance with various embodiments.

FIG. 65M illustrates a flow diagram of an embodiment of a method in accordance with the present disclosure. In particular a method is presented for execution by and/or for use in conjunction with a plurality of drive-sense circuits 28, a plurality of electrodes 85, touch screen processing module 82, other processing modules 42, touch screen 16, 20, 80, and/or 90, computing device 14 and/or 18, and/or other sensors, processing modules, touch screen displays, and/or computing devices disclosed herein. Some or all steps of FIG. 65M can be performed in conjunction with the embodiments illustrated in and described in conjunction with FIGS. 65A-FIG. 65L. Some or all steps of FIG. 65M can be performed in conjunction with some or all steps of any other methods described herein.

Step 6582 includes render frames of data into visible images for display via a display, such as a display of a touch screen display device or computing device. Step 6584 includes generating, via each of a plurality of sets of drive-sense circuits (DSCs), a corresponding proper subset of a plurality of sensed signals. Step 6586 includes processing at least some of the plurality of sensed signals to identify a proximal user interaction.

In various embodiments, a plurality of sets of electrodes are integrated into the display to facilitate touch sense functionality, for example, based on electrode signals having a drive signal component and a receive signal component. In various embodiments, each set of electrodes of the plurality of sets of electrodes includes a corresponding proper subset of non-neighboring ones of a plurality of row electrodes and a corresponding proper subset of non-neighboring ones of a plurality of column electrodes. In various embodiments, the plurality of row electrodes is separated from the plurality of column electrodes by a dielectric material. In various embodiments, the plurality of row electrodes and the plurality of column electrodes form a plurality of cross points.

In various embodiments, each set of drive-sense circuits of the plurality of sets of drive-sense circuits includes a plurality of drive-sense circuits coupled to electrodes of a corresponding set of electrodes of the plurality of sets of electrodes. In various embodiments, each set of drive-sense circuits is operable to generate a proper subset of a plurality of sensed signals indicating variations in capacitance associated with a proper subset of the plurality of cross points formed by the corresponding set of electrodes.

In various embodiments, a processing module includes at least one memory that stores operational instructions and at least one processing circuit that executes the instructions to receiving the plurality of sensed signals from the plurality of sets of drive-sense circuits; and/or to process the plurality of sensed signals identify a user interaction in proximity to the touch screen display.

In various embodiments, the display has a resolution equal to or greater than full high-definition (HD); has an aspect ratio of a set of aspect ratios; and/or has a screen size equal to or greater than eighteen inches and/or greater than or equal to thirty-two inches.

In various embodiments, each of the electrodes of the plurality of sets of electrodes comprise a transparent conductive trace placed in a layer of the touch screen display, where the transparent conduction trace is constructed of one or more of: Indium Tin Oxide (ITO), Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), or poly(3,4-ethylenedioxythiophene) (PEDOT).

In various embodiments, each of the plurality of drive-sense circuits includes a first conversion circuit and a second conversion circuit. In various embodiments, when a drive-sense circuit of the plurality of drive-sense circuits is enabled to monitor a corresponding electrode of the plurality of electrodes, the first conversion circuit is configured to convert the receive signal component into a sensed signal of the plurality of sensed signals and the second conversion circuit is configured to generate the drive signal component from the sensed signal of the plurality of sensed signals.

In various embodiments, a plurality of proper subsets of the plurality of row electrodes corresponding to the plurality of sets of electrodes each include a first same number of row electrodes. In various embodiments, the plurality of proper subsets of the plurality of row electrodes are mutually exclusive and collectively exhaustive with respect to the plurality of row electrodes. In various embodiments, a plurality of proper subsets of the plurality of column electrodes corresponding to the plurality of sets of electrodes each include a second same number of column electrodes. In various embodiments, the plurality of proper subsets of the plurality of column electrodes are mutually exclusive and collectively exhaustive with respect to the plurality of column electrodes.

In various embodiments, the plurality of row electrodes are physically arranged in accordance with a first linear ordering. In various embodiments, the plurality of column electrodes are physically arranged in accordance with a second linear ordering. In various embodiments, an ordering multiple is equal to a number of sets of electrodes included in the plurality of sets of electrodes. In various embodiments, the plurality of row electrodes are ordered in the first linear ordering based on spacing row electrodes in each given proper subset of the plurality of row electrodes apart by the ordering multiple in the first linear ordering. In various embodiments, the plurality of column electrodes are ordered in the second linear ordering based on spacing column electrodes in each given proper subset of the plurality of column electrodes apart by the ordering multiple in the second linear ordering.

In various embodiments, each set of electrodes of the plurality of sets of electrodes forms a corresponding electrode grid of a set of electrode grids. In various embodiments, each electrode grid is in accordance with a common grid-based uniform row spacing and/or a common grid-based uniform column spacing. In various embodiments, the corresponding proper subset of the plurality of row electrodes belonging to the each set of electrodes form rows of the electrode grid is in accordance with the common grid-based uniform row spacing. In various embodiments, the corresponding proper subset of the plurality of column electrodes belonging to the each set of electrodes form columns of the electrode grid is in accordance with the common grid-based uniform column spacing. In various embodiments, the common grid-based uniform row spacing is equal to the common grid-based uniform column spacing.

In various embodiments, neighboring ones of the plurality of row electrodes are in accordance with a uniform row spacing, and neighboring ones of the plurality of column electrodes are in accordance with another uniform column spacing. In various embodiments, the uniform row spacing and/or the uniform column spacing is a 5 mm spacing. In various embodiments, the common grid-based uniform row spacing is equal to and/or based on a product of the uniform row spacing and the number of sets of electrode grids. In various embodiments, the common grid-based uniform row spacing is equal to and/or based on a product of the uniform column spacing and the number of sets of electrode grids.

In various embodiments, each electrode grid of the set of electrode grids is bounded via a corresponding one of a set of bounding areas projected upon a plane parallel with the display. In various embodiments, each corresponding one of a set of bounding areas is based on ones of the plurality of cross points forming a cross point perimeter of the each electrode grid. In various embodiments, each electrode grid of the set of electrode grids is physically integrated into the display having a location of the corresponding one of the set of bounding areas in accordance with one of a set of different offset locations on the plane. In various embodiments, every one of the set of bounding areas overlaps with all other ones of the set of bounding areas on the plane.

In various embodiments, a plurality of proper subsets of the plurality of sensed signals indicate variations in capacitance associated with a corresponding proper subset of a plurality of proper subsets of the plurality of cross points. In various embodiments, each of the plurality of proper subsets of the plurality of cross points include a same number of cross points. In various embodiments, the plurality of proper subsets of the plurality of cross points are mutually exclusive with respect to the plurality of cross points.

In various embodiments, a set difference between the plurality of cross points and a set union of the plurality of proper subsets of the plurality of cross points is non-null. In various embodiments, a nearest neighboring cross point from any given cross point included in a set union of the plurality of proper subsets of the plurality of cross points is included in a proper subset of the plurality of proper subsets of the plurality of cross points that is different from another proper subset of the plurality of proper subsets that includes the given cross point.

In various embodiments, the nearest neighboring cross point from the any given cross point has a first distance from the any given cross point. In various embodiments, a nearest cross point from the any given cross point that is also in the same proper subset of the plurality of proper subsets of the plurality of cross points with the any given cross points has a second distance from the any given cross point that is greater than the first distance. In various embodiments, a plurality of segments formed by all pairs of cross points separated by the first distance each fall upon one of a set of parallel lines upon a plane parallel with the display. In various embodiments, the set of parallel lines are not parallel with the plurality of row electrodes, and/or the set of parallel lines are not parallel with the plurality of column electrodes.

In various embodiments, all of the sets of drive-sense circuits in the plurality of sets of drive-sense circuits generate corresponding proper subsets of the plurality of sensed signals in a first temporal period. In various embodiments, the proximal user interaction is detected for the first temporal period based on processing the corresponding proper subsets of the plurality of sensed signals generated by all of the sets of drive-sense circuits for the first temporal period.

In various embodiments, a first proper subset of sets of drive-sense circuits in the plurality of sets of drive-sense circuits generate corresponding proper subsets of the plurality of sensed signals in a first temporal period. In various embodiments, the proximal user interaction is detected for the first temporal period based on processing the corresponding proper subsets of the plurality of sensed signals generated by the first proper subset of the plurality of sets of drive-sense circuits for the first temporal period.

In various embodiments, a second proper subset of the set of drive-sense circuits generate corresponding proper subsets of the plurality of sensed signals in a second temporal period after the first temporal period. In various embodiments, the second proper subset of the set of drive-sense circuits and the first proper subset of the set of drive-sense circuits have a non-null set difference. Alternatively or in addition, the second proper subset of the set of drive-sense circuits and the first proper subset of the set of drive-sense circuits are mutually exclusive. Alternatively or in addition, the second proper subset of the set of drive-sense circuits and the first proper subset of the set of drive-sense circuits have a non-null intersection. Alternatively or in addition, the second proper subset of the set of drive-sense circuits and the first proper subset of the set of drive-sense circuits are collectively exhaustive with respect to the plurality of drive-sense circuits.

In various embodiments, the display is configured to render frames of data into visible images in accordance with a frame rate. In various embodiments, the frame rate is equal to a 300 Hz frame rate, or a different frame rate. In various embodiments, a length of the first temporal period is a period corresponding to frame rate. In various embodiments, a plurality of sequentially displayed frames are rendered for display via the display in accordance with the frame rate, where a first frame of data is rendered during the first temporal period, and where a second frame of data is rendered during the second temporal period. In various embodiments, the user interaction is performed and/or detected during the first temporal period while the one frame of data is rendered.

In various embodiments a touch screen display includes the display, the plurality of sets of electrodes, and/or the plurality of sets of drive-sense circuits. For example, the touch screen display performs some or all steps of the method of FIG. 65M, and/or some or all steps of any other method described herein, utilizing the display, the plurality of sets of electrodes, and/or the plurality of sets of drive-sense circuits. In some embodiments, the touch screen display can further include at least one processing module and can performs some or all steps of the method of FIG. 65M, and/or some or all steps of any other method described herein, by utilizing the at least one processing module.

In various embodiments, a touch screen display comprises a display configured to render frames of data into visible images. For example, the touch screen display comprises a video graphics processing module operably coupled to generate the frames of data.

In various embodiments, the touch screen display further comprises a plurality of sets of electrodes integrated into the display to facilitate touch sense functionality based on electrode signals having a drive signal component and a receive signal component. Each set of electrodes of the plurality of sets of electrodes can include a corresponding proper subset of non-neighboring ones of a plurality of row electrodes and a corresponding proper subset of non-neighboring ones of a plurality of column electrodes. The plurality of row electrodes can be separated from the plurality of column electrodes by a dielectric material. The plurality of row electrodes and the plurality of column electrodes can form a plurality of cross points.

In various embodiments, the touch screen display further comprises a plurality of sets of drive-sense circuits. Each set of drive-sense circuits of the plurality of sets of drive-sense circuits can include a plurality of drive-sense circuits coupled to electrodes of a corresponding set of electrodes of the plurality of sets of electrodes. Each set of drive-sense circuits can be operable to generate a proper subset of a plurality of sensed signals indicating variations in capacitance associated with a proper subset of the plurality of cross points formed by the corresponding set of electrodes.

In various embodiments, the touch screen display further comprises a plurality of sets of drive-sense circuits. Each set of drive-sense circuits of the plurality of sets of drive-sense circuits can include a plurality of drive-sense circuits coupled to electrodes of a corresponding set of electrodes of the plurality of sets of electrodes. Each set of drive-sense circuits can be operable to generate a proper subset of a plurality of sensed signals indicating variations in capacitance associated with a proper subset of the plurality of cross points formed by the corresponding set of electrodes.

In various embodiments, the touch screen display further comprises a processing module that includes at least one memory that stores operational instructions and at least one processing circuit that executes the instructions to perform operations. In various embodiments, the operations include receiving the plurality of sensed signals from the plurality of sets of drive-sense circuits and/or processing the plurality of sensed signals identify a user interaction in proximity to the touch screen display. The operations can include and/or can be based on: some or all steps of FIG. 65M, operations of any other processing module described herein, and/or some or all steps of any other method described herein.

In various embodiments, another touch-based device such as a touch panel does not include a display, but includes the plurality of sets of electrodes, the plurality of sets of drive-sense circuits, and/or a processing module. Such a touch-based device can be configured to perform some or all steps of the method of FIG. 65M, for example, where all steps are performed except for the rendering of image data for display. Such a touch-based device can be configured to via some or all various features and/or functionality of the touch screen display described above and/or described in conjunction with FIGS. 65A-65L.

FIGS. 66A-66G present embodiments of a touch screen display having a plurality of interlaced electrode grids 6528, where exactly one of the plurality of interlaced electrode grids is active during some temporal periods, and where more than one of the plurality of interlaced electrode grids are active during other temporal periods. For example, exactly one of the plurality of interlaced electrode grids 6528 is active in accordance with operation under a base sensing mode 6612, while one of the plurality of interlaced electrode grids is active in accordance with operation under an enhanced sensing mode 6614. Some or all features and/or functionality presented in FIGS. 66A-66G can be utilized to implement the electrode grids 6528 of FIG. 65A and/or any other embodiment of a touch screen display described herein.

Figure 66A:
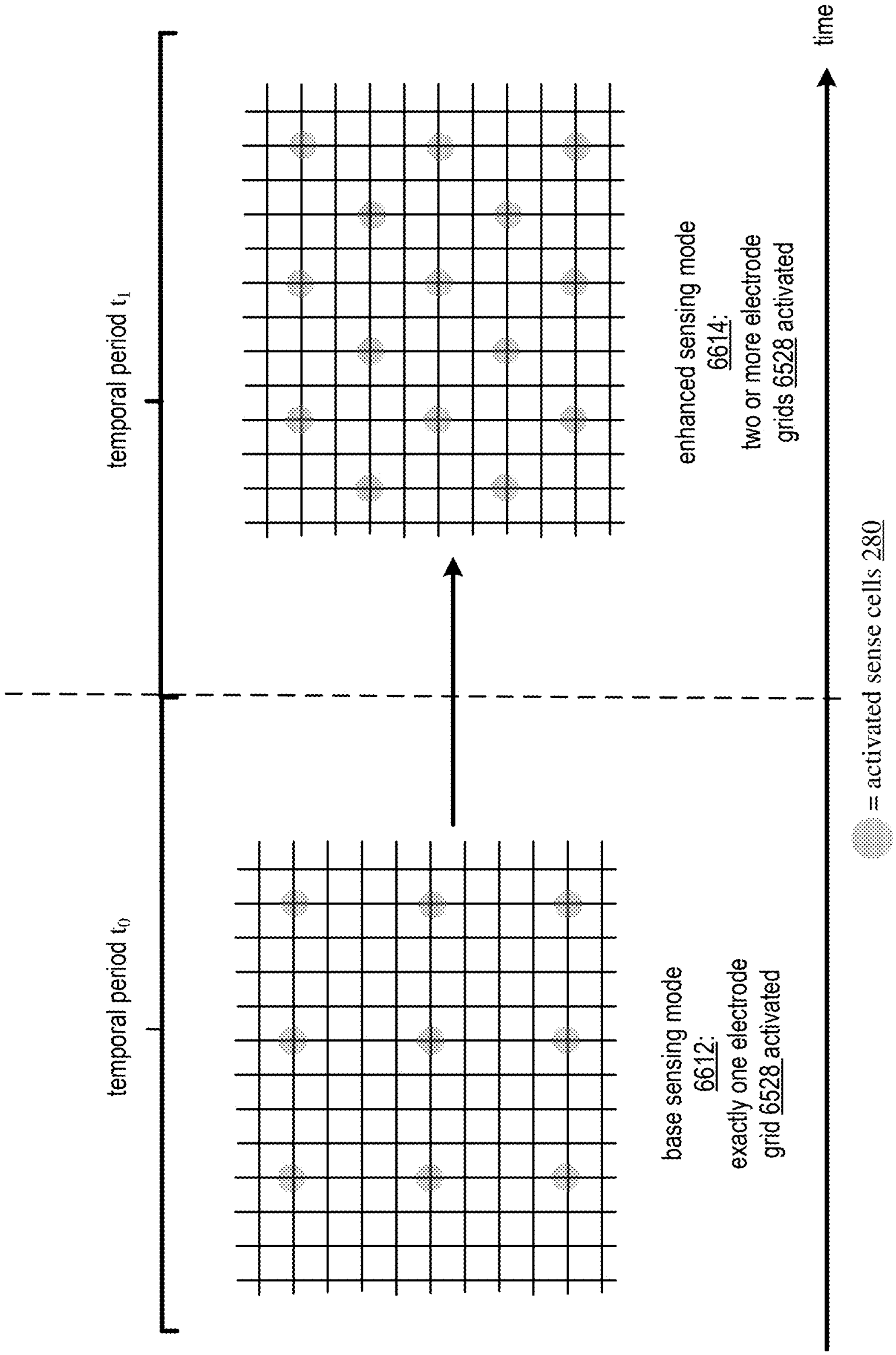
FIG. 66A illustrates transition of operation by a touch screen display from a base sensing mode to an enhanced sensing mode in accordance with various embodiments.

FIG. 66A presents transition from a base sensing mode 6612 in a first temporal period to to an enhanced sensing mode 6614 in a second temporal period $t_1$ that is strictly after and/or immediately after the first temporal period. Some or all features and/or functionality of FIG. 66A can be utilized to implement the electrode grids of FIG. 65A and/or any embodiment of the touch screen display described herein.

During the base sensing mode 6612, exactly one electrode grid is activated, where the sense cells 280 of only one electrode grid are monitored to detect and/or characterize proximal interaction, such as touches to the display and/or hovers proximal to the display by a user. The minimal number of active sense cells can be useful in reducing power consumption and/or processing requirements during the base sensing mode.

During the enhanced sensing mode 6614, two or more electrode grids are activated, where the sense cells 280 of two or more electrode grids are monitored to detect and/or characterize proximal interaction. The resulting increase in sense cells can be useful in providing additional granularity in sensing the location of and/or movement of user interaction.

While not depicted in FIG. 66A, in a later temporal period, such as a temporal period strictly after and/or immediately after temporal period to, the touch screen display can return to the base sensing mode 6612.

The base sensing mode 6612 and/or enhanced sensing mode 6614 can correspond to all possible sensing modes 6515, or a proper subset of a plurality of possible sensing modes 6515. In some embodiments, multiple different base sensing modes 6612 of a plurality of possible sensing modes 6515 enabled at different times can correspond to different single ones of the set of n possible electrode grids being activated. In some embodiments, multiple different enhanced sensing modes 6614 of a plurality of possible sensing modes 6515 enabled at different times can correspond to different possible combinations of two or more ones of the set of n possible electrode grids being activated.

Figure 66B:
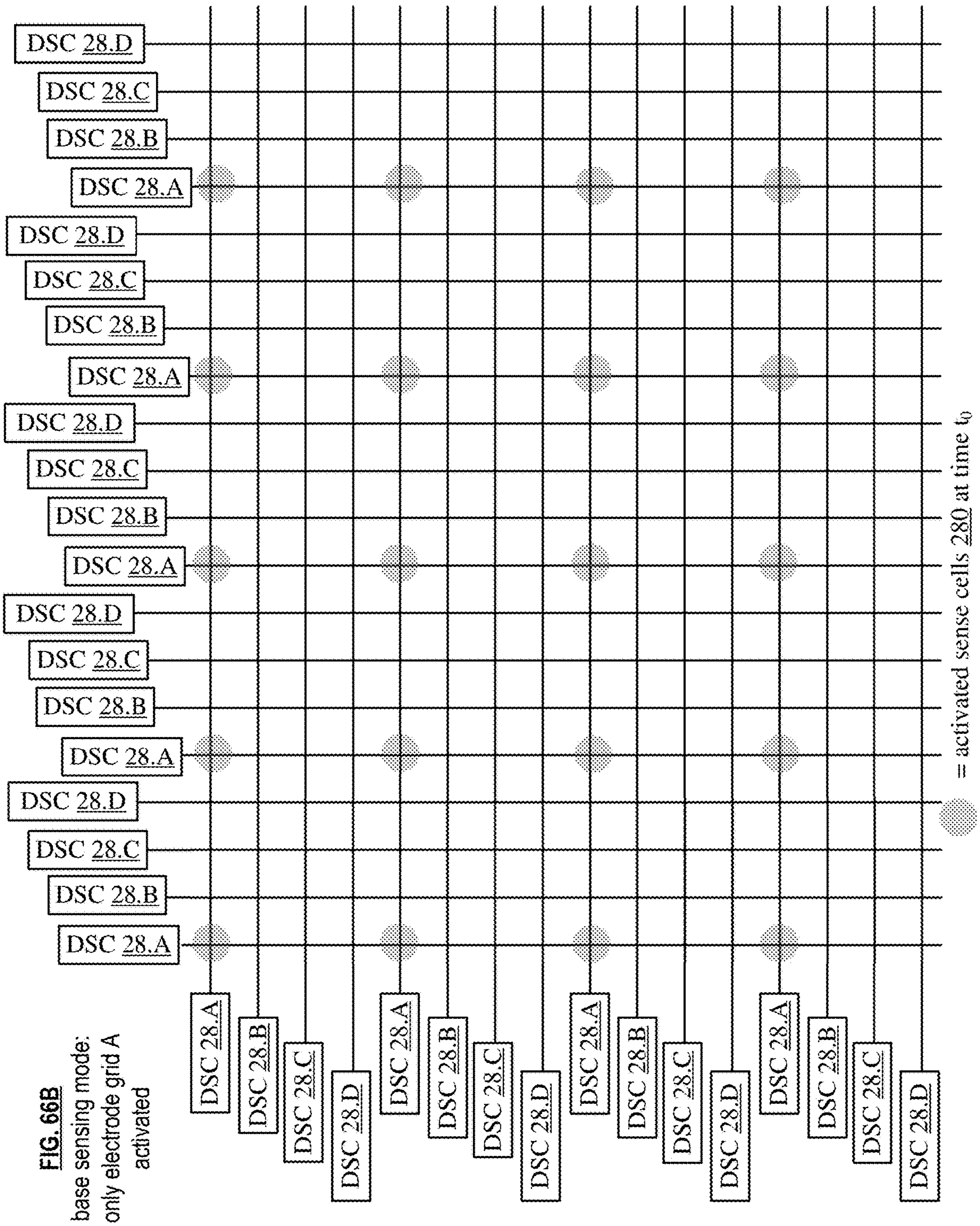
FIG. 66B is a schematic block diagram illustrating an example configuration of activated sense cells of a plurality of electrode grids of a touch screen display operating in a base sensing mode in accordance with various embodiments.

FIG. 66B illustrates an example embodiment of base sensing mode 6612 applied to the example set of interlaced electrode grids of FIG. 65A. In this example, base sensing mode 6612 includes only electrode grid 6528.A being activated. In other embodiments of the same or different base sensing mode 6612, exactly one of the other electrode grids 6528.B-6528.D is activated. Some or all features and/or functionality of the base sensing mode 6612 of FIG. 66B can implement the base sensing mode 6612 of FIG. 66A.

Figure 66C:
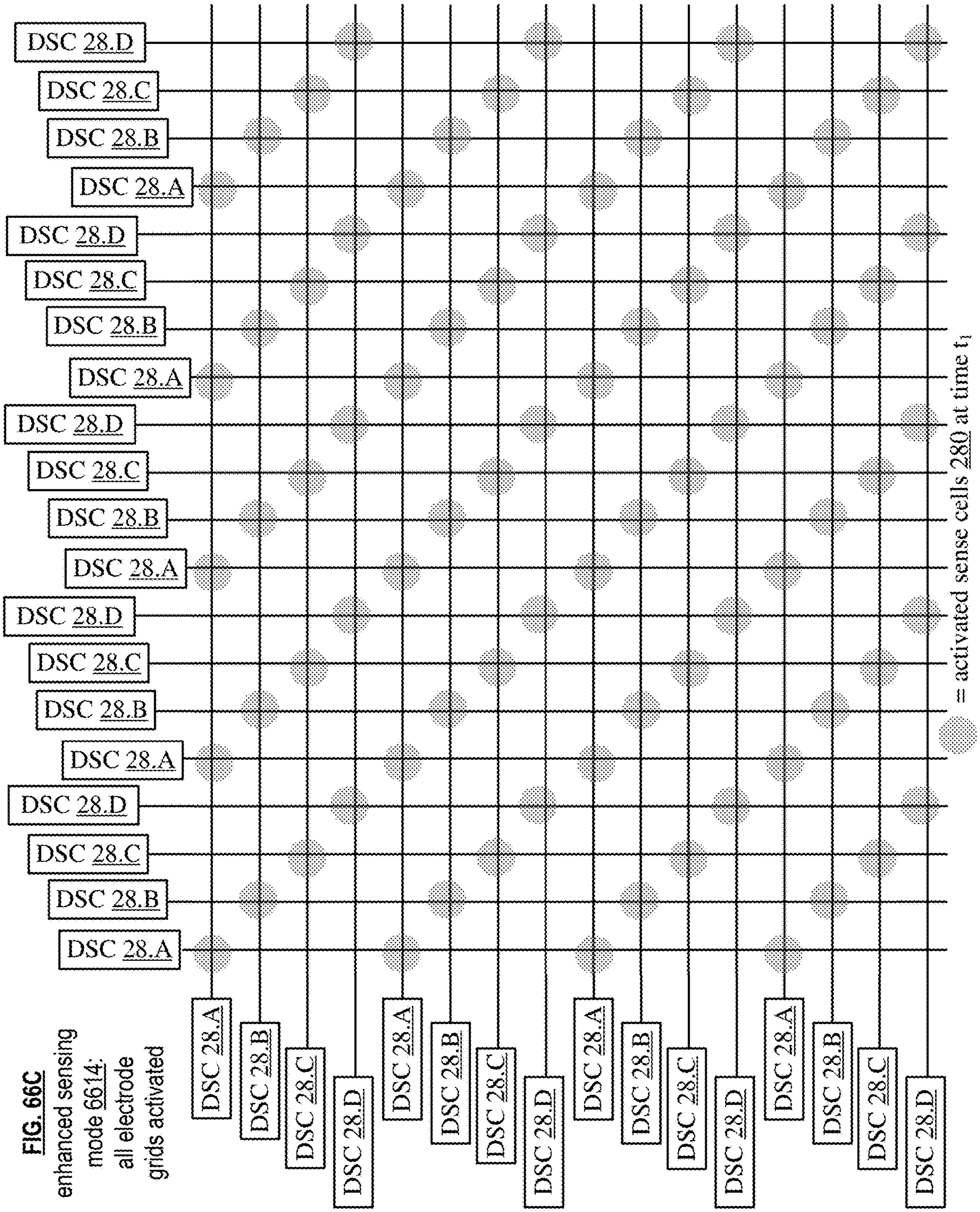
FIGS. 66C-66E is a schematic block diagram illustrating an example configurations of activated sense cells of a plurality of electrode grids of a touch screen display operating in an enhanced sensing mode in accordance with various embodiments.

FIG. 66C illustrates an example embodiment of enhanced sensing mode 6614 applied the example set of interlaced electrode grids of FIG. 65A. In this example, enhanced sensing mode 6614 includes all electrode grids 6528.A-6528.D being activated. For example, the enhanced sensing mode 6614 corresponds to activating all n electrode grids 6528 of the touch screen display. Some or all features and/or functionality of the enhanced sensing mode 6614 of FIG. 66C can implement the enhanced sensing mode 6614 of FIG. 66A.

Figure 66D:
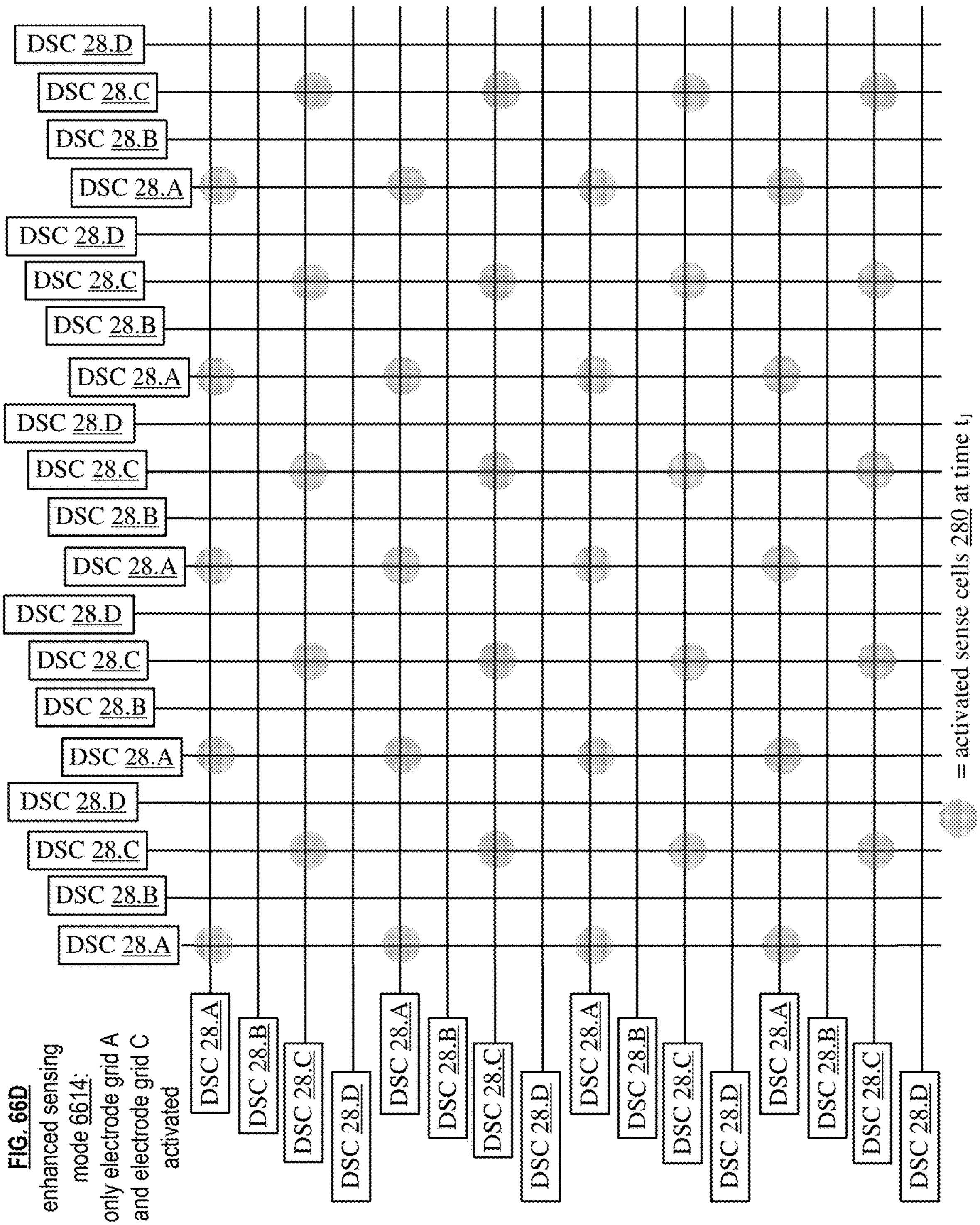

FIG. 66D illustrates another example embodiment of enhanced sensing mode 6614 applied to the example set of interlaced electrode grids of FIG. 65A. In some embodiments, enhanced sensing mode 6614 includes a proper subset of electrode grids 6528.A-6528.D being activated (e.g. the two electrode grids 6528.A and 6528.C in this example), including the electrode grid of the base sensing mode 6612 (e.g. where only electrode grids 6528.A was activated by applying the example base sensing mode 6612 of FIG. 66B). For example, entering the enhanced sensing mode 6614 from the base sensing mode 6612 corresponds to maintaining activation of the electrode grid already active in the base sensing mode 6612, and also activating one or more additional electrode grids 6528 of the touch screen display. Some or all features and/or functionality of the enhanced sensing mode 6614 of FIG. 66D can implement the enhanced sensing mode 6614 of FIG. 66A.

Figure 66E:
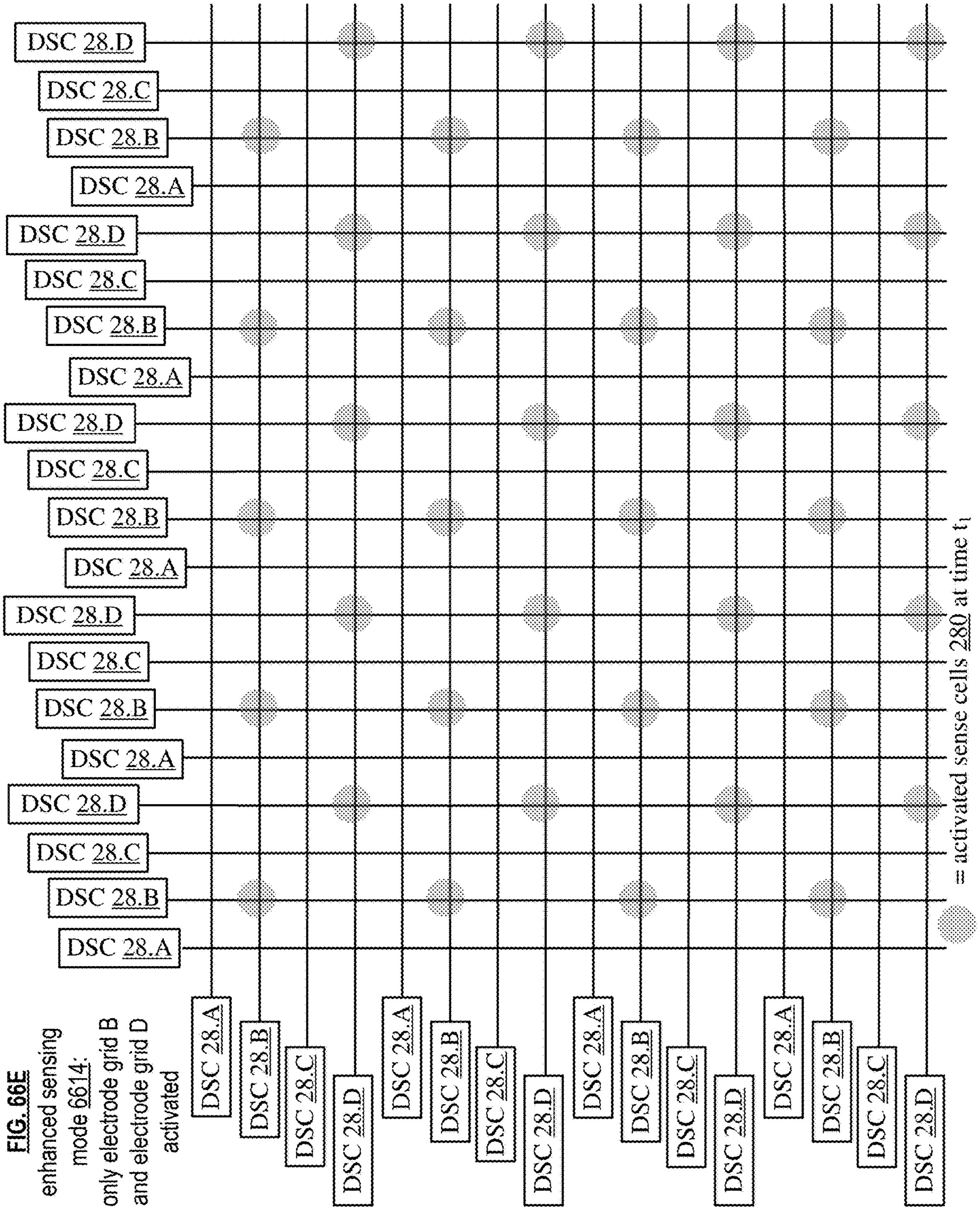

FIG. 66E illustrates another example embodiment of enhanced sensing mode 6614 applied to the example set of interlaced electrode grids of FIG. 65A. In some embodiments, enhanced sensing mode 6614 includes a proper subset of electrode grids 6528.A-6528.D being activated (i.e. the two electrode grids 6528.B and 6528.D in this example), not including the electrode grid of the base sensing mode 6612 (e.g. where only electrode grids 6528.A was activated by applying the example base sensing mode 6612 of FIG. 66B). For example, entering the enhanced sensing mode 6614 from the base sensing mode 6612 corresponds to deactivating the electrode grid that was active in the base sensing mode 6612, and activating two or more other electrode grids 6528 of the touch screen display. Some or all features and/or functionality of the enhanced sensing mode 6614 of FIG. 66E can implement the enhanced sensing mode 6614 of FIG. 66A.

Figure 66F:
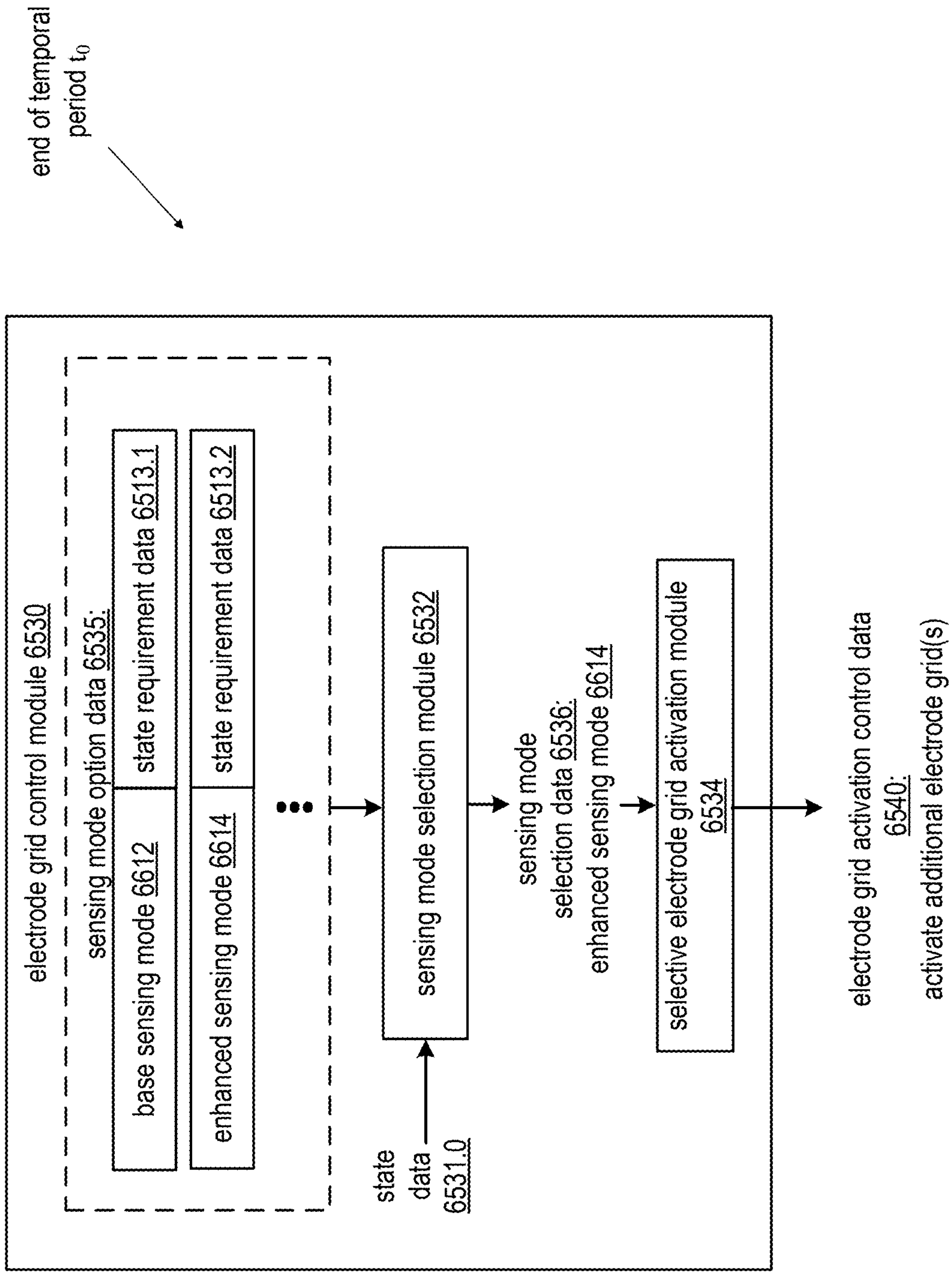
FIGS. 66F-66G are schematic block diagrams of an electrode grid control module in accordance with various embodiments.

FIG. 66F illustrates an embodiments where an electrode grid control module 6530 is implemented to facilitate and enabling the enhanced sensing mode 6614 in temporal period $t_1$. Some or all features and/or functionality of the electrode grid control module of FIG. 66F can implement the changing from the base sensing mode 6612 in temporal period $t_0$ to the enhanced sensing mode 6614 in temporal period $t_1$ of FIG. 66A. Some or all features and/or functionality of the electrode grid control module 6530 of 66F can implement the electrode grid control module 6530 of FIG. 65K and/or FIG. 65L, and/or any other embodiment of the electrode grid control module 6530 and/or touch screen display described herein.

As illustrated in FIG. 66F, state data 6531.0, corresponding to a determined state during temporal period $t_0$, is processed by sensing mode selection module 6532 to render transition from the base sensing mode 6612 to the enhanced sensing mode 6614, for example, based on the state data 6531.0 comparing favorably to the state requirement data 6513.2.

Figure 66G:
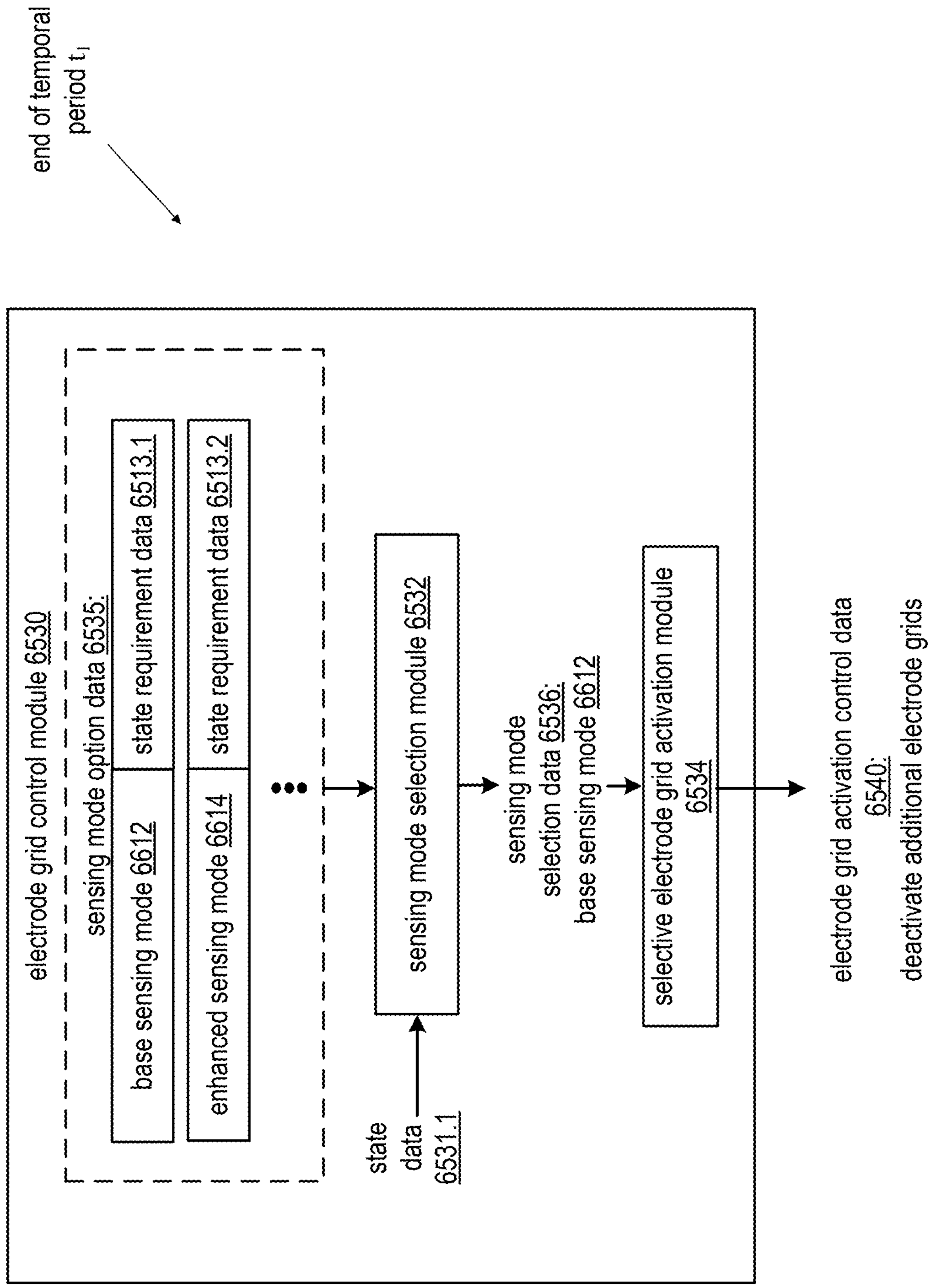

FIG. 66G illustrates an embodiments where the electrode grid control module 6530 further facilitates a return to the base sensing mode 6612 after temporal period $t_1$. Some or all features and/or functionality of the electrode grid control module of FIG. 66G can implement the electrode grid control module 6530 of FIG. 65K and/or FIG. 65L, and/or any other embodiment of the electrode grid control module 6530 and/or touch screen display described herein.

As illustrated in FIG. 66G, state data 6531.1, corresponding to a determined state during temporal period $t_1$, is processed by sensing mode selection module 6532 to render transition from the enhanced sensing mode 6614 to the base sensing mode 6612, for example, based on the state data 6531.1 comparing favorably to the state requirement data 6513.1.

In some embodiments, the state requirement data 6513.2 requires detection of a proximal user interaction and/or a particular type of proximal user interaction, where the transition to the enhanced sensing mode 6614 is based on the state data 6531.0 denoting that a proximal user interaction was detected in one or more capacitive images detected in temporal period to via the single active electrode grid of while operating in the base sensing mode 6612. In such embodiments, the state requirement data 6513.1 can require no detection of a proximal user interaction for at least a threshold amount of time, where the transition to the enhanced sensing mode 6614 is based on the state data 6531.0 denoting that a proximal user interaction was not detected in capacitive images detected in temporal period $t_1$ via the two or more active electrode grids while operating in the enhanced sensing mode 6614 for at least the threshold amount of time.

Such embodiments can be ideal in implementing the base sensing mode 6612 to simply scan for touches and/or other interaction via minimal processing resources. Once interaction is detected, the sensing is enhanced via additional electrode grids to ensure the interactions are localized, tracked, and/or otherwise characterized appropriately via an enhanced level of granularity. In other embodiments, the state requirement data 6513.1 and/or 6513.2 is based on a type of graphical image data being displayed, threshold processing and/or power consumption requirements, and/or other parameters.

Figure 66H:
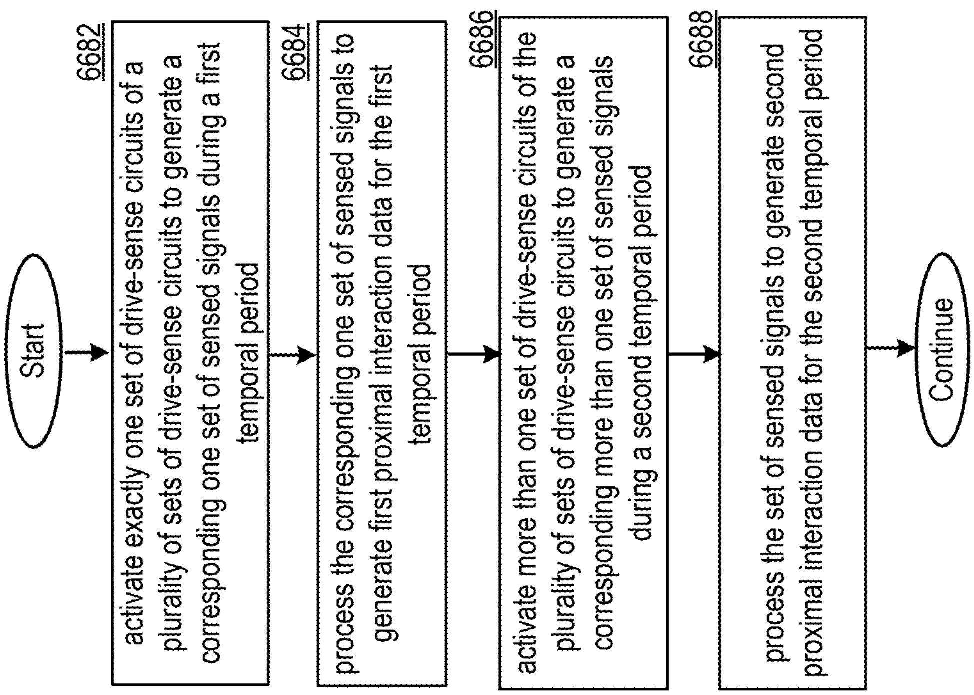
FIG. 66H is a logic diagram of an example method for execution in accordance with various embodiments.

FIG. 66H illustrates a flow diagram of an embodiment of a method in accordance with the present disclosure. In particular a method is presented for execution by and/or for use in conjunction with a plurality of drive-sense circuits 28, a plurality of electrodes 85, touch screen processing module 82, other processing modules 42, touch screen 16, 20, 80, and/or 90, computing device 14 and/or 18, and/or other sensors, processing modules, touch screen displays, and/or computing devices disclosed herein. Some or all steps of FIG. 66H can be performed in conjunction with the embodiments illustrated in and described in conjunction with FIGS. 66A-FIG. 66G. Some or all steps of FIG. 66H can be performed in conjunction with some or all steps of FIG. 65M any other methods described herein.

Step 6682 includes activating exactly one set of drive-sense circuits of a plurality of sets of drive-sense circuits to generate a corresponding one set of sensed signals during a first temporal period. Step 6684 includes processing the corresponding one set of sensed signals to generate first proximal interaction data for the first temporal period. Step 6686 includes activating more than one set of drive-sense circuits of the plurality of sets of drive-sense circuits to generate a corresponding more than one set of sensed signals during a second temporal period. Step 6688 includes processing the set of sensed signals to generate second proximal interaction data for the second temporal period.

In various embodiments, a touch screen display includes the plurality of sets of drive-sense circuits. For example, the touch screen display performs some or all steps of the method of FIG. 66H, and/or some or all steps of any other method described herein, utilizing the plurality of sets of drive-sense circuits.

In various embodiments, the same or different touch screen display comprises a display configured to render frames of data into visible images. For example, the touch screen display comprises a video graphics processing module operably coupled to generate the frames of data.

In various embodiments, the touch screen display further comprises a plurality of sets of electrodes integrated into the display to facilitate touch sense functionality based on electrode signals having a drive signal component and a receive signal component. Each set of electrodes of the plurality of sets of electrodes can include a corresponding proper subset of non-neighboring ones of a plurality of row electrodes and a corresponding proper subset of non-neighboring ones of a plurality of column electrodes. The plurality of row electrodes can be separated from the plurality of column electrodes by a dielectric material. The plurality of row electrodes and the plurality of column electrodes can form a plurality of cross points.

In various embodiments, the touch screen display further comprises a plurality of sets of drive-sense circuits. Each set of drive-sense circuits of the plurality of sets of drive-sense circuits can include a plurality of drive-sense circuits coupled to electrodes of a corresponding set of electrodes of the plurality of sets of electrodes. Each set of drive-sense circuits can be operable to generate a proper subset of a plurality of sensed signals indicating variations in capacitance associated with a proper subset of the plurality of cross points formed by the corresponding set of electrodes.

In various embodiments, the touch screen display further comprises a processing module that includes at least one memory that stores operational instructions and at least one processing circuit that executes the instructions to perform operations. In various embodiments, the operations include operating in a first mode during a first temporal period, and operating in a second mode during a second temporal period after the first temporal period. The operations can include and/or can be based on: some or all steps of FIG. 66H, operations of any other processing module described herein, and/or some or all steps of any other method described herein.

Operating in the first mode during the first temporal period can include: activating exactly one set of drive-sense circuits of the plurality of sets of drive-sense circuits to generate a corresponding one set of sensed signals during the first temporal period; receiving the corresponding one set of sensed signals from the exactly one set of drive-sense circuits during the first temporal period; and/or processing the corresponding one set of sensed signals to generate first proximal interaction data for the first temporal period.

Operating in the second mode during a second temporal period after the first temporal period can include: activating more than one set of drive-sense circuits of the plurality of sets of drive-sense circuits to generate a corresponding more than one set of sensed signals during the second temporal period; receiving the corresponding more than one set of sensed signals from the more than one set of drive-sense circuits during the second temporal period; and/or processing the set of sensed signals to generate second proximal interaction data for the second temporal period.

In various embodiments, the display has a resolution equal to or greater than full high-definition (HD); has an aspect ratio of a set of aspect ratios; and/or has a screen size equal to or greater than eighteen inches and/or greater than or equal to thirty-two inches.

In various embodiments, each of the electrodes of the plurality of sets of electrodes comprise a transparent conductive trace placed in a layer of the touch screen display, where the transparent conduction trace is constructed of one or more of: Indium Tin Oxide (ITO), Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), or poly(3,4-ethylenedioxythiophene) (PEDOT).

In various embodiments, each of the plurality of drive-sense circuits includes a first conversion circuit and a second conversion circuit. In various embodiments, when the exactly one set of drive-sense circuits of the plurality of drive-sense circuits is enabled to monitor a corresponding electrode of the plurality of electrodes based on being activated, each first conversion circuit of each drive-sense circuit of the exactly one set of drive-sense circuits is configured to convert the receive signal component into a sensed signal of the set of sensed signals and each second conversion circuit of each drive-sense circuit of the exactly one set of drive-sense circuits is configured to generate the drive signal component from the sensed signal of the set of sensed signals.

In various embodiments, a plurality of proper subsets of the plurality of row electrodes corresponding to the plurality of sets of electrodes each include a first same number of row electrodes. In various embodiments, the plurality of proper subsets of the plurality of row electrodes are mutually exclusive and collectively exhaustive with respect to the plurality of row electrodes. In various embodiments, a plurality of proper subsets of the plurality of column electrodes corresponding to the plurality of sets of electrodes each include a second same number of column electrodes. In various embodiments, the plurality of proper subsets of the plurality of column electrodes are mutually exclusive and collectively exhaustive with respect to the plurality of column electrodes.

In various embodiments, the plurality of row electrodes are physically arranged in accordance with a first linear ordering. In various embodiments, the plurality of column electrodes are physically arranged in accordance with a second linear ordering. In various embodiments, an ordering multiple is equal to a number of sets of electrodes included in the plurality of sets of electrodes. In various embodiments, the plurality of row electrodes are ordered in the first linear ordering based on spacing row electrodes in each given proper subset of the plurality of row electrodes apart by the ordering multiple in the first linear ordering. In various embodiments, the plurality of column electrodes are ordered in the second linear ordering based on spacing column electrodes in each given proper subset of the plurality of column electrodes apart by the ordering multiple in the second linear ordering.

In various embodiments, each set of electrodes of the plurality of sets of electrodes forms a corresponding electrode grid of a set of electrode grids. In various embodiments, each electrode grid is in accordance with a common uniform row spacing and/or a common uniform column spacing. In various embodiments, the corresponding proper subset of the plurality of row electrodes belonging to the each set of electrodes form rows of the electrode grid is in accordance with the common uniform row spacing. In various embodiments, the corresponding proper subset of the plurality of column electrodes belonging to the each set of electrodes form columns of the electrode grid is in accordance with the common uniform column spacing. In various embodiments, the common uniform row spacing is equal to the common uniform column spacing.

In various embodiments, each electrode grid of the set of electrode grids is bounded via a corresponding one of a set of bounding areas projected upon a plane parallel with the display. In various embodiments, each corresponding one of a set of bounding areas is based on ones of the plurality of cross points forming a cross point perimeter of the each electrode grid. In various embodiments, each electrode grid of the set of electrode grids is physically integrated into the display having a location of the corresponding one of the set of bounding areas in accordance with one of a set of different offset locations on the plane. In various embodiments, every one of the set of bounding areas overlaps with all other ones of the set of bounding areas on the plane.

In various embodiments, a plurality of proper subsets of the plurality of sensed signals indicate variations in capacitance associated with a corresponding proper subset of a plurality of proper subsets of the plurality of cross points. In various embodiments, each of the plurality of proper subsets of the plurality of cross points include a same number of cross points. In various embodiments, the plurality of proper subsets of the plurality of cross points are mutually exclusive with respect to the plurality of cross points.

In various embodiments, a set difference between the plurality of cross points and a set union of the plurality of proper subsets of the plurality of cross points is non-null. In various embodiments, a nearest neighboring cross point from any given cross point included in a set union of the plurality of proper subsets of the plurality of cross points is included in a proper subset of the plurality of proper subsets of the plurality of cross points that is different from another proper subset of the plurality of proper subsets that includes the given cross point.

In various embodiments, the nearest neighboring cross point from the any given cross point has a first distance from the any given cross point. In various embodiments, a nearest cross point from the any given cross point that is also in the same proper subset of the plurality of proper subsets of the plurality of cross points with the any given cross points has a second distance from the any given cross point that is greater than the first distance. In various embodiments, a plurality of segments formed by all pairs of cross points separated by the first distance each fall upon one of a set of parallel lines upon a plane parallel with the display. In various embodiments, the set of parallel lines are not parallel with the plurality of row electrodes, and/or the set of parallel lines are not parallel with the plurality of column electrodes.

In various embodiments, only the exactly one set of drive-sense circuits of the plurality of sets of drive-sense circuits is activated to generate the corresponding set of sensed signals for a first temporal period. In various embodiments, every other set of drive-sense circuits of the plurality of sets of drive-sense circuits are activated to generate other corresponding sets of sensed signals for other temporal periods distinct from the first temporal period.

In various embodiments, the operations further include determining to activate only the exactly one set of drive-sense circuits based on determining to minimize the number of active drive-sense circuits based on at least one of: a resource efficiency requirement; or detecting an unfavorable health of at least one resource.

In various embodiments, the operations further include determining to change activation from the exactly one set of drive-sense circuits to the more than one set of drive-sense circuits based on determining to increase the number of drive-sense circuits in response to detecting a sensor increase triggering event. In various embodiments, the processing module operates in the first mode until the sensor increase triggering event is detected. In various embodiments, the sensor increase triggering event is detection of a user interaction by a user in proximity to the touch screen display in the first proximal interaction data.

In various embodiments, the first proximal interaction data includes a plurality of capacitance variation data generated for a corresponding plurality of sequential time frames in the first temporal period, where the processing module processing module operates in the first mode for the plurality of sequential time frames based on capacitance variation data for all but a most recent one of the sequential time frames indicating detection of no user interaction by any user in proximity to the touch screen display. In various embodiments, the sensor increase triggering event is detected based on the most recent one of the sequential time frames indicates the detection of the user interaction by the user in proximity to the touch screen display.

In various embodiments, the processing module operates in the first mode based on not identifying any user interaction in a temporal period prior to the first temporal period.

In various embodiments, the touch screen display is implemented via some or all features and/or functionality of any other embodiment of the touch screen display described herein.

In various embodiments, another touch-based device such as a touch panel does not include a display, but includes the plurality of sets of electrodes, the plurality of sets of drive-sense circuits, and/or the processing module. Such a touch-based device can be configured to perform some or all steps of the method of FIG. 66H and/or can be configured via some or all various features and/or functionality of the touch screen display described above and/or described in conjunction with FIGS. 66A-66G.

Figure 67A:
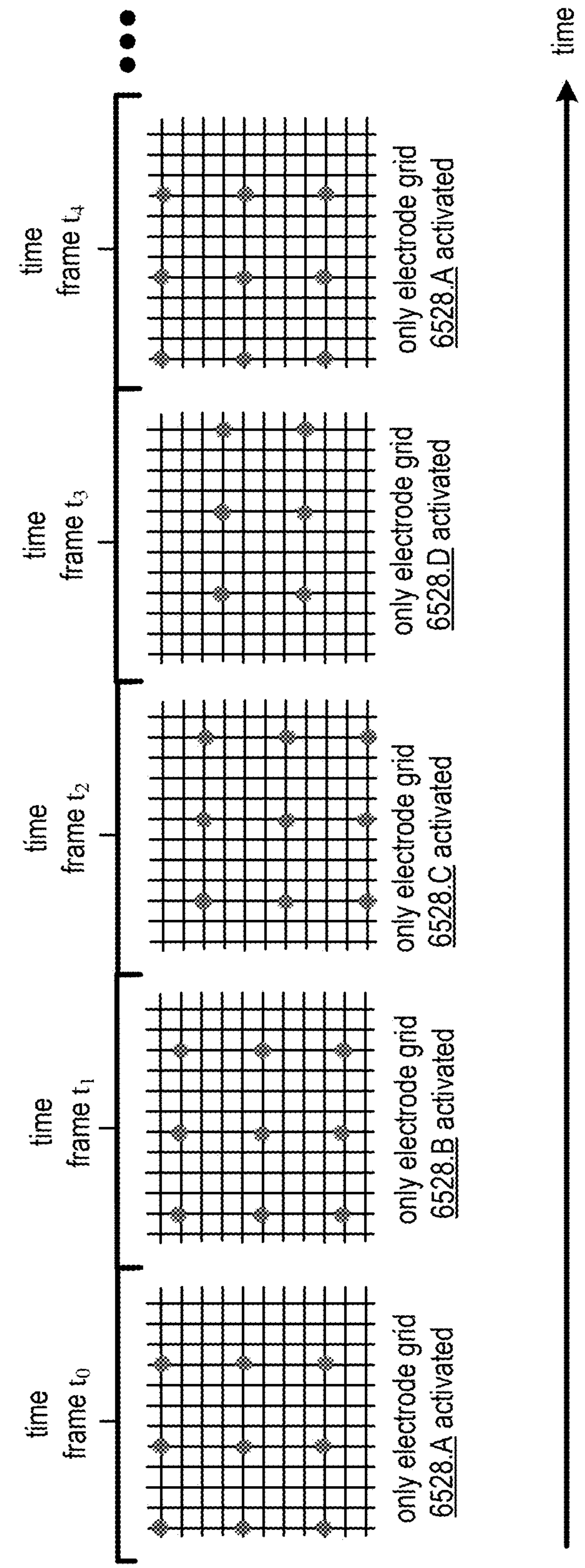
FIG. 67A illustrates transition of operation by a touch screen display between activation of different electrode grids over time in accordance with various embodiments.

FIG. 67A presents an embodiment of a touch screen display having a plurality of interlaced electrode grids 6528. In particular exactly one of the plurality of interlaced electrode grids is active during each of a set of consecutive time frames, where the given one of the plurality of interlaced electrode grids that is active during a given time frame changes from the previous time frame. Some or all features and/or functionality presented in FIGS. 67A-67B can be utilized to implement the electrode grids 6528 of FIG. 65A and/or any other embodiment of a touch screen display described herein.

The activation of different electrode grids can be in accordance with a turn-based ordering. For example, in the example of FIG. 67A, a predetermined ordering of all electrode grids is applied as 6528.A, 6528.B, 6528.C, and 6528.D. Thus, 6528.A is activated in time frame $t_0$; electrode grid 6528.B is activated next in time frame $t_1$; electrode grid 6528.C is activated next in time frame $t_2$; and electrode grid 6528.D is activated next in time frame $t_3$. The process repeats starting in time frame $t_4$. In other embodiments, another non-cyclical ordering and/or a random selection of the activated electrode grid is applied to select the electrode grid for activation in each time frame.

The time frames can each be of equal length and can optionally correspond to a frame rate of the touch screen display. For example, exactly one electrode grid is active during each given frame, and the activated electrode grid changes for each given frame. This can be useful in ensuring all possible sense cells are monitored within a short time period, when the frame rate is sufficiently fast and/or when the number of electrode grids n is sufficiently small.

Figure 67B:
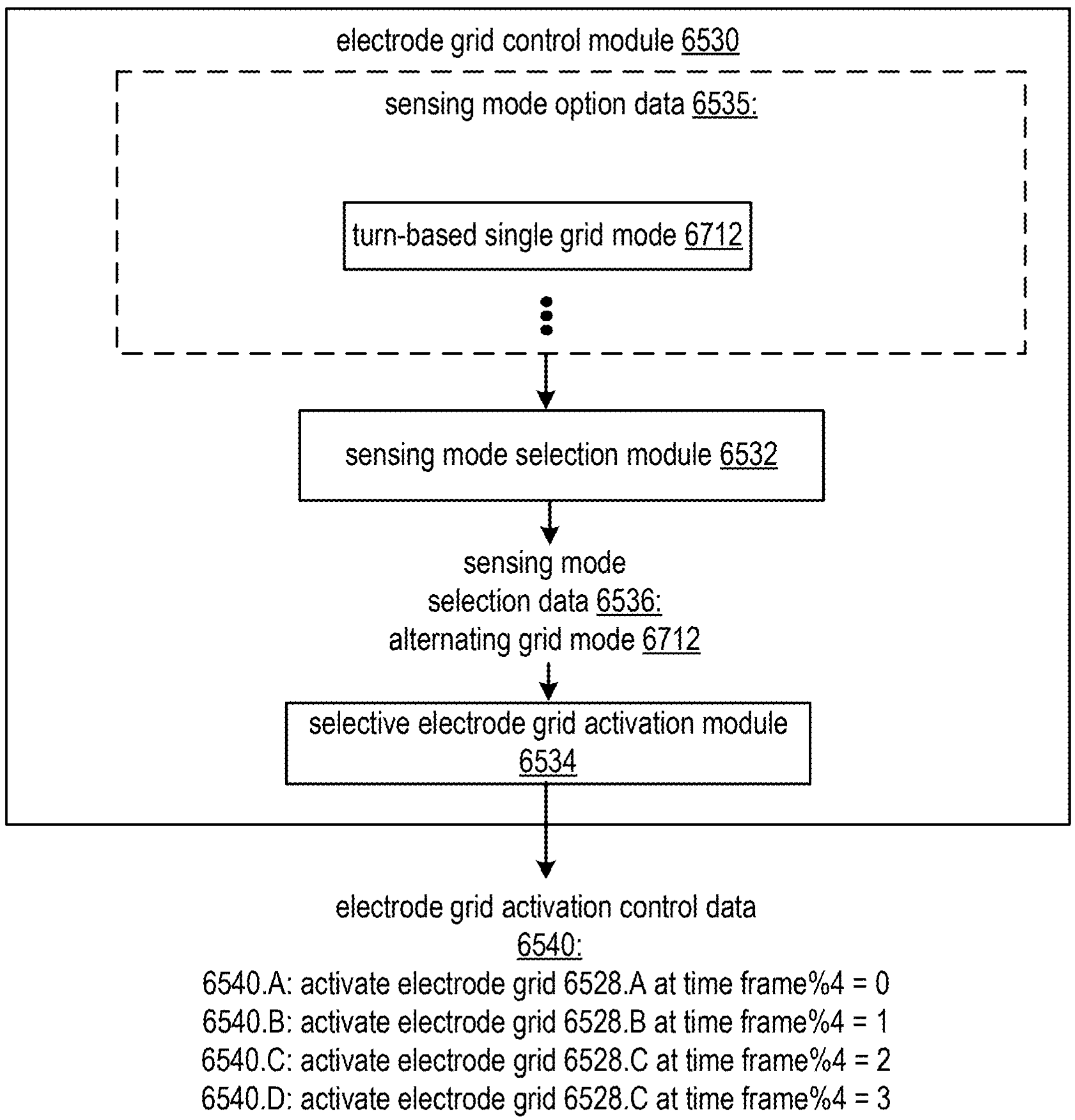
FIG. 67B is a schematic block diagram of an electrode grid control module in accordance with various embodiments.

FIG. 67B illustrates an embodiments where an electrode grid control module 6530 further facilitates selection of an operation under a turn-based single grid mode 6712. For example, enabling of the turn-based single grid mode 6712 via the electrode grid control module 6530 of FIG. 67B renders the turn-based activation of the electrode grids across the plurality of consecutive time frames as illustrated in FIG. 67A. Some or all features and/or functionality of the electrode grid control module of FIG. 67B can implement the electrode grid control module 6530 of FIG. 65K and/or FIG. 65L, and/or any other embodiment of the electrode grid control module 6530 and/or touch screen display described herein.

The turn-based single grid mode 6712 can correspond to some or all possible sensing modes 6515. While not depicted, the electrode grid control module 6530 can enter into and/or exit from the turn-based single grid mode 6712 based on state data 6531 meeting corresponding state requirement data 6513 for the turn-based single grid mode 6712.

In some embodiments, operation under the turn-based single grid mode 6712 of FIGS. 67A and 67B implements the base sensing mode 6612 of FIGS. 66A-66H. In particular, rather than the same exactly one electrode grid 6528 remaining activated across the entire temporal period to, the active electrode grid 6528 changes, for example, in turn across all possible electrode grids in a plurality of consecutive time frames within the temporal period $t_0$. This can enhance the level of sense cell coverage while only requiring processing resources to enable a single electrode grid to be active at a time. In some embodiments, enhanced sensing mode 6614 of FIGS. 66A-66H can similarly rotate across different possible combinations of two or more electrode grids across a plurality of time frames in a corresponding temporal period $t_1$.

Figure 67C:
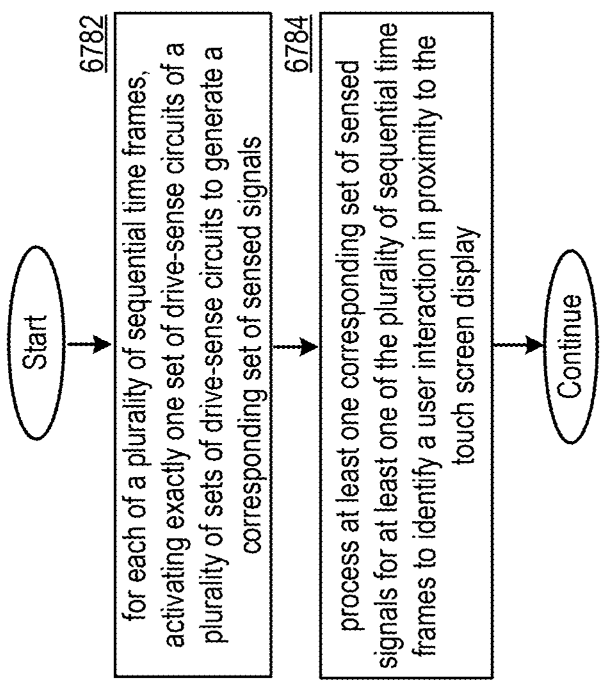
FIG. 67C is a logic diagram of an example method for execution in accordance with various embodiments.

FIG. 67C illustrates a flow diagram of an embodiment of a method in accordance with the present disclosure. In particular a method is presented for execution by and/or for use in conjunction with a plurality of drive-sense circuits 28, a plurality of electrodes 85, touch screen processing module 82, other processing modules 42, touch screen 16, 20, 80, and/or 90, computing device 14 and/or 18, and/or other sensors, processing modules, touch screen displays, and/or computing devices disclosed herein. Some or all steps of FIG. 67C can be performed in conjunction with the embodiments illustrated in and described in conjunction with FIGS. 67A-FIG. 67B. Some or all steps of FIG. 67C can be performed in conjunction with some or all steps of FIG. 65M, FIG. 66H, and/or any other methods described herein.

Step 6782 includes activating exactly one set of drive-sense circuits of a plurality of sets of drive-sense circuits to generate a corresponding set of sensed signals for each of a plurality of sequential time frames. Step 6784 includes processing at least one corresponding set of sensed signals for at least one of the plurality of sequential time frames to identify a user interaction in proximity to the touch screen display.

In various embodiments, a touch screen display includes the plurality of sets of drive-sense circuits. For example, the touch screen display performs some or all steps of the method of FIG. 67C, and/or some or all steps of any other method described herein, utilizing the plurality of sets of drive-sense circuits.

In various embodiments, the same or different touch screen display includes a display configured to render frames of data into visible images. For example, the touch screen display comprises a video graphics processing module operably coupled to generate the frames of data.

In various embodiments, the touch screen display includes a plurality of sets of electrodes integrated into the display to facilitate touch sense functionality based on electrode signals having a drive signal component and a receive signal component. Each set of electrodes of the plurality of sets of electrodes can includes a corresponding proper subset of non-neighboring ones of a plurality of row electrodes and a corresponding proper subset of non-neighboring ones of a plurality of column electrodes. The plurality of row electrodes can be separated from each the plurality of column electrodes by a dielectric material. The plurality of row electrodes and the plurality of column electrodes can form a plurality of cross points.

In various embodiments, the touch screen display includes a plurality of sets of drive-sense circuits. Each set of drive-sense circuits of the plurality of sets of drive-sense circuits can include a plurality of drive-sense circuits coupled to electrodes of a corresponding set of electrodes of the plurality of sets of electrodes. Each set of drive-sense circuits can be operable to generate a set of sensed signals indicating variations in capacitance associated with a proper subset of the plurality of cross points formed by the corresponding set of electrodes.

In various embodiments, the touch screen display includes a processing module that includes at least one memory that stores operational instructions and at least one processing circuit that executes the instructions to perform operations. The operations can include, for each of a plurality of sequential time frames, activating exactly one set of drive-sense circuits of the plurality of sets of drive-sense circuits to generate a corresponding set of sensed signals. The operations can further include, for each of the plurality of sequential time frames, receiving the corresponding set of sensed signals from the exactly one set of drive-sense circuits. The operations can further include processing at least one corresponding set of sensed signals for at least one of the plurality of sequential time frames to identify a user interaction in proximity to the touch screen display. The operations can include and/or can be based on: some or all steps of FIG. 67C, operations of any other processing module described herein, and/or some or all steps of any other method described herein.

In various embodiments, the display has a resolution equal to or greater than full high-definition (HD); has an aspect ratio of a set of aspect ratios; and/or has a screen size equal to or greater than eighteen inches and/or greater than or equal to thirty-two inches.

In various embodiments, each of the electrodes of the plurality of sets of electrodes comprise a transparent conductive trace placed in a layer of the touch screen display, where the transparent conduction trace is constructed of one or more of: Indium Tin Oxide (ITO), Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), or poly(3,4-ethylenedioxythiophene) (PEDOT).

In various embodiments, each of the plurality of drive-sense circuits includes a first conversion circuit and a second conversion circuit. In various embodiments, when the exactly one set of drive-sense circuits of the plurality of drive-sense circuits is enabled to monitor a corresponding electrode of the plurality of electrodes based on being activated, each first conversion circuit of each drive-sense circuit of the exactly one set of drive-sense circuits is configured to convert the receive signal component into a sensed signal of the set of sensed signals and each second conversion circuit of each drive-sense circuit of the exactly one set of drive-sense circuits is configured to generate the drive signal component from the sensed signal of the set of sensed signals.

In various embodiments, a plurality of proper subsets of the plurality of row electrodes corresponding to the plurality of sets of electrodes each include a first same number of row electrodes. In various embodiments, the plurality of proper subsets of the plurality of row electrodes are mutually exclusive and collectively exhaustive with respect to the plurality of row electrodes. In various embodiments, a plurality of proper subsets of the plurality of column electrodes corresponding to the plurality of sets of electrodes each include a second same number of column electrodes. In various embodiments, the plurality of proper subsets of the plurality of column electrodes are mutually exclusive and collectively exhaustive with respect to the plurality of column electrodes.

In various embodiments, the plurality of row electrodes are physically arranged in accordance with a first linear ordering. In various embodiments, the plurality of column electrodes are physically arranged in accordance with a second linear ordering. In various embodiments, an ordering multiple is equal to a number of sets of electrodes included in the plurality of sets of electrodes. In various embodiments, the plurality of row electrodes are ordered in the first linear ordering based on spacing row electrodes in each given proper subset of the plurality of row electrodes apart by the ordering multiple in the first linear ordering. In various embodiments, the plurality of column electrodes are ordered in the second linear ordering based on spacing column electrodes in each given proper subset of the plurality of column electrodes apart by the ordering multiple in the second linear ordering.

In various embodiments, each set of electrodes of the plurality of sets of electrodes forms a corresponding electrode grid of a set of electrode grids. In various embodiments, each electrode grid is in accordance with a common uniform row spacing and/or a common uniform column spacing. In various embodiments, the corresponding proper subset of the plurality of row electrodes belonging to the each set of electrodes form rows of the electrode grid is in accordance with the common uniform row spacing. In various embodiments, the corresponding proper subset of the plurality of column electrodes belonging to the each set of electrodes form columns of the electrode grid is in accordance with the common uniform column spacing. In various embodiments, the common uniform row spacing is equal to the common uniform column spacing.

In various embodiments, each electrode grid of the set of electrode grids is bounded via a corresponding one of a set of bounding areas projected upon a plane parallel with the display. In various embodiments, each corresponding one of a set of bounding areas is based on ones of the plurality of cross points forming a cross point perimeter of the each electrode grid. In various embodiments, each electrode grid of the set of electrode grids is physically integrated into the display having a location of the corresponding one of the set of bounding areas in accordance with one of a set of different offset locations on the plane. In various embodiments, every one of the set of bounding areas overlaps with all other ones of the set of bounding areas on the plane.

In various embodiments, a plurality of proper subsets of the plurality of sensed signals indicate variations in capacitance associated with a corresponding proper subset of a plurality of proper subsets of the plurality of cross points. In various embodiments, each of the plurality of proper subsets of the plurality of cross points include a same number of cross points. In various embodiments, the plurality of proper subsets of the plurality of cross points are mutually exclusive with respect to the plurality of cross points.

In various embodiments, a set difference between the plurality of cross points and a set union of the plurality of proper subsets of the plurality of cross points is non-null. In various embodiments, a nearest neighboring cross point from any given cross point included in a set union of the plurality of proper subsets of the plurality of cross points is included in a proper subset of the plurality of proper subsets of the plurality of cross points that is different from another proper subset of the plurality of proper subsets that includes the given cross point.

In various embodiments, the nearest neighboring cross point from the any given cross point has a first distance from the any given cross point. In various embodiments, a nearest cross point from the any given cross point that is also in the same proper subset of the plurality of proper subsets of the plurality of cross points with the any given cross points has a second distance from the any given cross point that is greater than the first distance. In various embodiments, a plurality of segments formed by all pairs of cross points separated by the first distance each fall upon one of a set of parallel lines upon a plane parallel with the display. In various embodiments, the set of parallel lines are not parallel with the plurality of row electrodes, and/or the set of parallel lines are not parallel with the plurality of column electrodes.

In various embodiments, every set of drive-sense circuits of the plurality of sets of drive-sense circuits are activated in different ones of the plurality of sequential time frames. In various embodiments, any two consecutive ones of the plurality of sequential time have different ones of the drive-sense circuits of the plurality of sets of drive-sense circuits activated. In various embodiments, the exactly one set of drive-sense circuits of the plurality of sets of drive-sense circuits is activated for each of the plurality of sequential time frames based on a predefined ordering of the plurality of sets of drive-sense circuits.

In various embodiments, the plurality of sequential time frames have equal length. In various embodiments, the display is configured to render frames of data into visible images in accordance with a frame rate, and/or where the equal length is a period corresponding to the frame rate. In various embodiments, the frame rate is equal to a 300 Hz frame rate, or a different frame rate.

In various embodiments, the processing module activates the exactly one set of drive-sense circuits of the plurality of sets of drive-sense circuits to generate a corresponding set of sensed signals for the each of the plurality of sequential time frames in accordance with operating in first mode during a first temporal period that includes the plurality of sequential time frames. In various embodiments, the operations further include changing from operation in the first mode to operation in a second mode in a second temporal period after the first temporal period that includes a second plurality of sequential time frames. In various embodiments, operating in the second mode includes: for each of the second plurality of sequential time frames, activating more than one set of drive-sense circuits of the plurality of sets of drive-sense circuits to generate a corresponding more than one set of sensed signals; for each of the second plurality of sequential time frames, receiving the corresponding more than one set of sensed signals from the more than one set of drive-sense circuits; and/or processing at least one corresponding more than one set of sensed signals for at least one of the second plurality of sequential time frames to identify a second user interaction in proximity to the touch screen display.

In various embodiments, the more than one set of drive-sense circuits of the plurality of sets of drive-sense circuits is all of the plurality of sets of drive-sense circuits. In various embodiments, the more than one set of drive-sense circuits of the plurality of sets of drive-sense circuits is a proper subset of the plurality of sets of drive-sense circuits. In various embodiments, any two consecutive ones of the plurality of sequential time have different ones of the drive-sense circuits of the plurality of sets of drive-sense circuits activated. In various embodiments, changing from operation in the first mode to operation in a second mode is based on determining to increase a number of activated drive-sense circuits based on identifying the first user interaction.

In various embodiments, the touch screen display is implemented via some or all features and/or functionality of any other embodiment of the touch screen display described herein.

In various embodiments, another touch-based device such as a touch panel does not include a display, but includes the plurality of sets of electrodes, the plurality of sets of drive-sense circuits, and/or the processing module. Such a touch-based device can be configured to perform some or all steps of the method of FIG. 67C and/or can be configured via some or all various features and/or functionality of the touch screen display described above and/or described in conjunction with FIGS. 67A-67B.

Figure 68A:
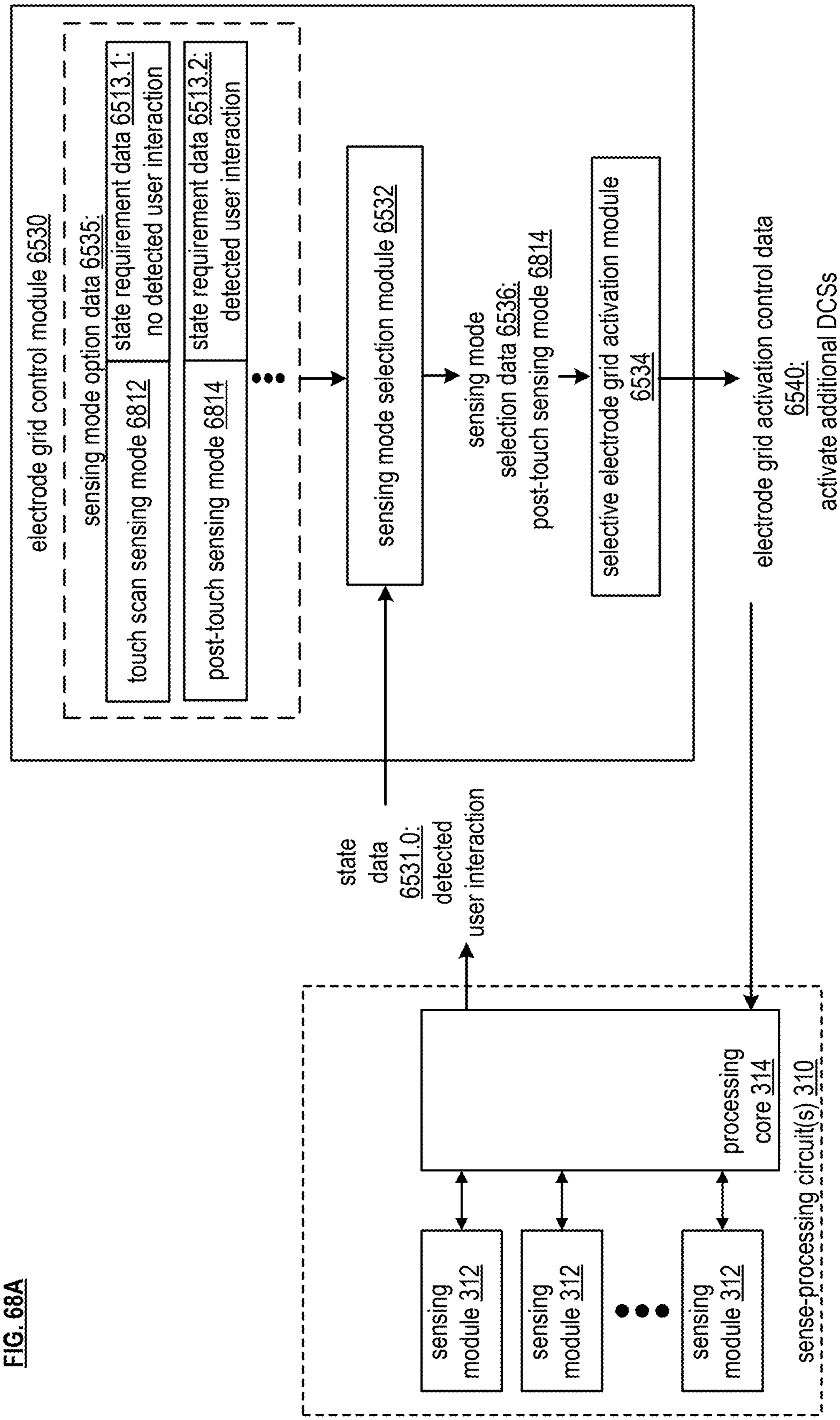
FIGS. 68A-68B are schematic block diagrams of an electrode grid control module that processes detected user interactions detected by at least one sense-processing circuit in accordance with various embodiments.
Figure 68B:
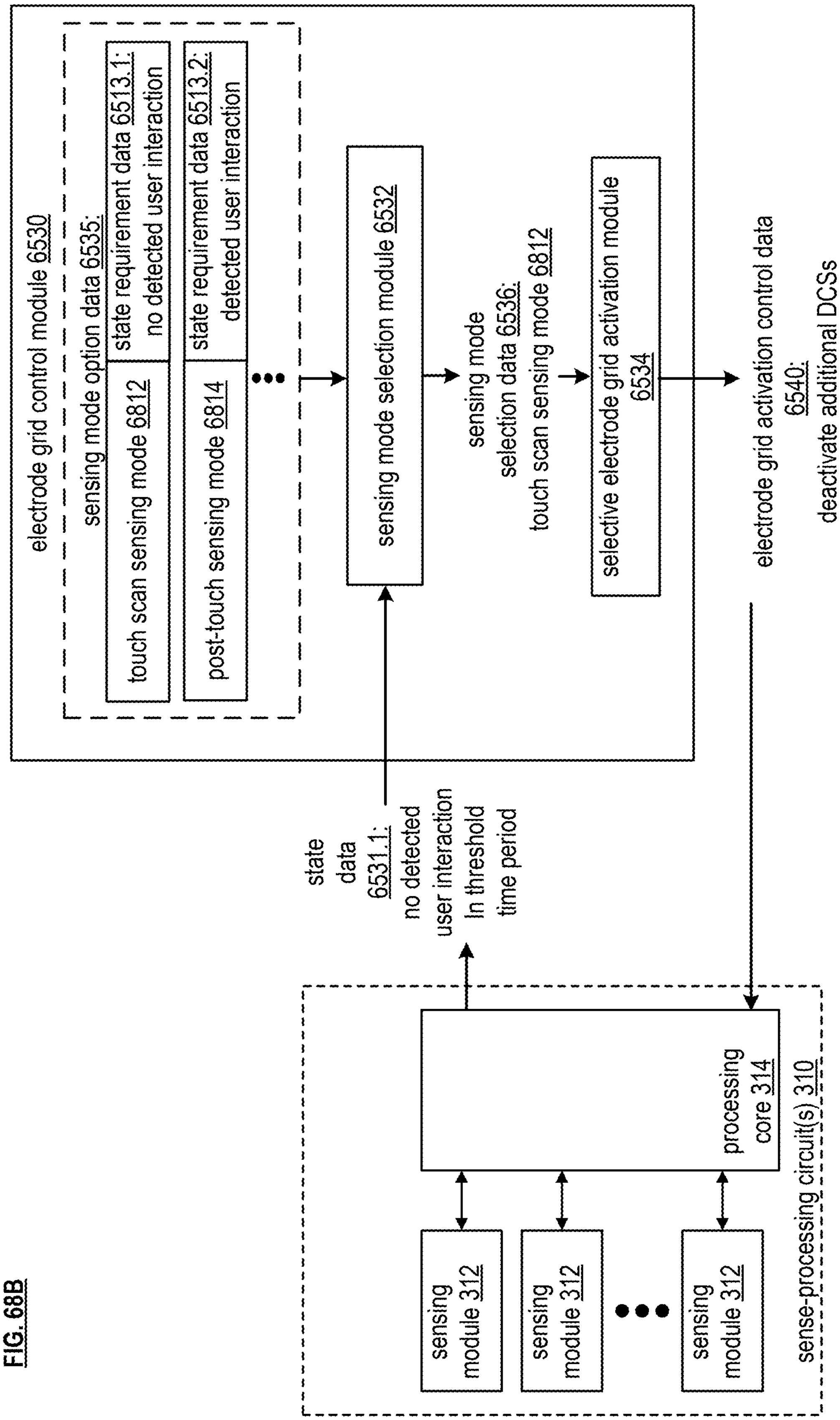

FIGS. 68A-68B illustrate embodiments of an electrode grid control module 6530 of a touch screen display that is operable to enter a touch scan sensing mode 6812 and/or a post-touch sensing mode 6814 at various times. In particular, the electrode grid control module 6530 can facilitate transition from the touch scan sensing mode 6812 to the post-touch sensing mode 6814 in response to detecting a proximal user interaction, and/or the electrode grid control module 6530 can facilitate transition from the post-touch sensing mode 6814 to the touch scan sensing mode 6812 in response to the proximal user interaction being completed and/or not having detected a proximal user interaction within at least a predetermined threshold period of time. Some or all features and/or functionality of the electrode grid control module of FIGS. 68A-68B can implement the electrode grid control module 6530 of FIG. 65K and/or FIG. 65L, and/or any other embodiment of the electrode grid control module 6530 and/or touch screen display described herein.

As illustrated in FIG. 68A, state data 6531.0 can denote a detected user interaction via DSCs activated in the current state during a first temporal period, such via an initial set of DSCs activated in the touch scan sensing mode 6812 due to the touch scan sensing mode 6812 being active prior to the detection of the touch. For example, the touch scan mode is a default mode, where a post-touch sensing mode 6814 is only entered and/or maintained when touch is detected and/or this detection is maintained.

This initial set of DSCs activated in the touch scan sensing mode 6812 can correspond to some or all DCSs of one or more electrode grids. For example, the touch scan sensing mode 6812 can be implemented via some or all features and/or functionality of the base sensing mode 6612 of FIGS. 66A-66H and/or via some or all features and/or functionality of the turn-based single grid mode 6712 of FIGS. 67A-67C. The touch scan sensing mode 6812 can otherwise correspond to enabling of only a proper subset of DSCs of a plurality of possible DSCs and/or monitoring of only a proper subset of sense cells of a plurality of possible sense cells. The touch scan sensing mode 6812 can be implemented via activation of all DSCs in or more entire electrode grids. In some embodiments, and/or can be implemented via activation of a proper subset of all DSCs of one or more electrode grids, where only a portion of an electrode grid is activated.

Based on the detected user interaction in state data 6531.0 and based on the post-touch sensing mode 6814 having state requirement data 6513.2 denoting the post-touch sensing mode 6814 when user interaction (e.g. a detected touch or hover in one or more most recent capacitive images) is detected, the sensing mode selection module 6532 generates sensing mode selection data 6536 denoting selection of the post-touch sensing mode 6814, and the selective electrode grid activation module 6534 an generate electrode grid activation control data 6540 indicating activation of additional DSCs to facilitate entering of the post-touch sensing mode 6814. The electrode grid activation data 6540 can optionally further indicate deactivation of currently activated DSCs of the touch scan sensing mode 6812. The electrode grid activation control data 6540 can be sent to one or more respective sense-processing circuits 310 and/or other processing modules that enable the additional DSCs accordingly.

The post-touch sensing mode 6814 can correspond to activation of some or all DCSs of one or more electrode grids. For example, the touch scan sensing mode 6812 can be implemented via some or all features and/or functionality of the enhanced sensing mode 6614 of FIGS. 66A-66H. The touch scan sensing mode 6812 can be implemented via activation of all DSCs in or more entire electrode grids. In some embodiments, and/or can be implemented via activation of a proper subset of all DSCs of one or more electrode grids, where only a portion of an electrode grid is activated.

The post-touch sensing mode 6814 can optionally correspond to enabling of all DSCs of a plurality of possible DSCs and/or monitoring of all sense cells of a plurality of possible sense cells. The post-touch sensing mode 6814 can optionally correspond to enabling of a proper DSCs of the plurality of possible DSCs and/or monitoring of a proper subset sense cells of the plurality of possible sense cells. However, the number of electrode grids activated in the post-touch sensing mode 6814 can be strictly greater than the number of electrode grids activated in the touch scan sensing mode 6812, and/or the number of DSCs activated in the post-touch sensing mode 6814 can be strictly greater than the number of DSCs activated in the touch scan sensing mode 6812, and/or the number sense cells monitored in the post-touch sensing mode 6814 can be strictly greater than the number of sense cells monitored in the touch scan sensing mode 6812, for example, to facilitate enhanced sensing while a user is detected to be interacting with the display.

As illustrated in FIG. 68B, state data 6531.1 can denote no detected user interaction in at least a threshold time period via DSCs activated in the current state during a second temporal after the first period, such via the set of DSCs activated in post-touch scan sensing mode 6814 due to the post-touch scan sensing mode 6814 being entered as discussed in FIG. 68A.

The sensing mode selection module 6532 generates sensing mode selection data 6536 denoting selection of the touch scan sensing mode 6812 based on lack of detected user interaction for at least the threshold amount of time in state data 6531.1, and based on the post-touch sensing mode 6814 having state requirement data 6513.2 denoting the post-touch sensing mode 6814 when no user interaction (e.g. no detected touch or hover in one or more most recent capacitive images) is detected, for example, for at least this threshold amount of time. The selective electrode grid activation mode can generate electrode grid activation control data 6540 indicating deactivation of additional DSCs to facilitate reentering of the touch scan sensing mode 6812. This can include activating some DSCs that were not active during the post-touch sensing mode 6814. However, the number of electrode grids activated in the touch scan sensing mode 6812 can be strictly less than the number of electrode grids activated in the post-touch sensing mode 6814, and/or the number of DSCs activated in the touch scan sensing mode 6812 can be strictly less than the number of DSCs activated in the post-touch sensing mode 6814, and/or the number sense cells monitored in the touch scan sensing mode 6812 can be strictly less than the number of sense cells monitored in the post-touch sensing mode 6814 as discussed previously, for example, to preserve processing resources and/or minimize power consumption no user is detected to be interacting with the display.

Figure 68C:
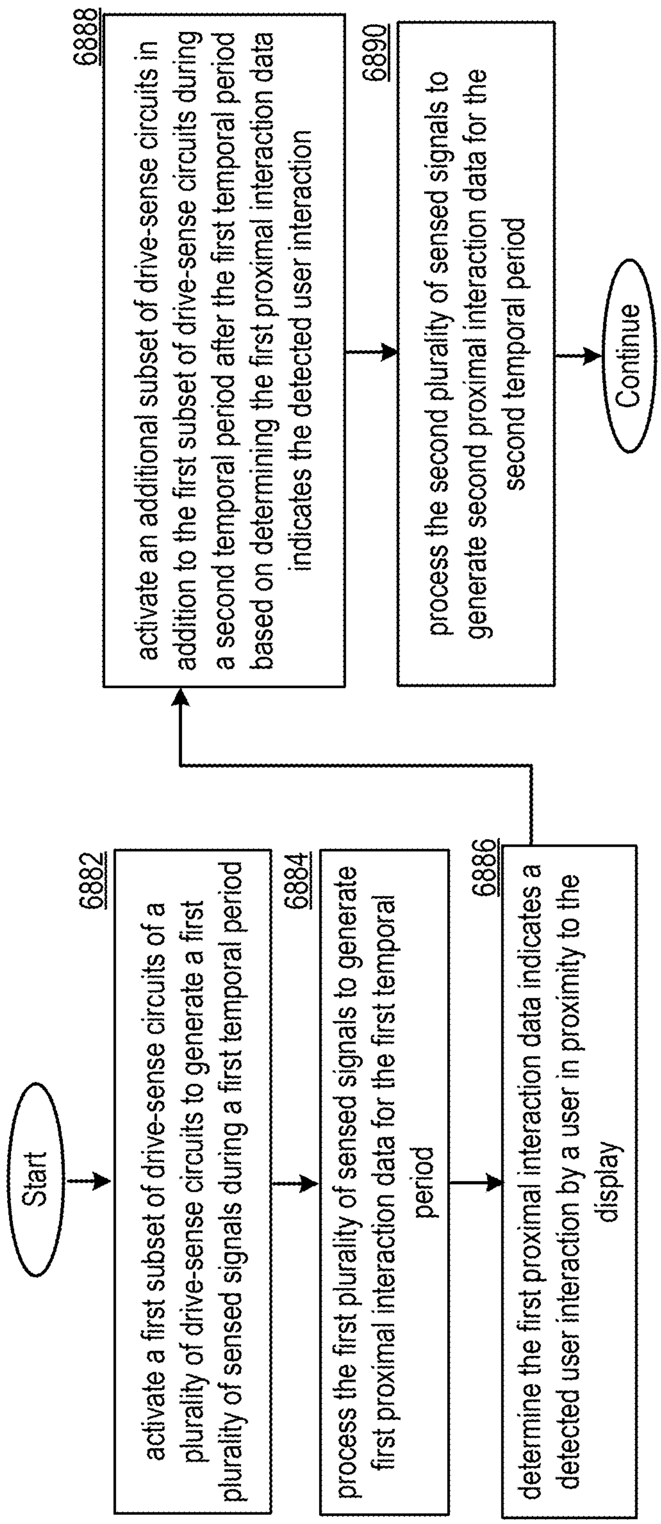
FIG. 68C is a logic diagram of an example method for execution in accordance with various embodiments.

FIG. 68C illustrates a flow diagram of an embodiment of a method in accordance with the present disclosure. In particular a method is presented for execution by and/or for use in conjunction with a plurality of drive-sense circuits 28, a plurality of electrodes 85, touch screen processing module 82, other processing modules 42, touch screen 16, 20, 80, and/or 90, computing device 14 and/or 18, and/or other sensors, processing modules, touch screen displays, and/or computing devices disclosed herein. Some or all steps of FIG. 68C can be performed in conjunction with the embodiments illustrated in and described in conjunction with FIGS. 68A-FIG. 68B. Some or all steps of FIG. 68C can be performed in conjunction with some or all steps of FIG. 65M, FIG. 66H, FIG. 67C, and/or any other methods described herein.

Step 6882 includes activating a first subset of drive-sense circuits of a plurality of drive-sense circuits to generate a first plurality of sensed signals during a first temporal period. Step 6884 includes processing the first plurality of sensed signals to generate first proximal interaction data for the first temporal period. Step 6886 includes determining the first proximal interaction data indicates a detected user interaction by a user in proximity to the display. Step 6888 includes activating an additional subset of drive-sense circuits in addition to the first subset of drive-sense circuits during a second temporal period after the first temporal period based on determining the first proximal interaction data indicates the detected user interaction. Step 6890 includes processing the second plurality of sensed signals to generate second proximal interaction data for the second temporal period.

In various embodiments, a touch screen display includes the plurality of sets of drive-sense circuits. For example, the touch screen display performs some or all steps of the method of FIG. 68C, and/or some or all steps of any other method described herein, utilizing the plurality of sets of drive-sense circuits.

In various embodiments, the same or different touch screen display includes a display configured to render frames of data into visible images. For example, the touch screen display comprises a video graphics processing module operably coupled to generate the frames of data.

In various embodiments, the touch screen display includes a plurality of electrodes integrated into the display to facilitate touch sense functionality based on electrode signals having a drive signal component and a receive signal component. The plurality of electrodes can include a plurality of row electrodes and a plurality of column electrodes. The plurality of row electrodes can be separated from each the plurality of column electrodes by a dielectric material. The plurality of row electrodes and the plurality of column electrodes can form a plurality of cross points.

In various embodiments, the touch screen display includes a plurality of drive-sense circuits coupled to the plurality of electrodes. Each drive-sense circuit can be operable to generate sensed signals indicating variations in capacitance associated with at least some cross points formed by the corresponding electrode.

In various embodiments, the touch screen display includes a processing module that includes at least one memory that stores operational instructions and at least one processing circuit that executes the instructions to perform operations. The operations can include: activating a first subset of drive-sense circuits of the plurality of drive-sense circuits to generate a first plurality of sensed signals during a first temporal period; receiving a first plurality of sensed signals from the first subset of drive-sense circuits during the first temporal period; processing the first plurality of sensed signals to generate first proximal interaction data for the first temporal period; determining the first proximal interaction data indicates a detected user interaction by a user in proximity to the display; activating an additional subset of drive-sense circuits in addition to the first subset of drive-sense circuits during a second temporal period after the first temporal period based on determining the first proximal interaction data indicates the detected user interaction; receiving a second plurality of sensed signals from the first subset of drive-sense circuits and the additional subset of drive-sense circuits during the second temporal period; and/or processing the second plurality of sensed signals to generate second proximal interaction data for the second temporal period. The operations can include and/or can be based on: some or all steps of FIG. 68C, operations of any other processing module described herein, and/or some or all steps of any other method described herein.

In various embodiments, the plurality of electrodes include a plurality of sets of electrodes. In various embodiments, the set of electrodes of the plurality of sets of electrodes includes a corresponding proper subset of non-neighboring ones of a plurality of row electrodes and a corresponding proper subset of non-neighboring ones of a plurality of column electrodes. In various embodiments, the first subset of the plurality of drive-sense circuits corresponds to at least one first set of plurality of sets of electrodes. In various embodiments, the additional subset of the plurality of drive-sense circuits corresponds at least one additional set of plurality of sets of electrodes. The plurality of sets of electrodes can be implemented via any features and/or functionality of distinct electrode grids described herein, and/or via any features and/or functionality of the plurality of sets of electrodes described in conjunction with FIGS. 65M, 66H, and/or 67C.

In various embodiments, each of the plurality of drive-sense circuits includes a first conversion circuit and a second conversion circuit. In various embodiments, when each of the first subset of drive-sense circuits of the plurality of drive-sense circuits is enabled to monitor a corresponding electrode of the plurality of electrodes based on being activated, each first conversion circuit of each drive-sense circuit of the first subset of drive-sense circuits is configured to convert the receive signal component into a sensed signal of the set of sensed signals and/or each second conversion circuit of each drive-sense circuit of the first subset of drive-sense circuits is configured to generate the drive signal component from the sensed signal of the set of sensed signals.

In various embodiments, the operations further include: determining the second proximal interaction data indicates no detected user interaction by any user in proximity to the display for at least a predetermined threshold amount of time; deactivating the additional subset of drive-sense circuits during a third temporal period after the second temporal period based on determining the second proximal interaction data indicates no detected user interaction for at least the predetermined threshold amount of time; receiving a third plurality of sensed signals from only the first subset of drive-sense circuits during the third temporal period; and/or processing the third plurality of sensed signals to generate third proximal interaction data for the third temporal period.

In various embodiments, the processing module activates only the first subset of drive-sense circuits during in the first temporal period based on not identifying any user interaction in a temporal period prior to the first temporal period.

In various embodiments, the additional subset of the plurality of drive-sense circuits are selected based on at least one of: a location of the detected user interaction; a direction of movement of the detected user interaction; a speed of movement of the detected user interaction; a size of a touch point of the detected user interaction; or a size of a hover region of the detected user interaction.

In various embodiments, the first subset of the plurality of drive-sense circuits have a corresponding subset of the plurality of cross-points in accordance with a uniform first sensor resolution across a full touch area corresponding to the entire display surface. In various embodiments, the additional subset of the plurality of drive-sense circuits are selected to increase the sensor resolution in a portion of the full touch area to an enhanced sensor resolution from the first sensor resolution. In various embodiments, the portion of the full touch area is based on the location of the detected user interaction.

In various embodiments, the touch screen display is implemented via some or all features and/or functionality of any other embodiment of the touch screen display described herein.

In various embodiments, another touch-based device such as a touch panel does not include a display, but includes the plurality of sets of electrodes, the plurality of sets of drive-sense circuits, and/or the processing module. Such a touch-based device can be configured to perform some or all steps of the method of FIG. 68C and/or can be configured via some or all various features and/or functionality of the touch screen display described above and/or described in conjunction with FIGS. 68A-68B.

FIGS. 69A-69E illustrate embodiments of a touch screen display that is operable to adapt the sensing resolution based on the size of a detected user interaction region. In particular, the touch screen display can facilitate more granular sensing resolution for detected user interactions inducing a smaller user interaction region activating more DSCs and/or monitoring more sense cells, and can facilitate less granular sensing resolution for user interactions inducing a larger user interaction region by activating less DSCs and/or monitoring less sense cells. This can be useful in ensuring smaller body parts (e.g. a finger tip) and/or objects (e.g. a pen) utilized for user interactions are tracked and processed with higher sensitivity, as their smaller touch and/or hover region can induce finer, more accurate interactions that should be tracked with higher resolution. Meanwhile, this level of sensitivity may not be required for tracking larger body parts (e.g. a fist/whole hand) and/or objects utilized for other user interactions, and power consumption and/or processing resources can be preserved via less sensitive detection in these cases. Some or all features and/or functionality of the touch screen display and/or the electrode grid control module of FIGS. 69A-69E can implement the electrode grids of FIG. 65A, the electrode grid control module 6530 of FIG. 65K and/or FIG. 65L, and/or any other embodiment of the electrode grid control module 6530 and/or touch screen display described herein.

Figure 69A:
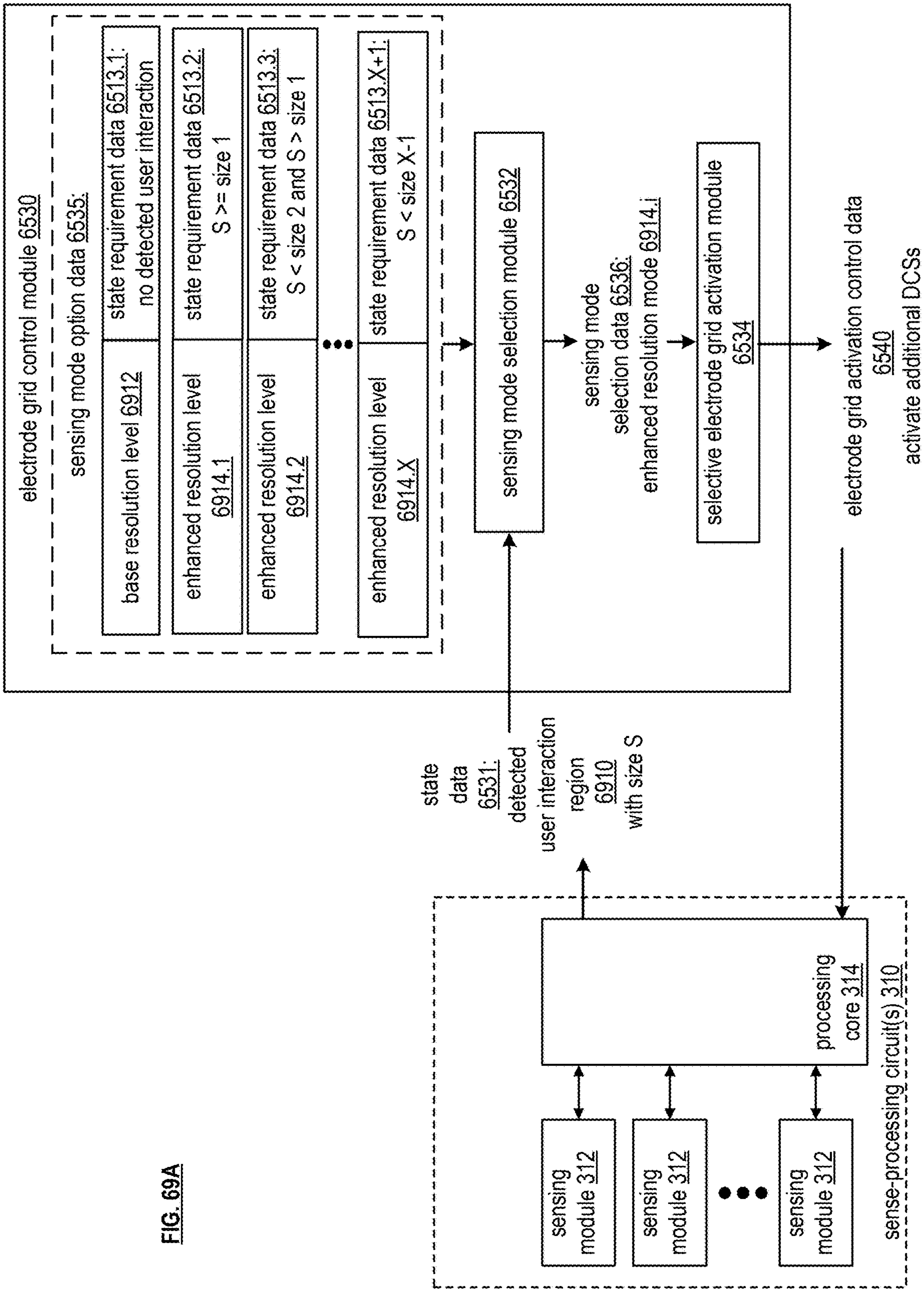
FIG. 69A is a schematic block diagram of an electrode grid control module that processes detected user interaction regions detected by at least one sense-processing circuit in accordance with various embodiments.

FIG. 69A illustrates an embodiment of an electrode grid control module 6530 that can select and facilitate activation of various enhanced resolution levels 6914 based on detection of user interaction regions of various sizes, and optionally a base resolution level 6912 corresponding to no detected user interaction. The base resolution level 6912 and/or the plurality of enhanced resolution levels 6914 can be implemented as different sensing modes 6515 of FIG. 65K. In some embodiments, the base resolution level 6912 is implemented as the base sensing mode 6612 of FIG. 66A-66F and/or the plurality of enhanced resolution levels 6914 are implemented as different possible enhanced sensing modes 6614 of FIGS. 66A-66F. In some embodiments, the base resolution level 6912 is implemented as the touch scan sensing mode 6812 of FIGS. 68A-68B and/or the plurality of enhanced resolution levels 6914 are implemented as the different possible post-touch sensing modes 6814 of FIGS. 68A-68B, depending on the region size of the detected user interaction.

State data 6531 can be generated based on detection data outputted by one or more individual sense-processing circuits. The state data 6531 can include and/or be based on variations in capacitance at monitored sense cells in the current mode, corresponding capacitive images 232, corresponding proximal touches 234, and/or other indications of user interaction, or lack thereof, for the given time frame of the given state data. This information can be separately generated by individual sense-processing circuits to denote detection of capacitance variation and/or corresponding user interaction by individual electrode grids. This information can optionally be processed to generate collective information characterizing interaction with the touch screen display as a whole via collective processing of the separate detection data, where the state data denotes variations in capacitance, capacitive images, proximal touches 234, and/or other indications of user interaction with respect to the collective set of currently active electrode grids.

When the state data 6531 indicates a detected user interaction region 6910 of a detected size, a corresponding one of a set of X enhanced resolution levels can be selected. Each enhanced resolution level 6914.*i*+1 can increase in resolution from a previous enhanced resolution level 6914.*i* based on involving: activation of a greater number of electrode grids than the previous enhanced resolution level, activation of a greater number of DSCs than the previous enhanced resolution level, and/or monitoring of a greater number of sense cells than the previous enhanced resolution level. Each enhanced resolution level 6914.*i*+1 can have corresponding state requirement data 6513 denoting decreasing sizes from the state requirement data 6513 of the previous enhanced resolution level 6914.*i*, such as a smaller maximum and/or minimum size. Alternatively or in addition, the selected mode is otherwise determined based on selecting a number of electrode grids for activation, a number of DSCs for monitoring, and/or a number of sense cells to monitor that is a monotonically decreasing linear or nonlinear function of user interaction region size. The number of possible enhanced resolutions X can be any integer value greater than or equal to two, for example where at least three total resolution levels are possible due to the base level. The number of possible enhanced resolutions X can be an increasing function of the number of different electrode grids (e.g. X=n−1, where the total number of resolution levels=n), an increasing function of rate of time frame in which electrode grids are alternated, and/or of a level of configuration possible in activating and deactivating DSCs and/or in monitoring various cross points.

Thus, transitioning between various enhanced resolution levels over time can include activating more or less DSCs, for example, based on whether transitioning from a higher resolution level to a lower resolution level in accordance with the enhanced resolution levels 6914.

The user interaction region 6910 can correspond to a set of one or more adjacent sense cells, monitored in the current sensing mode, where corresponding sensed signals indicate a touch and/or hover was detected at these sense cells. For example, a touch and/or hover is detected at each of these sense cells based on having variation in capacitance exceeding a predefined threshold and/or otherwise denoting detection of a touch/hover in at least one of a set of one or more most recent sensed signals, such as one or more most recent capacitive images.

The user interaction region 6910 can optionally be bounded, for example, by a rectangle, circle, or other shape surrounding and/or intersecting some or all outermost ones of this set of one or more adjacent sense cells denoting the touch and/or hover. The boundary can optionally be expanded and/or can be characterized with a probabilistic error metric based on a current sensing resolution of the current sensing mode, where non-monitored sense cells in the current sensing mode can be optionally included in the user interaction region 6910 and/or where a size of a probabilistic buffer is applied as a decreasing function of the resolution of the current sensing mode and/or where the size is characterized as a range of possible sizes, accounting for the non-monitored sense cells between the outermost sense cells where the interaction is detected and the closest monitored sense cells where no touch is detected.

The corresponding size of this user interaction region 6910 can correspond to a number of sense cells in the set of one or more adjacent sense cells denoting the touch and/or an area of the bounded region. For example, characterizing size as an area rather than a number of sense cells can be ideal due to the changing in sensing resolution, and thus changing of spacing between monitored adjacent sense cells, over time. The size can correspond to a most recently captured size, such as the size in a most recently generated capacitive image, and/or can correspond to n average, maximum, and/or minimum size of a plurality of sizes of a tracked user interaction region 6910 over time, such as in multiple consecutive capacitive images.

In some embodiments, the user interaction region 6910 is optionally not measured in capacitive images, but its size is automatically determined based on detection of the corresponding body part or object inducing the user interaction. For example, a unique emitted signal and/or electrical characteristics of a particular pen or other object can be distinguished to identify the given object having a known, fixed region size induced in its user interaction region 6910, for example, based on a size of a tip configured to touch and/or hover over the touch screen display.

In some embodiments, multiple simultaneous user interactions, such as multiple touch points by the same or different user in a same capacitive image and/or in a plurality of consecutive capacitive images within a threshold time period, are detected. The size of the user interaction region 6910 utilized to select the applied enhanced resolution level can be selected as a smallest size, a largest size, and/or an average size of each of the plurality of detected touch points. In some embodiments, different resolution levels are applied for different locations of the different user interactions at a given time, for example, via corresponding localized enhanced sensing portions with different resolution levels as discussed in conjunction with FIGS. 70A-70D.

Figure 69B:
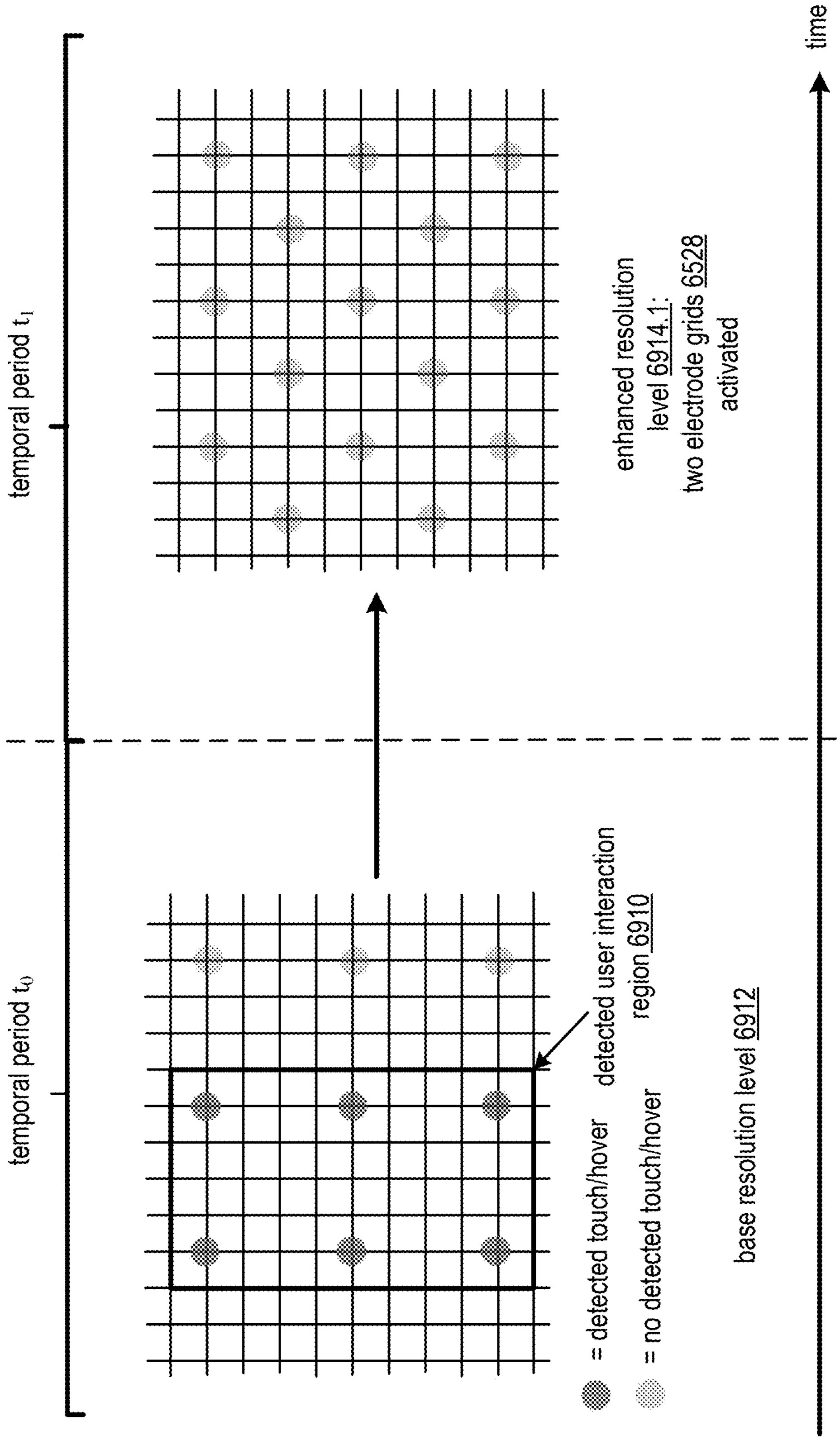
FIGS. 69B-69C illustrate transition of operation by a touch screen display from a base sensing mode to example enhanced sensing modes based on example detected user interaction regions in accordance with various embodiments.
Figure 69C:
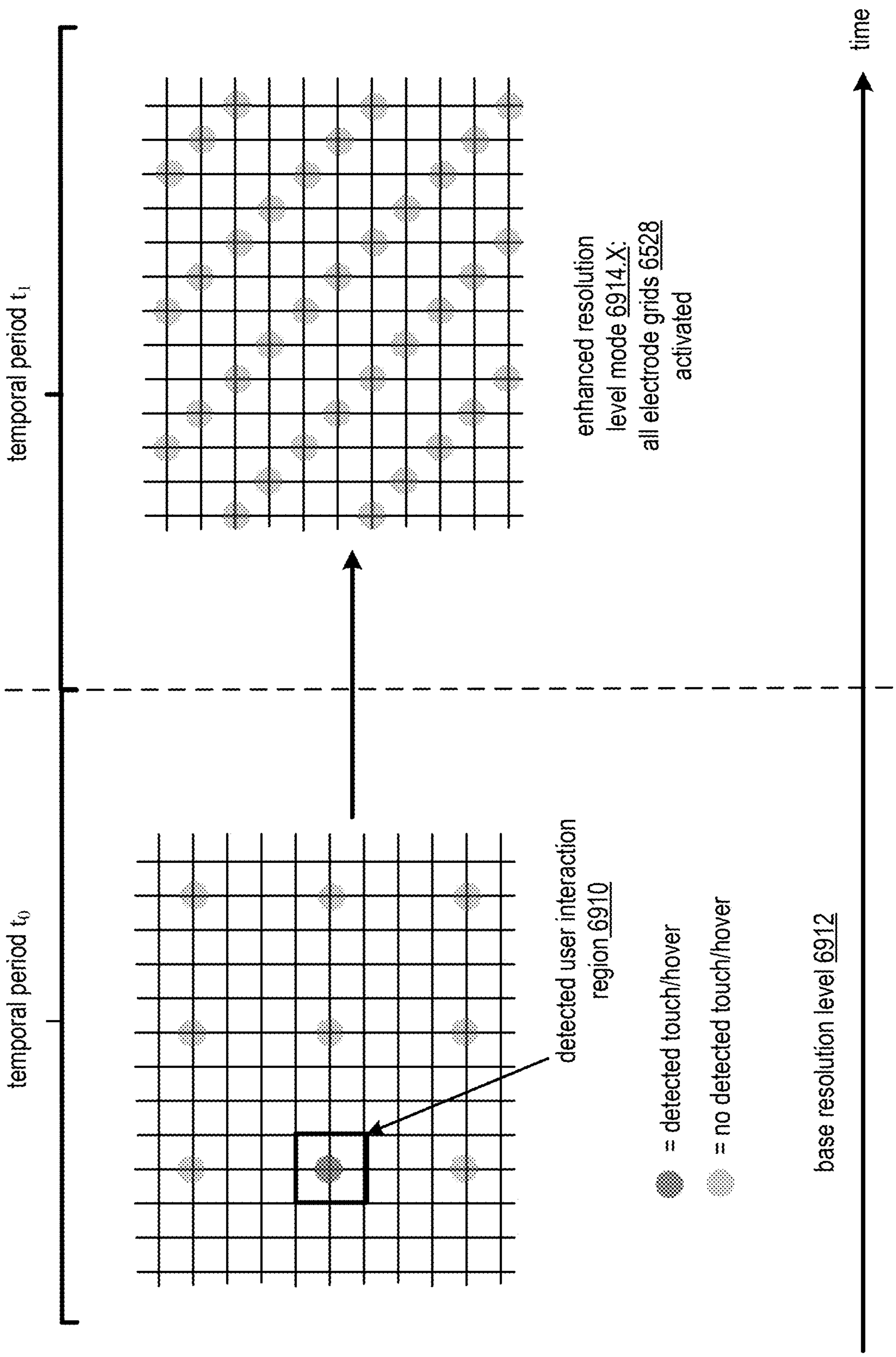

FIGS. 69B and 69C illustrate examples of selecting and activating an enhanced resolution level 6914 based on detected user interaction regions 6910 of two different sizes. Some or all features and/or functionality of user interaction regions 6910 and/or the transition into a corresponding enhanced resolution level can be utilized to implement some or all functionality of the electrode grid control module 6530 of FIG. 69A, the touch screen display of FIG. 65A, and/or any other embodiment of the electrode grid control module 6530 and/or touch screen display described herein.

In the example of FIG. 69B, at temporal period to, a detected user interaction region 6910 is determined based on identifying a detected touch/hover in six adjacent sense cells at the base resolution level 6912, and enhanced resolution level mode 6914.1, or another enhanced resolution level 6914, is selected and applied for the following temporal period $t_1$ in response. For example, the enhanced resolution level mode 6914.1 corresponds to activation of exactly two electrode grids, and/or is another mode with higher resolution than the base resolution level 6912.

In the example of FIG. 69C, at temporal period to, a smaller detected user interaction region 6910 is determined based on identifying a detected touch/hover in only one sense cells at the base resolution level 6912. For example, the detected user interaction region 6910 of FIG. 69C corresponds to a pen tip held by a user interacting with the touch screen display, while the detected user interaction region 6910 of FIG. 69B corresponds to a finger tip of the user interacting with the touch screen display, and is thus larger. As another example, the detected user interaction region 6910 of FIG. 69C corresponds to fingertip of a user interacting with the touch screen display, while the detected user interaction region 6910 of FIG. 69B corresponds to a whole hand of the user interacting with the touch screen display, and is thus larger.

Thus, enhanced resolution level 6914.X, or another enhanced resolution level 6914 that is higher resolution than that of FIG. 69B, is selected and applied for the following temporal period $t_1$ in response. For example, the enhanced resolution level 6914.X corresponds to activation of all electrode grids, and/or is another mode with higher resolution than the base resolution level 6912. The enhanced resolution level mode selected for this smaller detected user interaction region 6910 than that of FIG. 69B can otherwise render higher resolution of monitored sense cells such as a higher concentration of sense cells in some or all portions of the touch screen in a given time frame, and/or across multiple consecutive time frames in the case where the active DSCs rotate over time frames as discussed in conjunction with FIG. 67A.

In these examples, the initial sensing mode at time to corresponds to the base resolution level 6912, such as activation of exactly one electrode grid 6528, for example, in accordance with the base sensing mode 6612. A detected touch/hover can be detected during operation under any other sensing mode, for example, where a higher resolution of monitored sense cells is active during temporal period $t_0$. For example, during temporal period $t_1$ of either example of FIG. 69C or 69D, a different sized user interaction region 6910 can be detected and induce change to another enhanced resolution level 6914 accordingly.

Note that in these examples, the detected user interaction region 6910 is narrowly selected as the region that includes all sense cells with the detected interaction, intersecting the closest outer sense cells that do not denote a user interaction, via a rectangle, despite these closest outer sense cells not having been monitored. In other embodiments, the detected user interaction region 6910 is more conservative selected to account for non-monitored sense cells where the region could extend, for example, based on instead intersecting the closest outer sense cells that are currently monitored. The strategy for identifying detected user interaction region 6910 can be applied constantly to ensure relative change is size is measured appropriately, where the bounded distance from the outmost sense sells where touch and/or hover is detected is fixed and/or is a predefined function of the current monitored sense cell resolution of the current sensing mode.

Figure 69D:
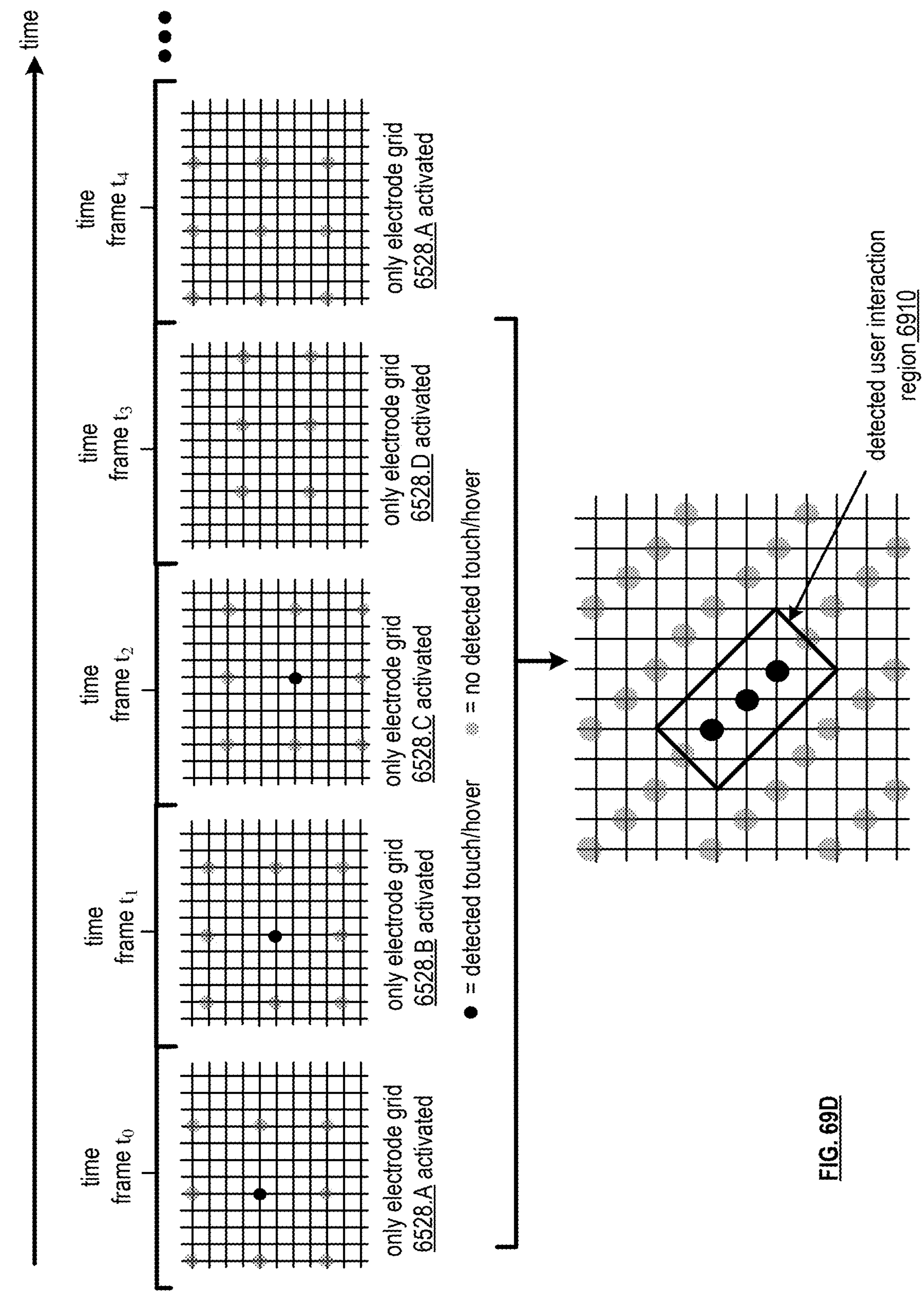
FIGS. 69D-69E illustrate example detected user interaction regions based on detections over time via different electrode grids activated over time in accordance with various embodiments.
Figure 69E:
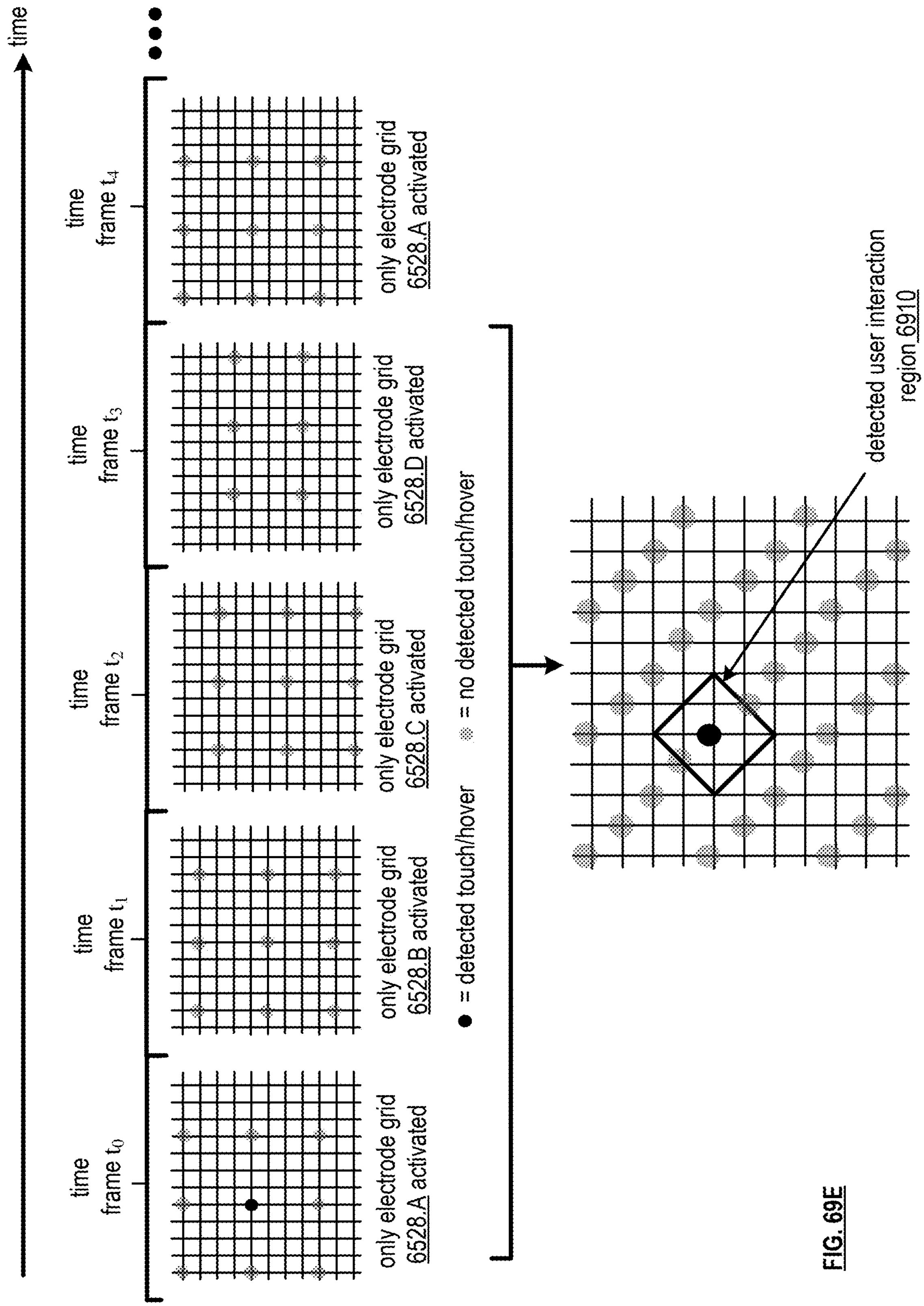

FIGS. 69D and 69E illustrate an example of determining detected user interaction regions 6910 under a current mode where the activated DSCs alternate across one or more consecutive time frames. Some or all features and/or functionality of user interaction regions 6910 and/or the transition into a corresponding enhanced resolution level can be utilized to implement some or all functionality of the electrode grid control module 6530 of FIG. 69A, the touch screen display of FIG. 65A, and/or any other embodiment of the electrode grid control module 6530 and/or touch screen display described herein.

As illustrated in FIGS. 69D and 69E, detected touches can be identified in monitored sense cells in each of a set of consecutive time frames where the set of monitored sense cells change. In this example, the current sensing mode corresponds to the turn-based single grid mode 6712 of FIG. 67A, which can optionally be implemented as the base resolution level 6912 and/or another currently applied mode within a temporal period such as temporal period to of FIGS. 69B and/or 69C.

The detection of sense cells across some or all of plurality of different sets of monitored set cells can be combined, for example, where a capacitive image is optionally generated across each set of n time frames. In this example, a first capacitive image is captured across time frames $t_0$-$t_3$, and a subsequent capacitive image is captured across time frames $t_4$-$t_7$, etc. In particular, if the rate of changing monitored sense cells is sufficiently fast and/or the length of each time frame $t_0$-$t_3$ is sufficiently small, this strategy likely corresponds to all locations of a static region rather than a corresponding movement of the region over these time frames. For example, the activated DSCs change at a rate of 300 Hz, at the frame rate of the display of graphical display data via the touch screen, or another sufficiently high rate.

In the example of FIG. 69D, detected user interaction region 6910 includes three adjacent sense cells, based on these sense cells having been monitored and have sense signals denoting the detected touch and/or hover in time frames $t_0$, $t_1$, and $t_2$. In the example of FIG. 69E, detected user interaction region 6910 includes only one sense cells, based on only this sense cells denoting a detected touch across all time frames $t_0$-$t_3$. While not depicted, a first enhanced resolution level 6914 is selected for the detected user interaction region 6910 of FIG. 69D, and a second enhanced resolution level 6914 is selected for the detected user interaction region 6910 of FIG. 69E. The second enhanced resolution level 6914 can correspond to a higher resolution than that of the first enhanced resolution level 6914 based on the detected user interaction region 6910 of FIG. 69E being smaller than the detected user interaction region 6910 of FIG. 69D.

Figure 69F:
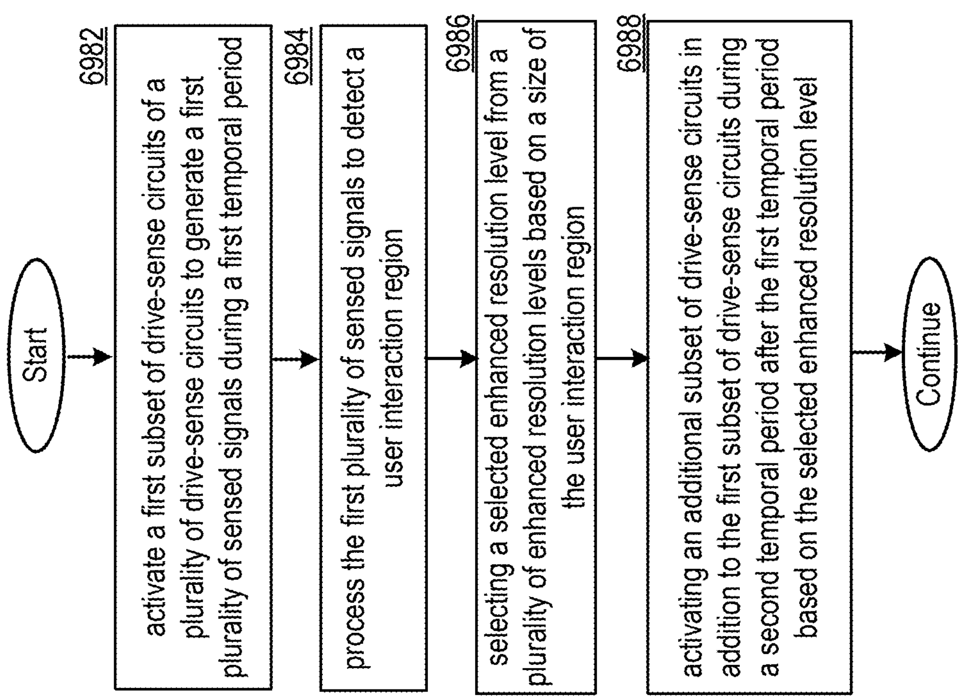
FIG. 69F is a logic diagram of an example method for execution in accordance with various embodiments.

FIG. 69F illustrates a flow diagram of an embodiment of a method in accordance with the present disclosure. In particular a method is presented for execution by and/or for use in conjunction with a plurality of drive-sense circuits 28, a plurality of electrodes 85, touch screen processing module 82, other processing modules 42, touch screen 16, 20, 80, and/or 90, computing device 14 and/or 18, and/or other sensors, processing modules, touch screen displays, and/or computing devices disclosed herein. Some or all steps of FIG. 69F can be performed in conjunction with the embodiments illustrated in and described in conjunction with FIGS. 69A-FIG. 69E. Some or all steps of FIG. 69F can be performed in conjunction with some or all steps of FIG. 65M, FIG. 66H, FIG. 67C, FIG. 68C, and/or any other methods described herein.

Step 6982 includes activating a first subset of drive-sense circuits of a plurality of drive-sense circuits to generate a first plurality of sensed signals during a first temporal period. Step 6984 includes processing the first plurality of sensed signals to detect a user interaction region. Step 6986 includes selecting a selected enhanced resolution level from a plurality of enhanced resolution levels based on a size of the user interaction region. Step 6988 includes activating an additional subset of drive-sense circuits in addition to the first subset of drive-sense circuits during a second temporal period after the first temporal period based on the selected enhanced resolution level.

In various embodiments, a touch screen display includes the plurality of sets of drive-sense circuits. For example, the touch screen display performs some or all steps of the method of FIG. 69F, and/or some or all steps of any other method described herein, utilizing the plurality of sets of drive-sense circuits.

In various embodiments, the same or different touch screen display includes a display configured to render frames of data into visible images. For example, the touch screen display comprises a video graphics processing module operably coupled to generate the frames of data.

In various embodiments, the touch screen display includes a plurality of electrodes integrated into the display to facilitate touch sense functionality based on electrode signals having a drive signal component and a receive signal component. The plurality of electrodes can include a plurality of row electrodes and a plurality of column electrodes. The plurality of row electrodes can be separated from each the plurality of column electrodes by a dielectric material. The plurality of row electrodes and the plurality of column electrodes can form a plurality of cross points.

In various embodiments, the touch screen display includes a plurality of drive-sense circuits coupled to the plurality of electrodes. Each drive-sense circuit can be operable to generate sensed signals indicating variations in capacitance associated with at least some cross points formed by the corresponding electrode.

In various embodiments, the touch screen display includes a processing module that includes at least one memory that stores operational instructions and at least one processing circuit that executes the instructions to perform operations. The operations can include: activating a first subset of drive-sense circuits of the plurality of drive-sense circuits to generate a first plurality of sensed signals during a first temporal period; receiving a first plurality of sensed signals from the first subset of drive-sense circuits during the first temporal period; processing the first plurality of sensed signals to detect a user interaction region; selecting a selected enhanced resolution level from a plurality of enhanced resolution levels based on a size of the user interaction region; and/or activating an additional subset of drive-sense circuits in addition to the first subset of drive-sense circuits during a second temporal period after the first temporal period based on the selected enhanced resolution level. In various embodiments, the operations further include: receiving a second plurality of sensed signals from the first subset of drive-sense circuits and the additional subset of drive-sense circuits during the second temporal period; and/or processing the second plurality of sensed signals to generate proximal interaction data for the second temporal period. The operations can include and/or can be based on: some or all steps of FIG. 69F, operations of any other processing module described herein, and/or some or all steps of any other method described herein.

In various embodiments, the plurality of electrodes include a plurality of sets of electrodes. In various embodiments, the set of electrodes of the plurality of sets of electrodes includes a corresponding proper subset of non-neighboring ones of a plurality of row electrodes and a corresponding proper subset of non-neighboring ones of a plurality of column electrodes. In various embodiments, the first subset of the plurality of drive-sense circuits corresponds to at least one first set of plurality of sets of electrodes. In various embodiments, the additional subset of the plurality of drive-sense circuits corresponds at least one additional set of plurality of sets of electrodes. The plurality of sets of electrodes can be implemented via any features and/or functionality of distinct electrode grids described herein, and/or via any features and/or functionality of the plurality of sets of electrodes described in conjunction with FIGS. 65M, 66H, and/or 67C.

In various embodiments, each of the plurality of drive-sense circuits includes a first conversion circuit and a second conversion circuit. In various embodiments, when each of the first subset of drive-sense circuits of the plurality of drive-sense circuits is enabled to monitor a corresponding electrode of the plurality of electrodes based on being activated, each first conversion circuit of each drive-sense circuit of the first subset of drive-sense circuits is configured to convert the receive signal component into a sensed signal of the set of sensed signals and/or each second conversion circuit of each drive-sense circuit of the first subset of drive-sense circuits is configured to generate the drive signal component from the sensed signal of the set of sensed signals.

In various embodiments, the operations further include: activating only the first subset of drive-sense circuits during a third temporal period distinct from the first temporal period and second temporal period; receiving a second plurality of sensed signals from the first subset of drive-sense circuits during a third temporal period; and/or processing the third plurality of sensed signals to detect a second user interaction region. In various embodiments, the operations further include selecting a second selected enhanced resolution level from the plurality of enhanced resolution levels that is different from the selected enhanced resolution level based on a second size of the second user interaction region being different from the size of the user interaction region; and/or activating another additional subset of drive-sense circuits in addition to the first subset of drive-sense circuits during a fourth temporal period after the third temporal period based on the second selected enhanced resolution level. In various embodiments, the additional subset of drive-sense circuits has a first number of drive-sense circuits different from a second number of drive-sense circuits of the another additional subset of drive-sense circuits based on the selected enhanced resolution level being different from the second enhanced resolution level.

In various embodiments, the first number of drive-sense circuits is greater than the second number of drive-sense circuits based on the enhanced resolution level corresponding to a higher resolution than the second resolution level. In various embodiments, the first number of drive-sense circuits is less than the second number of drive-sense circuits based on the enhanced resolution level corresponding to a lower resolution than the second resolution level. In various embodiments, a first subset of cross points monitored by the additional subset of drive-sense circuits fall within a first portion of the display having a same area as a second portion of the display including a second subset of cross points monitored by the another additional subset of drive-sense circuits. In various embodiments, the first portion of the display is centered at the first touch region and the second portion of the display is centered at the second touch region, In various embodiments, the second size of the second user interaction region is different from the size of the user interaction region based on the first user interaction region being induced by a first type of indication object, and/or based on the second user interaction region being induced by a second type of indication object that is different from the first type of indication object. In various embodiments, the first type of indication object and the second first type of indication object correspond to two of: a finger of a hand of the user, a palm of the hand of the user, a fist of the hand of the user, multiple fingers of the hand of the user, a pen held by the user, and/or a different object held by the user.

In various embodiments, the additional subset of the plurality of drive-sense circuits are further selected based on at least one of: a location of the detected user interaction; a direction of movement of the detected user interaction; or a speed of movement of the detected user interaction.

In various embodiments, the first subset of the plurality of drive-sense circuits have a corresponding subset of the plurality of cross-points in accordance with the first sensor resolution across a full touch area corresponding to the entire display surface. In various embodiments, the additional subset of the plurality of drive-sense circuits are selected to increase the sensor resolution in a portion of the full touch area to the enhanced sensor resolution from the first sensor resolution. In various embodiments, the portion of the full touch area is based on the location of the detected user interaction.

In various embodiments, the touch screen display is implemented via some or all features and/or functionality of any other embodiment of the touch screen display described herein.

In various embodiments, another touch-based device such as a touch panel does not include a display, but includes the plurality of sets of electrodes, the plurality of sets of drive-sense circuits, and/or the processing module. Such a touch-based device can be configured to perform some or all steps of the method of FIG. 69F and/or can be configured via some or all various features and/or functionality of the touch screen display described above and/or described in conjunction with FIGS. 69A-69E.

Figure 70A:
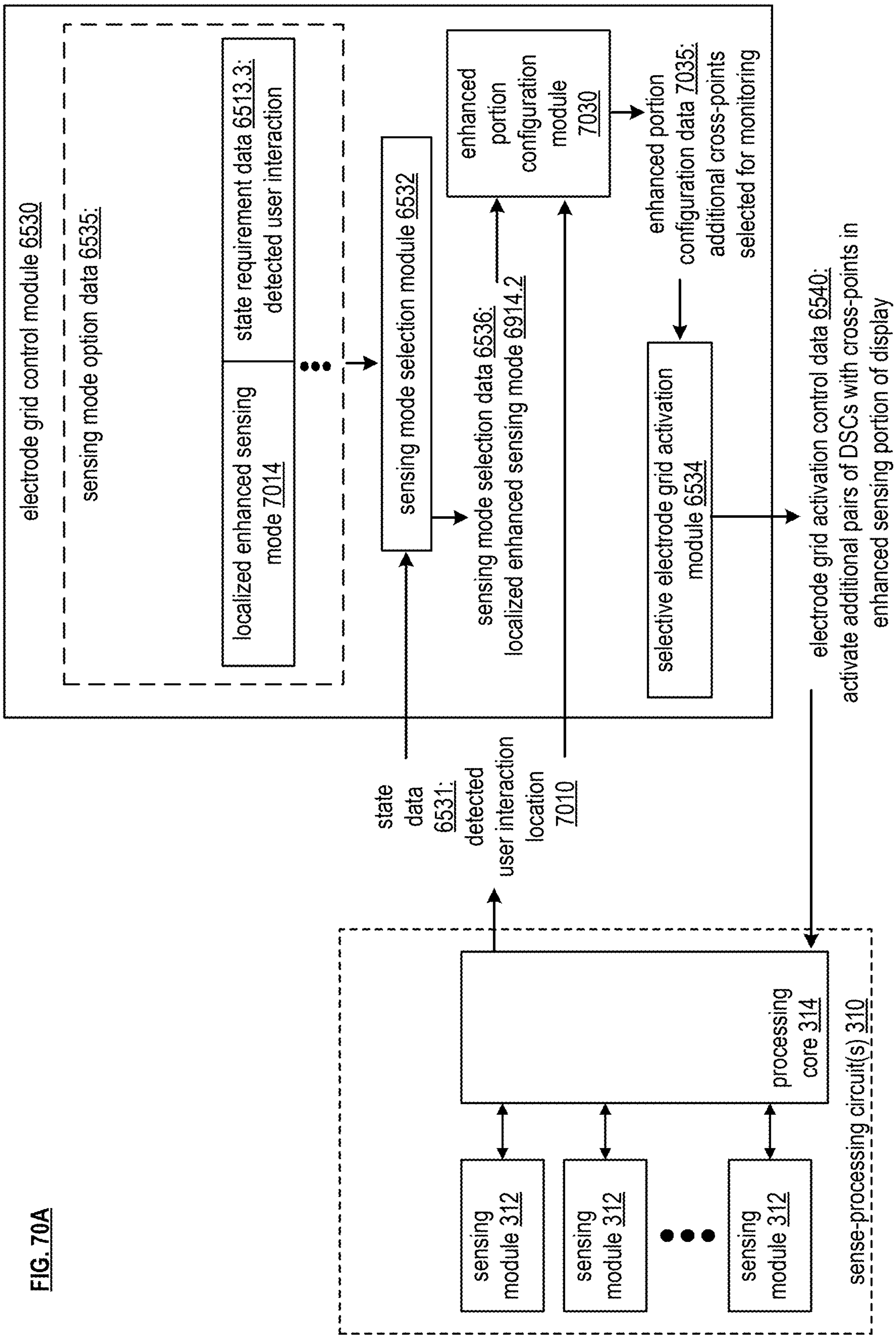
FIG. 70A is a schematic block diagram of an electrode grid control module that processes detected user interaction locations detected by at least one sense-processing circuit in accordance with various embodiments.
Figure 70B:
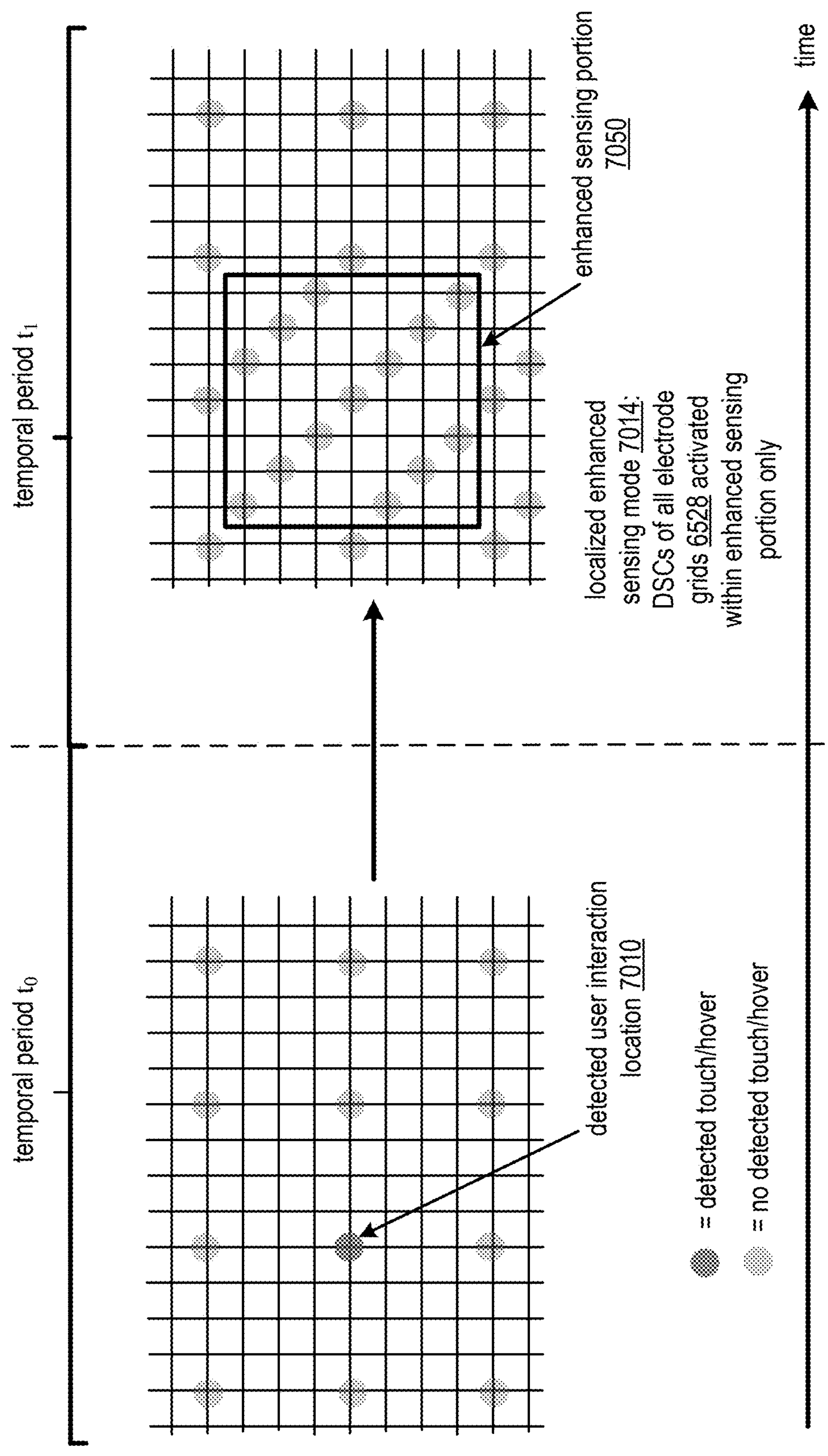
FIG. 70B illustrates transition of operation by a touch screen display from a base sensing mode to a localized enhanced sensing modes based on a detected user interaction location in accordance with various embodiments.
Figure 70C:
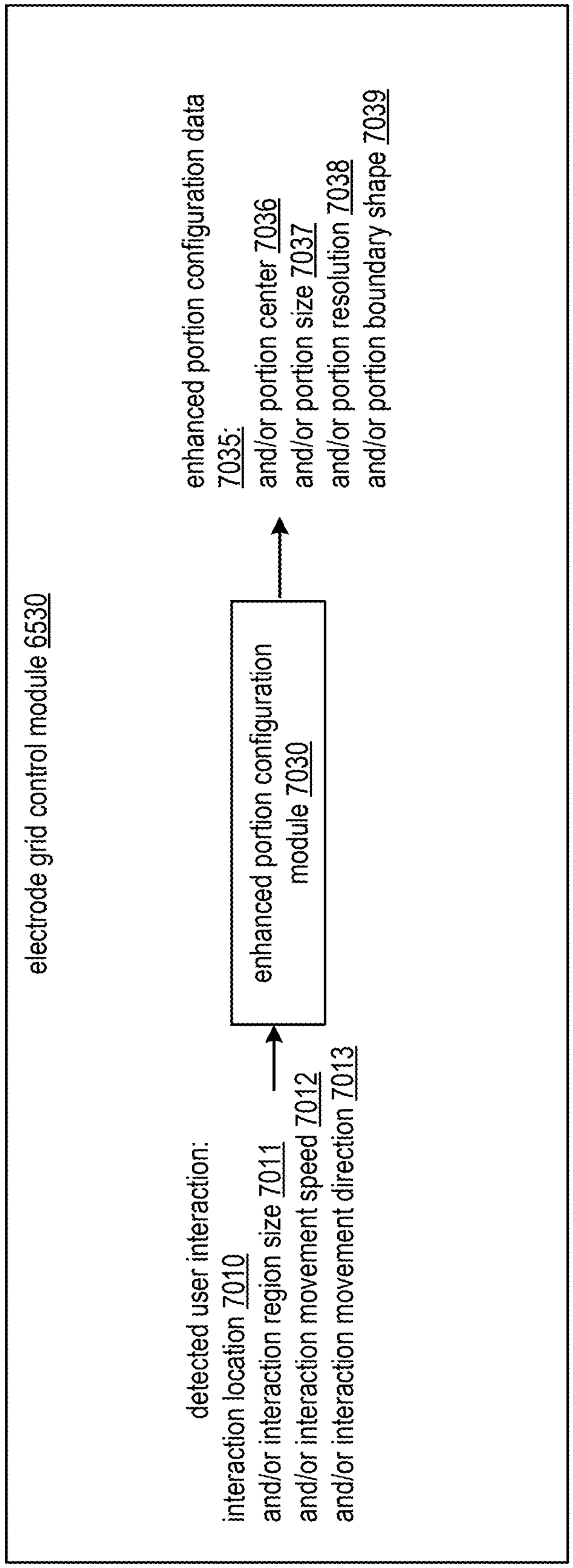
FIG. 70C is a schematic block diagram of an enhanced portion configuration module of an electrode grid control module in accordance with various embodiments.

FIGS. 70A-70C illustrate embodiments of a touch screen display that is operable to adapt the sensing resolution in different portions of the touch screen display based on the location of a detected user interaction. In particular, the touch screen display can facilitate more granular sensing resolution within portions of the touch screen where a user interaction was recently detected to ensure this region is monitored with more sensitivity, for example, due to the user interaction being expected to continue in proximity to this location. Some or all features and/or functionality of the touch screen display and/or the electrode grid control module of FIGS. 70A-70C can implement the electrode grids of FIG. 65A, the electrode grid control module 6530 of FIG. 65K and/or FIG. 65L, and/or any other embodiment of the electrode grid control module 6530 and/or touch screen display described herein.

FIG. 70A illustrates an embodiment of an electrode grid control module 6530 that can select and facilitate activation of a localized enhanced sensing mode 7014 based on the location where a user interaction was detected. At least one localized enhanced sensing mode 7014 can be implemented as at least one sensing modes 6515 of FIG. 65K. In some embodiments, the localized enhanced sensing mode 7014 is implemented as an enhanced sensing mode 6614 of FIGS. 66A-66F, for example, where the base resolution level 6912 is implemented when no user interaction is detected. In some embodiments, the localized enhanced sensing mode 7014 is implemented as a post-touch sensing mode 6814 of FIGS. 68A-68B, depending on the location of the detected user interaction, where the touch scan sensing mode 6812 is applied when no user interaction is detected. In some embodiments, a plurality of different localized enhanced sensing modes 7014 are implemented with different corresponding resolutions, for example, as the plurality of enhanced resolution levels 6914 of FIGS. 69A-69E, where the particular corresponding resolution is localized to a portion of the touch screen display based on the location of the detected user interaction, rather being than applied to the touch screen display as a whole.

A detected user interaction location 7010 can be determined for a detected user interaction. For example, the detected user interaction location 7010 is generated based on the detected user interaction region 6910, for example, to indicate the set of adjacent sense cells indicating detection of a touch and/or hover; a centermost one of the set of adjacent sense cells indicating detection of a touch and/or hover; one or more of the set of adjacent sense cells indicating a highest capacitance variation; a perimeter of a bounded detected user interaction region 6910, such as a bounding rectangle, circle, or other shape; a center of the bounded detected user interaction region 6910, and/or other information denoting location, for example, relative to the plurality of cross points and/or as one or more coordinates of a coordinate system upon a plane parallel with the surface of the touch screen display.

Selection of the localized enhanced sensing mode 7014 can further include generation of enhanced portion configuration data 7035 via an enhanced portion configuration module 7030. The enhanced portion configuration data 7035 can indicate additional cross points selected for monitoring, such as cross points of one or more pairs of row and column electrodes, for example, where each pair belongs to a same electrode grid. The additional cross points can all fall within a selected portion of the touch screen with a location based on the detected user interaction location 7010. For example, the selected portion of the touch screen is centered at the detected user interaction location 7010.

The selected portion of the touch screen can be of a fixed size and/or shape, or can be configured based on the detected user interaction and/or other state data 6531. The selected portion of the touch screen can be of a fixed size and/or shape, or can be configured based on the detected user interaction and/or other state data 6531. The concentration of monitored cross points within the selected portion of the touch screen can be at a fixed resolution, can be in accordance with a selected enhanced resolution level 6914, for example, as discussed in conjunction with FIGS. 69A-69F, and/or can be configured based on the detected user interaction and/or other state data 6531. Configuration of the selected portion of the touch screen for enhanced sensing is discussed in further detail in conjunction with FIG. 70C.

The identified additional cross points of the localized enhanced sensing mode 7014 can be utilized to generate the electrode grid activation control data 6540. In particular, the electrode grid activation control data 6540 can indicate that additional pairs of DSCs with cross-points in the enhanced sensing portion be activated. This can include identifying activation of only a proper subset of DSCs in one or more electrode grids based on having intersections falling within the selected enhanced portion.

FIG. 70B illustrates an example of transitioning into a localized enhanced sensing mode 7014 based on a user interaction. Some or all features and/or functionality of user interaction location 7010 and/or the transition into a corresponding localized enhanced sensing level can be utilized to implement some or all functionality of the electrode grid control module 6530 of FIG. 70A, the touch screen display of FIG. 65A, and/or any other embodiment of the electrode grid control module 6530 and/or touch screen display described herein.

In a first temporal period to, a detected user interaction location 7010 is identified. In this example, the detected user interaction location 7010 is determined as the location of a single sense cell indicating a detected touch and/or hover in temporal period to, such as in one or more most recently generated capacitive images. In response, the localized enhanced sensing mode 7014 is selected for temporal period $t_1$, where a greater concentration of sensing cells are activated in a corresponding selected enhanced sensing portion 7050.

The sensing mode at temporal period to can optionally correspond to the base sensing mode 6612, such as activation of exactly one electrode grid 6528, such as electrode grid 6528.A, as illustrated in FIG. 70B, and/or another initial sensing mode. A detected touch/hover can be detected during operation under any other sensing mode, for example, where an enhanced sensing portion 7050 is already activated due previous detection of user interaction, where the detected user interaction location 7010 is within the enhanced sensing portion 7050 and/or outside of the enhanced sensing portion 7050. Thus, the enhanced sensing portion 7050 can be adjusted over time, for example, to have a different center and/or otherwise move to different locations of the touch screen display based on movement of the user interaction across the display of the touch screen display over time.

In this example, the enhanced sensing portion 7050 is a square region centered at the detected user interaction location 7010. The enhanced sensing portion 7050 can correspond to another regular polygon shape, or any shape. The size of the enhanced sensing portion 7050 can correspond to any other size.

In this example, all possible sense cells of all possible electrode grids are activated within the enhanced sensing portion 7050. For example, only the pairs of rows in columns of these additional electrode grids, such as electrode grids 6528.B-6528.D, are activated, where these electrode grids have only a proper subset of DSCs activated and all remaining DSCs remaining deactivated. The existing set of activated DSCs, such as the full set of DSCs of electrode grids 6528.A in this example, can be maintained, for example, to ensure that remaining portions of the display outside the enhanced sensing portion 7050 maintain the same level of sensing resolution, such as the base level.

The enhanced sensing portion 7050 can otherwise be configured to include any other set of monitored cross-points, such as cross-points of one or more additional electrode grids and/or inter-grid cross points. In particular, the enhanced sensing portion 7050 can be configured to have concentration of monitored sense cells at a higher resolution that some or all remaining portions of the touch screen display. The resolution within the enhanced sensing portion 7050 can optionally be selected as one of a plurality of different enhanced resolution le6914, for example, based on a size of the detected user interaction and/or based on a type of graphical display data being displayed as discussed in conjunction with FIGS. 72A-72F.

In this example, the resolution in enhanced sensing portion 7050 is in accordance with. Alternatively, the resolution is non-uniform, and optionally "fades out" from the center, where the concentration of monitored sense cells is highest in a central location of the enhanced sensing portion 7050 and where the concentration of monitored sense cells decreases, for example, as a function of distance from the center, where two or more different resolution levels are applied within the enhanced sensing portion 7050, for example, concentrically, with higher resolution more central than lower resolution levels.

FIG. 70C illustrates an example of applying the enhanced portion configuration module 7030 to generate the enhanced portion configuration data 7035. The enhanced portion configuration data 7035 can indicate and/or be based: a selected portion center 7036 of enhanced sensing portion 7050; a predetermined and/or selected portion size 7037 of enhanced sensing portion 7050; a predetermined and/or selected portion resolution of enhanced sensing portion 7050; a predetermined and/or selected portion boundary shape 7039 of enhanced sensing portion 7050; and/or other parameters.

These parameters can define the selection of the additional sense cells for monitoring when activating the localized enhanced sensing mode 7014. Some or all of these parameters can be fixed for all enhanced sensing portions 7050 and/or can be a function of and/or otherwise based on one of more parameters of the detected user interaction, such as: the interaction location 7010 of the detected user interaction; an interaction region size 7011 of a detected user interaction region 6910 of the detected user interaction; an interaction movement speed 7012 of tracked movement of the user interaction; an interaction movement direction 7013 of tracked movement of the user interaction, which can correspond to a linear and/or non-linear motion; and/or other parameters. For example the interaction movement speed 7012 is detected over multiple capacitive images, for example, based on a frame rate and/or a distance between interaction locations 7010 in two or more capacitive images over a time period. As another example the interaction movement direction 7013 is detected over multiple capacitive images, for example, based on a direction relative to the display, such as a coordinate system corresponding to the display, denoting path traveled by the user interaction, from one interaction location 7010 to one or more other interaction location 7010 in two or more capacitive images over a time period.

For example, the portion size selected as a monotonically linear or nonlinear increasing function of the interaction region size 7011 and/or interaction movement speed 7012. As another example, the portion boundary shape is selected as a function of the interaction movement speed 7012 and/or the interaction movement direction 7013, particularly if the shape is oblong. As another example, the portion resolution 7038 is selected where concentration of sense cells and/or corresponding sensing sensitivity is an increasing function of interaction region size 7011 and/or interaction movement speed 7012. As another example, the portion center 7036 is selected as the interaction location 7010 and/or is selected as a function of interaction location 7010, interaction movement speed 7012, and/or interaction movement direction 7013.

In some embodiments, multiple simultaneous user interactions, such as multiple touch points by the same or different user in a same capacitive image and/or in a plurality of consecutive capacitive images within a threshold time period, are detected and indicated as distinct detected user interaction locations 7010 of given state data 6531. Each of these different detected user interaction locations 7010 can have their own enhanced sensing portion 7050 selected and activated during a same subsequent temporal period time. The different enhanced sensing portions 7050 can be non-overlapping. The different enhanced sensing portions 7050 can optionally each be configured via the same of different enhanced portion configuration data, for example, where different enhanced sensing portions 7050 have different sizes, shapes, and/or resolutions based on different characteristics of the corresponding different detected user interactions.

Figure 70D:
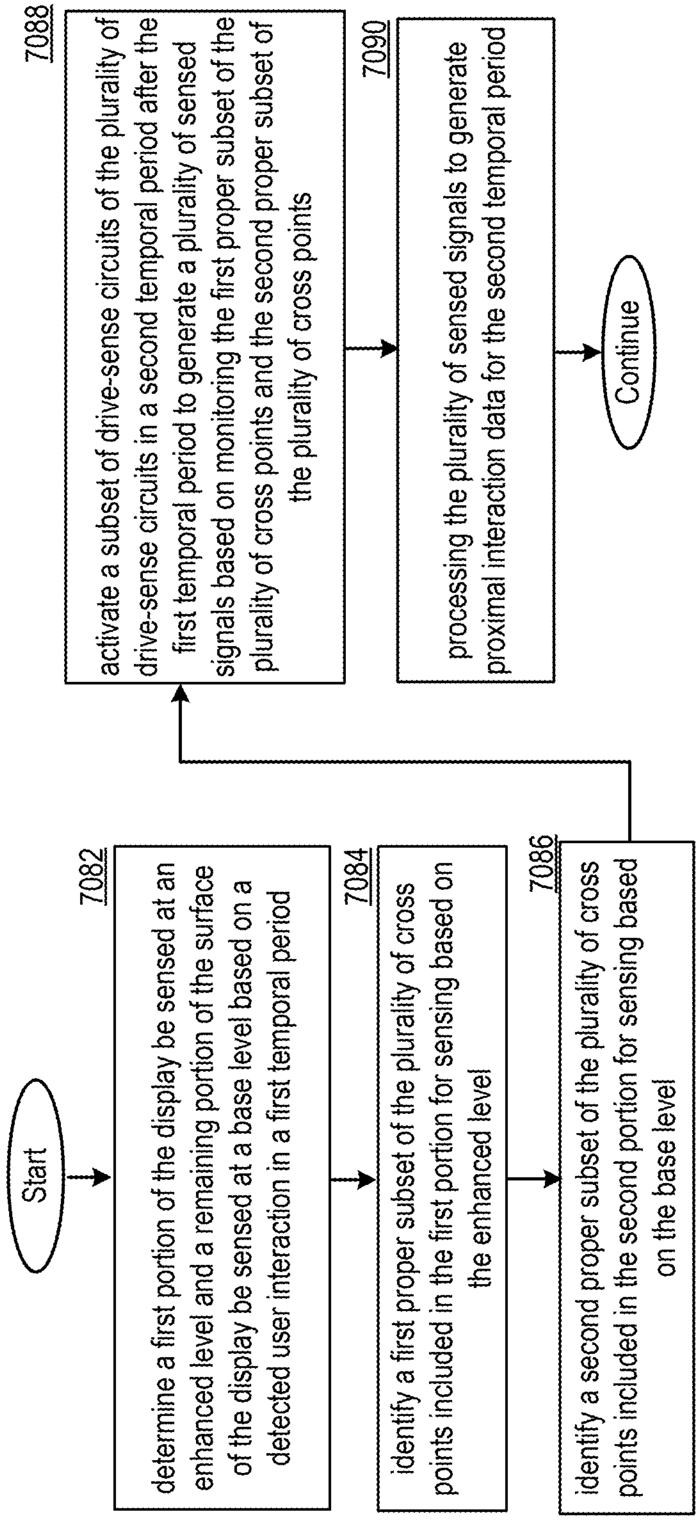
FIG. 70D is a logic diagram of an example method for execution in accordance with various embodiments.

FIG. 70D illustrates a flow diagram of an embodiment of a method in accordance with the present disclosure. In particular a method is presented for execution by and/or for use in conjunction with a plurality of drive-sense circuits 28, a plurality of electrodes 85, touch screen processing module 82, other processing modules 42, touch screen 16, 20, 80, and/or 90, computing device 14 and/or 18, and/or other sensors, processing modules, touch screen displays, and/or computing devices disclosed herein. Some or all steps of FIG. 70D can be performed in conjunction with the embodiments illustrated in and described in conjunction with FIGS. 70A-FIG. 70C. Some or all steps of FIG. 70D can be performed in conjunction with some or all steps of FIG. 65M, FIG. 66H, FIG. 67C, FIG. 68C, FIG. 69F, and/or any other methods described herein.

Step 7082 includes determining a first portion of the display be sensed at an enhanced level and a remaining portion of the surface of the display be sensed at a base level based on a detected user interaction in a first temporal period. Step 7084 includes identifying a first proper subset of the plurality of cross points included in the first portion for sensing based on the enhanced level. Step 7086 includes identify a second proper subset of the plurality of cross points included in the second portion for sensing based on the base level. Step 7088 includes activating a subset of drive-sense circuits of the plurality of drive-sense circuits in a second temporal period after the first temporal period to generate a plurality of sensed signals based on monitoring the first proper subset of the plurality of cross points and the second proper subset of the plurality of cross points.

Step 7090 includes processing the plurality of sensed signals to generate proximal interaction data for the second temporal period.

In various embodiments, a touch screen display includes the plurality of sets of drive-sense circuits. For example, the touch screen display performs some or all steps of the method of FIG. 69F, and/or some or all steps of any other method described herein, utilizing the plurality of sets of drive-sense circuits.

In various embodiments, the same or different touch screen display includes a display configured to render frames of data into visible images. For example, the touch screen display comprises a video graphics processing module operably coupled to generate the frames of data.

In various embodiments, the touch screen display includes a plurality of electrodes integrated into the display to facilitate touch sense functionality based on electrode signals having a drive signal component and a receive signal component. The plurality of electrodes can include a plurality of row electrodes and a plurality of column electrodes. The plurality of row electrodes can be separated from each the plurality of column electrodes by a dielectric material. The plurality of row electrodes and the plurality of column electrodes can form a plurality of cross points.

In various embodiments, the touch screen display includes a plurality of drive-sense circuits coupled to the plurality of electrodes. Each drive-sense circuit can be operable to generate sensed signals indicating variations in capacitance associated with at least some cross points formed by the corresponding electrode.

In various embodiments, the touch screen display includes a processing module that includes at least one memory that stores operational instructions and at least one processing circuit that executes the instructions to perform operations. The operations can include: determining a first portion of the display be sensed at an enhanced level and a remaining portion of the surface of the display be sensed at a base level based on a detected user interaction in a first temporal period; identifying a first proper subset of the plurality of cross points included in the first portion for sensing based on the enhanced level; identifying a second proper subset of the plurality of cross points included in the second portion for sensing based on the base level; activating a subset of drive-sense circuits of the plurality of drive-sense circuits in a second temporal period after the first temporal period to generate a plurality of sensed signals based on monitoring the first proper subset of the plurality of cross points and the second proper subset of the plurality of cross points; receiving the plurality of sensed signals from the subset of drive-sense circuits in the second temporal period; and/or processing the plurality of sensed signals to generate proximal interaction data for the second temporal period. The operations can include and/or can be based on: some or all steps of FIG. 70D, operations of any other processing module described herein, and/or some or all steps of any other method described herein.

In various embodiments, the plurality of electrodes include a plurality of sets of electrodes. In various embodiments, the set of electrodes of the plurality of sets of electrodes includes a corresponding proper subset of non-neighboring ones of a plurality of row electrodes and a corresponding proper subset of non-neighboring ones of a plurality of column electrodes. In various embodiments, the subset of the plurality of drive-sense circuits corresponds to at least one first set of plurality of sets of electrodes. The plurality of sets of electrodes can be implemented via any features and/or functionality of distinct electrode grids described herein, and/or via any features and/or functionality of the plurality of sets of electrodes described in conjunction with FIGS. 65M, 66H, and/or 67C.

In various embodiments, each of the plurality of drive-sense circuits includes a first conversion circuit and a second conversion circuit. In various embodiments, when each of the subset of drive-sense circuits of the plurality of drive-sense circuits is enabled to monitor a corresponding electrode of the plurality of electrodes based on being activated, each conversion circuit of each drive-sense circuit of the subset of drive-sense circuits is configured to convert the receive signal component into a sensed signal of the set of sensed signals and/or each second conversion circuit of each drive-sense circuit of the subset of drive-sense circuits is configured to generate the drive signal component from the sensed signal of the set of sensed signals.

In various embodiments, the first portion is a contiguous portion of the display. In various embodiments, the plurality of cross points included in the first portion are bounded by one of: a circular shape or a square shape. In various embodiments, the plurality of cross points included in the first portion are bounded by an oblong shape having a major axis in a first direction based on a detected direction of movement of the detected user interaction.

In various embodiments, the operations further include determining the first portion based on determining at least one first cross point be included within the first portion based on the detected user interaction being detected at the at least one first cross point. In various embodiments, the first portion is centered at the at least one first cross point. In various embodiments, the first portion is not centered at the at least one first cross point based on a detected direction of movement of the detected user interaction.

In various embodiments, the operations further include determining the first portion based on determining a size of the first portion based on at least one of: a size of a detected interaction region of the detected user interaction; a size of at least one interactable element displayed by the display at the location; or a speed of movement of the detected user interaction. In various embodiments, the operations further include determining a shape for the first portion based on: first portion based on at least one of: a shape of at least one interactable element displayed by the display at the location; or a direction of movement of the detected user interaction.

In various embodiments, the operations further include: determining an updated first portion for sensing at the enhanced level by updating, based on the detected user interaction in the second first temporal period, at least one of: a location of the first portion, a size of the first portion, or a shape of the first portion; determining an updated second portion for sensing at the base level based on the updated first portion; identifying an updated first proper subset of the plurality of cross points included in the updated first portion based on the enhanced level; identifying an updated second proper subset of the plurality of cross points included in the second portion for sensing based on the base level; activating an updated subset of drive-sense circuits of the plurality of drive-sense circuits in a third temporal period after the second temporal period to generate an additional plurality of sensed signals based on monitoring the first proper subset of the plurality of cross points and the second proper subset of the plurality of cross points; receiving the additional plurality of sensed signals from the subset of drive-sense circuits in the third temporal period; and/or processing the additional plurality of sensed signals to generate proximal interaction data for the third temporal period.

In various embodiments, the operations further include: activating a previously determined subset of drive-sense circuits of the plurality of drive-sense circuits in the first temporal period to generate a previous plurality of sensed signals based on monitoring at least some of the plurality of cross points; receiving the previous plurality of sensed signals from the subset of drive-sense circuits in the first temporal period; and/or processing the previous plurality of sensed signals to generate proximal interaction data for the first temporal period indicating the detected user interaction.

In various embodiments, a first minimum distance between ones of the first proper subset of the plurality of cross points included in the first portion is less than a second minimum distance between ones of the second proper subset of the plurality of cross points included in the second portion based on the enhanced resolution level having a higher resolution than the base resolution level. In various embodiments, a first maximum distance between ones of the first proper subset of the plurality of cross points included in the first portion is less than a second maximum distance between ones of the second proper subset of the plurality of cross points included in the second portion based on the enhanced resolution level having a higher resolution than the base resolution level. In various embodiments, a first average distance between ones of the first proper subset of the plurality of cross points included in the first portion is less than a second average distance between ones of the second proper subset of the plurality of cross points included in the second portion based on the enhanced resolution level having a higher resolution than the base resolution level.

In various embodiments, the touch screen display is implemented via some or all features and/or functionality of any other embodiment of the touch screen display described herein.

In various embodiments, another touch-based device such as a touch panel does not include a display, but includes the plurality of sets of electrodes, the plurality of sets of drive-sense circuits, and/or the processing module. Such a touch-based device can be configured to perform some or all steps of the method of FIG. 70D and/or can be configured via some or all various features and/or functionality of the touch screen display described above and/or described in conjunction with FIGS. 70A-70C.

Figure 71A:
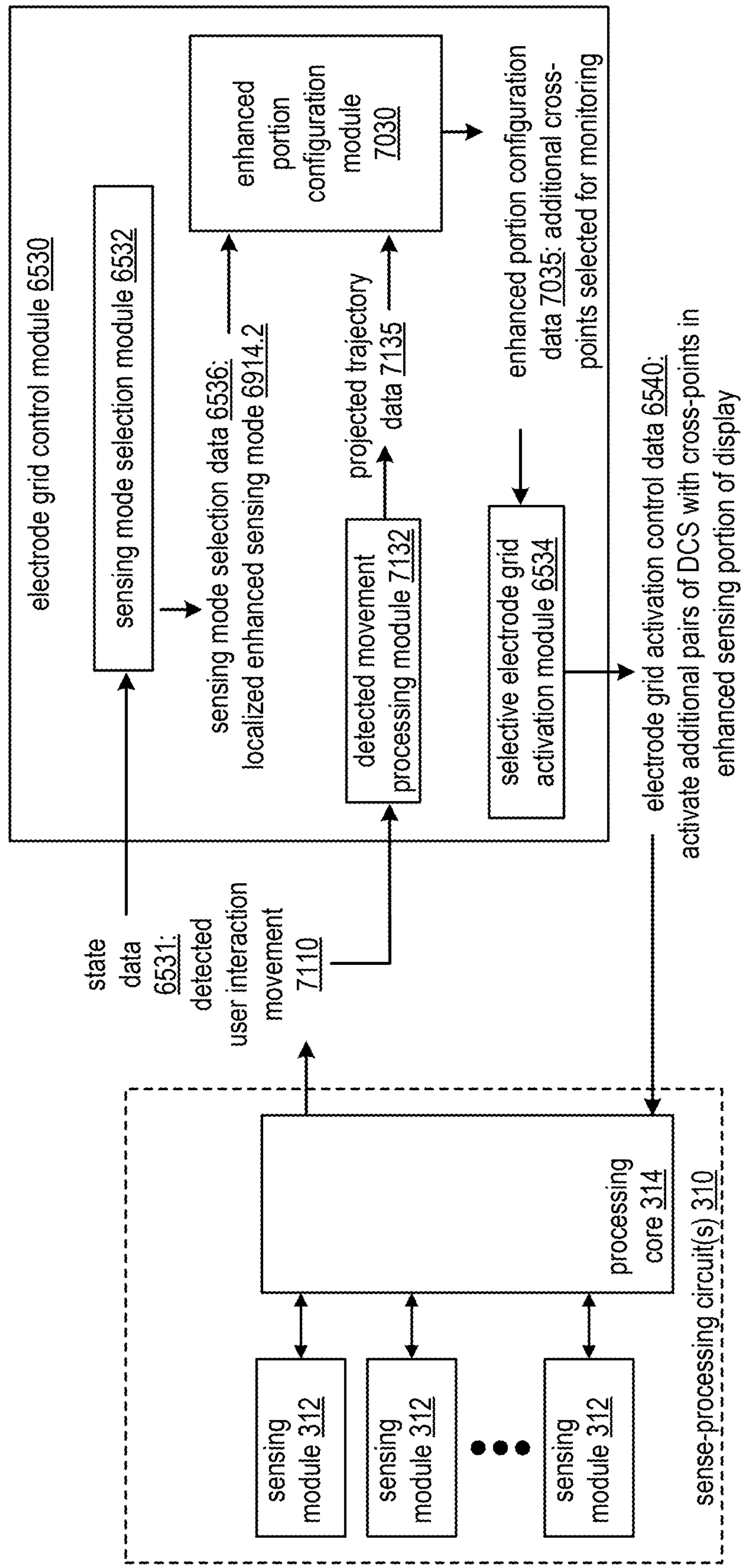
FIG. 71A is a schematic block diagram of an electrode grid control module that processes detected user interaction movements detected by at least one sense-processing circuit in accordance with various embodiments.
Figure 71B:
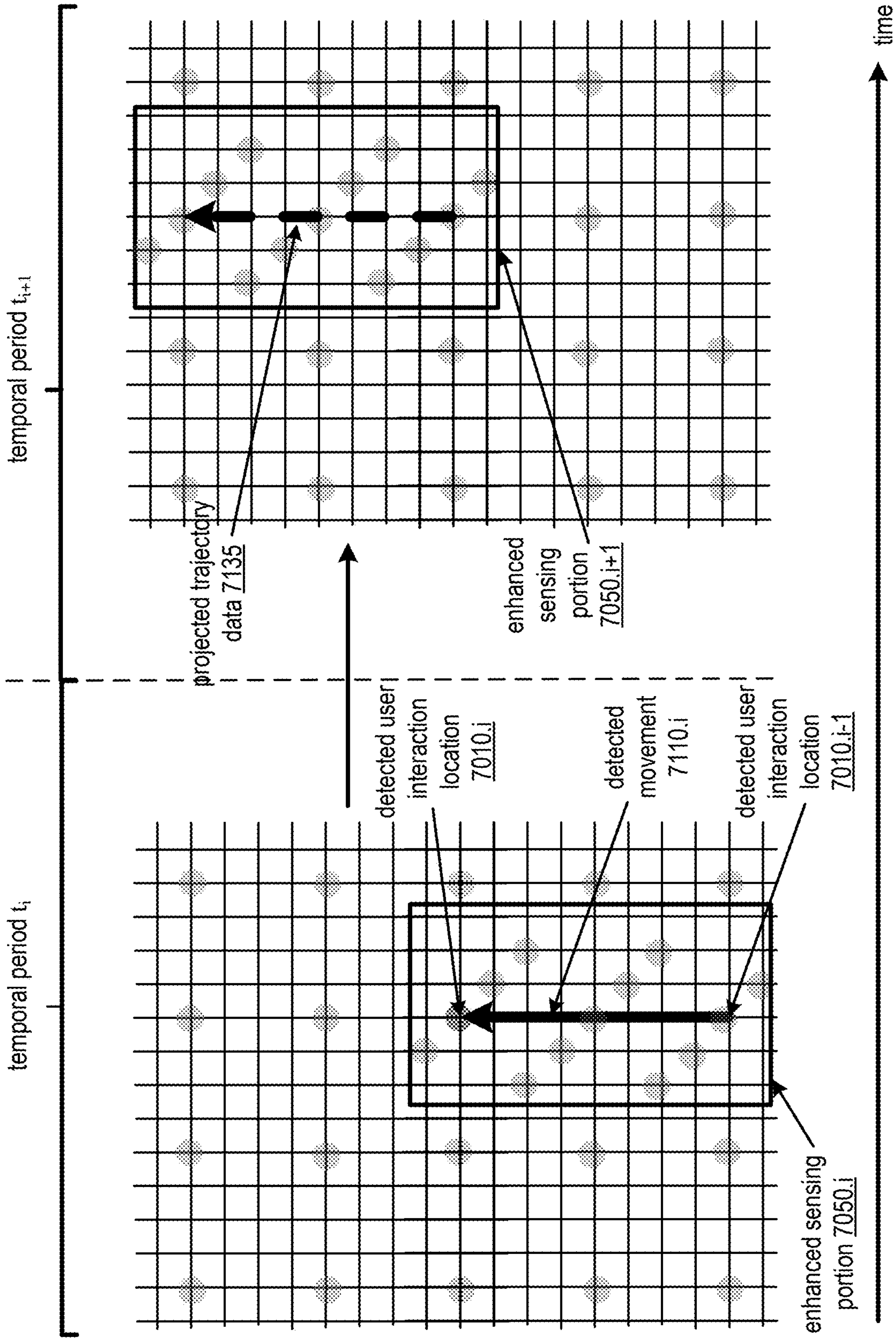
FIG. 71B illustrates transition of by a touch screen display from implementing a first enhanced sensing portion to a second enhanced sensing portion based on a detected user interaction movement in accordance with various embodiments.
Figure 71C:
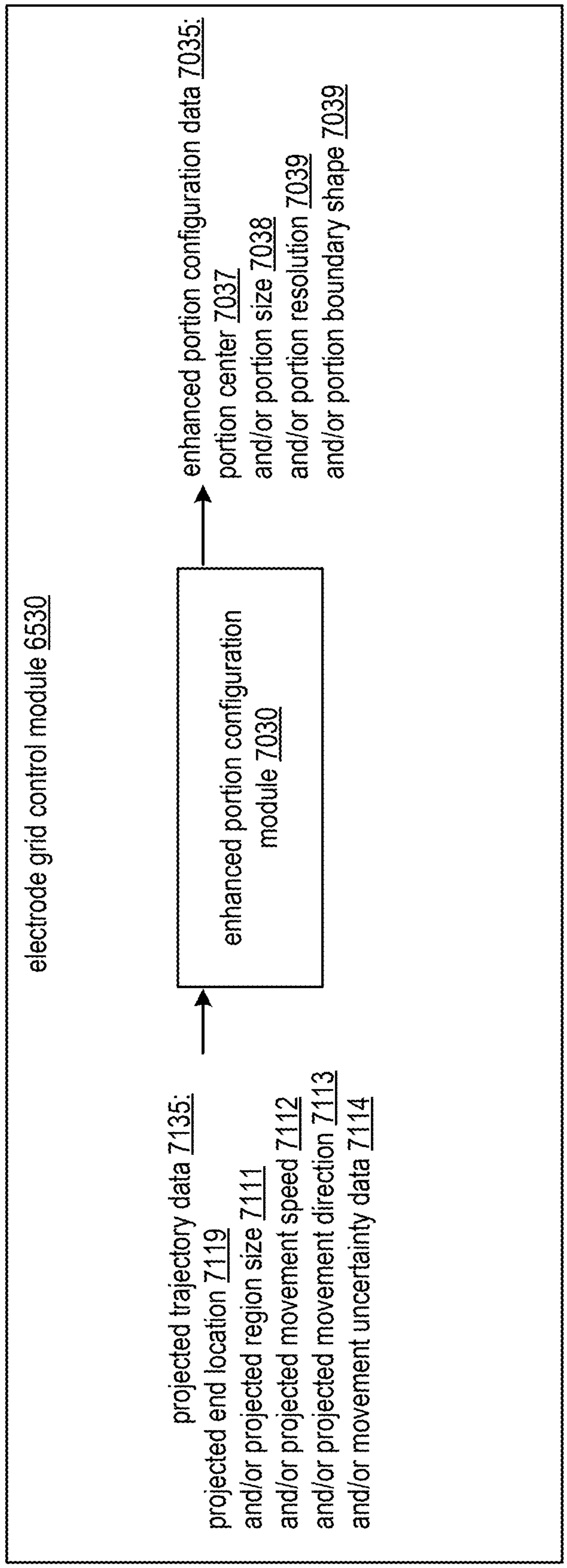
FIG. 71C is a schematic block diagram of an enhanced portion configuration module of an electrode grid control module in accordance with various embodiments.

FIGS. 71A-71C illustrate embodiments of a touch screen display that is operable to adapt the sensing resolution in different portions of the touch screen display based on the motion of a detected user interaction. In particular, the touch screen display can facilitate more granular sensing resolution within portions of the touch screen where a tracked user interaction is projected to travel to in subsequent time frames to ensure this region is monitored with more sensitivity, for example, due to the user interaction being expected to travel to this new location based on its most recent path and/or speed of motion. Some or all features and/or functionality of the touch screen display and/or the electrode grid control module of FIGS. 71A-71C can implement the electrode grids of FIG. 65A, the electrode grid control module 6530 of FIG. 65K and/or FIG. 65L, and/or any other embodiment of the electrode grid control module 6530 and/or touch screen display described herein.

FIG. 71A illustrates an embodiment of an electrode grid control module 6530 that can select and facilitate activation of a localized enhanced sensing mode 7014 based on projected trajectory data 7135 generated for a detected user interaction movement 7110. The localized enhanced sensing mode 7014 of FIG. 71A can be implemented as the same or different localized enhanced sensing mode 7014 of FIGS. 70A-70C, for example, where the localized enhanced sensing mode 7014 is optionally further based on tracked motion of the detected user interaction. One or more localized enhanced sensing modes 7014 of FIG. 71A can be implemented as one or more sensing modes 6515 of FIGS. 65A and/or can be utilized to implement one or more other types of sensing modes discussed herein.

In some embodiments, the detected user interaction movement 7110 indicates and/or is based on: a most recent interaction movement speed 7012, for example, over the two most recent capacitive images, an average interaction movement speed 7012, for example, over more than two capacitive images; a plurality of interaction movement speeds over more than two capacitive images; a tracked and/or learned pattern in interaction movement speed generated based on tracked movements over time; a most recent interaction movement direction 7013, for example, over the two most recent capacitive images, an average interaction movement direction 7013, for example, over more than two capacitive images; a plurality of interaction movement direction over more than two capacitive images 232 and/or a corresponding shape of motion; a tracked and/or learned pattern in interaction movement speed generated based on tracked movements over time; a most recent, average, and/or plurality of interaction accelerations based on two or more user interaction speeds 7012 and/or two or more user interaction directions 7012; any order derivative applied to the user interaction locations 7010 over time; one or more vectors with respect to a coordinate system corresponding to the display characterizing the speed and/or direction of motion; a known and/or expected gesture the user is in the process of performing and/or is expected to finish performing; the location of one or more graphical user elements the user appears to be moving away from and/or towards; and/or other parameters.

Projected trajectory data 7135 can be generated via a detected movement processing module 7132 based on processing the detected user interaction movement 7110, such as some or all of these parameters. Generating the projected trajectory data 7135 can be based on applying predicted aspects of the motion to one or more times in the future, such as one or more subsequent time frames in accordance with a frame rate of display of graphical images and/or in accordance with a rate of updating the enhanced sensing portion in accordance with most recent and/or predicted user motion over time. Generating the projected trajectory data 7135 can be based on determining an expected final location of motion at a future time, such as after one or more fixed time frames, by applying: a same speed as the speed indicated in the detected user interaction movement 7110: a same direction as the speed indicated in the detected user interaction movement 7110; a same acceleration as the acceleration indicated in the detected user interaction movement 7110; a same rate of change in speed, same direction, same rate of change in direction, any order derivative determined for a plurality of user interaction locations 7010 indicated in the detected user interaction movement 7110; learned behavior for next movements based on detected user interaction movement 7110; a next motion of a gesture the user is determined to be currently performing; and/or other data based on processing detected user interaction movement 7110.

FIG. 71B illustrates an example of transitioning into a localized enhanced sensing mode 7014 based on the detected motion of a user interaction. Some or all features and/or functionality of detected movement 7110 and/or the transition into a corresponding localized enhanced sensing level can be utilized to implement some or all functionality of the electrode grid control module 6530 of FIG. 71A, the touch screen display of FIG. 65A, and/or any other embodiment of the electrode grid control module 6530 and/or touch screen display described herein.

In a first temporal period $t_i$, a detected user interaction location 7010 is identified as having moved from a prior detected user interaction location 7010.*i*−1 to a new detected user interaction location 7010.*i* via a corresponding detected movement 7110.*i* This detected movement can be expressed as a vector, where the magnitude denotes speed of the movement and direction denotes direction of the movement.

The sensing mode at temporal period $t_1$ can optionally correspond to localized enhanced sensing mode with enhanced sensing portion 7050 configured based on a previously detected location of the user interaction and/or corresponding previously detected motion. Thus, the enhanced sensing portion 7050 can be adjusted over time, for example, to have a different center, shape, and/or size and/or otherwise move to different locations of the touch screen display based on tracking movement of the user interaction across the display of the touch screen display over time. Alternatively, detected movement 7110 can be detected during operation under any other sensing mode.

The enhanced sensing portion 7050 can be generated based on projected trajectory data 7135. In this example, the projected trajectory data 7135 indicates continuing of the movement at the same speed and in the same direction. The projected trajectory data 7135 can alternatively indicate projected changes in speed and/or direction, for example, based on a plurality of prior movements and/or as discussed previously.

In this example, the enhanced sensing portion 7050 is an oblong region, such a non-square rectangle, with a major axis along the direction of the projected movement. A length of the major axis can be an increasing function of the projected speed of the projected motion and/or an amount of uncertainty associated with the projected motion, for example, as an increasing function of a measured standard deviation of speed in previously detected motion of the same or different user interaction. A length of a minor axis of the oblong shape and/or a width of the oblong shape can be an increasing function of: the size of the detected location region 6910 tracked in the detected motion and/or a corresponding projected size of the location region; and/or an amount of uncertainty associated with the projected motion, for example, as an increasing function of a measured standard deviation of direction in previously detected motion of the same or different user interaction.

The enhanced sensing portion 7050 can otherwise be in accordance with any oblong or non-oblong shape. The shape of enhanced sensing portion 7050 can be configured to bound a non-linear shape, such as an arc shape or other non-linear shape, based on the projected motion corresponding to a non-linear motion.

In this example, the center of the enhanced sensing portion 7050 is centered at a midpoint between the projected start location and projected end location of the projected motion. In other embodiments, the center of the enhanced sensing portion 7050 is centered at the projected end location of the projected motion. In other embodiments, the center of the enhanced sensing portion 7050 is centered at the projected start location of the projected motion, or otherwise at a most recently detected location. In other embodiments, the center of the enhanced sensing portion 7050 is centered at another location along and/or based on the projected motion, for example, that is strictly different from the start location unless the projected motion indicates no movement from the current location.

In this example, the enhanced sensing portion has a resolution of all electrode grids being active. The resolution can be selected differently for the enhanced sensing portion 7050 based on the projected motion and/or discussed in conjunction with FIGS. 69A-69E and/or as discussed in conjunction with FIGS. 70A-70C.

In some embodiments, the level of resolution is selected as a decreasing function of speed of the motion. In some embodiments, the level of resolution is selected as an increasing function of rate of change in direction of the motion. In some embodiments, the level of resolution is selected as a decreasing function the size of the detected location region 6910 tracked in the detected motion and/or a corresponding projected size of the location region. In some embodiments, the level of resolution is selected as an increasing function of: an amount of uncertainty associated with the projected motion, for example, as an increasing function of a measured standard deviation of speed and/or direction in previously detected motion of the same or different user interaction.

FIG. 71C illustrates an example of applying the enhanced portion configuration module 7030 to generate the enhanced portion configuration data 7035. The enhanced portion configuration data 7035 can indicate and/or be based some or all parameters discussed in conjunction with FIG. 71C, where the parameters can define the selection of the additional sense cells for monitoring when activating the localized enhanced sensing mode 7014.

Some or all of these parameters can be fixed for all enhanced sensing portions 7050 and/or can be a function of and/or otherwise based on one of more parameters of the projected trajectory data 7135, such as: a projected end location 7119 of the detected user interaction; a projected region size 7111; at least one projected speed 7012; at least one projected direction 7013 and/or other projected path, which can correspond to a linear and/or non-linear projected motion; and/or movement uncertainty data 7114 for the projected motion. The movement uncertainty data 7114 can indicate and/or be based on variance, standard deviation, and/or other measures of uncertainty generated for: the projected end location 7119, projected region size 7111, projected speed 7012, projected direction 7013 and/or other path, and/or other parameters of the projected trajectory data 7135, for example, based on measured standard deviation and/or variance of detected motion over one or more recent time frames and/or learned over longer lengths of time.

Figure 71D:
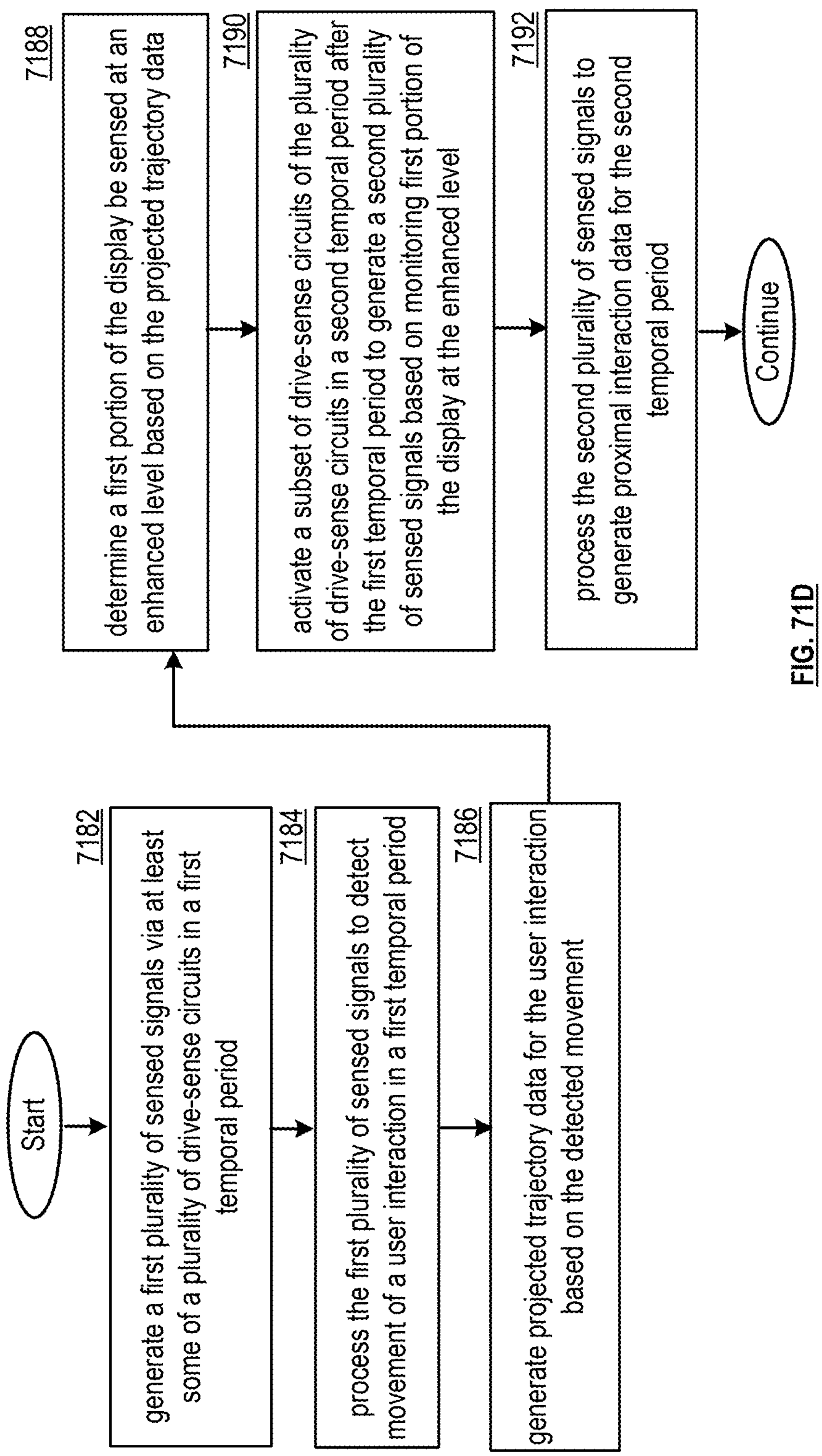
FIG. 71D is a logic diagram of an example method for execution in accordance with various embodiments.

FIG. 71D illustrates a flow diagram of an embodiment of a method in accordance with the present disclosure. In particular a method is presented for execution by and/or for use in conjunction with a plurality of drive-sense circuits 28, a plurality of electrodes 85, touch screen processing module 82, other processing modules 42, touch screen 16, 20, 80, and/or 90, computing device 14 and/or 18, and/or other sensors, processing modules, touch screen displays, and/or computing devices disclosed herein. Some or all steps of FIG. 71D can be performed in conjunction with the embodiments illustrated in and described in conjunction with FIGS. 71A-FIG. 71C. Some or all steps of FIG. 71D can be performed in conjunction with some or all steps of FIG. 65M, FIG. 66H, FIG. 67C, FIG. 68C, FIG. 69F, FIG. 70D, and/or any other methods described herein.

Step 7182 includes generating a first plurality of sensed signals via at least some of a plurality of drive-sense circuits in a first temporal period. Step 7184 includes processing the first plurality of sensed signals to detect movement of a user interaction in a first temporal period. Step 7186 includes generating projected trajectory data for the user interaction based on the detected movement. Step 7188 includes determining a first portion of the display be sensed at an enhanced level based on the projected trajectory data. Step 7190 includes activating a subset of drive-sense circuits of the plurality of drive-sense circuits in a second temporal period after the first temporal period to generate a second plurality of sensed signals based on monitoring first portion of the display at the enhanced level. Step 7192 includes processing the second plurality of sensed signals to generate proximal interaction data for the second temporal period.

In various embodiments, a touch screen display includes the plurality of sets of drive-sense circuits. For example, the touch screen display performs some or all steps of the method of FIG. 69F, and/or some or all steps of any other method described herein, utilizing the plurality of sets of drive-sense circuits.

In various embodiments, the same or different touch screen display includes a display configured to render frames of data into visible images. For example, the touch screen display comprises a video graphics processing module operably coupled to generate the frames of data.

In various embodiments, the touch screen display includes a plurality of electrodes integrated into the display to facilitate touch sense functionality based on electrode signals having a drive signal component and a receive signal component. The plurality of electrodes can include a plurality of row electrodes and a plurality of column electrodes. The plurality of row electrodes can be separated from each the plurality of column electrodes by a dielectric material. The plurality of row electrodes and the plurality of column electrodes can form a plurality of cross points.

In various embodiments, the touch screen display includes a plurality of drive-sense circuits coupled to the plurality of electrodes. Each drive-sense circuit can be operable to generate sensed signals indicating variations in capacitance associated with at least some cross points formed by the corresponding electrode.

In various embodiments, the touch screen display includes a processing module that includes at least one memory that stores operational instructions and at least one processing circuit that executes the instructions to perform operations. The operations can include: receiving a first plurality of sensed signals from at least some of the plurality of drive-sense circuits in a first temporal period; processing the first plurality of sensed signals to detect movement of a user interaction in a first temporal period; generating projected trajectory data for the user interaction based on the detected movement; determining a first portion of the display be sensed at an enhanced level based on the projected trajectory data; activating a subset of drive-sense circuits of the plurality of drive-sense circuits in a second temporal period after the first temporal period to generate a second plurality of sensed signals based on monitoring first portion of the display at the enhanced level; receiving the second plurality of sensed signals from the subset of drive-sense circuits in the second temporal period; and/or processing the second plurality of sensed signals to generate proximal interaction data for the second temporal period. The operations can include and/or can be based on: some or all steps of FIG. 71D, operations of any other processing module described herein, and/or some or all steps of any other method described herein.

In various embodiments, the plurality of electrodes include a plurality of sets of electrodes. In various embodiments, the set of electrodes of the plurality of sets of electrodes includes a corresponding proper subset of non-neighboring ones of a plurality of row electrodes and a corresponding proper subset of non-neighboring ones of a plurality of column electrodes. In various embodiments, the subset of the plurality of drive-sense circuits corresponds to at least one first set of plurality of sets of electrodes. The plurality of sets of electrodes can be implemented via any features and/or functionality of distinct electrode grids described herein, and/or via any features and/or functionality of the plurality of sets of electrodes described in conjunction with FIGS. 65M, 66H, and/or 67C.

In various embodiments, each of the plurality of drive-sense circuits includes a first conversion circuit and a second conversion circuit. In various embodiments, when each of the subset of drive-sense circuits of the plurality of drive-sense circuits is enabled to monitor a corresponding electrode of the plurality of electrodes based on being activated, each conversion circuit of each drive-sense circuit of the subset of drive-sense circuits is configured to convert the receive signal component into a sensed signal of the set of sensed signals and/or each second conversion circuit of each drive-sense circuit of the subset of drive-sense circuits is configured to generate the drive signal component from the sensed signal of the set of sensed signals.

In various embodiments, the operations further include: determining a remaining portion of the surface of the display be sensed at a base level based on the first portion; identifying a second proper subset of the plurality of cross points included in the second portion for sensing based on the base level; and/or activating the subset of drive-sense circuits of the plurality of drive-sense circuits in the second temporal period after the first temporal period to generate the second plurality of sensed signals based on further monitoring the second proper subset of the plurality of cross points.

In various embodiments, a first minimum distance between ones of the first proper subset of the plurality of cross points included in the first portion is less than a second minimum distance between ones of the second proper subset of the plurality of cross points included in the second portion based on the enhanced resolution level having a higher resolution than the base resolution level. In various embodiments, a first maximum distance between ones of the first proper subset of the plurality of cross points included in the first portion is less than a second maximum distance between ones of the second proper subset of the plurality of cross points included in the second portion based on the enhanced resolution level having a higher resolution than the base resolution level. In various embodiments, a first average distance between ones of the first proper subset of the plurality of cross points included in the first portion is less than a second average distance between ones of the second proper subset of the plurality of cross points included in the second portion based on the enhanced resolution level having a higher resolution than the base resolution level.

In various embodiments, the plurality of cross points included in the first portion are bounded by an oblong shape having a major axis in a first direction based on a projected direction of movement indicated by the projected trajectory data. In various embodiments, the projected direction of movement is a linear direction based on a most recent direction of movement.

In various embodiments, the operations further include determining the first portion based on determining at least one first cross point be included within the first portion based on a portion of the detected user interaction being detected at the at least one first cross point. In various embodiments, the oblong shape includes the at least one first cross point in a first portion of the major axis that is off-center with respect to the major axis in a direction from a center of the oblong shape opposite the first direction.

In various embodiments, the operations further include determining the first portion based on determining a length of the major axis based on a speed of movement of the detected user interaction.

In various embodiments, the plurality of cross points included in the first portion are bounded by a shape surrounding a non-projected direction of movement indicated by the projected trajectory data.

In various embodiments, the operations further include generating movement pattern data tracking movement of user interaction over time. In various embodiments, generating the projected trajectory data is further based on the movement pattern data.

In various embodiments, the operations further include determining the first portion further based on at least one interactable element displayed by the display at the location.

In various embodiments, the operations further include determining the movement of the user interaction based on generating a plurality of capacitance image data over a plurality of time frames within the first temporal period.

In various embodiments, the operations further include: generating updated projected trajectory data based on the detected user interaction in the second first temporal period; determining an updated first portion for sensing at the enhanced level by updating, based on the updated projected trajectory data, at least one of: a location of the first portion, a size of the first portion, or a shape of the first portion; identifying an updated first proper subset of the plurality of cross points included in the updated first portion based on the enhanced level; activating an updated subset of drive-sense circuits of the plurality of drive-sense circuits in a third temporal period after the second temporal period to generate an additional plurality of sensed signals based on monitoring the first proper subset of the plurality of cross points; receiving the additional plurality of sensed signals from the subset of drive-sense circuits in the third temporal period; and/or processing the additional plurality of sensed signals to generate proximal interaction data for the third temporal period.

In various embodiments, the touch screen display is implemented via some or all features and/or functionality of any other embodiment of the touch screen display described herein.

In various embodiments, another touch-based device such as a touch panel does not include a display, but includes the plurality of sets of electrodes, the plurality of sets of drive-sense circuits, and/or the processing module. Such a touch-based device can be configured to perform some or all steps of the method of FIG. 71D and/or can be configured via some or all various features and/or functionality of the touch screen display described above and/or described in conjunction with FIGS. 71A-71C.

FIGS. 72A-72E illustrate embodiments of a touch screen display that is operable to adapt the sensing resolution of the touch screen display based on the currently displayed interactable elements, for example, of a corresponding GUI of graphical display data, and/or based on a type of processing of user interactions, for example, in accordance with a corresponding type of application currently executed by the touch screen display. Some or all features and/or functionality of the touch screen display and/or the electrode grid control module of FIGS. 72A-72C can implement the electrode grids of FIG. 65A, the electrode grid control module 6530 of FIG. 65K and/or FIG. 65L, and/or any other embodiment of the electrode grid control module 6530 and/or touch screen display described herein.

In particular, the touch screen display can facilitate more granular sensing resolution when the touch screen display is displaying types of interactable elements requiring greater granularity (e.g. smaller buttons; sliders with more granularity; a free hand region for supplying a signature or drawing characters/shapes; displaying video game data when executing video game application requiring accurate detection of touch-based user commands/user gestures via the touch screen display; etc.), and facilitates less granular sensing resolution when the touch screen display is displaying types of interactable elements requiring less granularity (e.g. larger buttons; sliders with less granularity; displaying video data when executing a video streaming application requiring simple taps to pause/play; not displaying any GUI and simply displaying data for viewing only; etc.). Corresponding different resolutions can be selected and applied across the screen as a whole when different types of interactable elements are displayed/and/or when different granularity is otherwise required based on the type of application being executed. In some embodiments, different portions of the screen displaying different types of interactable elements at a given time and/or otherwise requiring different granularity at different portions based on one or more applications being executed can be monitored in accordance with different resolutions at a given time.

Figure 72A:
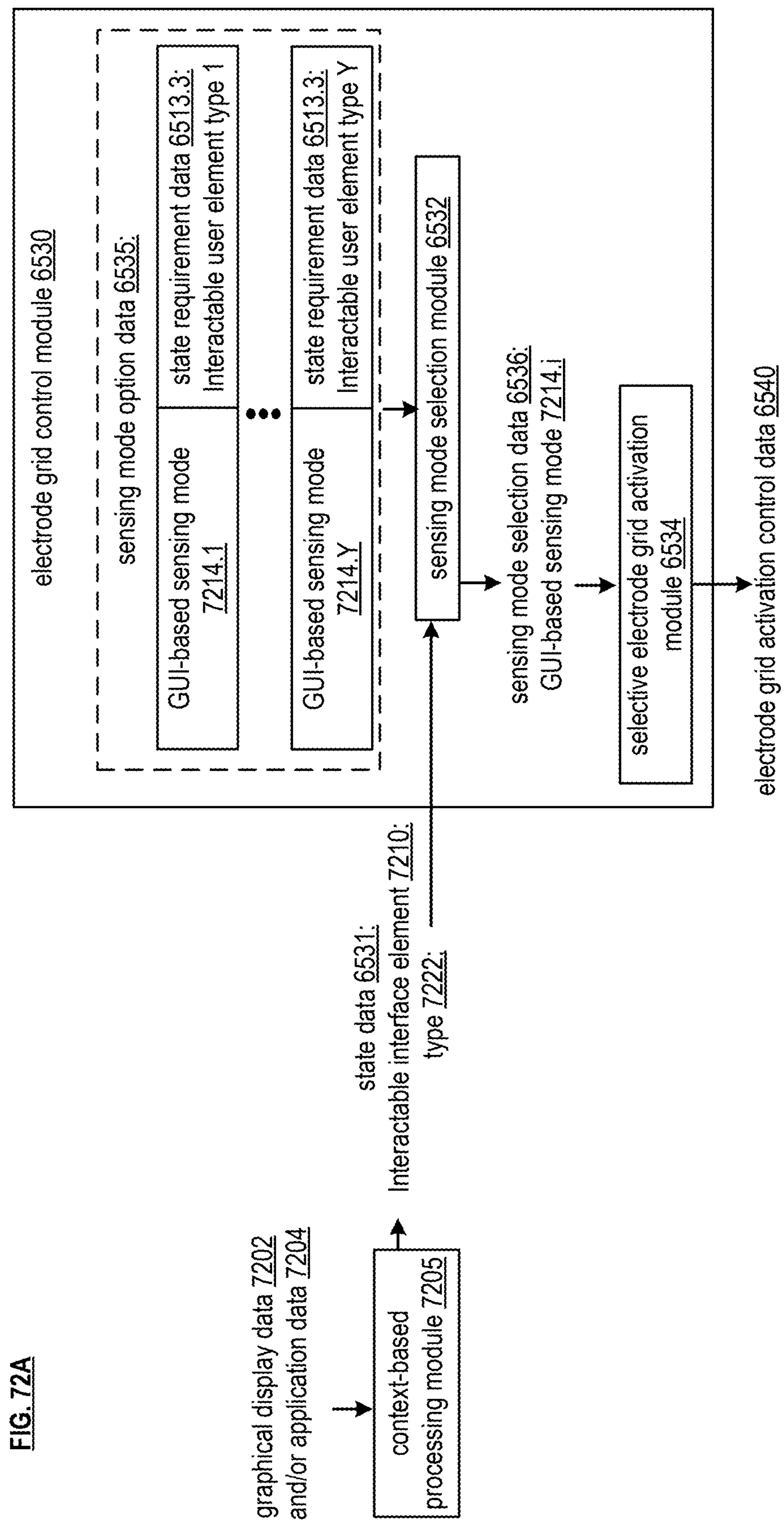
FIGS. 72A-72B are schematic block diagrams of an electrode grid control module that processes interactable interface elements of graphical state data displayed by a touch screen display in accordance with various embodiments.

FIG. 72A illustrates an embodiment of an electrode grid control module 6530 that can select and facilitate activation of a GUI-based enhanced sensing mode 7214 based on the type 7222 or other features of an interactable interface element 7210, and/or of other processing of user input in accordance with the currently displayed graphical image data.

Corresponding state data 6531 indicating these characteristics can be generated via a context-based processing module 7205. This can include receiving and/or processing the displayed graphical display data 7202, receiving and/or processing application data 7204 of a currently executed application, and/or processing other information denoting the type of user interaction processing required and/or size and/or granularity of interface features of a currently displayed GUI.

Sensing mode selection module 6532 can select one of a plurality of GUI-based sensing modes 7214.1-7214.Y based on the type of interactable interface element 7210, and/or other characteristics corresponding to processing of user input in accordance with the currently displayed graphical image data. For example, the plurality of GUI-based sensing modes 7214.1-7214.Y are implemented as the enhanced resolution levels 6914.1-6914.X and/or as other sensing modes 6515 with different corresponding resolutions, such as different concentration of and/or distribution pattern of sensing cells activated via activation of corresponding pairs of DSCs. In some embodiments, a base resolution level 6912 corresponds to one of the GUI-based sensing modes 7214.1 and/or corresponds to a resolution level when no interactable interface elements are displayed and/or when user input is not required for executed of a corresponding application at the given time (e.g. a movie is being played and/or a screen saver is on). Transitioning between various modes over time can include activating more or less DSCs, for example, based on whether transitioning from a higher resolution level to a lower resolution level in accordance with the corresponding GUI-based sensing modes 7214.

Figure 72B:
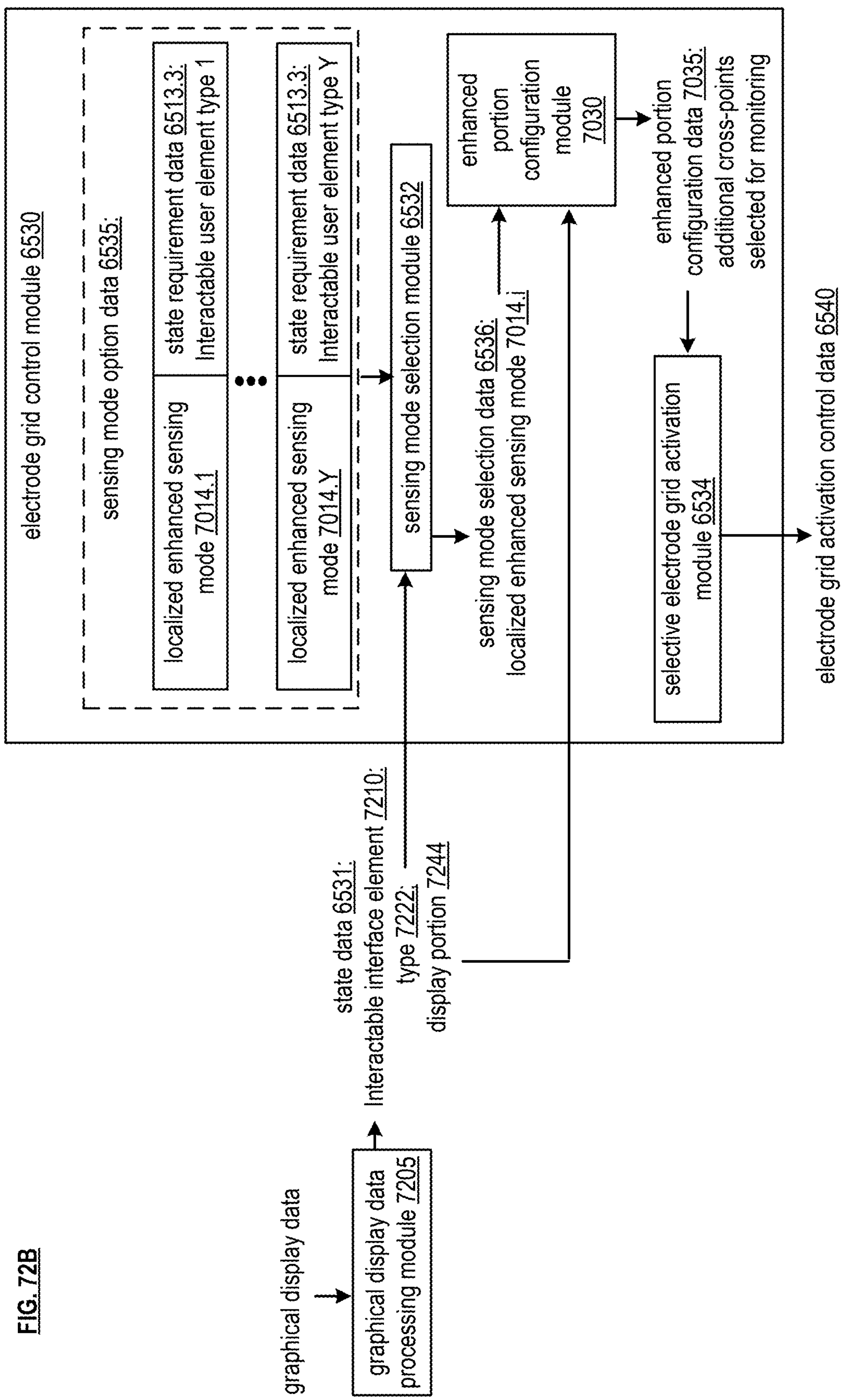

FIG. 72B illustrates another embodiment of an electrode grid control module 6530 that can select and facilitate activation of a localized enhanced sensing mode 7014 based on the type 7222 and/or location 7244 or other features of an interactable interface element 7210, and/or of other processing of user input in accordance with the currently displayed graphical image data. In particular, the localized enhanced sensing mode 7014 can be implemented in a same or similar a localized sensing mode of FIGS. 70A-70C and/or 71A-71C, where the location of the corresponding enhanced sensing portion 7050 is further selected based on the location of an interactable element instead of or in addition to the location of a detected and/or projected user interaction.

Furthermore, the resolution of the enhanced sensing portion 7050 can be further selected based on the type of the interactable interface element 7210, and/or of other processing of user input in accordance with the currently displayed graphical image data as discussed in conjunction with FIG. 72A, where this resolution is only applied to the portion of the touch screen display where this interactable interface element 7210 is located and/or where the corresponding user input will be processed in accordance with the corresponding characteristics requiring the corresponding resolution. For example, a plurality of localized enhanced sensing mode 7014.1-7014.Y correspond to the plurality of GUI-based sensing modes 7214.1-7214.Y for localization in the appropriate portion of the display, for example, corresponding to different resolution levels such as different enhanced resolution levels 6914.1-6914.X. Alternatively, a single localized enhanced sensing mode 7014 can be applied with a fixed resolution, for example, in locations with buttons or other interface features, where remaining portions are monitored at a base sensing mode at lower resolution than the enhanced sensing portion 7050.

Figure 72C:
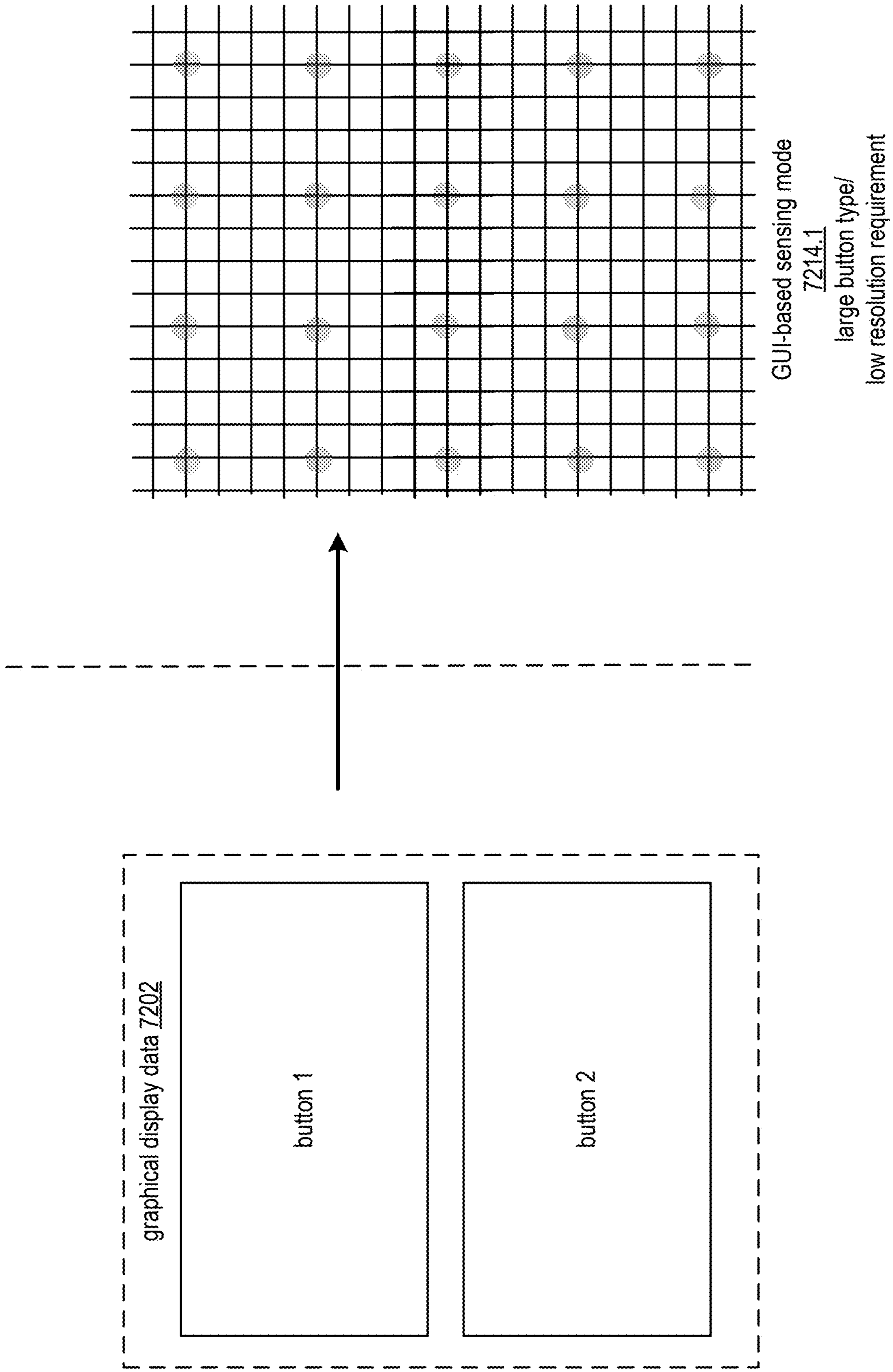
FIGS. 72C-72D illustrate activation of example GUI-based sensing modes via a touch screen display based on example interactable interface elements in accordance with various embodiments.
Figure 72D:
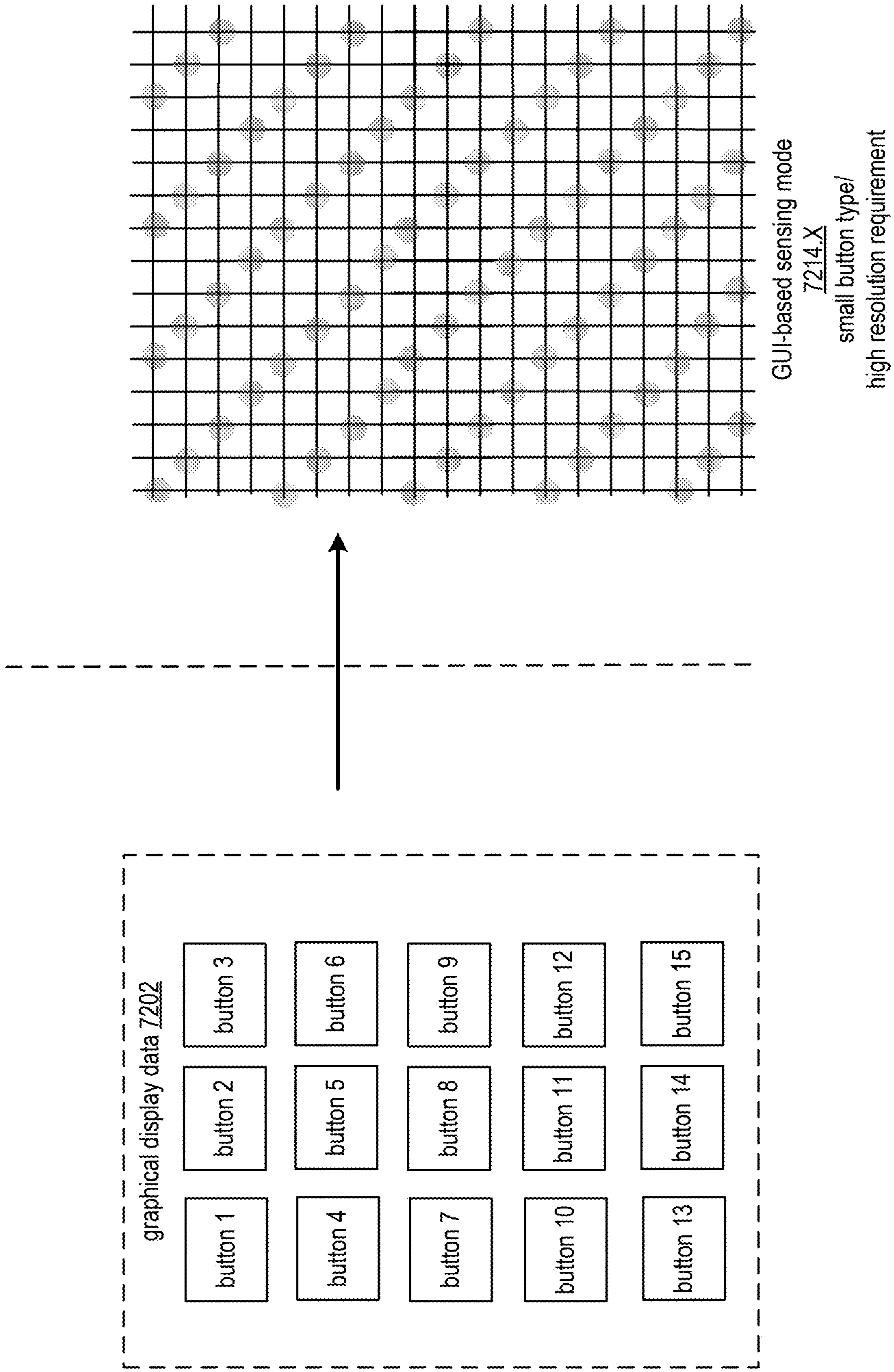

FIGS. 72C and 72D illustrate examples of selecting and activating a GUI-based sensing mode 7214 based on different graphical display data 7202 requiring different granularity in sensing user interactions of two different sizes. Some or all features and/or functionality of graphical display data 7202 and/or the transition into a corresponding GUI-based sensing mode 7214 can be utilized to implement some or all functionality of the electrode grid control module 6530 of FIG. 69A, the touch screen display of FIG. 65A, and/or any other embodiment of the electrode grid control module 6530 and/or touch screen display described herein.

In the example of FIG. 72C, at temporal period to, graphical display data 7202 is determined to display two large buttons, and GUI-based sensing mode 7214.1, or another GUI-based sensing mode 7214, is selected and applied for the following temporal period $t_1$ in response. For example, the GUI-based sensing mode 7214 corresponds to activation of exactly one electrode grids and/or is another low resolution mode based on the GUI-based sensing mode 7214.1 corresponding to a large button type or other low resolution requirement.

In the example of FIG. 72D, at temporal period to, a plurality of smaller buttons occupy the same space as these larger buttons, and thus require greater granularity to distinguish between selection of different buttons than that required of FIG. 72C. Thus, GUI-based sensing mode 7214.X, or another GUI-based sensing mode 7214 that is higher resolution than that of FIG. 72C, is selected and applied for the following temporal period $t_1$ in response. For example, the GUI-based sensing mode 7214.X corresponds to activation of all electrode grids, and/or is another mode with higher resolution than the GUI-based sensing mode 7214.1 of FIG. 72C. The GUI-based sensing mode 7214 selected for plurality of smaller buttons of FIG. 72D can otherwise render higher resolution of monitored sense cells than that of FIG. 72C such as a higher concentration of sense cells in some or all portions of the touch screen in a given time frame, and/or across multiple consecutive time frames in the case where the active DSCs rotate over time frames as discussed in conjunction with FIG. 67A.

Figure 72E:
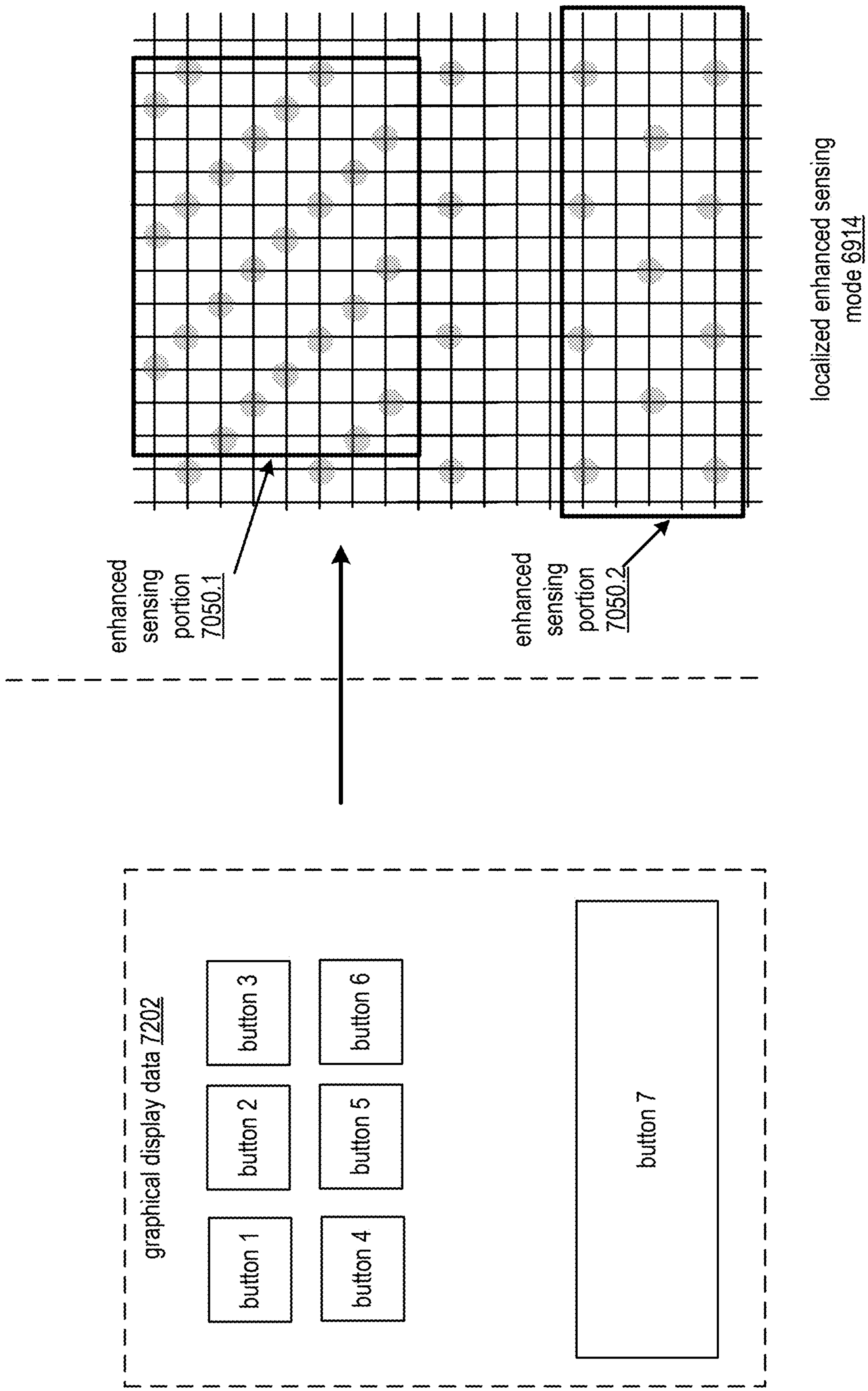
FIG. 72E illustrates activation of different enhanced sensing portions in different locations based on locations of different example interactable interface elements in accordance with various embodiments.

FIG. 72E illustrates an example of selecting and activating a two different GUI-based sensing modes 7214 for two different enhanced sensing portions corresponding to locations of two different interactable interface elements of displayed simultaneously in graphical display data 7202. Some or all features and/or functionality of graphical display data 7202 and/or the transition into corresponding GUI-based sensing modes 7214 at two different enhanced sensing portions can be utilized to implement some or all functionality of the electrode grid control module 6530 of FIG. 69A, the touch screen display of FIG. 65A, and/or any other embodiment of the electrode grid control module 6530 and/or touch screen display described herein.

In the example of FIG. 72D, at temporal period to, the graphical display data 7202 includes a plurality of smaller buttons 1-6 displayed in a top portion of the screen, a single large button 7 displayed in a bottom portion of the screen, and an empty void corresponding to no interactable elements in between the plurality of smaller buttons and the single large button.

The plurality of smaller buttons can correspond to a first type of interactable element requiring higher resolution, and an enhanced sensing portion 7050.1 surrounding some or all of portion of the touch screen display displaying this corresponding portion of the graphical display data can be configured at the high resolution, for example, in accordance with a corresponding GUI-based sensing mode.

The single larger buttons can correspond to a second type of interactable element not requiring this higher resolution, and an enhanced sensing portion 7050.2 surrounding some or all of portion of the touch screen display displaying this corresponding portion of the graphical display data can be configured at a lower resolution, for example, in accordance with a corresponding GUI-based sensing mode.

In this example, as the single larger buttons is still a region where a user is expected to interact, as opposed to other portions of the screen devoid of any buttons or other interactable interface elements, a base resolution level, base sensing mode, and/or or other resolution level lower than that of the two enhanced sensing portion 7050.1 and 7050.2 can be applied to the remaining portion of the touch screen.

Figure 72F:
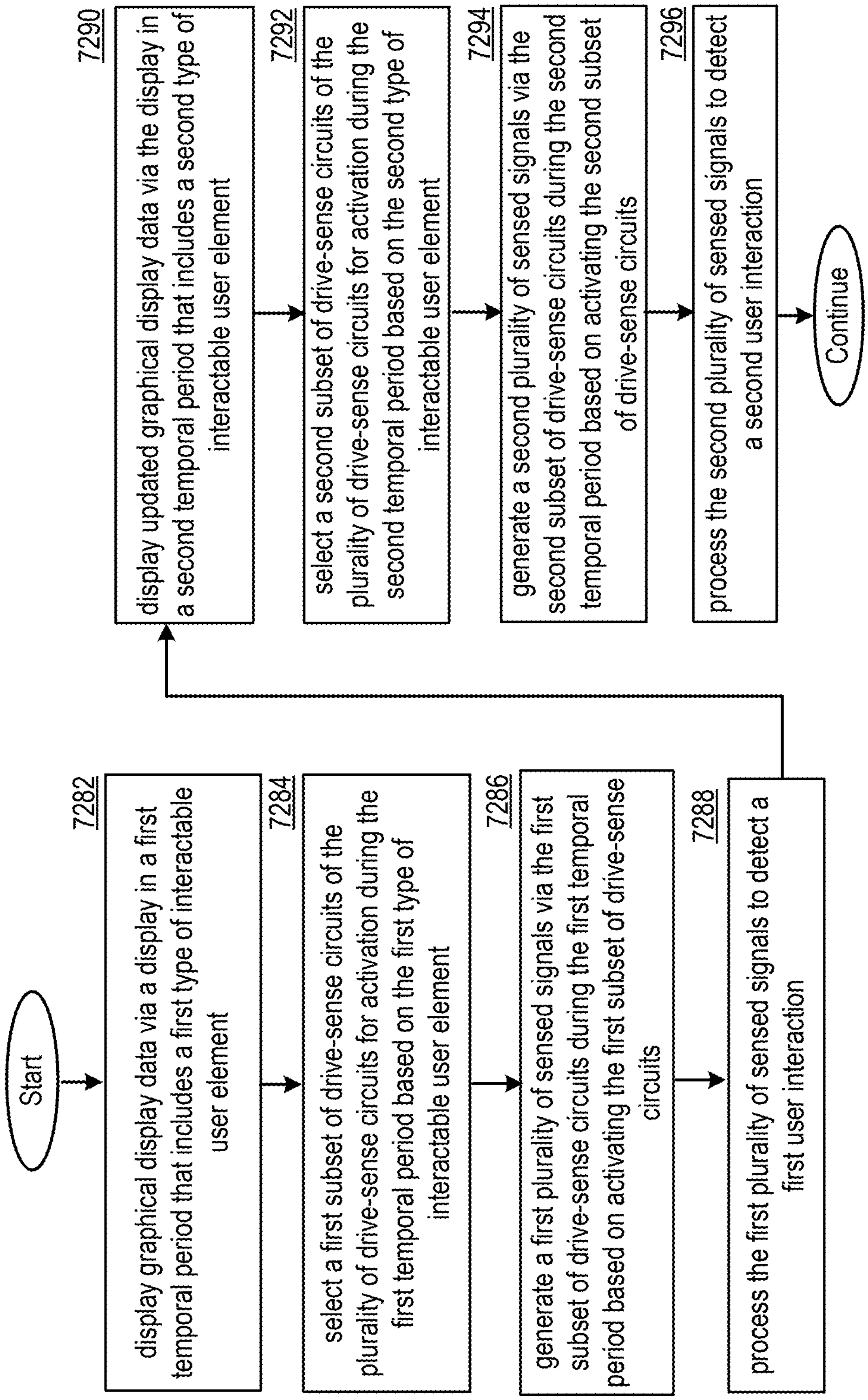
FIG. 72F is a logic diagram of an example method for execution in accordance with various embodiments.

The configuration of various enhanced sensing portions 7050 by the electrode grid control module can be based on a combination of parameters that include both parameters corresponding to detected and/or projected user interactions as discussed in conjunction with FIGS. 69A-71D as well as parameters corresponding to the graphical image data being displayed and/or the application being executed. For example, a given enhanced sensing portions 7050 is generated based on user interaction within and/or in proximity to a region of the screen with small buttons and/or requiring higher granularity. This given enhanced sensing portion 7050 can be generated to have higher resolution than that generated for this region of the screen prior to the detection of the user interaction. Alternatively or in addition, this given enhanced sensing portion 7050 is generated to have higher resolution than that generated for other detected user interaction is other regions of the screen that do not include interface features and/or that include interface features requiring less granularity FIG. 72F illustrates a flow diagram of an embodiment of a method in accordance with the present disclosure. In particular a method is presented for execution by and/or for use in conjunction with a plurality of drive-sense circuits 28, a plurality of electrodes 85, touch screen processing module 82, other processing modules 42, touch screen 16, 20, 80, and/or 90, computing device 14 and/or 18, and/or other sensors, processing modules, touch screen displays, and/or computing devices disclosed herein. Some or all steps of FIG. 72F can be performed in conjunction with the embodiments illustrated in and described in conjunction with FIGS. 72A-FIG. 72E. Some or all steps of FIG. 72F can be performed in conjunction with some or all steps of FIG. 65M, FIG. 66H, FIG. 67C, FIG. 68C, FIG. 69F, FIG. 70D, FIG. 71D and/or any other methods described herein.

Step 7282 includes displaying graphical display data via a display in a first temporal period that includes a first type of interactable interface element. Step 7284 includes selecting a first subset of drive-sense circuits of the plurality of drive-sense circuits for activation during the first temporal period based on the first type of interactable interface element. Step 7286 includes generating a first plurality of sensed signals via the first subset of drive-sense circuits during the first temporal period based on activating the first subset of drive-sense circuits. Step 7288 includes processing the first plurality of sensed signals to detect a first user interaction.

Step 7290 includes displaying updated graphical display data via the display in a second temporal period that includes a second type of interactable interface element. Step 7292 includes selecting a second subset of drive-sense circuits of the plurality of drive-sense circuits for activation during the second temporal period based on the second type of interactable interface element. Step 7294 includes generating a second plurality of sensed signals via the second subset of drive-sense circuits during the second temporal period based on activating the second subset of drive-sense circuits. Step 7296 includes processing the second plurality of sensed signals to detect a second user interaction.

In various embodiments, a touch screen display includes the plurality of sets of drive-sense circuits. For example, the touch screen display performs some or all steps of the method of FIG. 69F, and/or some or all steps of any other method described herein, utilizing the plurality of sets of drive-sense circuits.

In various embodiments, the same or different touch screen display includes a display configured to render frames of data into visible images. For example, the touch screen display comprises a video graphics processing module operably coupled to generate the frames of data.

In various embodiments, the touch screen display includes a plurality of electrodes integrated into the display to facilitate touch sense functionality based on electrode signals having a drive signal component and a receive signal component. The plurality of electrodes can include a plurality of row electrodes and a plurality of column electrodes. The plurality of row electrodes can be separated from each the plurality of column electrodes by a dielectric material. The plurality of row electrodes and the plurality of column electrodes can form a plurality of cross points.

In various embodiments, the touch screen display includes a plurality of drive-sense circuits coupled to the plurality of electrodes. Each drive-sense circuit can be operable to generate sensed signals indicating variations in capacitance associated with at least some cross points formed by the corresponding electrode.

In various embodiments, the touch screen display includes a processing module that includes at least one memory that stores operational instructions and at least one processing circuit that executes the instructions to perform operations. The operations can include: displaying graphical display data via the display in a first temporal period that includes a first type of interactable interface element; selecting a first subset of drive-sense circuits of the plurality of drive-sense circuits for activation during the first temporal period based on the first type of interactable interface element; receiving a first plurality of sensed signals from the first subset of drive-sense circuits during the first temporal period based on activating the first subset of drive-sense circuits; processing the first plurality of sensed signals to detect a first user interaction; displaying updated graphical display data via the display in a second temporal period that includes a second type of interactable interface element; selecting a second subset of drive-sense circuits of the plurality of drive-sense circuits for activation during the second temporal period based on the second type of interactable interface element, where the second subset of drive-sense circuits is different from the first subset of drive-sense circuits based on the second type of interactable interface element being different from the first type of interactable interface element; receiving a second plurality of sensed signals from the second subset of drive-sense circuits during the second temporal period based on activating the second subset of drive-sense circuits; and/or processing the second plurality of sensed signals to detect a second user interaction. The operations can include and/or can be based on: some or all steps of FIG. 72F, operations of any other processing module described herein, and/or some or all steps of any other method described herein.

In various embodiments, the plurality of electrodes include a plurality of sets of electrodes. In various embodiments, the set of electrodes of the plurality of sets of electrodes includes a corresponding proper subset of non-neighboring ones of a plurality of row electrodes and a corresponding proper subset of non-neighboring ones of a plurality of column electrodes. In various embodiments, the first subset of the plurality of drive-sense circuits corresponds to at least one first set of plurality of sets of electrodes. In various embodiments, the second subset of the plurality of drive-sense circuits corresponds to at least one second set of plurality of sets of electrodes that is different from the at least one first set of plurality of sets of electrodes. The plurality of sets of electrodes can be implemented via any features and/or functionality of distinct electrode grids described herein, and/or via any features and/or functionality of the plurality of sets of electrodes described in conjunction with FIGS. 65M, 66H, and/or 67C.

In various embodiments, each of the plurality of drive-sense circuits includes a first conversion circuit and a second conversion circuit. In various embodiments, when each of the first subset of drive-sense circuits of the plurality of drive-sense circuits is enabled to monitor a corresponding electrode of the plurality of electrodes based on being activated, each conversion circuit of each drive-sense circuit of the first subset of drive-sense circuits is configured to convert the receive signal component into a sensed signal of the set of sensed signals and/or each second conversion circuit of each drive-sense circuit of the first subset of drive-sense circuits is configured to generate the drive signal component from the sensed signal of the set of sensed signals.

In various embodiments, the first type of interactable interface element is displayed in a first portion of the display, and the second type of interactable interface element is displayed in a second portion of the display. The second portion of the display can be different from and/or non-overlapping with the first portion of the display. In various embodiments, the first subset of drive-sense circuits of the plurality of drive-sense circuits corresponds to an enhanced resolution level in the first portion, and/or the second subset of drive-sense circuits of the plurality of drive-sense circuits corresponds to an enhanced resolution level in the second portion.

In various embodiments, a first remaining portion display is monitored via other ones of the plurality of drive-sense circuits in accordance with a base resolution level during the first temporal period based on not including the first type of interactable interface element, and/or a second remaining portion display is monitored via other ones of the plurality of drive-sense circuits in accordance with the base resolution level during the first temporal period based on not including the second type of interactable interface element.

In various embodiments, the first type of interactable interface element is interactable in accordance with a first granularity, and/or the second type of interactable interface element interactable in accordance with a second granularity that is greater than the first granularity. In various embodiments, the first subset of drive-sense circuits of the plurality of drive-sense circuits corresponds to a first resolution level based on the first granularity, and/or the second subset of drive-sense circuits of the plurality of drive-sense circuits corresponds to a second resolution level that is increased from the first resolution level based on the second granularity being greater than the first granularity.

In various embodiments, the first granularity is based on a first button size of a first set of buttons of the first type of interactable interface element and/or a first minimum distance between different ones of the first set of buttons of the first type of interactable interface element, and/or the second granularity is based on a second button size of a second set of buttons of the first type of interactable interface element and/or a second minimum distance between different ones of the second set of buttons. In various embodiments, the second granularity is greater than the first granularity based on the second button size being smaller than the first button size and/or the second minimum distance being smaller than the first minimum distance.

In various embodiments, the second granularity is greater than the first granularity based on the second type of interactable interface element including: a slider element, a free-form writing element for writing by the user, a signature element for supplying a user signature, or other element that requires greater granularity than the first type of interactable interface element.

In various embodiments, the second granularity is greater than the first granularity based on the second type of interactable interface element being interacted via a first type of object that induces a smaller interaction region than a second type of object used to interact with the first type of interactable interface element. The first type of object and/or the second type of object can correspond to a pen, a finger, a fist, a palm, or other device or body part of the corresponding user.

In various embodiments, the updated graphical display data is generated in response to detecting the first user interaction.

In various embodiments, the touch screen display is implemented via some or all features and/or functionality of any other embodiment of the touch screen display described herein.

FIGS. 73A-73D illustrate embodiments of a touch screen display that is operable to detect only variations in mutual capacitance for some sense cells; detect only variations in self capacitance at other sense cells; and/or detect variations in both mutual capacitance and self capacitance at other sense cells. Some or all features and/or functionality of the touch screen display and/or the electrode grid control module of FIGS. 73A-73D can implement the electrode grids of FIG. 65A, the electrode grid control module 6530 of FIG. 65K and/or FIG. 65L, and/or any other embodiment of the electrode grid control module 6530 and/or touch screen display described herein.

Figure 73A:
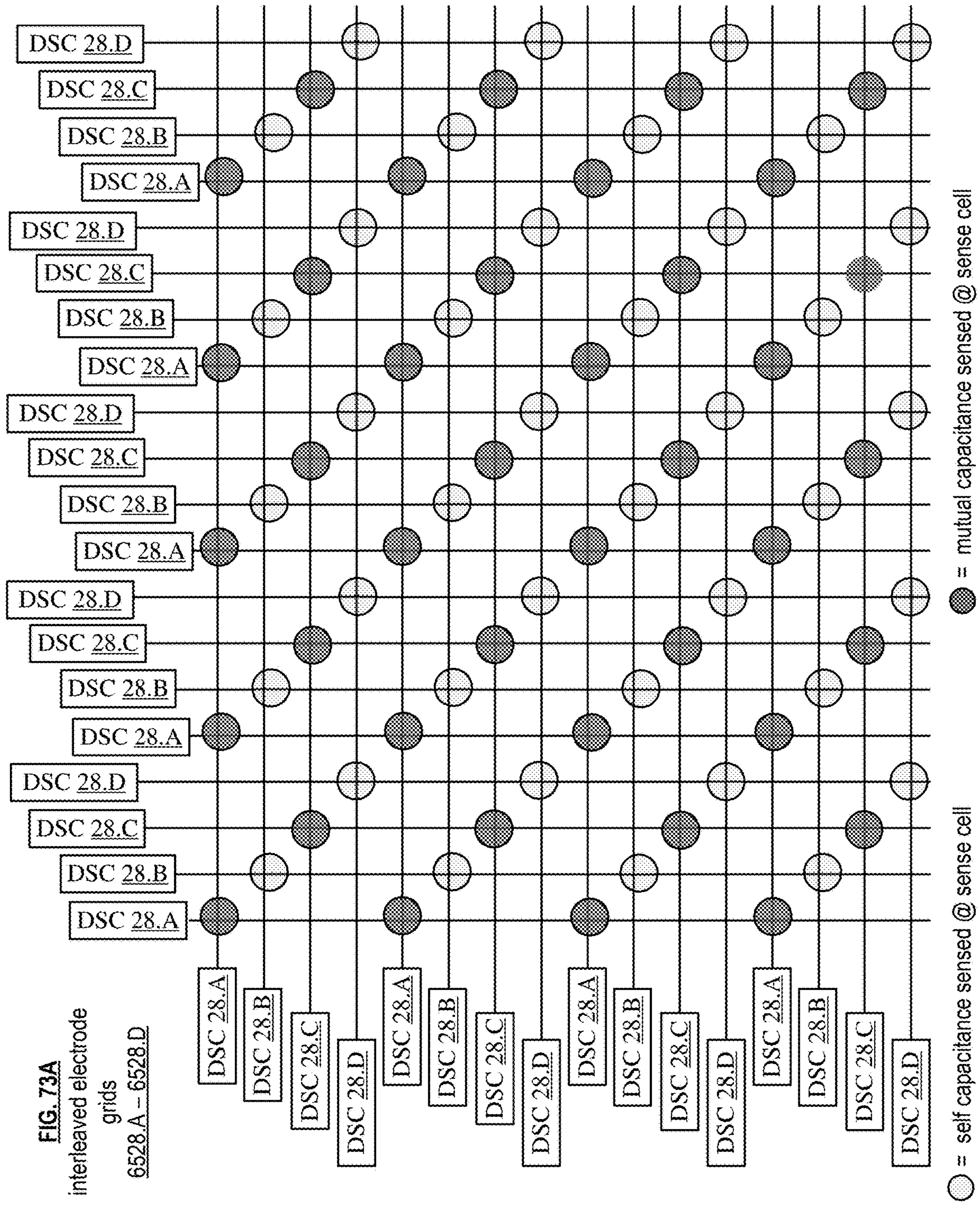
FIG. 73A is a schematic block diagram illustrating an example configuration of activated sense cells of a plurality of electrode grids of a touch screen display where either mutual capacitance or self capacitance is sensed via drive-sense circuits sense in accordance with various embodiments.

FIG. 73A illustrates an example configuration of a plurality of DSCs of a touch screen display operable to detect a combination of only mutual capacitance variation in some sense cells and only self capacitance variation in other sense cells. For example, as depicted in FIG. 73A, the type of capacitance variations detected in sensed signals can be assigned on a per-electrode grid basis, where an entire given electrode grid 6528 is operable to detect: only mutual capacitance variation via all of its activated DSCs: only mutual capacitance variation via all of its all of its activated DSCs: or both mutual capacitance variations and self capacitance variations via all of its all of its activated DSCs. In this example, electrode grids 6528.A and 6528.C are operable to detect variations in mutual capacitance only, while electrode grids 6528.B and 6528.D are operable to detect variations in mutual capacitance only. Some or all features and/or functionality of electrode grids 6528.A-6528.D of FIG. 73A can be utilized to implement some or all functionality of the touch screen display of FIG. 65A and/or any other touch screen display described herein.

In some embodiments, sensed signals generated via DSCs of electrode grid 6528.A, such as sensed signals generated via the DSCs of all of its column electrodes, are processed via a plurality of band pass filters (BPFs), each corresponding to one unique frequency of a plurality of unique frequencies in signal components of different ones of the plurality of row electrodes (e.g. applying x−1 BPFs corresponding to frequencies $f_{A1}$-$f_{Ax}$ as discussed in conjunction with FIG. 65I, where the electrode grid includes x−1 row electrodes), based on electrode grid 6528.A being configured to detect mutual capacitance. Electrode grid 6528.A can otherwise drive and/or detect mutual capacitance via its DSCs and electrodes via some or all functionality for mutual capacitance detection discussed herein, based on electrode grid 6528.A being configured to detect mutual capacitance. DSCs of electrode grid 6528.C in the example of FIG. 73A can be configured in a similar fashion to process mutual capacitance variation. Any other electrode grid 6528 configured to process mutual capacitance variation can similarly operate via some or all of this functionality.

In some embodiments, based on electrode grid 6528.A being configured to detect mutual capacitance variation only, optionally no BPF for detection of self capacitance (e.g. for frequency $f_1$) is applied for processing sensed signals of the column electrodes of electrode grid 6528.A, and/or sensed signals of DSCs of row electrodes of electrode grid 6528.A are not processed for detection of any variation in capacitance. Alternatively or in addition, based on being configured to detect mutual capacitance variation only, optionally no frequency component for the self capacitance is included in signals transmitted by the DSCs of the row and/or column electrodes of electrode grid 6528.A. Thus, variations in mutual capacitance alone can be processed for DSCs of electrode grid 6528.A to detect threshold changes in mutual capacitance denoting touches at corresponding touch points. For example, cross-points denoting detected touches correspond to locations where the given column electrode intersects with a row electrode emitting its signal having the corresponding mutual capacitance frequency component with a magnitude detected by the given column electrodes DSC to exceed or otherwise compare favorably to a predetermined threshold. These cross-points can otherwise denote a touch and/or hover at the corresponding sense cell based on detected variation of mutual capacitance, for example, as discussed previously. DSCs of electrode grid 6528.C in the example of FIG. 73A can be configured in a similar fashion to process mutual capacitance variation only. Any other electrode grid 6528 configured to process mutual capacitance variation only can similarly operate via some or all of this functionality.

In some embodiments, the DSCs of row electrodes and/or column electrodes of electrode grid 6528.B can transmit signals that include a frequency component having frequency $f_1$ based on electrode grid 6528.B being configured to detect self capacitance. Sensed signals generated via DSCs of electrode grid 6528.B, such as sensed signals generated via the DSCs of all of its row electrodes and/or column electrodes, can be processed via a single band pass filters (BPFs), corresponding to the common frequency for self capacitance (e.g. $f_1$), based on electrode grid 6528.B being configured to detect self capacitance. Electrode grid 6528.B can otherwise drive and/or detect self capacitance via its DSCs and electrodes via some or all functionality for self capacitance detection discussed herein, based on electrode grid 6528.B being configured to detect self capacitance. DSCs of electrode grid 6528.D in the example of FIG. 73A can be configured in a similar fashion to process self capacitance variation. Any other electrode grid 6528 configured to process self capacitance variation can similarly operate via some or all of this functionality.

In some embodiments, based on electrode grid 6528.B being configured to detect self capacitance variation only, optionally no set BPFs for detection of mutual capacitance (e.g. for frequencies $f_{B1}$-$f_{Bx}$) are applied for processing sensed signals of the column electrodes of electrode grid 6528.B. Alternatively or in addition, based on being configured to detect self capacitance variation only, optionally no frequency component for the mutual capacitance is included in signals transmitted by the DSCs of the row electrodes of electrode grid 6528.B, where these signals include frequency components for $f_1$ only. Thus, variations in self capacitance alone can be processed for DSCs of electrode grid 6528.B to detect threshold changes in self capacitance denoting touches at corresponding touch points. For example, cross-points denoting detected touches correspond to cross-points where the given column electrode with a DSC generating sensed signal data denotes a threshold amount and/or change in self capacitance and where the given row electrode with a DSC generating sensed signal data also denotes a threshold amount and/or change in self capacitance. These cross-points can otherwise denote a touch and/or hover at the corresponding sense cell based on detected variation of self capacitance, for example, as discussed previously. DSCs of electrode grid 6528.D in the example of FIG. 73A can be configured in a similar fashion to process self capacitance variation only. Any other electrode grid 6528 configured to process self capacitance variation only can similarly operate via some or all of this functionality.

In some embodiments, a configuration of different electrode grids 6528 being configured to drive and/or detect different types of capacitance is fixed. For example, in the example of FIG. 73A, electrode grids 6528.A-6528.C are always configured to detect mutual capacitance only, while electrode grids 6528.B-6528.D are always configured to detect self capacitance only.

In other embodiments, the configuration of some or all different electrode grids 6528 can change over time. For example, in the example of FIG. 73A, electrode grids 6528.A and/or 6528.C are configured to detect self capacitance at other times, in addition to and/or instead of mutual capacitance, and/or electrode grids 6528.B and/or 6528.D are configured to detect mutual capacitance at other times, in addition to and/or instead of self capacitance.

Figure 73B:
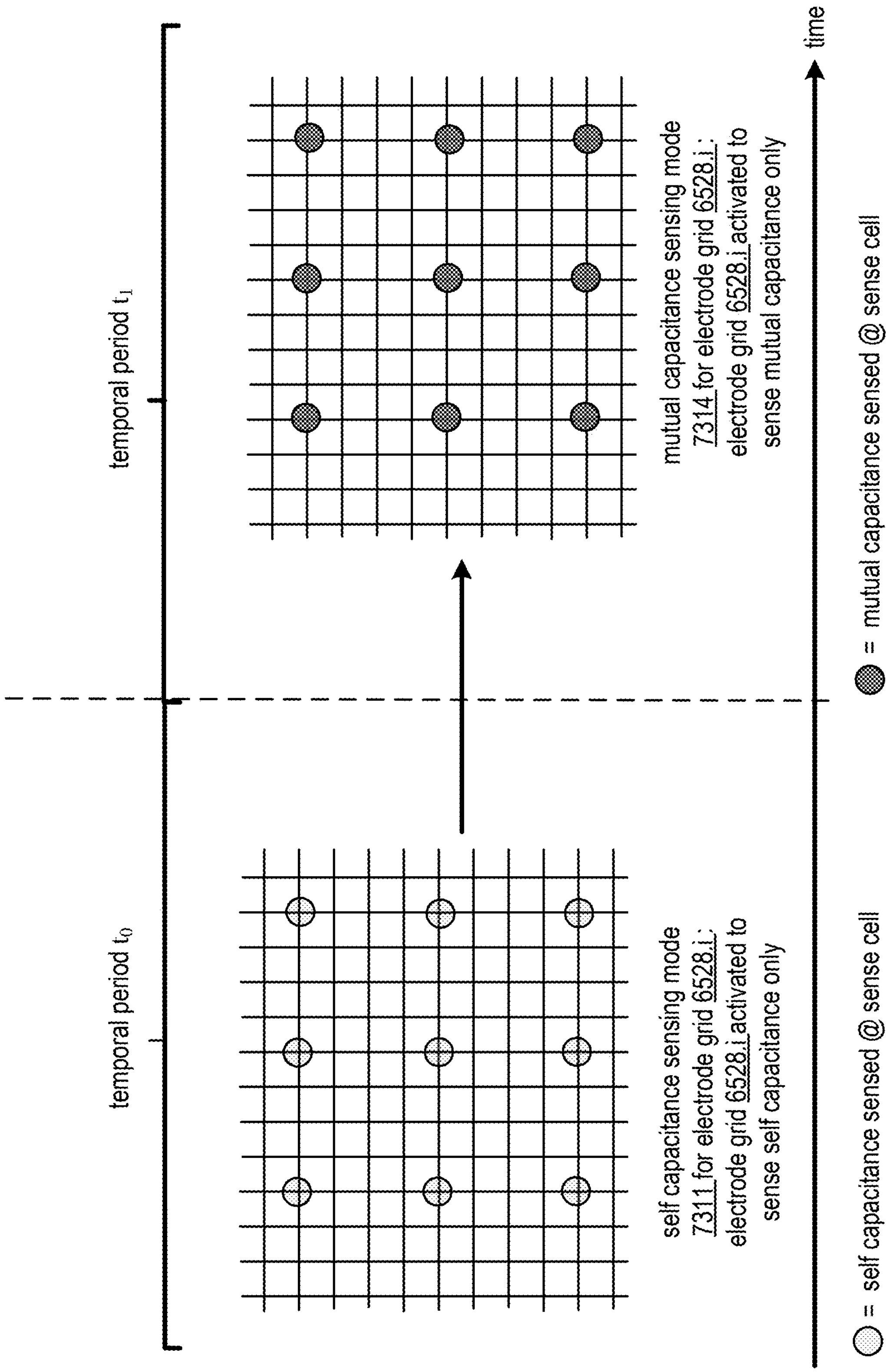
FIG. 73B illustrates transition of by a touch screen display from implementing a self capacitance sensing mode for an electrode grid to implementing a mutual capacitance sensing mode for the electrode grid in accordance with various embodiments.

FIG. 73B illustrates an example of a given electrode grid 6528.*i* transitioning from operating in accordance with a self capacitance sensing mode 731 in a first temporal period $t_0$ to operating in accordance with a mutual capacitance sensing mode 7314. Some or all features and/or functionality of transitioning between mutual capacitance sensing mode 7314 and self capacitance sensing mode 7311 can be utilized to implement some or all functionality of electrode grid control module 6530, the touch screen display of FIG. 65A, and/or any other embodiment of the electrode grid control module 6530 and/or touch screen display described herein.

Some or all electrode grids 6528 can be configured to change between operating under the mutual capacitance sensing mode 7314, the self capacitance sensing mode 7311, both, or neither at any given time. For example, a given electrode grid 6528 alternates between modes in accordance with a predetermined schedule, such as alternating between these modes in each of a consecutive plurality of fixed length time frames, for example, at 300 Hz, based on a frame rate of display of graphical display data via the display, and/or at another rate. As another example, the electrode grid 6528 is configured to change from self capacitance sensing mode 7311 to mutual capacitance sensing mode 7314, or vice versa, based on a detected event, for example, where the transition to the new mode is determined and facilitated via electrode grid control module 6530.

The sensing mode at temporal period to can optionally correspond to the base sensing mode 6612, such as activation of exactly one electrode grid 6528, such as electrode grid 6528.A, as illustrated in FIG. 70B, and/or another initial sensing mode. A detected touch/hover can be detected during operation under any other sensing mode, for example, where an enhanced sensing portion 7050 is already activated due previous detection of user interaction, where the detected user interaction location 7010 is within the enhanced sensing portion 7050 and/or outside of the enhanced sensing portion 7050. Thus, the enhanced sensing portion 7050 can be adjusted over time, for example, to have a different center and/or otherwise move to different locations of the touch screen display based on movement of the user interaction across the display of the touch screen display over time.

Figure 73C:
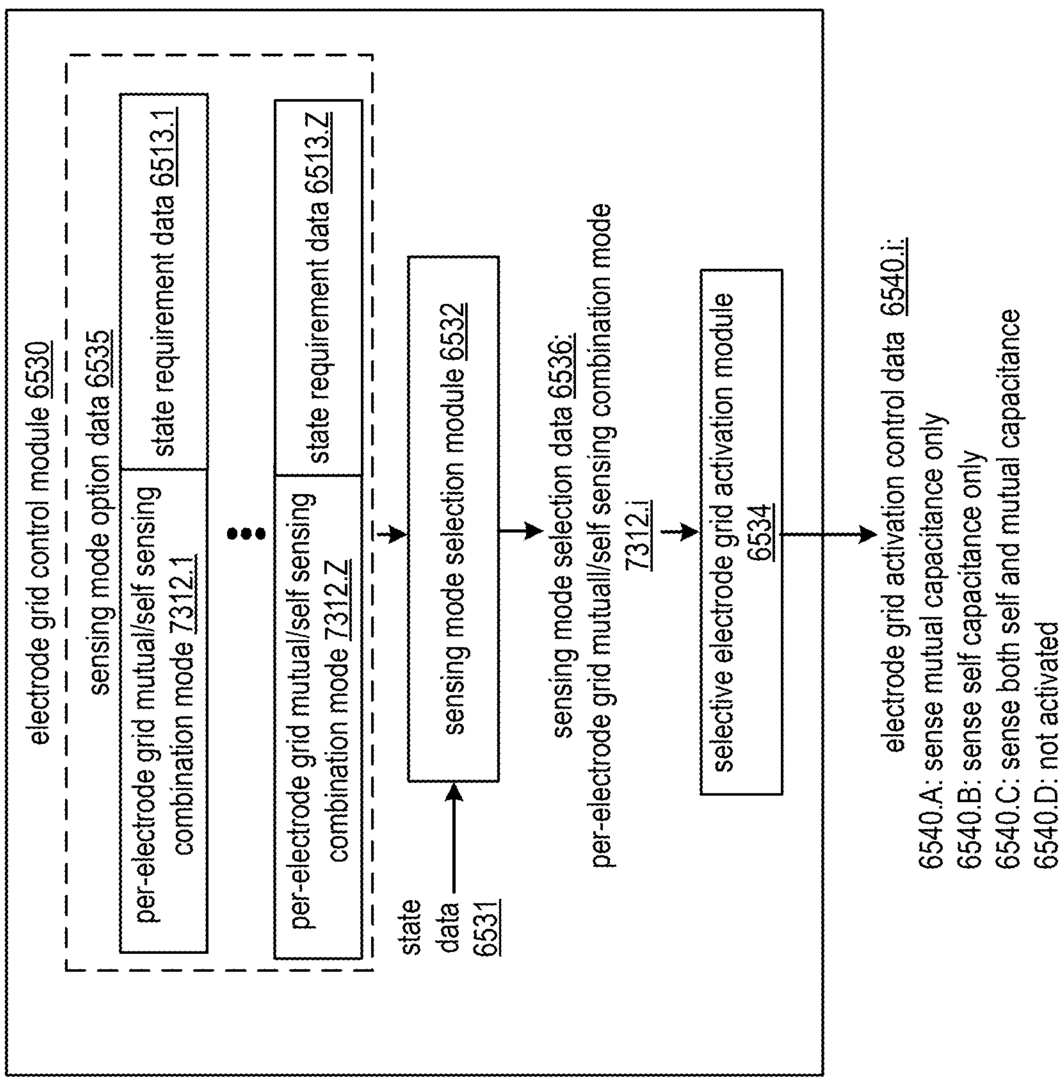
FIGS. 73C and 73D are schematic block diagrams of an electrode grid control module that configures mutual and/or self capacitance sensing for different electrode grids of a touch screen display in accordance with various embodiments.

FIG. 73C illustrates an embodiment of an electrode grid control module 6530 that can select and facilitate activation of different per-electrode grid mutual/self capacitance sensing combination modes 7322, for example, based on state data 6531. Some or all features and/or functionality of the electrode grid control module 6530 of FIG. 73C can implement the electrode grid control module 6530 of FIG. 65K and/or any embodiment of the touch screen display described herein. Some or all features and/or functionality of the electrode grid control module 6530 of FIG. 73C can implement selection and activation of the configuration of electrode grids 6528.A-6528.D of FIG. 73A. Some or all features and/or functionality of the electrode grid control module 6530 of FIG. 73C can implement transition from a given electrode grid's operation under the mutual capacitance sensing mode 7314 to self capacitance sensing mode 7311, or vise versa.

Each of the set of per-electrode grid mutual/self capacitance sensing combination modes 7312.1-7312.Z can correspond to a different set of capacitance sensing modes being applied to full set of electrode grids of the touch screen display. For example, for a given per-electrode grid mutual/self capacitance sensing combination modes 7312, each electrode grid can be assigned configuration in self capacitance sensing mode 7311, mutual capacitance sensing mode 7314, another capacitance sensing mode for sensing of both mutual or self capacitance, or no capacitance sensing, where the electrode grid is not activated. In some embodiments, the full set of per-electrode grid mutual/self capacitance sensing combination modes 7312.1-7312.Z can include some or all of $n^4$ possible options of assignment of each of these four capacitance sensing modes to each of n different electrode grids of the touch screen display. For example, the configuration of FIG. 73A corresponds to one per-electrode grid mutual/self capacitance sensing combination modes 7312 of the set of per-electrode grid mutual/self capacitance sensing combination modes 7312.1-7312.Z.

The electrode grid activation control data 6540 generated a given time can denotes a configuration corresponding to a selected per-electrode grid mutual/self capacitance sensing combination mode 7312.*i*, where a set of electrode grid activation control data 6540.A-6540.D are generated to configure each corresponding electrode grid 6528, for example, via its respective sense-processing circuit 310 as discussed in conjunction with FIG. 65L. In this example, the electrode grid activation control data 6540 denotes that: electrode grid 6528.A be configured to sense mutual capacitance only via its respective set of DSCs; electrode grid 6528.B be configured to sense self capacitance only via its respective set of DSCs; electrode grid 6528.C be configured to sense both self capacitance and mutual capacitance via its respective set of DSCs; and electrode grid 6528.D be configured to be deactivated. Subsequent electrode grid activation control data 6540 can be generated at later times to facilitate transition into a different, subsequently selected per-electrode grid mutual/self capacitance sensing combination mode 7312 or other sensing mode 6515.

Figure 73D:
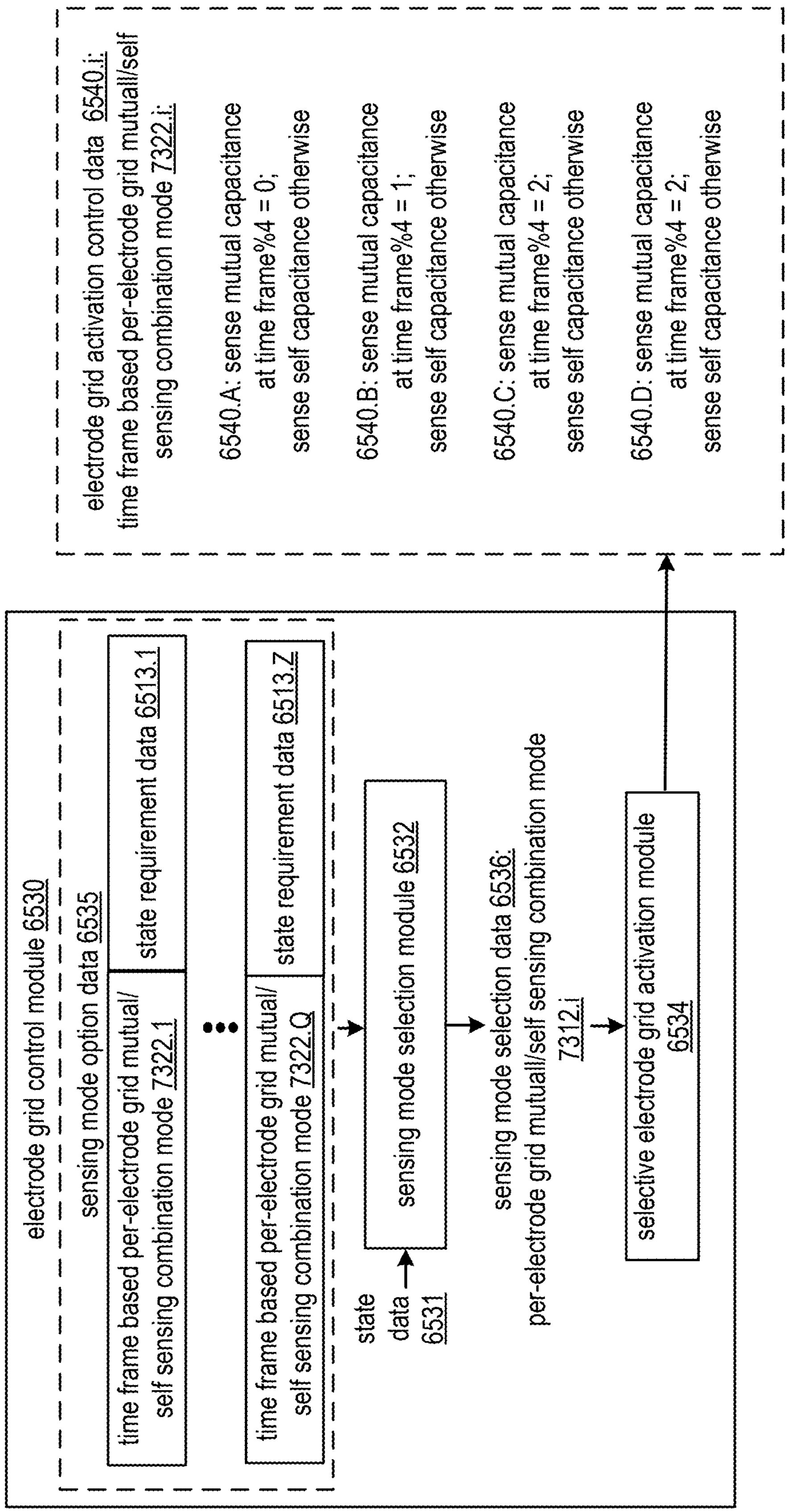

FIG. 73D illustrates another example of electrode grid control module 6530 that can select and facilitate activation of different time frame based per-electrode grid mutual/self capacitance sensing combination modes 7322, for example, based on state data 6531. Some or all features and/or functionality of the electrode grid control module 6530 of FIG. 73D can implement the electrode grid control module 6530 of FIG. 73C, FIG. 65K, and/or any embodiment of the touch screen display described herein. Some or all features and/or functionality of the electrode grid control module 6530 of FIG. 73D can implement selection and activation of the configuration of electrode grids 6528.A-6528.D of FIG. 73A within a given time frame.

Some or all features and/or functionality of the electrode grid control module 6530 of FIG. 73D can implement transition from a given electrode grid's operation under the mutual capacitance sensing mode 7314 to self capacitance sensing mode 7312 between time frames, or vice versa.

Each of the set of time frame based per-electrode grid mutual/self capacitance sensing combination modes 7322.1-7322.Q can indicate scheduled transition, such as a cyclical transition, between two or more different per-electrode grid mutual/self capacitance sensing combination modes 7312 of FIG. 73C. For example, the cyclical transition between sensing self and mutual capacitance via exactly one electrode grid at a time as discussed in conjunction with FIGS. 67A-67C can correspond to one time frame based per-electrode grid mutual/self capacitance sensing combination modes 7322. The transitions between different combinations of electrode grids being active, and/or being configured to detect mutual capacitance, self capacitance, or both, can be facilitated in a fixed length time frame for all per-electrode grid mutual/self capacitance sensing combination modes 7322, and/or some or all different time frame-based per-electrode grid mutual/self capacitance sensing combination modes 7322 can facilitate transition between two or more different per-electrode grid mutual/self capacitance sensing combination modes 7312 in accordance with different length time frames. The time frame can correspond to a 300 Hz rate, a frame rate of rendering graphical image data via the display, and/or any other fixed and/or variable rate of change between different sensing combination modes 7322.

The electrode grid activation control data 6540 generated a given time can denotes a configuration corresponding to a selected time frame based per-electrode grid mutual/self capacitance sensing combination mode 7322.*i*, where a set of electrode grid activation control data 6540.A-6540.D are generated to configure each corresponding electrode grid 6528, for example, via its respective sense-processing circuit 310 as discussed in conjunction with FIG. 65L. In this example, the electrode grid activation control data 6540 denotes that a single electrode grid senses mutual capacitance at a given time, in accordance with a turn-based ordering over a plurality of consecutive time frames, such as time frames of a fixed length, where all other three electrode grids sense self capacitance only at each given time. In particular, the electrode grid activation control data 6540 denotes that: electrode grid 6528.A be configured to sense mutual capacitance via its respective set of DSCs in every fourth time frame starting with a time frames to, and sense self capacitance only in the other time frames; electrode grid 6528.B be configured to sense mutual capacitance via its respective set of DSCs in every fourth time frame starting with time frame $t_1$, and sense self capacitance only in the other time frames; electrode grid 6528.B be configured to sense mutual capacitance via its respective set of DSCs in every fourth time frame starting with time frame $t_2$, and sense self capacitance only in the other time frames; and electrode grid 6528.B be configured to sense mutual capacitance via its respective set of DSCs in every fourth time frame starting with time frame $t_3$, and sense self capacitance only in the other time frames. Subsequent electrode grid activation control data 6540 can be generated at later times to facilitate transition into a different, subsequently selected time frame based per-electrode grid mutual/self capacitance sensing combination mode 7322 or other sensing mode 6515.

Figure 73E:
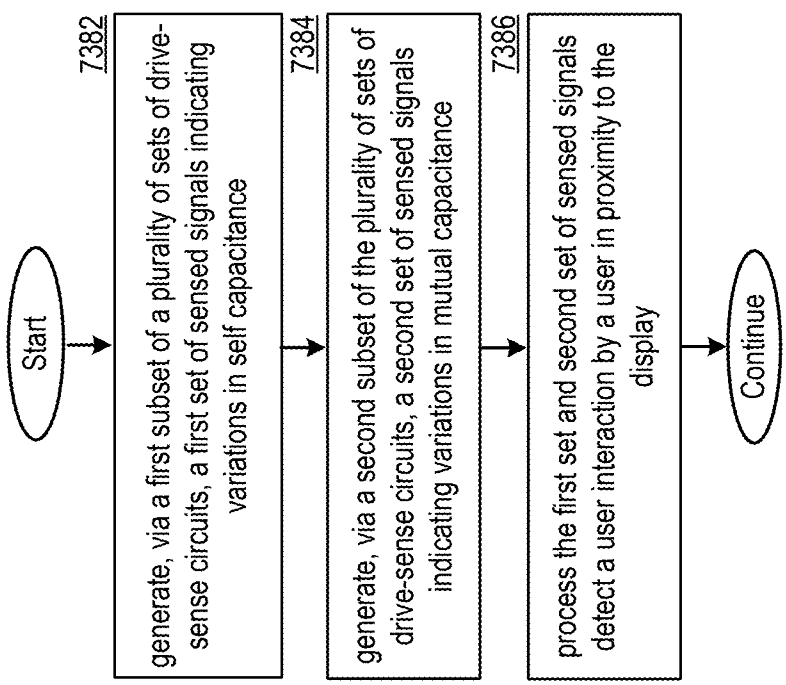
FIG. 73E is a logic diagram of an example method for execution in accordance with various embodiments.

FIG. 73E illustrates a flow diagram of an embodiment of a method in accordance with the present disclosure. In particular a method is presented for execution by and/or for use in conjunction with a plurality of drive-sense circuits 28, a plurality of electrodes 85, touch screen processing module 82, other processing modules 42, touch screen 16, 20, 80, and/or 90, computing device 14 and/or 18, and/or other sensors, processing modules, touch screen displays, and/or computing devices disclosed herein. Some or all steps of FIG. 73E can be performed in conjunction with the embodiments illustrated in and described in conjunction with FIGS. 73A-FIG. 73D. Some or all steps of FIG. 73E can be performed in conjunction with some or all steps of FIG. 65M, FIG. 66H, FIG. 67C, FIG. 68C, FIG. 69F, FIG. 70D, FIG. 71D, FIG. 72F, and/or any other methods described herein.

Step 7382 includes generating, via a first subset of a plurality of sets of drive-sense circuits, a first set of sensed signals indicating variations in self capacitance. Step 7384 includes generating, via a second subset of a plurality of sets of drive-sense circuits, a second set of sensed signals indicating variations in mutual capacitance. Step 7386 includes processing the first set and second set of sensed signals detect a user interaction by a user in proximity to the display.

In various embodiments, a touch screen display includes the plurality of sets of drive-sense circuits. For example, the touch screen display performs some or all steps of the method of FIG. 73E, and/or some or all steps of any other method described herein, utilizing the plurality of sets of drive-sense circuits.

In various embodiments, the same or different touch screen display includes a display configured to render frames of data into visible images. For example, the touch screen display comprises a video graphics processing module operably coupled to generate the frames of data.

In various embodiments, the touch screen display includes a plurality of sets of electrodes integrated into the display to facilitate touch sense functionality based on electrode signals having a drive signal component and a receive signal component. Each set of electrodes of the plurality of sets of electrodes can includes a corresponding proper subset of non-neighboring ones of a plurality of row electrodes and a corresponding proper subset of non-neighboring ones of a plurality of column electrodes. The plurality of row electrodes can be separated from each the plurality of column electrodes by a dielectric material. The plurality of row electrodes and the plurality of column electrodes can form a plurality of cross points.

In various embodiments, the touch screen display includes a plurality of sets of drive-sense circuits. Each set of drive-sense circuits of the plurality of sets of drive-sense circuits can include a plurality of drive-sense circuits coupled to electrodes of a corresponding set of electrodes of the plurality of sets of electrodes. In various embodiments, each of a first subset of the plurality of sets of drive-sense circuits can be operable to generate a first set of sensed signals indicating variations in self capacitance. In various embodiments, each of a second subset of the plurality of sets of drive-sense circuits is operable to generate a second set of sensed signals indicating variations in mutual capacitance.

In various embodiments, the touch screen display includes a processing module that includes at least one memory that stores operational instructions and at least one processing circuit that executes the instructions to perform operations. The operations can include: receiving the first set of sensed signals from the first subset of the plurality of sets of drive-sense circuits; receiving the second set of sensed signals from the second subset of the plurality of sets of drive-sense circuits; and/or processing the first set and second set of sensed signals detect a user interaction by a user in proximity to the display. The operations can include and/or can be based on: some or all steps of FIG. 73E, operations of any other processing module described herein, and/or some or all steps of any other method described herein.

In various embodiments, each of the plurality of drive-sense circuits includes a first conversion circuit and a second conversion circuit. In various embodiments, each first conversion circuit of each drive-sense circuit is configured to convert the receive signal component into a sensed signal of the set of sensed signals and each second conversion circuit of each drive-sense circuit is configured to generate the drive signal component from the sensed signal of the set of sensed signals.

In various embodiments, the first subset of the plurality of sets of drive-sense circuits is configured to generate the first set of sensed signals indicating variations in self capacitance, and not variations in mutual capacitance. In various embodiments, the second subset of the plurality of sets of drive-sense circuits is configured to generate the second set of sensed signals indicating variations in mutual capacitance, and not variations in self capacitance.

In various embodiments, the first subset of the plurality of sets of drive-sense circuits and the second subset of the plurality of sets of drive-sense circuits are mutually exclusive and collectively exhaustive with respect to the plurality of sets of drive-sense circuits. In various embodiments, the first subset of the plurality of sets of drive-sense circuits and the second subset of the plurality of sets of drive-sense circuits have a non-null intersection.

In various embodiments, each set of drive-sense circuits of the second subset of the plurality of sets of drive-sense circuits are operable to detect the variations in mutual capacitance based on a set of drive-sense circuits of a set of row electrodes of the each set of drive-sense circuits driving the variations in mutual capacitance, and/or based on set of drive-sense circuits of a set of column electrodes of the each set of drive-sense circuits sensing the variations in mutual capacitance.

In various embodiments, the operations further include: selecting sets of drive-sense circuits included in the first subset of the plurality of sets of drive-sense circuits for a first temporal period; selecting sets of drive-sense circuits included in the second subset of the plurality of sets of drive-sense circuits for the first temporal period; activating the first subset of the plurality of sets of drive-sense circuits to generate the first set of sensed signals indicating variations in self capacitance for the first temporal period based on selecting the sets of drive-sense circuits included in the first subset; and/or activating the second subset of the plurality of sets of drive-sense circuits to generate the second set of sensed signals indicating variations in mutual capacitance for the first temporal period based on selecting the sets of drive-sense circuits included in the second subset. The first set of sensed signals and the second set of sensed signals can be received from the first subset of the plurality of sets of drive-sense circuits and the second subset of the plurality of sets of drive-sense circuits, respectively, in the first temporal period.

In various embodiments, the operations further include: determining an updated first subset of the plurality of sets of drive-sense circuits for a second temporal period after the first temporal period by changing at least one set of drive-sense circuits included in the first subset of the plurality of sets of drive-sense circuits; determining an updated second subset of the plurality of sets of drive-sense circuits for the second temporal period by changing at least one set of drive-sense circuits included in the second subset of the plurality of sets of drive-sense circuits; activating the updated first subset of the plurality of sets of drive-sense circuits to generate another first set of sensed signals indicating variations in self capacitance for the second temporal period; activating the updated second subset of the plurality of sets of drive-sense circuits to generate another second set of sensed signals indicating variations in mutual capacitance for the second temporal period; receiving the another first set of sensed signals and the another second set of sensed signals from the first subset of the plurality of sets of drive-sense circuits and the second subset of the plurality of sets of drive-sense circuits, respectively, in the second temporal period; and/or processing the another first set of sensed signals and the another second set of sensed signals to detect another user interaction in the second temporal period. The operations can include and/or can be based on: some or all steps of FIG. 74D, operations of any other processing module described herein, and/or some or all steps of any other method described herein.

In various embodiments, determining the updated first subset of the plurality of sets of drive-sense circuits and the updated second subset of the plurality of sets of drive-sense circuits for the second temporal period includes removing at least one set of drive-sense circuits from inclusion in the second subset for inclusion in the updated first subset. In various embodiments, determining the updated first subset of the plurality of sets of drive-sense circuits and the updated second subset of the plurality of sets of drive-sense circuits for the second temporal period includes removing at least one set of drive-sense circuits from inclusion in the first subset for inclusion in the updated second subset. In various embodiments, determining the updated first subset of the plurality of sets of drive-sense circuits for the second temporal period includes including at least one set of drive-sense circuits included in the second subset and not the first subset for inclusion in both the updated first subset and the updated second subset. In various embodiments, determining the updated second subset of the plurality of sets of drive-sense circuits for the second temporal period includes including at least one set of drive-sense circuits included in the first subset and not the second subset for inclusion in both the updated first subset and the updated second subset. In various embodiments, determining the updated first subset of the plurality of sets of drive-sense circuits for the second temporal period includes removing at least one set of drive-sense circuits included in the first subset and not the second subset for inclusion in neither the updated first subset nor the updated second subset. In various embodiments, determining the updated second subset of the plurality of sets of drive-sense circuits for the second temporal period includes removing at least one set of drive-sense circuits included in the second subset and not the first subset for inclusion in neither the updated first subset nor the updated second subset.

In various embodiments, the operations further include updating at least one set of drive-sense circuits of the plurality of drive sense circuits for the second temporal period based on removing at least one drive-sense circuit from one set of drive-sense circuits for inclusion in another set of drive-sense circuits of the plurality of drive sense circuits. In various embodiments, the updated first subset or the updated second subset includes the updated at least one set of drive-sense circuits.

In various embodiments, determining the updated first subset of the plurality of sets of drive-sense circuits for the second temporal period includes decreasing the number of sets of drive-sense circuits included in the updated first subset from the number of sets of drive-sense circuits included in the first subset. In various embodiments, determining the updated first subset of the plurality of sets of drive-sense circuits for the second temporal period includes increasing the number of sets of drive-sense circuits included in the updated first subset from the number of sets of drive-sense circuits included in the first subset. various embodiments, determining the updated second subset of the plurality of sets of drive-sense circuits for the second temporal period includes decreasing the number of sets of drive-sense circuits included in the updated second subset from the number of sets of drive-sense circuits included in the second subset. In various embodiments, determining the updated second subset of the plurality of sets of drive-sense circuits for the second temporal period includes increasing the number of sets of drive-sense circuits included in the updated second subset from the number of sets of drive-sense circuits included in the second subset.

In various embodiments, determining the updated first subset of the plurality of sets of drive-sense circuits and the updated second subset of the plurality of sets of drive-sense circuits is based on: a predetermined schedule; detecting a change in resource health; detecting a change in processing resources; a power consumption requirement; a location of the detected user interaction; a movement of the detected user interaction; a size of a detected interaction region of the detected user interaction; or a type of interactive display data displayed by the display; and/or or detecting a triggering event.

In various embodiments, the touch screen display is implemented via some or all features and/or functionality of any other embodiment of the touch screen display described herein.

In various embodiments, another touch-based device such as a touch panel does not include a display, but includes the plurality of sets of electrodes, the plurality of sets of drive-sense circuits, and/or the processing module. Such a touch-based device can be configured to perform some or all steps of the method of FIG. 73E and/or can be configured via some or all various features and/or functionality of the touch screen display described above and/or described in conjunction with FIGS. 73A-73D.

FIGS. 74A-74D illustrate embodiments of a touch screen display that is operable to configure functionality of various DSCs over time based on various conditions, rendering higher or lower processing and/or resource requirements over time, and/or rendering higher or lower resolution of sensing over time. Some or all features and/or functionality of the touch screen display and/or the electrode grid control module of FIGS. 74A-74D can implement the electrode grids of FIG. 65A, the electrode grid control module 6530 of FIG. 65K and/or FIG. 65L, and/or any other embodiment of the electrode grid control module 6530 and/or touch screen display described herein.

Figure 74A:
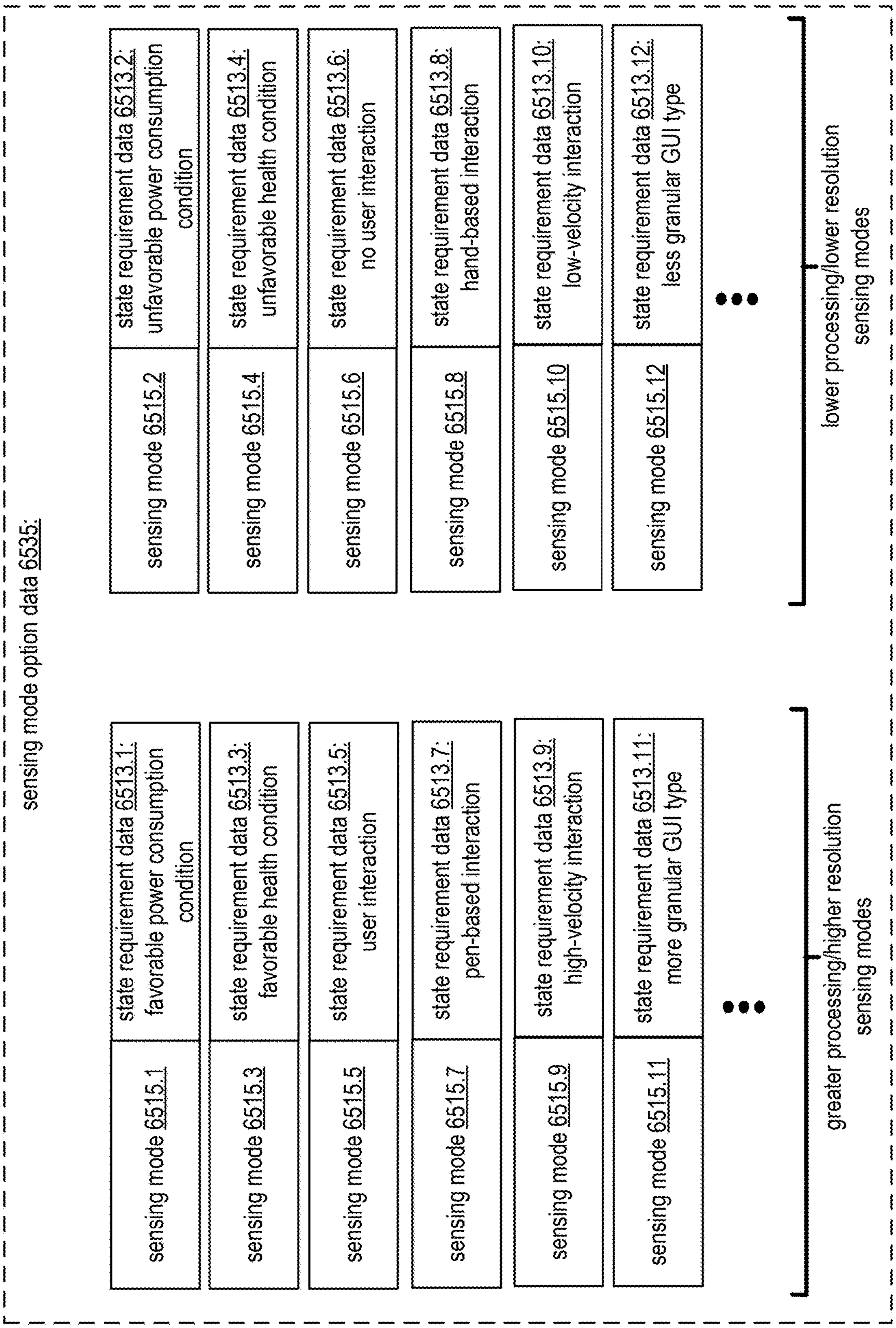
FIG. 74A illustrates example sensing mode option data of an electrode grid control module that includes a plurality of greater processing/higher resolution sensing modes and a plurality of lower processing/lower resolution sensing modes in accordance with various embodiments.

FIG. 74A illustrates an example embodiment of various sensing modes 6515 and corresponding example state requirement data 6513 of sensing mode option data 6535. Different given state requirement data 6513, such as examples of FIGS. 74A, when detected, can cause the touch screen display to enter a corresponding sensing mode 6515. Some state requirement data 6513 can correspond to states requiring greater resolution, inducing higher levels of processing, while other state requirement data 6513 can correspond to states requiring lower processing levels, inducing lower resolution. Some or all features and/or functionality of the sensing mode option data 6535 of FIG. 74A can implement the sensing mode option data 6535 of the electrode grid control module 6530 of FIG. 65K and/or FIG. 65L, and/or any other embodiment of the electrode grid control module 6530 described herein.

For example, two or more different sensing modes 6515 can be selected and activated in response to detection of two or more different corresponding power consumption conditions. More favorable detected power consumption conditions, such as current power consumption being lower and/or more power consumption being possible, can trigger activation of sensing modes 6515 with higher resolution and thus requiring higher power consumption and/or processing, while less favorable detected power consumption conditions, such as current power consumption being higher and/or less power consumption being possible, can trigger activation of sensing modes 6515 with higher resolution and thus requiring higher power consumption and/or processing.

As another example, two or more different sensing modes 6515 can be selected and activated in response to detection of two or more different corresponding health conditions. More favorable detected health conditions, such as proper and/or unfailing operation of some or all hardware and/or software components of the touch screen display, can trigger activation of sensing modes 6515 with higher resolution and thus requiring higher resources consumption and/or processing, while less favorable detected health conditions, such as poor and/or failing operation of one or more hardware and/or software components of the touch screen display, can trigger activation of sensing modes 6515 with lower resolution and thus requiring lower resource consumption and/or processing.

As another example, two or more different sensing modes 6515 can be selected and activated in response to detection of whether user interaction is detected, for example, as detected in conjunction with FIGS. 68A-68C. Detected user interaction can trigger activation of sensing modes 6515 with higher resolution and thus requiring higher processing, while no detected user interaction can trigger activation of sensing modes 6515 with lower resolution and thus requiring lower processing.

As another example, two or more different sensing modes 6515 can be selected and activated in response to detection of the type and/or size of the object or body part inducing the user interaction, for example, as detected in conjunction with FIGS. 69A-69F. Pen-based interaction or other user interaction with a smaller user interaction region can trigger activation of sensing modes 6515 with higher resolution and thus requiring higher processing, while hand-based interaction or other user interaction with a larger user interaction region can trigger activation of sensing modes 6515 with lower resolution and thus requiring lower processing.

As another example, two or more different sensing modes 6515 can be selected and activated in response to detection of the velocity of movement of a user interaction, for example, as detected in conjunction with FIGS. 71A-71D. Higher-velocity interaction can trigger activation of sensing modes 6515 with higher resolution and thus requiring higher processing, while lower-velocity user interaction can trigger activation of sensing modes 6515 with lower resolution and thus requiring lower processing.

As another example, two or more different sensing modes 6515 can be selected and activated in response to granularity of displayed GUI types, for example, as detected in conjunction with FIGS. 72A-72F. More granular GUI types can trigger activation of sensing modes 6515 with higher resolution and thus requiring higher processing, while less granular GUI types can trigger activation of sensing modes 6515 with lower resolution and thus requiring lower processing.

Other sets of two or more different sensing modes 6515 can be selected an activated in response to detection of different states of a particular condition that require more or less sensing granularity, and/or that require higher or lower resource consumption, processing levels, and/or power usage, and can thus correspond to greater processing/higher resolution sensing modes, or lower processing/lower resolution sensing modes accordingly. More than two such levels of processing and resolution can optionally be implemented for some or all detectable conditions.

Some or all different lower processing/lower resolution sensing modes triggered based on different conditions can optionally correspond to the same or different configuration of electrode grids and/or individual DSCs. Some or all different greater processing/higher resolution sensing modes triggered based on different conditions can optionally correspond to the same or different configuration of electrode grids and/or individual DSCs.

Figure 74B:
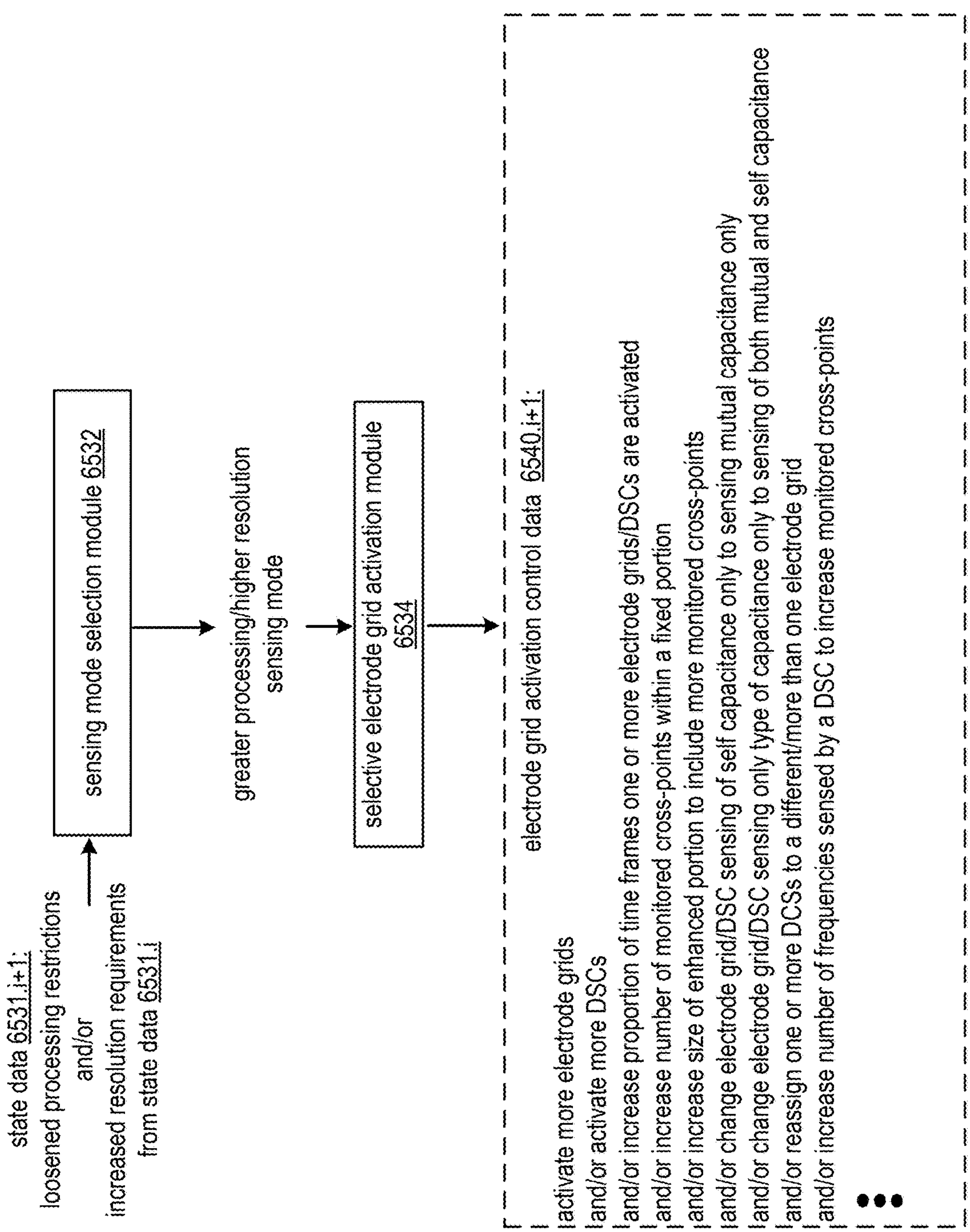
FIG. 74B is a schematic block diagram of an electrode grid control module that configures electrode grids and/or DSCs to enable transition into a greater processing/higher resolution sensing mode in accordance with various embodiments.

FIG. 74B illustrates example electrode grid activation control data 6540 generated for loosened processing restrictions and/or increased resolution requirements. Some or all features and/or functionality of the sensing mode option data 6535 of FIG. 74B can implement the sensing mode option data 6535 of the electrode grid control module 6530 of FIG. 65K and/or FIG. 65L, and/or any other embodiment of the electrode grid control module 6530 described herein.

The sensing mode selection module 6532 can select a sensing mode that has greater processing and/or higher resolution than the current mode based on given state data 6531.*i*+1 having loosened processing restrictions and/or increased resolution requirements relative to that of prior state data 6531.*i*, for example, that induced the activation of the current mode. For example, the greater processing and/or higher resolution mode selected in FIG. 74B corresponds to a greater processing/higher resolution sensing mode of FIG. 74A, and/or the current mode corresponds to a lower processing/lower resolution sensing mode of FIG. 74A. The given state data 6531.*i*+1 can correspond to state requirement data 6513 for one or more greater processing/higher resolution sensing modes, and/or the prior state data 6531.*i* can correspond to state requirement data 6513 for one or more lower processing/lower resolution sensing modes.

The selective electrode grid activation module 6534 can facilitate transition into this greater processing and/or higher resolution mode, relative to the current mode, based on generating electrode grid activation control data 6540 configuring DSCs of one or more electrode grids as discussed herein. In particular, the electrode grid activation control data 6540.*i*+1 can facilitate greater processing and higher resolution via the plurality of DSCs based on denoting: activation of more electrode grids; activation of more individual DSCs, where only portions of one or more electrode grids are optionally activated; increasing of a proportion of time frames and/or lengthening time frames where one or more particular electrode grids are activated; increasing of a proportion of time frames and/or lengthening time frames where one or more particular DSCs are activated; increasing a number of monitored cross-points within a fixed portion, such as within enhanced sensing portion 7050 or other fixed region and/or fixed area of a plane parallel with the display of the touch screen display; increasing a size of an enhanced sensing portion 7050 to include more monitored cross-points and/or to otherwise extend the region where sense cell resolution is enhanced; updating configuration of one or particular more electrode grids or DSCs from sensing of self capacitance only to sensing mutual capacitance only; updating configuration of one or particular more electrode grids or DSCs from sensing of only self capacitance or only mutual capacitance only to sensing of both self capacitance or only mutual capacitance; reassigning one or more DSCs to a different electrode grid and/or for inclusion in a greater number of electrode grids, for example, based on facilitating this DSC's monitoring of a set of mutual capacitance frequencies of signal components of row DSCs of each newly assigned electrode grid when this DSC is a column DSC, based on facilitating monitoring of a mutual capacitance frequency of this DSC's frequency component by each row DSC of each newly assigned electrode grid when this DSC is a row DSC, based on changing the frequency of signal components transmitted by one or more DSCs, and/or based on otherwise facilitating monitoring of cross points where electrodes of the new electrode grid's existing DSCs and this new DSC's electrode intersect; increasing the number of frequencies sensed by one or more given DSCs to increase the number of monitored cross points, for example, based on also changing the frequency of signal components transmitted by one or more DSCs and/or facilitating monitoring of one or more inter-electrode grid cross-points that was not previously monitored; and/or via other reconfiguration of individual DSCs and/or electrode grids as a whole.

Figure 74C:
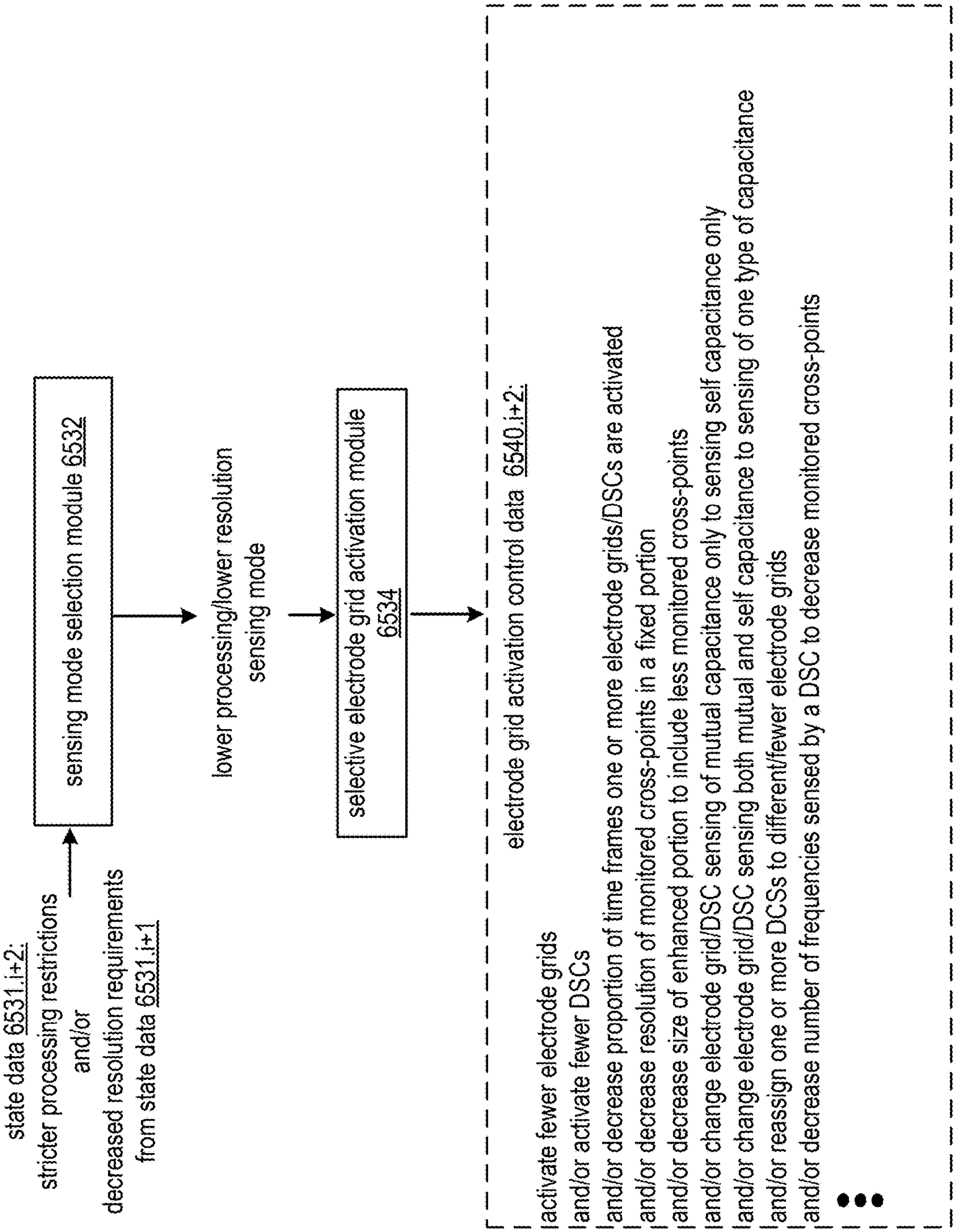
FIG. 74C is a schematic block diagram of an electrode grid control module that configures electrode grids and/or DSCs to enable transition into a lower processing/lower resolution sensing mode in accordance with various embodiments.

FIG. 74C illustrates example electrode grid activation control data 6540 generated for stricter processing restrictions and/or decreased resolution requirements. Some or all features and/or functionality of the sensing mode option data 6535 of FIG. 74C can implement the sensing mode option data 6535 of the electrode grid control module 6530 of FIG. 65K and/or FIG. 65L, and/or any other embodiment of the electrode grid control module 6530 described herein.

The sensing mode selection module 6532 can select a sensing mode that has lower processing and/or lower resolution than the current mode based on given state data 6531.*i*+2 having loosened processing restrictions and/or increased resolution requirements relative to that of prior state data 6531.*i*+1, for example, that induced the activation of the current mode. For example, the lower processing and/or lower resolution mode selected in FIG. 74C corresponds to a lower processing/lower resolution sensing mode of FIG. 74A, and/or the current mode corresponds to a greater processing/higher resolution sensing mode of FIG. 74A. As a particular example, the prior state data 6531.*i*+1 is the state data 6531.*i*+1 of FIG. 74B, where the electrode grid control module 6530 facilitates transition from the higher processing/higher resolution sensing mode selected in FIG. 74B at a first temporal period to a lower processing/lower resolution sensing mode.

The selective electrode grid activation module 6534 can facilitate transition into this lower processing and/or lower resolution mode, relative to the current mode, based on generating electrode grid activation control data 6540 configuring DSCs of one or more electrode grids as discussed herein. In particular, the electrode grid activation control data 6540.*i*+2 can facilitate lower processing and lower resolution via the plurality of DSCs based on denoting: activation of fewer electrode grids; activation of fewer individual DSCs, where only portions of one or more electrode grids are optionally activated; decreasing of a proportion of time frames and/or shortening time frames where one or more particular electrode grids are activated; decreasing of a proportion of time frames and/or decreasing time frames where one or more particular DSCs are activated; decreasing a number of monitored cross-points within a fixed portion, such as within enhanced sensing portion 7050 or other fixed region and/or fixed area of a plane parallel with the display of the touch screen display; decreasing a size of an enhanced sensing portion 7050 to include fewer monitored cross-points and/or to otherwise make-smaller the region where sense cell resolution is enhanced; updating configuration of one or particular more electrode grids or DSCs from sensing of mutual capacitance only to sensing self capacitance only; updating configuration of one or particular more electrode grids or DSCs from sensing of both self capacitance and mutual capacitance only to sensing of only self capacitance or only mutual capacitance; reassigning one or more DSCs to a different electrode grid and/or for inclusion in a smaller number of electrode grids, for example, based on facilitating this DSC's monitoring of a set of mutual capacitance frequencies of signal components of row DSCs of each newly assigned electrode grid when this DSC is a column DSC, based on facilitating monitoring of a mutual capacitance frequency of this DSC's frequency component by each row DSC of each newly assigned electrode grid when this DSC is a row DSC, based on changing the frequency of signal components transmitted by one or more DSCs, and/or based on otherwise facilitating monitoring of cross points where electrodes of the new electrode grid's existing DSCs and this new DSC's electrode intersect; decreasing the number of frequencies sensed by one or more given DSCs to decrease the number of monitored cross points, for example, based on also changing the frequency of signal components transmitted by one or more DSCs and/or no longer monitoring of one or more inter-electrode grid cross-points that was previously monitored; and/or via other reconfiguration of individual DSCs and/or electrode grids as a whole.

Figure 74D:
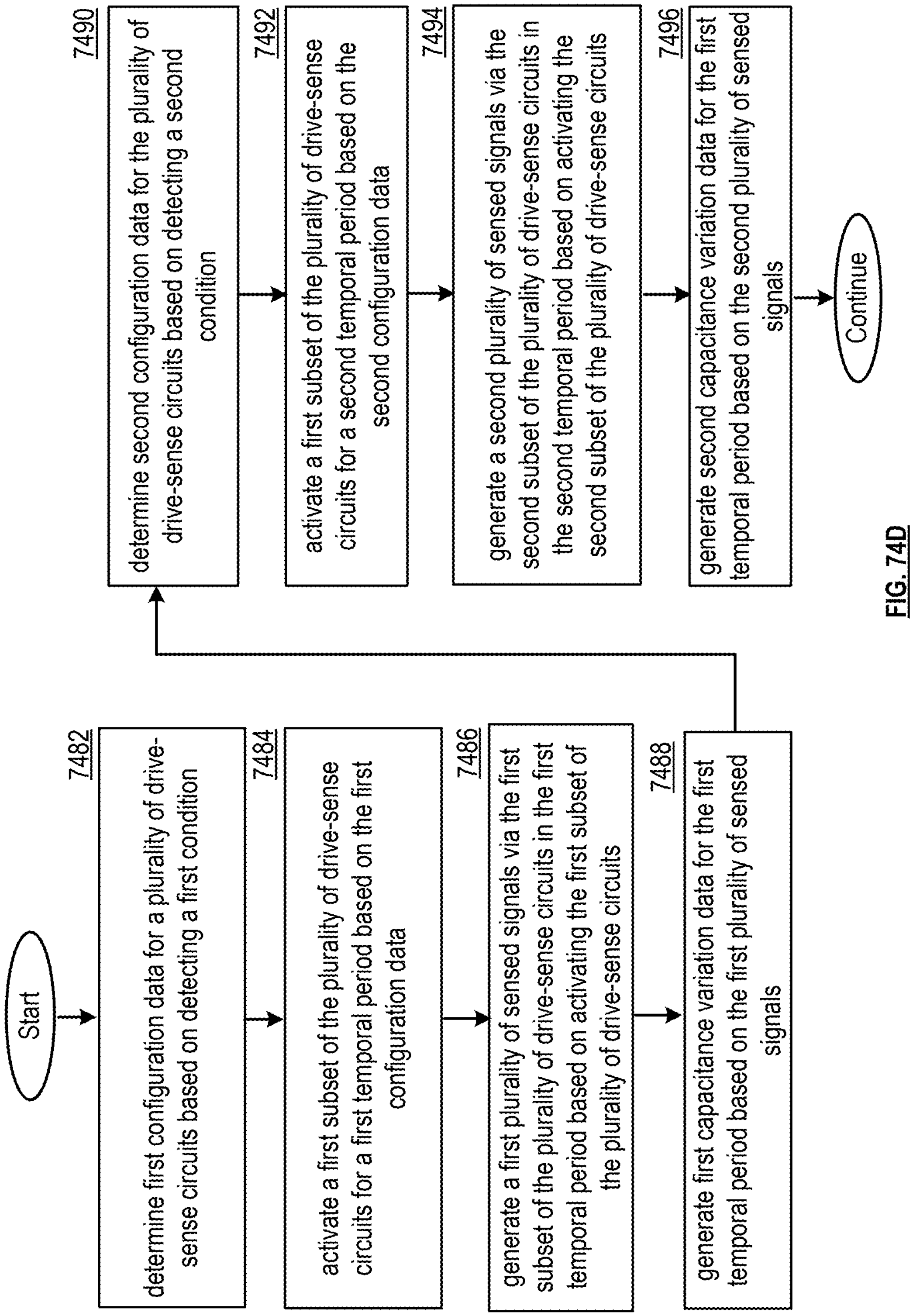
FIG. 74D is a logic diagram of an example method for execution in accordance with various embodiments.

FIG. 74D illustrates a flow diagram of an embodiment of a method in accordance with the present disclosure. In particular a method is presented for execution by and/or for use in conjunction with a plurality of drive-sense circuits 28, a plurality of electrodes 85, touch screen processing module 82, other processing modules 42, touch screen 16, 20, 80, and/or 90, computing device 14 and/or 18, and/or other sensors, processing modules, touch screen displays, and/or computing devices disclosed herein. Some or all steps of FIG. 74D can be performed in conjunction with the embodiments illustrated in and described in conjunction with FIGS. 74A-FIG. 74C. Some or all steps of FIG. 74D can be performed in conjunction with some or all steps of FIG. 65M, FIG. 66H, FIG. 67C, FIG. 68C, FIG. 69F, FIG. 70D, FIG. 71D, FIG. 72F, FIG. 73E, and/or any other methods described herein.

Step 7482 includes determining first configuration data for a plurality of drive-sense circuits based on detecting a first condition. Step 7484 includes activating a first subset of the plurality of drive-sense circuits for a first temporal period based on the first configuration data. Step 7486 includes generating a first plurality of sensed signals via the first subset of the plurality of drive-sense circuits in the first temporal period based on activating the first subset of the plurality of drive-sense circuits. Step 7488 includes generating first capacitance variation data for the first temporal period based on the first plurality of sensed signals.

Step 7490 includes determining second configuration data for the plurality of drive-sense circuits based on detecting a second condition. Step 7492 includes activating a first subset of the plurality of drive-sense circuits for a second temporal period based on the second configuration data. Step 7494 includes generating a second plurality of sensed signals via the second subset of the plurality of drive-sense circuits in the second temporal period based on activating the second subset of the plurality of drive-sense circuits. Step 7496 includes generating second capacitance variation data for the first temporal period based on the second plurality of sensed signals.

In various embodiments, a touch screen display includes the plurality of sets of drive-sense circuits.

For example, the touch screen display performs some or all steps of the method of FIG. 69F, and/or some or all steps of any other method described herein, utilizing the plurality of sets of drive-sense circuits.

In various embodiments, the same or different touch screen display includes a display configured to render frames of data into visible images. For example, the touch screen display comprises a video graphics processing module operably coupled to generate the frames of data.

In various embodiments, the touch screen display includes a plurality of electrodes integrated into the display to facilitate touch sense functionality based on electrode signals having a drive signal component and a receive signal component. The plurality of electrodes can include a plurality of row electrodes and a plurality of column electrodes. The plurality of row electrodes can be separated from each the plurality of column electrodes by a dielectric material. The plurality of row electrodes and the plurality of column electrodes can form a plurality of cross points.

In various embodiments, the touch screen display includes a plurality of drive-sense circuits coupled to the plurality of electrodes. Each drive-sense circuit can be operable to generate sensed signals indicating variations in capacitance associated with at least some cross points formed by the corresponding electrode.

In various embodiments, the touch screen display includes a processing module that includes at least one memory that stores operational instructions and at least one processing circuit that executes the instructions to perform operations. The operations can include: determining first configuration data for the plurality of drive-sense circuits based on detecting a first condition; activating a first subset of the plurality of drive-sense circuits for a first temporal period based on the first configuration data; receiving a first plurality of sensed signals from the first subset of the plurality of drive-sense circuits in the first temporal period; generating first capacitance variation data for the first temporal period based on the first plurality of sensed signals; determining second configuration data for the plurality of drive-sense circuits based on detecting a second condition; activating a first subset of the plurality of drive-sense circuits for a second temporal period based on the second configuration data; receiving a second plurality of sensed signals from the first subset of the plurality of drive-sense circuits in the second temporal period; and/or generating second capacitance variation data for the first temporal period based on the second plurality of sensed signals. The operations can include and/or can be based on: some or all steps of FIG. 74D, operations of any other processing module described herein, and/or some or all steps of any other method described herein.

In various embodiments, the plurality of electrodes include a plurality of sets of electrodes. In various embodiments, each set of electrodes of the plurality of sets of electrodes includes a corresponding proper subset of non-neighboring ones of a plurality of row electrodes and a corresponding proper subset of non-neighboring ones of a plurality of column electrodes. In various embodiments, the first subset of the plurality of drive-sense circuits corresponds to at least one first set of plurality of sets of electrodes, and/or the second subset of the plurality of drive-sense circuits corresponds to at least one second subset of the plurality of sets of electrodes that is different from the at least one first set of plurality of sets of electrodes. The plurality of sets of electrodes can be implemented via any features and/or functionality of distinct electrode grids described herein, and/or via any features and/or functionality of the plurality of sets of electrodes described in conjunction with FIGS. 65M, 66H, 67C, and/or 73E.

In various embodiments, the first configuration data indicates the first subset of the plurality of drive-sense circuits, and/or the second configuration data indicates the second subset of the plurality of drive-sense circuits. In various embodiments, the first configuration data indicates assignment of each the plurality of electrodes to different ones of the plurality of sets of electrodes, and/or the second configuration data changes the assignment of at least electrode to a different one of the plurality of sets of electrodes.

In various embodiments, each of the plurality of drive-sense circuits includes a first conversion circuit and a second conversion circuit. In various embodiments, each first conversion circuit of each drive-sense circuit, when activated, is configured to convert the receive signal component into a sensed signal of the set of sensed signals and/or each second conversion circuit of each drive-sense circuit, when activated, is configured to generate the drive signal component from the sensed signal of the set of sensed signals.

In various embodiments, the first condition and the second condition are different ones of a predetermined set of conditions. In various embodiments, the first condition corresponds to a first resource consumption level and the second condition corresponds to a second resource consumption level that is different from the first resource consumption level. In various embodiments, the first condition corresponds to a first type of user interaction and the second condition corresponds to a second type of user interaction. In various embodiments, the first condition corresponds to a first number of detected simultaneous touch points interaction consumption level and the second condition corresponds to a second number of detected simultaneous touch points.

In various embodiments, the first configuration data indicates the first subset of the plurality of drive-sense circuits, and the second configuration data indicates the second subset of the plurality of drive-sense circuits.

In various embodiments, a same set of drive-sense circuits of the plurality of drive-sense circuits is included in both the first subset and the second subset. In various embodiments, the first configuration data indicates detection of mutual capacitance and not self capacitance by the same set of drive-sense, and/or the second configuration data indicates detection of self capacitance and not mutual capacitance by the same set of drive-sense circuits.

In various embodiments, a same given drive-sense circuit of the plurality of drive-sense circuits is included in both the first subset and the second subset. In various embodiments, the first configuration data indicates detection of a first set of frequencies by the given drive-sense circuits, and/or the second configuration data indicates detection of a second set of frequencies by the given drive-sense circuit that is different from the first set of frequencies. In various embodiments, the given drive-sense circuit corresponds to one column electrode of the plurality of column electrodes that has a plurality of possible cross points with all row electrodes of the plurality of row electrodes. In various embodiments, the first set of frequencies corresponds to a first proper subset of the plurality of row electrodes to induce monitoring of variations in capacitance at a corresponding first proper subset of the plurality of possible cross points, and/or the second set of frequencies corresponds to a second proper subset of the plurality of row electrodes to induce monitoring of variations in capacitance at a corresponding second proper subset of the plurality of possible cross points. In various embodiments, the first proper subset of the plurality of row electrodes is a proper subset of the second proper subset of the plurality of row electrodes.

In various embodiments, the second condition is less favorable than the second condition. In various embodiments, the second condition is less favorable than the first condition based on corresponding to: a higher resource consumption level than a resource consumption level of the first condition; a higher power consumption level than a power consumption level of the first condition; a lower health level than a health level of the first condition; or another less favorable condition.

In various embodiments, the second condition requires sensing at a higher resolution than the first condition. In various embodiments, the first condition requires sensing at a higher resolution than the second condition based on corresponding to: a smaller size of a detected user interaction region than that of the second condition; a greater speed of a detected user interaction than that of the second condition; a greater rate of change in direction of a detected user interaction than that of the second condition; display of a type of interactable element that requires greater sensing resolution that another type of interactable element of the second condition; or another condition requiring higher resolution of sensing.

In various embodiments, the second configuration data indicates the second subset of the plurality of drive-sense circuits include a smaller number of activated drive-sense circuits than the number of drive-sense circuits of the first subset of the plurality of drive-sense circuits indicated by the first configuration data based on: the second condition being less favorable than the first condition, or the first condition requiring sensing at a higher resolution than the second condition.

In various embodiments, the second configuration data indicates the second subset of the plurality of drive-sense circuits monitor corresponding cross-points at a lower resolution than cross-points monitored by drive-sense circuits of the first subset of the plurality of drive-sense circuits indicated by the first configuration data based on: the second condition being less favorable than the first condition, or the first condition requiring sensing at a higher resolution than the second condition.

In various embodiments, the first configuration data indicates a subset of the plurality of drive-sense circuits monitor mutual capacitance and/or self capacitance and the second configuration data indicates this subset of the plurality of drive-sense circuits monitor self capacitance only based on: the second condition being less favorable than the first condition, or the first condition requiring sensing at a higher resolution than the second condition.

In various embodiments, the touch screen display is implemented via some or all features and/or functionality of any other embodiment of the touch screen display described herein.

In various embodiments, another touch-based device such as a touch panel does not include a display, but includes the plurality of sets of electrodes, the plurality of sets of drive-sense circuits, and/or the processing module. Such a touch-based device can be configured to perform some or all steps of the method of FIG. 74D and/or can be configured via some or all various features and/or functionality of the touch screen display described above and/or described in conjunction with FIGS. 74A-74C.

Figure 75B:
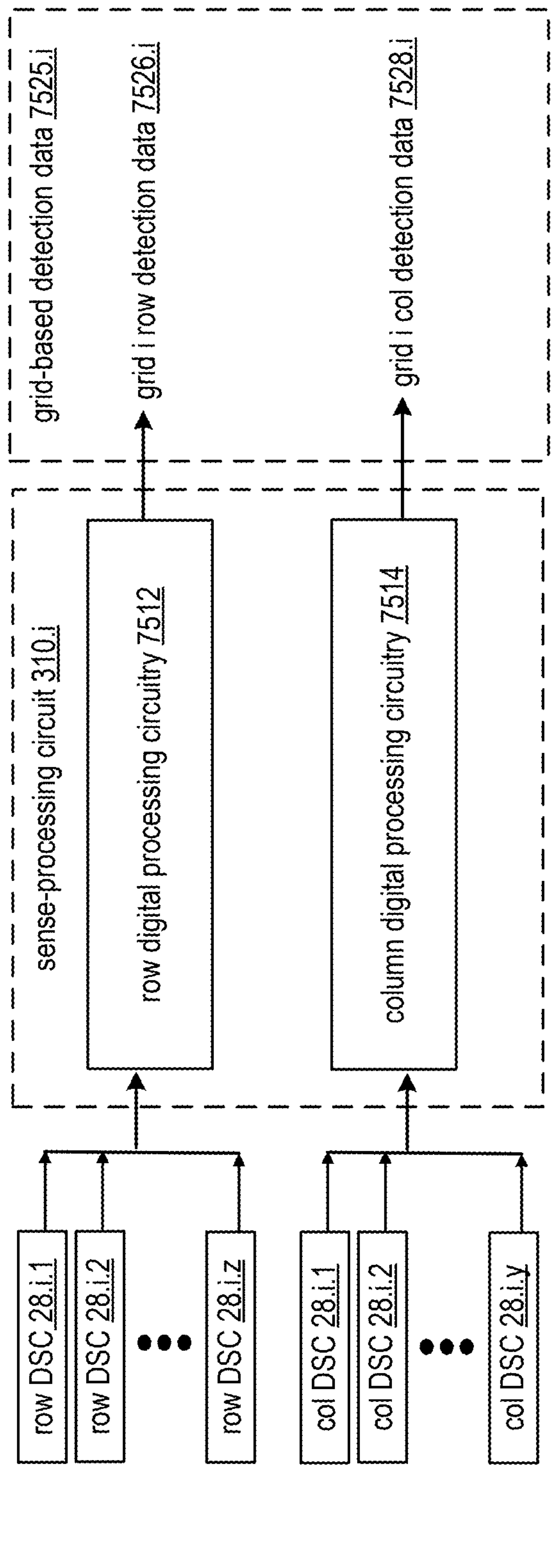
FIG. 75B is a schematic block diagram of a sense-processing circuit that implements row digital processing circuitry and column digital processing circuitry in accordance with various embodiments.

FIGS. 75A-75B illustrate embodiments of facilitating processing of sensed signals of separate electrode grids 6528 individually to generate grid-based detection data 7525 for individual electrode grids 6528, and generating proximal user interaction data 7530 based on collectively processing the grid-based detection data 7525 generated by each individual electrode grids 6528. Some or all features and/or functionality of the electrode grids 6528, DSCs 28, sense-processing circuits 310, and/or touch screen display can be utilized to implement the plurality of electrode grids 6528 of FIG. 65A, the sense-processing circuits 310 of FIGS. 65J and/or 65L; detection of touches, hovers, and/or other user interaction described herein; generation of capacitive images 232 described herein; and/or any other embodiment of the electrode grids 6528, DSCs 28, sense-processing circuits 310, and/or touch screen display described herein.

FIG. 75A illustrates a collective user interaction data generator 7520 that processes a plurality of grid-based detection data 7525.1-7525.*n* generated by a plurality of sense processing circuits 310.A-310.*n* corresponding to a plurality of electrode grids 6528.A-6528.*n*. Some or all features and/or functionality of the electrode grids 6528, sense-processing circuits 310, and/or touch screen display can be utilized to implement the plurality of electrode grids 6528 of FIG. 65A, the sense-processing circuits 310 of FIGS. 65J and/or 65L; and/or any other embodiment of the electrode grids 6528, DSCs 28, sense-processing circuits 310, and/or touch screen display described herein.

Each grid-based detection data 7525 can be implemented as and/or based on the sensed signals generated by a given plurality of DSCs monitoring sense cells 280 at its own plurality of cross-points formed by its corresponding row electrodes and column electrodes as described previously herein. For example, each grid-based detection data 7525 can indicate variation in self capacitance and/or mutual capacitance detected by some or all of its DSCs, which can denote corresponding variations of self capacitance and/or mutual capacitance at some or all of its sense cells formed at the cross points of electrodes of these DSCs. Each grid-based detection data 7525 can optionally indicate a capacitive image 232 generated for a corresponding time frame, or can otherwise indicate sensed signals generated by the DSCs of the corresponding electrode grid for the corresponding time frame and/or corresponding variations in capacitance detected by DSCs grid for the corresponding time frame. Each grid-based detection data 7525 can optionally indicate the location of one or more proximal touches 234 or other user interactions detected at sense cells of the corresponding electrode grid at the given time frame, if applicable. Multiple grid-based detection data 7525 can optionally be generated by some or all electrode grids 6528 over a plurality of time frames.

Each grid-based detection data 7525 can optionally be generated independently from other grid-based detection data 7525 generated for some or all other electrode grids 6528, for example, via distinct sense-processing circuits 310, distinct processing modules 42, or other distinct processing resources. Multiple grid-based detection data 7525 can optionally be generated for a same time frame simultaneously in parallel via multiple corresponding sense-processing circuits 310, for example, without coordination. Alternatively, multiple grid-based detection data 7525 can optionally be generated via shared processing resources, for example, one at a time in series and/or by applying a time multiplexing strategy of the shared processing resources.

The collective user interaction data generator 7520 can combine and/or otherwise collectively process the set of grid-based detection data 7525 at a given time frame and/or over multiple sequential time frames to generate corresponding proximal user interaction data 7530. For example, the collective user interaction data generator 7520 is implemented as a processing module 42 that receives and processes the grid-based detection data 7525 generated by each sense-processing circuit 310. The collective user interaction data generator 7520 can include at least one processor and/or at least one memory that stores operational instructions that, when executed by the at least one processor, cause the at least one processor to perform some or all of its functionality.

Proximal user interaction data 7530 generated at a given time can be based on and/or can indicate a corresponding set of grid-based detection data 7525 for a corresponding time frames and/or corresponding set of consecutive time frames. For example, the proximal user interaction data 7530 can be implemented as and/or based on all sensed signals indicated in the corresponding set of grid-based detection data 7525. The proximal user interaction data 7530 can indicate and/or be based on variation in self capacitance and/or mutual capacitance detected by some or all DSCs of the set of electrode grids, as indicated in the corresponding set of grid-based detection data 7525. The proximal user interaction data 7530 can optionally indicate at least one capacitive image 232 generated for the corresponding time frame based on combining capacitive images capacitive image 232 of the corresponding set of grid-based detection data 7525 and/or based on otherwise denoting the change in capacitance at each sense cell of the set of sense cells across all of the set of electrode grids as indicated in the corresponding set of grid-based detection data 7525. The proximal user interaction data 7530 can optionally indicate the location of one or more proximal touches 234 or other user interactions detected at sense cells across the set of electrode grids, if applicable. The proximal user interaction data 7530 can be implemented in a same or similar fashion as proximal touch data 204.

Some or all of the set of grid-based detection data 7525 utilized to generate given proximal user interaction data 7530 can be generated in the same time frame, or across different ones of a set of consecutive time frames. The set of grid-based detection data 7525 utilized to generate given proximal user interaction data 7530 can include grid-based detection data 7525 generated by every electrode grid of the touch screen display or only a proper subset of electrode grids of the touch screen display, for example, based on only some of the electrode grids currently being active in accordance with the given sensing mode 6515 and/or based on active electrode grids alternating over a plurality of time frames. Further proximal user interaction data 7530 can be generated over time as further sets of set of grid-based detection data 7525 are generated over time.

FIG. 75B illustrates an embodiment of a given sense-processing circuit 310.*i* that generates corresponding grid-based detection data 7525.*i* that includes and/or that is based on row detection data 7526.*i* and/or column detection data 7528.*i* for the corresponding electrode grid 6528.*i*. Some or all features and/or functionality of the sense-processing circuit 310.*i* of FIG. 75B can be utilized to implement some or all sense-processing circuits 310.1-310.*n* of FIG. 75A and/or any other sense-processing circuits 310 and/or touch screen display described herein. Some or all features and/or functionality of the grid-based detection data 7525.*i* of FIG. 75B can be utilized to implement some or all grid-based detection data 7525.1-7525.*n* of FIG. 75A.

A given sense-processing circuit 310 can process sensed signals generated via a plurality of row DSCs 28.1-28.*z* of the corresponding electrode grid via column digital processing circuitry 7514 to generate row detection data 7526, for example, indicating detected variations in capacitance of row electrodes of the corresponding electrode grid. The given sense-processing circuit 310 can further process sensed signals generated via a plurality of column DSCs 28.1-28.*y* of the corresponding electrode grid via column digital processing circuitry 7514 column detection data 7528, for example, indicating detected variations in capacitance of column electrodes of the corresponding electrode grid. Example embodiments of row digital processing circuitry 7512 and column digital processing circuitry 7514 are discussed in further detail in conjunction with FIGS. 76A-76G.

The row detection data 7526 and column detection data 7528 can be generated via the row digital processing circuitry 7512 and the column digital processing circuitry 7514 of the respective sense-processing circuit 310 separately and/or in parallel, for example, simultaneously within a given time period and/or without coordination, where the row digital processing circuitry 7512 and the column digital processing circuitry 7514 are implemented via distinct circuitry, distinct processing modules 42, and/or distinct processing resources. For example, sensed signals generated via the plurality of DSCs of the given electrode grid for a given time frame are processed via row detection data 7526 and column detection data 7528 for the given time frame in parallel to generate the respective row detection data 7526 and column detection data 7528 for the given time frame. Alternatively, the row digital processing circuitry 7512 and the column digital processing circuitry 7514 are optionally implemented via shared resources, where the row detection data 7526 and column detection data 7528 are optionally generated collectively, are optionally generated one at a time in series, and/or are generated by applying a time multiplexing strategy of the shared processing resources.

The row detection data 7526 and column detection data 7528 generated via a given sense-processing circuit 310.*i* can be processed, for example, via the collective user interaction data generator 7520 collectively with other row detection data 7526 and column detection data 7528 generated one or more via other sense-processing circuit 310, to ultimately generate the proximal user interaction data 7530, for example, as discussed in conjunction with FIG. 75A. Each row detection data 7526 of each grid-based detection data can be based on sensed signals generated via a corresponding proper subset of a plurality of row DSCs of the given touch screen display, where each row DSC's sensed signals are processed via row digital processing circuitry 7512 of only one sense-processing circuit 310 based on its assignment to only one electrode grid. Similarly, each column detection data 7528 of each grid-based detection data can be based on sensed signals generated via a corresponding proper subset of a plurality of column DSCs of the given touch screen display, where each column DSC's sensed signals are processed via column digital processing circuitry 7514 of only one sense-processing circuit 310 based on its assignment to only one electrode grid. Same or different numbers of row DSCs z can be included in and have sensed signals processed for different electrode grids based on the number of row DSCs included in each electrode grid. Same or different numbers of column DSCs y can be included in and have sensed signals processed for different electrode grids based on the number of column DSCs included in each electrode grid.

In other embodiments, only a single electrode grid is implemented via the touch screen display, and the proximal user interaction data 7530 is generated based on only the row detection data 7526 and column detection data 7528 for the single electrode grid, where the given row detection data 7526 is optionally generated via sensed signals generated by all row DSCs of the given touch screen display and/or where the given column detection data 7528 is optionally generated via sensed signals generated by all column DSCs of the given touch screen display. In such embodiments, a single sense-processing circuit 310 can be implemented to generate the proximal user interaction data 7530 based on the row detection data 7526 and the column detection data 7528 generated for the single electrode grid.

Figure 75C:
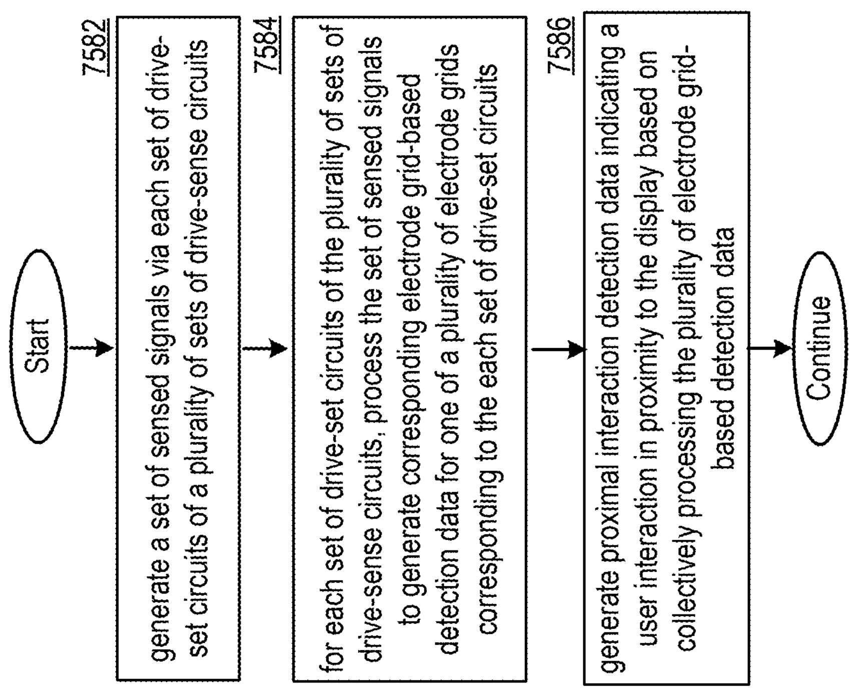
FIG. 75C is a logic diagram of an example method for execution in accordance with various embodiments.

FIG. 75C illustrates a flow diagram of an embodiment of a method in accordance with the present disclosure. In particular a method is presented for execution by and/or for use in conjunction with a plurality of drive-sense circuits 28, a plurality of electrodes 85, touch screen processing module 82, other processing modules 42, touch screen 16, 20, 80, and/or 90, computing device 14 and/or 18, and/or other sensors, processing modules, touch screen displays, and/or computing devices disclosed herein. Some or all steps of FIG. 75C can be performed in conjunction with the embodiments illustrated in and described in conjunction with FIGS. 75A-FIG. 75B. Some or all steps of FIG. 75C can be performed in conjunction with some or all steps of FIG. 65M, FIG. 66H, FIG. 67C, FIG. 68C, FIG. 69F, FIG. 70D, FIG. 71D, FIG. 72F, FIG. 73E, FIG. 74D and/or any other methods described herein.

Step 7282 includes generate a set of sensed signals via each set of drive-set circuits of a plurality of sets of drive-sense circuits. Step 7284 includes, for each set of drive-set circuits of a plurality of sets of drive-sense circuits, processing the set of sensed signals to generate corresponding electrode grid-based detection data for one of a plurality of electrode grids corresponding to the each set of drive-set circuits. Step 7286 includes generating proximal interaction detection data indicating a user interaction in proximity to the display based on collectively processing the plurality of electrode grid-based detection data.

In various embodiments, a touch screen display includes the plurality of sets of drive-sense circuits. For example, the touch screen display performs some or all steps of the method of FIG. 75C, and/or some or all steps of any other method described herein, utilizing the plurality of sets of drive-sense circuits.

In various embodiments, the same or different touch screen display includes a display configured to render frames of data into visible images. For example, the touch screen display comprises a video graphics processing module operably coupled to generate the frames of data.

In various embodiments, the touch screen display includes a plurality of sets of electrodes integrated into the display to facilitate touch sense functionality based on electrode signals having a drive signal component and a receive signal component. In various embodiments, each set of electrodes of the plurality of sets of electrodes includes a corresponding proper subset of non-neighboring ones of a plurality of row electrodes and a corresponding proper subset of non-neighboring ones of a plurality of column electrodes. In various embodiments, each set of electrodes of the plurality of sets of electrodes forms one corresponding electrode grid of a plurality of electrode corresponding to the plurality of sets of electrodes. The plurality of sets of electrodes can be implemented via any features and/or functionality of distinct electrode grids described herein, and/or via any features and/or functionality of the plurality of sets of electrodes described in conjunction with FIGS. 65M, 66H, 67C, and/or 73E.

In various embodiments, the plurality of row electrodes is separated from each the plurality of column electrodes by a dielectric material. In various embodiments the plurality of row electrodes and the plurality of column electrodes form a plurality of cross points.

In various embodiments, the touch screen display includes a plurality of sets of drive-sense circuits. In various embodiments, each set of drive-sense circuits of the plurality of sets of drive-sense circuits includes a plurality of drive-sense circuits coupled to electrodes of a corresponding set of electrodes of the plurality of sets of electrodes. In various embodiments, each set of drive-sense circuits is operable to generate a set of sensed signals indicating variations in capacitance associated with a proper subset of the plurality of cross points formed by the corresponding set of electrodes. In various embodiments, the touch screen display includes a processing module that includes at least one memory that stores operational instructions and at least one processing circuit that executes the instructions to perform operations. The operations can include, for each set of drive-set circuits of the plurality of sets of drive-sense circuits: receiving the set of sensed signals; and/or processing the set of sensed signals to generate corresponding electrode grid-based detection data for one of a plurality of electrode grids corresponding to the each set of drive-set circuits. Each of a plurality of corresponding electrode grid-based detection data can be generated for each corresponding one of the plurality of electrode grids. The operations can further include generating proximal interaction detection data indicating a user interaction in proximity to the display based on collectively processing the plurality of electrode grid-based detection data. The operations can include and/or can be based on: some or all steps of FIG. 75C, operations of any other processing module described herein, and/or some or all steps of any other method described herein.

In various embodiments, each of the plurality of drive-sense circuits includes a first conversion circuit and a second conversion circuit. In various embodiments, the first conversion circuit is configured to convert the receive signal component into a sensed signal of the plurality of sensed signals and the second conversion circuit is configured to generate the drive signal component from the sensed signal of the plurality of sensed signals.

In various embodiments, processing the set of sensed signals to generate corresponding electrode grid-based detection data includes: generating row-based detection data based on sensed signals generated by ones of the set of drive-sense circuits corresponding to ones of a set of row electrodes of the plurality of row electrodes corresponding to the one of the plurality of electrode grids, where row-based detection data is generated for each of the plurality of electrode grids; and/or generating column-based detection data based on sensed signals generated by ones of the set of drive-sense circuits corresponding to ones of a set of column electrodes of the plurality of column electrodes corresponding to the one of the plurality of electrode grids, where column-based detection data is generated for each of the plurality of electrode grids.

In various embodiments, generating the row-based detection data includes determining, for each one of the set of drive-sense circuits for each corresponding one of the set of row electrodes, self-capacitance variation data for the corresponding one of the set of row electrodes. In various embodiments, a plurality of detected capacitance variation data includes each self-capacitance variation data of each one of the set of drive-sense circuits for each corresponding one of the set of row electrodes. In various embodiments, the row-based detection data is generated based on processing the plurality of detected self-capacitance variation data.

In various embodiments, generating the column-based detection data includes determining, for each one of the set of drive-sense circuits for each corresponding one of the set of column electrodes, a plurality of mutual-capacitance variation data for each of a plurality of row electrodes with which the one of the set of column electrodes forms one of a set of cross points of the one of the set of column electrodes. In various embodiments, generating the column-based detection data further includes determining, for each one of the set of drive-sense circuits for each corresponding one of the set of column electrodes, self-capacitance variation data for the corresponding one of the set of column electrodes. In various embodiments, a plurality of detected capacitance variation data includes each self and mutual capacitance variation data of each one of the set of drive-sense circuits for each corresponding one of the set of column electrodes. In various embodiments, the column-based detection data is generated based on processing the plurality of detected self and mutual capacitance variation data.

In various embodiments, generating each of the plurality of mutual-capacitance variation data for the each of the plurality of row electrodes with which the one of the set of column electrodes forms one of a set of cross points of the one of the set of column electrodes is based on a corresponding one of a plurality of distinct frequencies of signals generated by a corresponding of the plurality of drive-sense circuits corresponding to the each of the plurality of row electrodes. In various embodiments, the plurality of row electrodes with which the one of the set of column electrodes forms one of a set of cross points of the one of the set of column electrodes are driven by all ones of the each set of drive-sense circuits for the one of the plurality of electrode grids that are coupled to row electrodes of the one of the plurality of electrode grids. In various embodiments, the plurality of row electrodes with which the one of the set of column electrodes forms one of a set of cross points of the one of the set of column electrodes are driven by only ones of the each set of drive-sense circuits for the one of the plurality of electrode grids that are coupled to the row electrodes of the one of the plurality of electrode grids.

In various embodiments, the touch screen display is implemented via some or all features and/or functionality of any other embodiment of the touch screen display described herein.

In various embodiments, another touch-based device such as a touch panel does not include a display, but includes the plurality of sets of electrodes, the plurality of sets of drive-sense circuits, and/or the processing module. Such a touch-based device can be configured to perform some or all steps of the method of FIG. 75C and/or can be configured via some or all various features and/or functionality of the touch screen display described above and/or described in conjunction with FIGS. 75A-75B.

FIGS. 76A-76G illustrate embodiments of row digital processing circuitry 7512 that processes of sensed signals of separate row DSCs 28 individually in series via a time multiplexing strategy to generate row detection data 7526, and embodiments of column digital processing circuitry 7514 that processes facilitating processing of sensed signals of separate column DSCs 28 individually in series via a time multiplexing strategy to generate column detection data 7528. Some or all features and/or functionality of the row digital processing circuitry 7512 and/or the column digital processing circuitry 7514 can be utilized to implement the row digital processing circuitry 7512 and/or the column digital processing circuitry 7514 of FIG. 75B. Some or all features and/or functionality of generating row detection data 7526 and/or column detection data 7528 can be utilized to implement the row detection data 7526 and/or column detection data 7528 of FIG. 76B, can be utilized to implement the grid-based detection data 7525 of FIG. 76A, can be utilized to implement any processing of sensed signals generated via DSCs described herein, can be utilized to implement any generation of capacitive images 232 described herein, can be utilized to implement generation of proximal user interaction data 7530, can be utilized to facilitate detection of proximal touches 234 or other user interaction proximal to the touch screen display described herein, and/or can implement any embodiment of the touch screen display described herein.

Figure 76A:
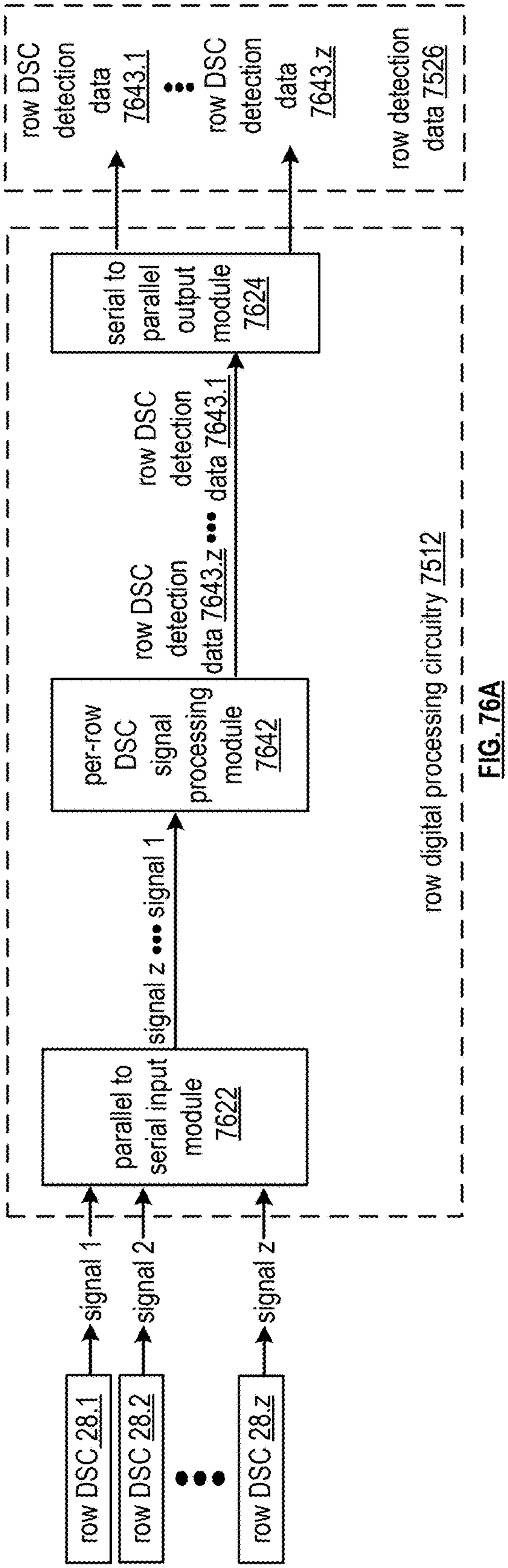
FIG. 76A is a schematic block diagram of row digital processing circuitry in accordance with various embodiments.

FIG. 76A illustrates an embodiment of row digital processing circuitry 7512 that processes of sensed signals of a plurality of row DSCs 28.1-28.*z*. Some or all features and/or functionality of row digital processing circuitry 7512 of FIG. 76A can implement the row digital processing circuitry 7512 of FIG. 75B, and/or any embodiment of processing sensed signals generated via DSCs to generate capacitive images and/or detect proximal user interactions described herein.

A plurality of signals 1-*z* can be generated via the corresponding plurality of row DSCs, for example, in parallel and/or within a same time frame. The plurality of row DSCs 28.1-28.*z* can be implemented as all row DSCs or all activated row DSCs of a corresponding electrode grid 6528, such as one of a plurality of electrode grids 6528 of the touch screen display and/or the sole electrode grid of the touch screen display. Each of the plurality of signals 1-*z* can be generated via some or all features and/or functionality of generation of sensed signals 120-2, for example, as discussed in conjunction with some or all of FIGS. 17-20.

A parallel to serial input module 7622 can facilitate serialization of the received set of signals 1-*z* to facilitate serialized processing of the set of signals 1-*z* via a per-row DSC signal processing module 7642. For example, the parallel to serial input module 7622 can assign an ordering of set of signals 1-*z* for processing one at a time by the per-row DSC signal processing module 7642, can assign each set of signals 1-*z* for processing in each of a set of consecutive time windows, and/or can facilitate processing of the set of signals 1-*z* in accordance with a time multiplexed strategy for processing via the resources of the per-row DSC signal processing module 7642.

The per-row DSC signal processing module 7642 can process each given signal as they are received and/or assigned for processing in series to generate corresponding row DSC detection data 7643. The per-row DSC signal processing module 7642 can generate each of the plurality DSC detection data 7643.1-7643.*z* one at a time, based on the ordering that the set of signals 1-*z* are processed. For example, signal 1 is assigned for processing first and signal z is assigned for processing last by the parallel to serial input module 7622, and the per-row DSC signal processing module 7642 thus processes signal 1 first, in a first one of a plurality of consecutive time windows, to output corresponding row DSC detection data 7643.1 first, and the per-row DSC signal processing module 7642 thus processes signal z last, in a final one of a plurality of consecutive time windows, to output corresponding row DSC detection data 7643.*z* last.

A serial to parallel input module 7624 can facilitate parallelizing of the generated set row DSC detection data 7643.1-7643.*z* to facilitate generation of row detection data 7526 for a given time frame that indicates and/or is generated based on some or all of the plurality of row DSC detection data 7643.1-7643.*z* from signals 1-*z* of a given time frame, despite their serialized processing. The plurality of row DSC detection data 7643.1-7643.*z* of row detection data 7526 can be processed, for example, in conjunction with column detection data 7528 for the given time frame, to generate corresponding grid-based detection data 7525 as discussed in conjunction with FIG. 75B, which can ultimately render generation of proximal user interaction data 7530, for example, as discussed in conjunction with FIG. 75A.

Further sets of signals 1-*z* can be generated via the row DSCs in subsequent time frames, where each set of signals 1-*z* for each time frame is serialized in this fashion over a corresponding plurality of time windows to generate corresponding row detection data 7526 for each time frame.

Figure 76B:
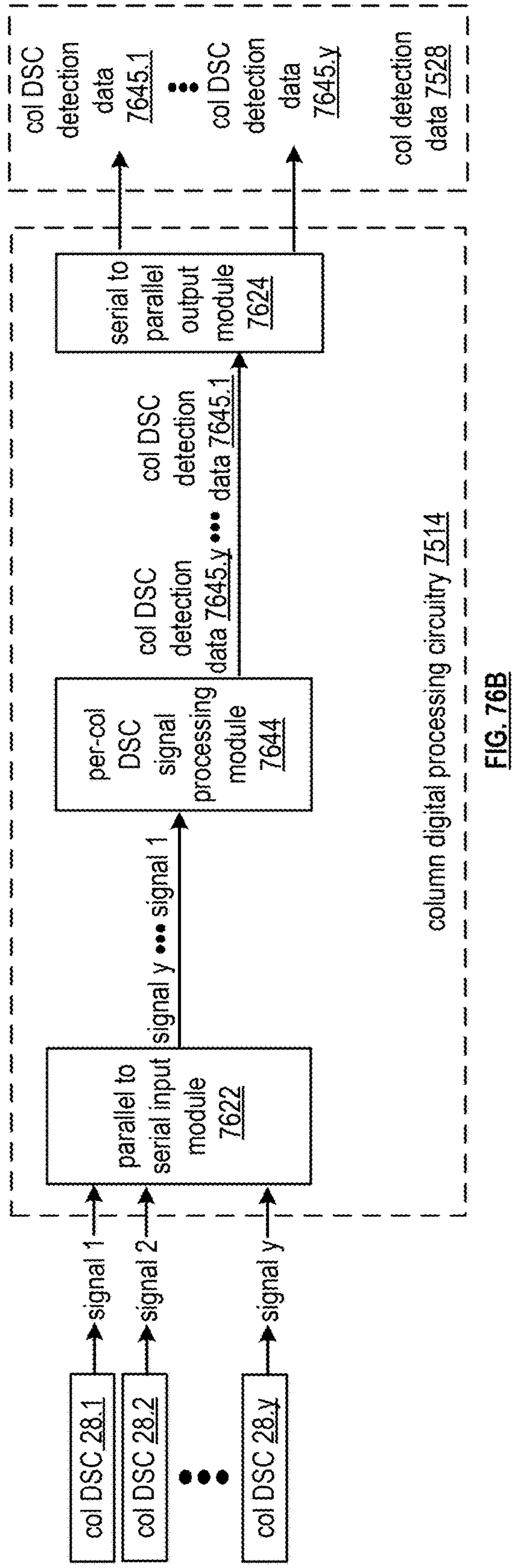
FIG. 76B is a schematic block diagram of column digital processing circuitry in accordance with various embodiments.

FIG. 76B illustrates an embodiment of column digital processing circuitry 7514 that processes of sensed signals of a plurality of column DSCs 28.1-28.*y*. Some or all features and/or functionality of column digital processing circuitry 7514 of FIG. 76B can implement the column digital processing circuitry 7514 of FIG. 75B, and/or any embodiment of processing sensed signals generated via DSCs to generate capacitive images and/or detect proximal user interactions described herein.

A plurality of signals 1-*y* can be generated via the corresponding plurality of column DSCs, for example, in parallel and/or within a same time frame. The plurality of column DSCs 28.1-28.*y* can be implemented as all column DSCs or all activated column DSCs of a corresponding electrode grid 6528, such as one of a plurality of electrode grids 6528 of the touch screen display and/or the sole electrode grid of the touch screen display. Each of the plurality of signals 1-*y* can be generated via some or all features and/or functionality of generation of sensed signals 120-1, for example, as discussed in conjunction with some or all of FIGS. 17-20.

A parallel to serial input module 7622 can facilitate serialization of the received set of signals 1-*z* to facilitate serialized processing of the set of signals 1-*z* via a per-row DSC signal processing module 7642. The parallel to serial input module 7622 can be implemented in a same or similar fashion as discussed in conjunction with FIG. 76A. The number of column electrodes y and thus the number of signals serialized signals y to be serialized via the parallel to serial input module 7622 of FIG. 76B can be different from the number of row electrodes y and thus the number of signals x to be serialized via the parallel to serial input module 7622 of FIG. 76A, for example, based on a non-square aspect ratio of the touch screen display.

The per-column DSC signal processing module 7644 can process each given signal as they are received and/or assigned for processing in series to generate corresponding column DSC detection data 7645. The per-column DSC signal processing module 7644 can be implemented in a same or similar fashion as the per-row DSC signal processing module 7642 discussed in conjunction with FIG. 76A. Distinctions between the per-column DSC signal processing module 7644 and the per-row DSC signal processing module 7642 are discussed in conjunction with FIGS. 76E-76G.

A serial to parallel input module 7624 can facilitate parallelizing of the generated set column DSC detection data 7645.1-7653.*y* to facilitate generation of column detection data 7528 for a given time frame that indicates and/or is generated based on some or all of the plurality of column DSC detection data 7645.1-7645.*y* from signals 1-*z* of a given time frame, despite their serialized processing. The serial to parallel input module 7624 can be implemented in a same or similar fashion as discussed in conjunction with FIG. 76A.

The plurality of column DSC detection data 7645.1-7645.*y* of column detection data 7526 can be processed, for example, in conjunction with the plurality of row DSC detection data 7643.1-7643.*z* for the given time frame, to generate corresponding grid-based detection data 7525 as discussed in conjunction with FIG. 75B, which can ultimately render generation of proximal user interaction data 7530, for example, as discussed in conjunction with FIG. 75A.

Further sets of signals 1-*y* can be generated via the column DSCs in subsequent time frames, where each set of signals 1-*y* for each time frame is serialized in this fashion over a corresponding plurality of time windows to generate corresponding column detection data 7528 for each time frame.

Figure 76C:
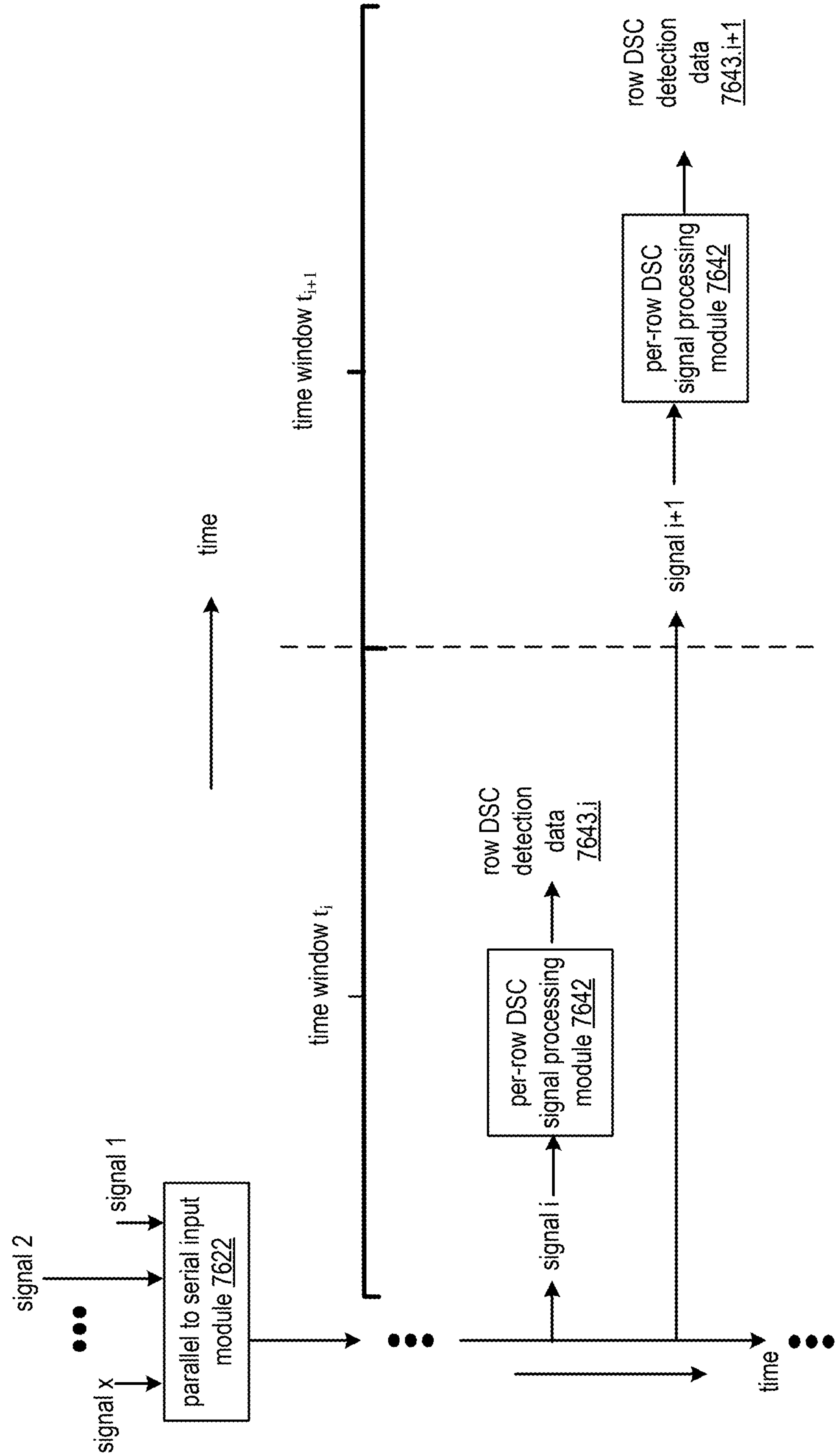
FIG. 76C illustrates serialized generation of row DSC detection data over a plurality of consecutive time windows via row digital processing circuitry in accordance with various embodiments.

FIG. 76C illustrates an example of generation of two consecutive row DSC detection data 7643.*i* and 7643.*i*+1 based on processing of two corresponding signals i and i+1, designated for processing in correspondingly consecutive time windows $t_1$ and $t_{141}$ of a plurality of time windows $t_1$-$t_z$ utilized to generate all of the row DSC detection data 7643.1-7643.*z* for a given set of signals 1-*z*. In particular, each row DSC detection data 7643 is generated one at a time based on processing the corresponding signals one at a time, where the same shared set of resources of per-row DSC signal processing module 7642 generates row DSC detection data 7643.*i*+1 strictly after generating row DSC detection data 7643.*i*, despite their respective signals being generated and received at the same time or substantially the same time. The generation of different row DSC detection data 7643 in distinct, consecutive time windows of FIG. 76C can implement the functionality of the per-row DSC signal processing module 7642 of FIG. 76A to generate the plurality of row DSC detection data 7643.1-7643.*z* from the plurality of signals 1-*z* in a serial fashion.

Different time windows of the plurality of consecutive time windows can have fixed lengths at scheduled intervals. Alternatively, the length of a given time windows of the plurality of consecutive time windows can be variable, and can for example correspond to a processing time for each given signal, where the next time window $t_{i+1}$ starts once processing of the given signal i to generate the given row DSC detection data 7643.*i* elapsed.

Figure 76D:
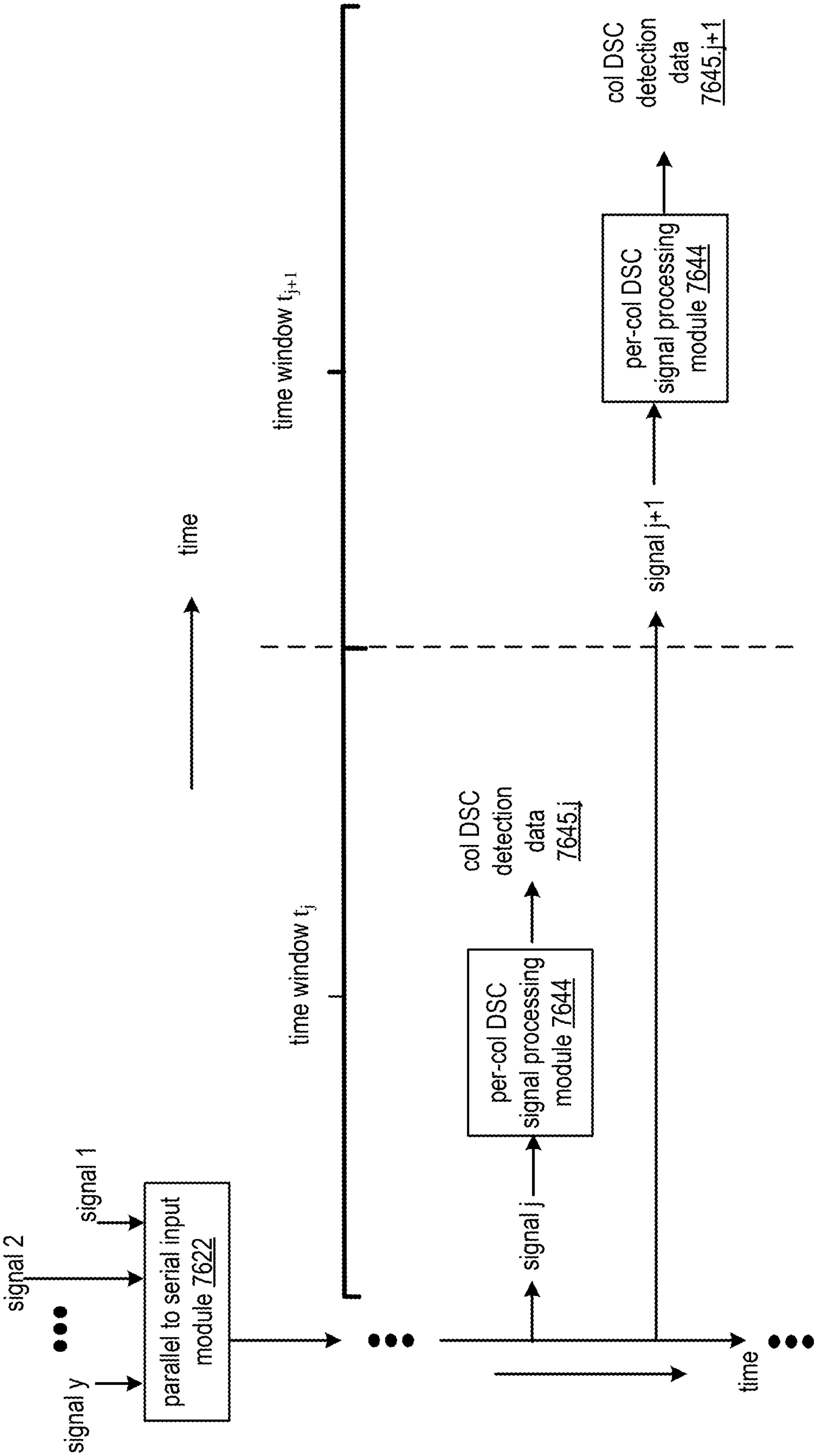
FIG. 76D illustrates serialized generation of column DSC detection data over a plurality of consecutive time windows via column digital processing circuitry in accordance with various embodiments.

FIG. 76D illustrates an example of generation of two consecutive column DSC detection data 7645.*j* and 7645.*j*+1 based on processing of two signals j and j+1, designated for processing in correspondingly consecutive time windows $t_j$ and $t_{j+1}$ of a plurality of time windows $t_1$-$t_y$ utilized to generate all of the column DSC detection data 7645.1-7645.*y* for a given set of signals 1-*y*. Similar to FIG. 76C, each column DSC detection data 7645 is generated one at a time based on processing the corresponding signals one at a time, where the same shared set of resources of per-column DSC signal processing module 7644 generates column DSC detection data 7645.*j*+1 strictly after generating column DSC detection data 7645.*i*, despite their respective signals being generated and received at the same time or substantially the same time. The generation of different column DSC detection data 7645 in distinct, consecutive time windows of FIG. 76D can implement the functionality of the per-column DSC signal processing module 7644 of FIG. 76A to generate the plurality of column DSC detection data 7645.1-7645.*y* from the plurality of signals 1-*y* in a serial fashion.

In some embodiments, a first time period that includes the plurality of time windows $t_1$-$t_z$ for processing of the set of signals 1-*z* generated via row DSCs in a given time frame can be overlapping with a second time period that includes the plurality of time windows $t_1$-$t_y$ for processing of the set of signals 1-*y* generated via column DSCs in this same given time frame. For example, the per-row DSC signal processing module 7642 and the per-column DSC signal processing module 7644 are implemented via distinct processing resources and/or are operable to generate their respective detection data in parallel with each other and/or within a same time period, for example, where the per-row DSC signal processing module 7642 processes a given signal to generate a corresponding row DSC detection data 7643 within the same time window as, and/or within a first time window overlapping with, the time window within which the per-column DSC signal processing module 7644 processes a given signal to generate a corresponding column DSC detection data 7645.

As another example, the first time period that includes the plurality of time windows $t_1$-$t_z$ is overlapping with the second time period that includes the plurality of time windows $t_1$-$t_y$ based on a full plurality of y+z time windows being utilized to process the set of signals 1-*z* and the set of signals 1-*y*. For example, the processing of signals for row and column DSCs is also serialized, for example, via a time multiplexing strategy applied to shared resources implementing the per-row DSC signal processing module 7642 and the per-column DSC signal processing module 7644. For example, these shared resources are implemented to generate each row DSC detection data 7643 and each column DSC detection data 7645 in separate time windows one at a time, for example, by alternating between generation of row DSC detection data 7643 and column DSC detection data 7645.

In other embodiments, a first time period that includes the plurality of time windows $t_1$-$t_z$ for processing of the set of signals 1-*z* generated via row DSCs in a given time frame can be nonoverlapping with a second time period that includes the plurality of time windows $t_1$-$t_y$ for processing of the set of signals 1-*y* generated via column DSCs in this same given time frame. For example, the processing of signals for row and column DSCs is also serialized for processing over y+z time windows, where the set of signals 1-*z* are processed first over the first z time windows, and where the set of signals 1-*y* are processed second over the remaining set of y time windows, or vice versa.

Figure 76E:
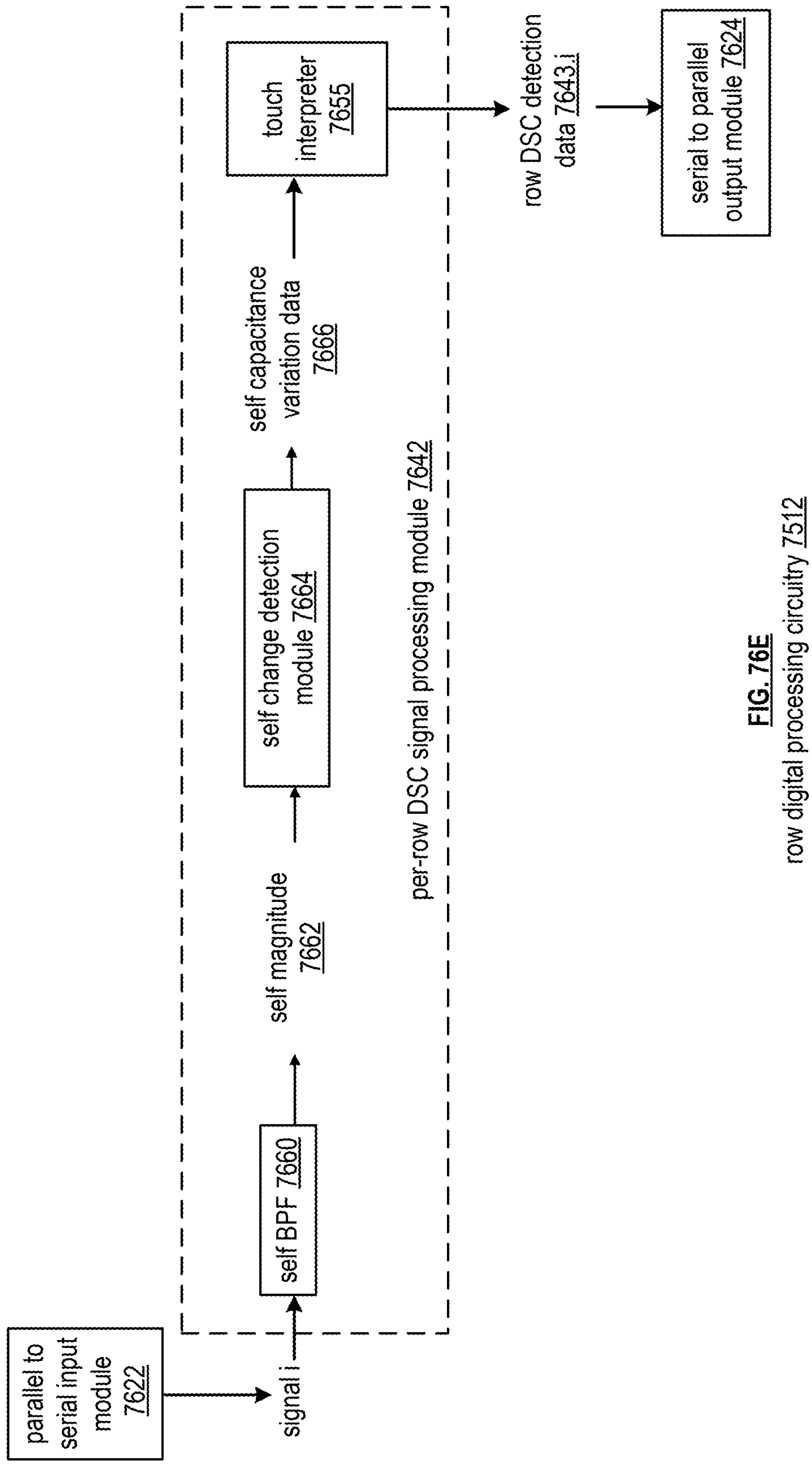
FIG. 76E is a schematic block diagram of a per-row DSC signal processing module of row digital processing circuitry in accordance with various embodiments.

FIG. 76E illustrates an embodiment of a per-row DSC signal processing module 7642 of row digital processing circuitry 7512 generating row DSC detection data 7643.*i* for a given signal i generated via a row DSC. Some or all features and/or functionality of the per-row DSC signal processing module 7642 and/or the row digital processing circuitry 7512 of FIG. 76E can implement the per-row DSC signal processing module 7642 and/or the row digital processing circuitry 7512 of FIG. 76A, the row digital processing circuitry 7512 of FIG. 75B, and/or any embodiment of processing sensed signals generated via DSCs described herein.

The per-row DSC signal processing module 7642 can apply a self band pass filter (BPF) 7660, for example centered at the frequency f1 of FIG. 65I utilized to detect self capacitance. For example, the self BPF 7660 is implemented in a same or similar fashion as band pass filter 160 of FIGS. 22-24. A corresponding magnitude of this frequency can be measured as self magnitude 7662.

A self change detection module 7664 can generate self capacitance variation data based on this self magnitude 7662, for example, based on measuring a difference of this self magnitude 7662 from a predefined threshold magnitude value corresponding to no touch, based on measuring a difference from a recently collected and/or average magnitude corresponding to no touch, and/or based on another determination. For example, the predefined threshold magnitude value corresponding to no touch and/or the recently collected magnitude corresponding to no touch is stored and/or accessed in memory accessible by the row digital processing circuitry 7512 to enable the self change detection module 7664 to generate the self capacitance variation data 7666. The self change detection module 7664 can optionally be in a same or similar fashion as frequency interpreter 164 and/or 166 of FIGS. 22-24.

A touch interpreter 7655 can process the self capacitance variation data 7666 to generate row DSC detection data 7643, for example, indicating whether a touch was detected for the corresponding signal, denoting whether a user interaction occurred at one or more sense cells of the row electrode. This can include comparing the self capacitance variation data 7666 to a predefined threshold variation value denoting a touchless and/or touch-based interaction is detected. For example, the predefined threshold variation value is stored and/or accessed in memory accessible by the row digital processing circuitry 7512 to enable the touch interpreter 7655 to generate the row DSC detection data 7643. The touch interpreter can optionally be implemented in a same or similar fashion as touch interpreter 372.

Figure 76F:
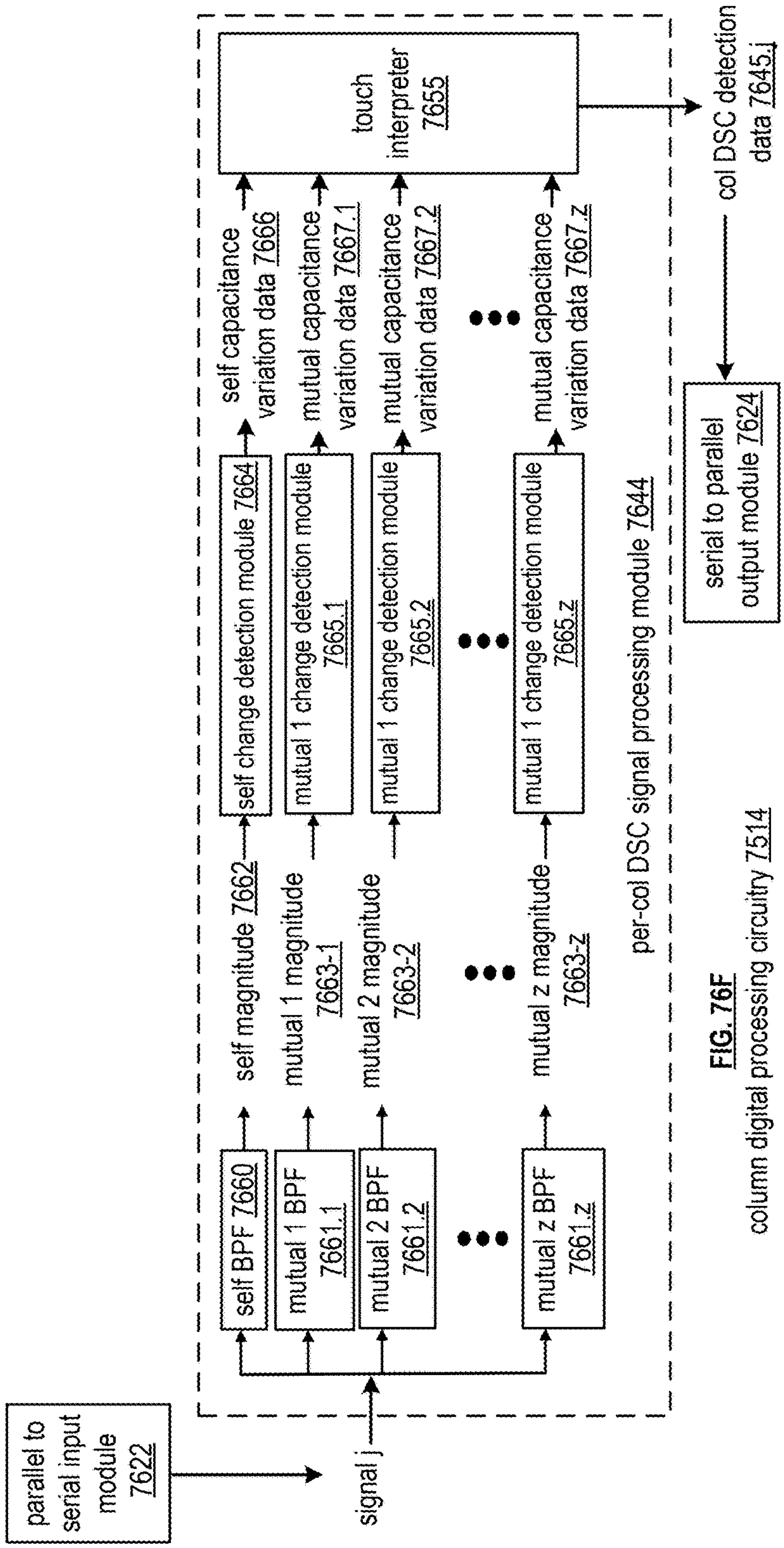
FIG. 76F is a schematic block diagram of a per-column DSC signal processing module of row digital processing circuitry in accordance with various embodiments.

FIG. 76F illustrates an embodiment of a per-column DSC signal processing module 7644 of column digital processing circuitry 7514 generating column DSC detection data 7645.*j* for a given signal j generated via a column DSC. Some or all features and/or functionality of the per-column DSC signal processing module 7644 and/or the column digital processing circuitry 7514 of FIG. 76F can implement the per-column DSC signal processing module 7644 and/or the column digital processing circuitry 7514 of FIG. 76A, the column digital processing circuitry 7514 of FIG. 75B, and/or any embodiment of processing sensed signals generated via DSCs described herein.

In a same or similar fashion as discussed in conjunction with the per-row DSC signal processing module 7642 of FIG. 76E, the per-column DSC signal processing module 7644 can apply a self BPF 7660, for example centered at the frequency f1 of FIG. 65I utilized to detect self capacitance. For example, the self BPF 7660 is implemented in a same or similar fashion as band pass filter 160 of FIGS. 22-24. A corresponding magnitude of this frequency can be measured as self magnitude 7662.

Furthermore, the per-column DSC signal processing module 7644 can apply a plurality of mutual BPFs 7661.1-7661.*z* each utilized to detect mutual capacitance. For example, each mutual BPF 7661 is implemented in a same or similar fashion as band pass filter 160 of FIGS. 22-24. A corresponding magnitude of each frequency can be measured as corresponding mutual magnitude 7663.

Figure 76G:
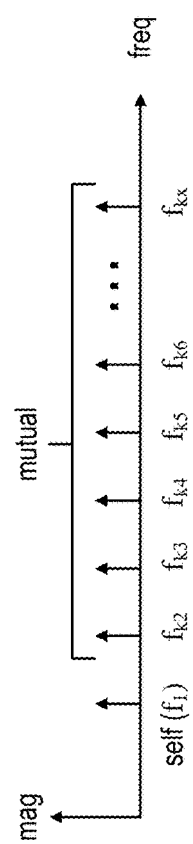
FIG. 76G illustrates an example plurality of frequencies for various band pass filters applied by a per-column DSC signal processing module in accordance with various embodiments.

Each mutual BPF can be centered at a corresponding one of a plurality of frequencies $f_{k2}$-$f_{kx}$ as illustrated in FIG. 76G, where k denotes a corresponding one electrode of a set of one or more electrode grids 6528 of the touch screen display, and where the additional frequency $f_1$ corresponds to the self frequency applied by the self BPF 7660. The plurality of frequencies $f_{k2}$-$f_{kx}$ can correspond to the set of x−1 frequencies included in signals transmitted upon row electrodes as discussed in conjunction with FIG. 65I, where x−1 is equal to z due to the electrode grid having exactly z rows and/or due to each of the z rows driving the signal having its own its own frequency component for detecting mutual capacitance. The set of frequencies of FIG. 76G can correspond to some or all frequencies of FIG. 39.

Returning to FIG. 76F, in a same or similar fashion as discussed in conjunction with the per-row DSC signal processing module 7642 of FIG. 76E, the per-column DSC signal processing module 7644 can apply a self change detection module 7664 that can generate self capacitance variation data based on the self magnitude 7662. Furthermore, the per-column DSC signal processing module 7644 can apply a plurality of mutual change detection modules 7665.1-7665.*z* that can each generate mutual capacitance variation data 7667 based on a corresponding mutual magnitude 7663. Each mutual change detection module 7665 can operate in a same or similar fashion as the self change detection module 7664. For example, each mutual change detection module 7665 generates its mutual capacitance variation data 7667 based on measuring a difference of this self magnitude 7662 from a predefined threshold magnitude value corresponding to no touch, based on measuring a difference from a recently collected and/or average magnitude corresponding to no touch, and/or based on another determination. Same of different predefined threshold magnitude values and/or recently measured magnitude values can be determined and/or stored for comparison with mutual magnitudes 7663 for different mutual frequencies, and can further be the same or different from that of the self frequency.

In a same or similar fashion as discussed in conjunction with the per-row DSC signal processing module 7642 of FIG. 76E, the per-column DSC signal processing module 7644 can apply a touch interpreter 7655 to collectively process the self capacitance variation data 7666 and the plurality of mutual capacitance variation data 7667.1-7667.*z* to generate row DSC detection data 7645, for example, indicating whether a touch was detected for the corresponding signal, and/or indicating which sense cell at which a touch was detected based on ones of the plurality of mutual capacitance variation data 7667.1-7667.*z* for corresponding rows denoted user interaction. This can include comparing the self capacitance variation data 7666 and/or each of the plurality of mutual capacitance variation data 7667.1-7667.*z* to the same or different predefined threshold variation value denoting a touchless and/or touch-based interaction is detected.

In some embodiments, the per-column DSC signal processing module 7644 generates and processes self capacitance variation data 7666 and/or the plurality of mutual capacitance variation data 7667.1-7667.*z* via a plurality of parallelized processes, where the self capacitance variation data 7666 and/or the plurality of mutual capacitance variation data 7667.1-7667.*z* for a given signal are generated simultaneously, in parallel, and/or without coordination between respective BPFs and/or change detection modules. In other embodiments, the per-column DSC signal processing module 7644 generates and processes self capacitance variation data 7666 and/or the plurality of mutual capacitance variation data 7667.1-7667.*z* one at a time in series, for example, via a time multiplexing strategy. For example, each self capacitance variation data 7666 is generated in one of a plurality of different consecutive time segments that are all within the given time window of the plurality of consecutive time windows in which the given signal is processed.

In some embodiments, the per-column DSC signal processing module 7644 processes both self capacitance variation and mutual capacitance variations as illustrated in FIG. 76F and the per-row DSC signal processing module 7642 only processes self capacitance variations as illustrated in FIG. 76E based on the row DSCs of the corresponding electrode grid being operable to drive mutual capacitance and based on the column DSCs of the corresponding electrode grid being operable to detect mutual capacitance as discussed previously. For example, the per-column DSC signal processing module 7644 processes mutual capacitance variations and the per-row DSC signal processing module 7642 does not based on row DSCs each transmitting their signals upon their electrode with signal components at one of a set of z frequencies for detection of mutual capacitance, and based on column DSCs each transmitting their signals upon their electrode with only a signal component for self capacitance at $f_1$ as illustrated and discussed in conjunction with FIG. 65I.

In other embodiments, the row DSCs of the corresponding electrode grid are operable to detect mutual capacitance and/or the column DSCs of the corresponding electrode grid are operable to drive mutual capacitance, and the per-column DSC signal processing module 7644 instead processes self capacitance only in a similar fashion as the per-row DSC signal processing module 7642 of FIG. 76E and/or the per-row DSC signal processing module 7642 processes both self capacitance variations and mutual capacitance variations in a similar fashion as the per-column DSC signal processing module 7644 of FIG. 76E.

In some embodiments, the per-column DSC signal processing module 7644 and/or the per-column DSC signal processing module do not process variations in self capacitance, for example, in a given temporal period or ever, based on the corresponding electrode grid being configured to detect mutual capacitance only as described in conjunction with FIGS. 73A-73E. For example, the per-column DSC signal processing module 7644 processes the plurality of variations in mutual capacitance only in such cases.

In some embodiments, the per-column DSC signal processing module 7644 module does not process variations in mutual capacitance, for example, in a given temporal period or ever, based on the corresponding electrode grid being configured to detect self capacitance only as described in conjunction with FIGS. 73A-73E. For example, the per-column DSC signal processing module 7644 processes only the variations in self capacitance in such cases, for example, in a same fashion as the per-row DSC signal processing module 7642.

Figure 76H:
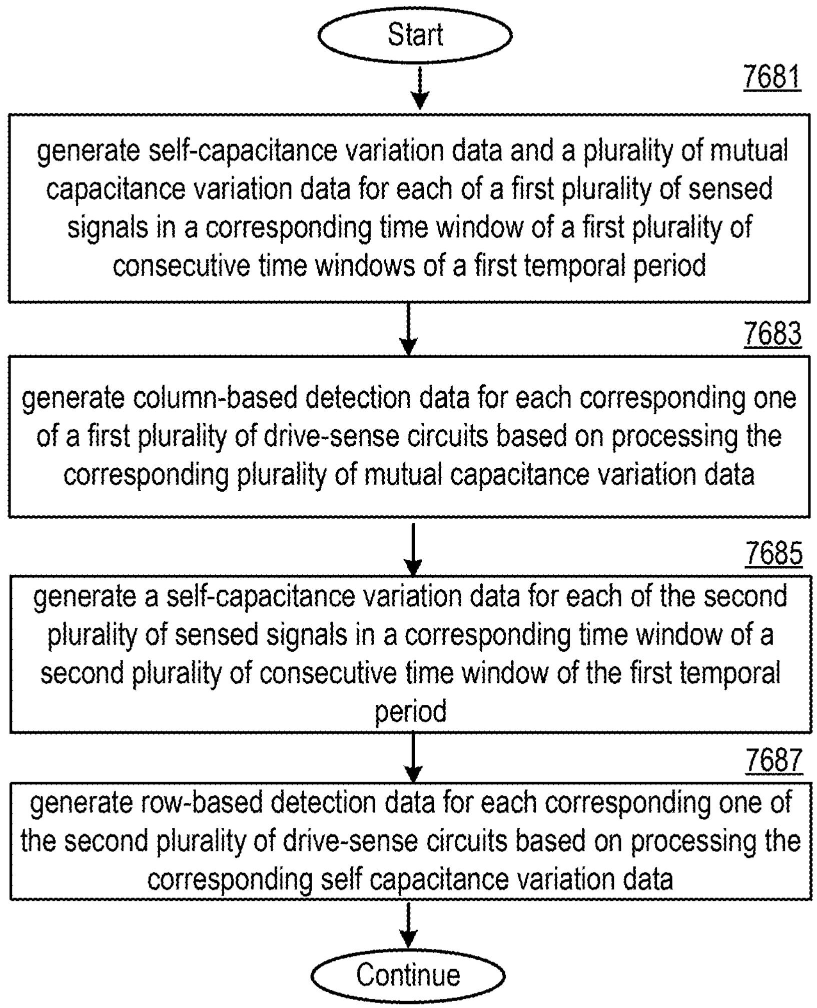
FIG. 76H is a logic diagram of an example method for execution in accordance with various embodiments.

FIG. 76H illustrates a flow diagram of an embodiment of a method in accordance with the present disclosure. In particular a method is presented for execution by and/or for use in conjunction with a plurality of drive-sense circuits 28, a plurality of electrodes 85, touch screen processing module 82, other processing modules 42, touch screen 16, 20, 80, and/or 90, computing device 14 and/or 18, and/or other sensors, processing modules, touch screen displays, and/or computing devices disclosed herein. Some or all steps of FIG. 76H can be performed in conjunction with the embodiments illustrated in and described in conjunction with FIGS. 76A-FIG. 76G. Some or all steps of FIG. 76H can be performed in conjunction with some or all steps of FIG. 65M, FIG. 66H, FIG. 67C, FIG. 68C, FIG. 69F, FIG. 70D, FIG. 71D, FIG. 72F, FIG. 73E, FIG. 74D, FIG. 75C, and/or any other methods described herein.

Step 7681 includes generating self-capacitance variation data and a plurality of mutual capacitance variation data for the each of a first plurality of sensed signals in a corresponding time window of a first plurality of consecutive time window of a first temporal period. Step 7683 generating column-based detection data for each corresponding one of a first plurality of drive-sense circuits based on processing the corresponding plurality of mutual capacitance variation data. Step 7685 includes generating a self-capacitance variation data for the each of the second plurality of sensed signals in a corresponding time window of a second plurality of consecutive time window of the first temporal period. Step 7687 includes generating row-based detection data for each corresponding one of the second plurality of drive-sense circuits based on processing the corresponding self capacitance variation data.

Figure 76I:
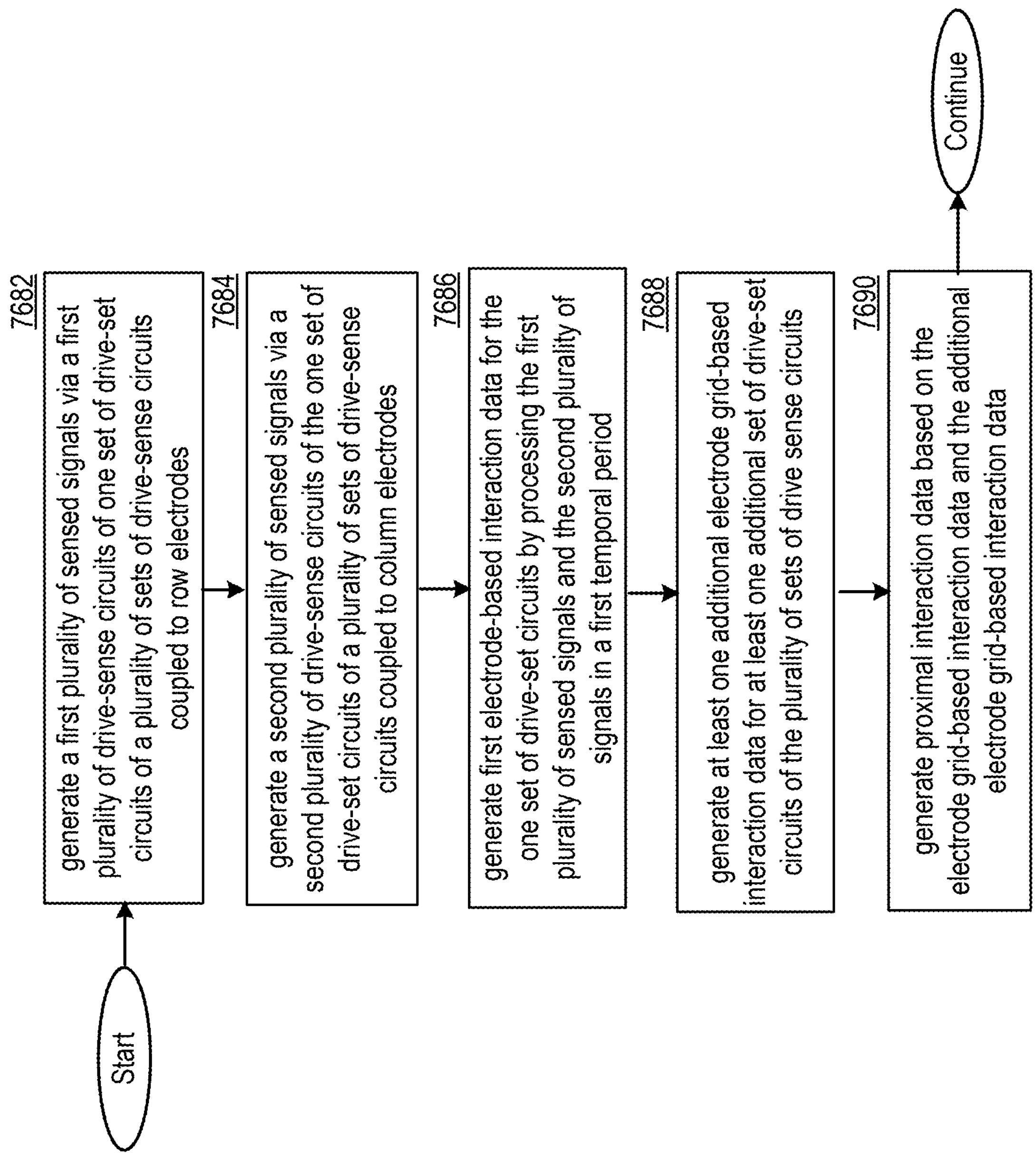
FIG. 76I is a logic diagram of an example method for execution in accordance with various embodiments.

FIG. 76I illustrates a flow diagram of an embodiment of a method in accordance with the present disclosure. In particular a method is presented for execution by and/or for use in conjunction with a plurality of drive-sense circuits 28, a plurality of electrodes 85, touch screen processing module 82, other processing modules 42, touch screen 16, 20, 80, and/or 90, computing device 14 and/or 18, and/or other sensors, processing modules, touch screen displays, and/or computing devices disclosed herein. Some or all steps of FIG. 76I can be performed in conjunction with the embodiments illustrated in and described in conjunction with FIGS. 76A-FIG. 76G. Some or all steps of FIG. 76I can be performed in conjunction with some or all steps of FIG. 65M, FIG. 66H, FIG. 67C, FIG. 68C, FIG. 69F, FIG. 70D, FIG. 71D, FIG. 72F, FIG. 73E, FIG. 74D, FIG. 75C, FIG. 76H, and/or any other methods described herein.

Step 7682 includes generating a first plurality of sensed signals via a first plurality of drive-sense circuits of one set of drive-set circuits of a plurality of sets of drive-sense circuits coupled to row electrodes. Step 7684 includes generating a second plurality of sensed signals via a second plurality of drive-sense circuits of the one set of drive-set circuits of a plurality of sets of drive-sense circuits coupled to column electrodes. Step 7686 includes generating first electrode-based interaction data for the one set of drive-set circuits by processing the first plurality of sensed signals and the second plurality of signals in a first temporal period. Step 7688 includes generating at least one additional electrode grid-based interaction data for at least one additional set of drive-set circuits of the plurality of sets of drive sense circuits. Step 7690 includes generating proximal interaction data based on the electrode grid-based interaction data and the additional electrode grid-based interaction data.

In various embodiments, performing step 7582 of FIG. 75C includes performing steps 7682 and 7684 of FIG. 76I. In various embodiments, performing step 7584 of FIG. 75C includes performing steps 7686 and 7688 of FIG. 76I. In various embodiments, performing step 7584 of FIG. 75C includes repeating some or all steps of FIG. 76H for each set of drive-sense circuits of the plurality of sets of drive sense circuits of step 7584. In various embodiments, performing step 7586 of FIG. 75C includes performing step 7690 of FIG. 76I.

In various embodiments, generating the first electrode grid-based interaction data for the one set of drive-set circuits by processing the first plurality of sensed signals and the second plurality of signals in the first temporal period of step 7686 includes performing some or all steps of FIG.

76H. For example, steps 7681 and/or 7683 of FIG. 76H are performed for each of the first plurality of sensed signals of step 7686 of FIG. 76I, and/or steps 7685 and/or 7687 of FIG. 76H are performed for each of the second plurality of sensed signals of step 7686 of FIG. 76I. In various embodiments, generating each of the at least one additional electrode grid-based interaction data for at least one additional set of drive-set circuits of the plurality of sets of drive sense circuits includes re-performing some or all steps of FIG. 76H for respective first and second pluralities of sensed signals.

In various embodiments, a touch screen display includes the plurality of sets of drive-sense circuits. For example, the touch screen display performs some or all steps of the method of FIG. 76I and/or FIG. 76H, and/or some or all steps of any other method described herein, utilizing the plurality of sets of drive-sense circuits.

In various embodiments, the same or different touch screen display includes a display configured to render frames of data into visible images. For example, the touch screen display comprises a video graphics processing module operably coupled to generate the frames of data.

In various embodiments, the touch screen display includes a plurality of sets of electrodes integrated into the display to facilitate touch sense functionality based on electrode signals having a drive signal component and a receive signal component. In various embodiments, each set of electrodes of the plurality of sets of electrodes includes a corresponding proper subset of non-neighboring ones of a plurality of row electrodes and a corresponding proper subset of non-neighboring ones of a plurality of column electrodes. In various embodiments, each set of electrodes of the plurality of sets of electrodes forms one corresponding electrode grid of a plurality of electrode corresponding to the plurality of sets of electrodes. The plurality of sets of electrodes can be implemented via any features and/or functionality of distinct electrode grids described herein, and/or via any features and/or functionality of the plurality of sets of electrodes described in conjunction with FIGS. 65M, 66H, 67C, 73E, and/or 75C.

In various embodiments, the plurality of row electrodes is separated from each the plurality of column electrodes by a dielectric material. In various embodiments the plurality of row electrodes and the plurality of column electrodes form a plurality of cross points.

In various embodiments, the touch screen display includes a plurality of sets of drive-sense circuits. In various embodiments, each set of drive-sense circuits of the plurality of sets of drive-sense circuits includes a plurality of drive-sense circuits coupled to electrodes of a corresponding set of electrodes of the plurality of sets of electrodes. In various embodiments, each set of drive-sense circuits is operable to generate a set of sensed signals indicating variations in capacitance associated with a proper subset of the plurality of cross points formed by the corresponding set of electrodes. In various embodiments, the touch screen display includes a processing module that includes at least one memory that stores operational instructions and at least one processing circuit that executes the instructions to perform operations. The operations can include, for one set of drive-set circuits of the plurality of sets of drive-sense circuits: receiving a first plurality of sensed signals, where each of the first plurality of sensed signals is generated by a corresponding one of the first plurality of drive-sense circuits; receiving a second plurality of sensed signals, where each of the second plurality of sensed signals is generated by a corresponding one of the second plurality of drive-sense circuits; and/or generating first electrode grid-based interaction data for the one set of drive-set circuits by processing the first plurality of sensed signals and the second plurality of signals in a first temporal period.

In various embodiments, generating the first electrode grid-based interaction data for the one set of drive-set circuits is based on, for each of the first plurality of sensed signals: generating a plurality of mutual capacitance variation data for the each of the first plurality of sensed signals in a corresponding time window of the plurality of consecutive time windows of the first temporal period; and/or generating column-based detection data for the corresponding one of the first plurality of drive-sense circuits based on processing the plurality of mutual capacitance variation data. In various embodiments, generating the first electrode grid-based interaction data for the one set of drive-set circuits is further based on, for each of the second plurality of sensed signals: generating self-capacitance variation data for the each of the second plurality of sensed signals in a corresponding time window of the second plurality of consecutive time windows of the first temporal period; and/or generating row-based detection data for the corresponding one of the second plurality of drive-sense circuits based on processing the self capacitance variation data.

In various embodiments, the operations further include generating at least one additional electrode grid-based interaction data for at least one additional set of drive-set circuits of the plurality of sets of drive sense circuits; and/or generating proximal interaction data based on the electrode grid-based interaction data and the additional electrode grid-based interaction data.

The operations can include and/or can be based on: some or all steps of FIG. 76I, some or all steps of FIG. 76H, operations of any other processing module described herein, and/or some or all steps of any other method described herein.

In various embodiments, the corresponding one of the first plurality of drive-sense circuits of the one set of drive-set circuits is coupled to one column electrodes of the corresponding set of electrodes of the plurality of sets of electrodes. In various embodiments, the one column electrodes forms each of a set of cross points with each row electrode of the corresponding set of electrodes of the plurality of sets of electrodes. In various embodiments, each of the plurality of mutual capacitance variation data is generated for one of the set of cross points.

In various embodiments, each of the second plurality of drive-sense circuits of the one set of drive-set circuits drives a signal on a corresponding row electrode of the corresponding set of electrodes at a corresponding one of a set of different frequencies. In various embodiments, generating each of the plurality of mutual capacitance variation data is based on detecting a corresponding one of the set of different frequencies.

In various embodiments, generating each of the plurality of mutual capacitance variation data includes: applying a band pass filter for the corresponding one of the set of different frequencies to generate magnitude data for the corresponding one of the set of different frequencies; and computing a change in mutual capacitance based on comparing the magnitude data to a predetermined threshold capacitance value. In various embodiments, the each of the plurality of mutual capacitance variation data indicates the change in mutual capacitance.

In various embodiments, the self-capacitance variation data and the each of the plurality of mutual capacitance variation data for the each of the first plurality of drive-sense circuits are serially generated in different consecutive ones of a plurality of time segments within the corresponding time window. In various embodiments, a number of time segments of the plurality of time segments within the corresponding time window is based on a number of row electrodes in the set of electrodes. In various embodiments, the self-capacitance variation data and the each of the plurality of mutual capacitance variation data for the each of the first plurality of drive-sense circuits are generated in parallel during the corresponding time window, for example, by applying a plurality of band pass filters in parallel.

In various embodiments, the first temporal period is a first one of a plurality of consecutive temporal periods, and/or the at least one additional electrode grid-based interaction data is generated in at least one additional one of the plurality of consecutive temporal periods serially after the first temporal period. In various embodiments, generating the proximal interaction data includes parallelizing the first electrode grid-based interaction data the at least one additional electrode grid-based interaction data generated across the plurality of consecutive temporal periods. In various embodiments, the plurality of consecutive temporal periods correspond to a plurality of frames displayed by the display. In various embodiments, a length of each of the plurality of consecutive temporal periods is based on a frame rate. In various embodiments, the frame rate is equal to 300 HZ, or is equal to a different frame rate.

In various embodiments, a number of time windows in the first plurality of consecutive time window within the first temporal period is based on is based on a number of column electrodes in the set of electrodes. In various embodiments, a number of time windows in the second plurality of consecutive time frames within the first temporal period is based on is based on a number of row electrodes in the set of electrodes. In various embodiments, a full plurality of distinct consecutive time windows of the first temporal period includes the first plurality of consecutive time frames and further includes the second plurality of consecutive time windows serially after the first plurality of time windows.

In various embodiments, the first plurality of sensed signals and the second plurality of sensed signals are received in a parallelized manner. In various embodiments, generating the first electrode grid-based interaction data further includes: assigning ones of the first plurality of sensed signals for processing in distinct ones of the first plurality of consecutive time windows, and/or assigning ones of the second plurality of sensed signals in distinct ones of the second plurality of consecutive time windows.

In various embodiments, generating the first electrode grid-based interaction data includes: parallelizing a plurality of column-based detection data generated for the first plurality of drive-sense circuits across the first plurality of consecutive time windows; and/or parallelizing a plurality of row-based detection data generated for the second plurality of drive-sense circuits across the second plurality of consecutive time windows.

In various embodiments, the one set of drive-sense circuits and the at least one additional set of drive-set circuits comprise a proper subset of the plurality of sets of drive sense circuits. In various embodiments, the one set of drive-sense circuits and the at least one additional set of drive-set circuits comprise all of the plurality of sets of drive sense circuits.

In various embodiments, the touch screen display is implemented via some or all features and/or functionality of any other embodiment of the touch screen display described herein.

In various embodiments, another touch-based device such as a touch panel does not include a display, but includes the plurality of sets of electrodes, the plurality of sets of drive-sense circuits, and/or the processing module. Such a touch-based device can be configured to perform some or all steps of the method of FIG. 76H and/or FIG. 76I, and/or can be configured via some or all various features and/or functionality of the touch screen display described above and/or described in conjunction with FIGS. 76A-76G.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor" "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A touch screen display comprises:

a display configured to render frames of data into visible images;

a plurality of sets of electrodes integrated into the display to facilitate touch sense functionality based on electrode signals having a drive signal component and a receive signal component, wherein each set of electrodes of the plurality of sets of electrodes includes a corresponding proper subset of non-neighboring ones of a plurality of row electrodes and a corresponding proper subset of non-neighboring ones of a plurality of column electrodes, wherein the plurality of row electrodes is separated from each the plurality of column electrodes by a dielectric material, and wherein the plurality of row electrodes and the plurality of column electrodes form a plurality of cross points;

a plurality of sets of drive-sense circuits, wherein each set of drive-sense circuits of the plurality of sets of drive-sense circuits includes a plurality of drive-sense circuits coupled to electrodes of a corresponding set of electrodes of the plurality of sets of electrodes, and wherein each set of drive-sense circuits is operable to generate a set of sensed signals indicating variations in capacitance associated with a proper subset of the plurality of cross points formed by the corresponding set of electrodes; and a processing module that includes at least one memory that stores operational instructions and at least one processing circuit that executes the operational instructions to perform operations to:

operate exactly one set of drive-sense circuits of the plurality of sets of drive-sense circuits in a first mode during a first temporal period to facilitate detection of first proximal interaction of a user; and operate more than one set of drive-sense circuits of the plurality of sets of drive-sense circuits in a second mode during a second temporal period after the first temporal period to facilitate detection of second proximal interaction of the user.

2. The touch screen display of claim 1, wherein the processing module that includes the at least one memory that stores operational instructions and the at least one processing circuit that executes the operational instructions further configured to perform operations to operate more than one set of drive-sense circuits of the plurality of sets of drive-sense circuits in a third mode, which includes both the first mode and the second mode, during a third temporal period after the second temporal period to facilitate detection of third proximal interaction of the user.

3. The touch screen display of claim 1, wherein the processing module that includes the at least one memory that stores operational instructions and the at least one processing circuit that executes the operational instructions further configured to perform operations to operate the sets of drive-sense circuits of the plurality of sets of drive-sense circuits in a multiple, different respective sensing modes of a plurality of possible sensing modes at multiple, different respective temporal periods to facilitate detection of multiple, different respective proximal interactions of the user.

4. The touch screen display of claim 1, wherein the processing module that includes the at least one memory that stores operational instructions and the at least one processing circuit that executes the operational instructions further configured to:

operate in the first mode during the first temporal period based on:

activating the exactly one set of drive-sense circuits of the plurality of sets of drive-sense circuits to generate a corresponding one set of sensed signals during the first temporal period;

receiving the corresponding one set of sensed signals from the exactly one set of drive-sense circuits during the first temporal period; and processing the corresponding one set of sensed signals to generate first proximal interaction data of the first proximal interaction of the user for the first temporal period; and operating in a second mode during a second temporal period after the first temporal period based on:

activating more than one set of drive-sense circuits of the plurality of sets of drive-sense circuits to generate a corresponding more than one set of sensed signals during the second temporal period;

receiving the corresponding more than one set of sensed signals from the more than one set of drive-sense circuits during the second temporal period; and processing the set of sensed signals to generate second proximal interaction data of the second proximal interaction of the user for the second temporal period.

5. The touch screen display of claim 4, wherein each of the plurality of drive-sense circuits includes a first conversion circuit and a second conversion circuit, and wherein, when the exactly one set of drive-sense circuits of the plurality of drive-sense circuits is enabled to monitor a corresponding electrode of the plurality of sets of electrodes based on being activated, each first conversion circuit of each drive-sense circuit of the exactly one set of drive-sense circuits is configured to convert the receive signal component into a sensed signal of the set of sensed signals and each second conversion circuit of each drive-sense circuit of the exactly one set of drive-sense circuits is configured to generate the drive signal component from the sensed signal of the set of sensed signals.

6. The touch screen display of claim 4, wherein a plurality of proper subsets of the plurality of row electrodes corresponding to the plurality of sets of electrodes each include a first same number of row electrodes, wherein the plurality of proper subsets of the plurality of row electrodes are mutually exclusive and collectively exhaustive with respect to the plurality of row electrodes;

wherein a plurality of proper subsets of the plurality of column electrodes corresponding to the plurality of sets of electrodes each include a second same number of row electrodes; and wherein the plurality of proper subsets of the plurality of column electrodes are mutually exclusive and collectively exhaustive with respect to the plurality of column electrodes.

7. The touch screen display of claim 4, wherein the plurality of row electrodes are physically arranged in accordance with a first linear ordering, wherein the plurality of column electrodes are physically arranged in accordance with a second linear ordering, wherein an ordering multiple is equal to a number of sets of electrodes included in the plurality of sets of electrodes, wherein the plurality of row electrodes are ordered in the first linear ordering based on spacing row electrodes in each given proper subset of the plurality of row electrodes apart by the ordering multiple in the first linear ordering, and wherein the plurality of column electrodes are ordered in the second linear ordering based on spacing column electrodes in each given proper subset of the plurality of column electrodes apart by the ordering multiple in the second linear ordering.

8. The touch screen display of claim 4, each set of electrodes of the plurality of sets of electrodes forms a corresponding electrode grid of a set of electrode grids, wherein each electrode grid is in accordance with a common uniform row spacing and a common uniform column spacing, wherein the corresponding proper subset of the plurality of row electrodes belonging to the each set of electrodes form rows of the electrode grid in accordance with the common uniform row spacing, wherein the corresponding proper subset of the plurality of column electrodes belonging to the each set of electrodes form columns of the electrode grid in accordance with the common uniform column spacing.

9. The touch screen display of claim 8, wherein each electrode grid of the set of electrode grids is bounded via a corresponding one of a set of bounding areas projected upon a plane parallel with the display, wherein each corresponding one of a set of bounding areas is based on ones of the plurality of cross points forming a cross point perimeter of the each electrode grid, wherein each electrode grid of the set of electrode grids is physically integrated into the display having a location of the corresponding one of the set of bounding areas in accordance with one of a set of different offset locations on the plane, and wherein every one of the set of bounding areas overlaps with all other ones of the set of bounding areas on the plane.

10. The touch screen display of claim 4, wherein a plurality of proper subsets of the set of sensed signals each indicate variations in capacitance associated with a corresponding proper subset of a plurality of proper subsets of the plurality of cross points, wherein each of the plurality of proper subsets of the plurality of cross points include a same number of cross points, and wherein the plurality of proper subsets of the plurality of cross points are mutually exclusive with respect to the plurality of cross points.

11. The touch screen display of claim 4, wherein only the exactly one set of drive-sense circuits of the plurality of sets of drive-sense circuits is activated to generate the corresponding set of sensed signals for a first temporal period, and wherein every other set of drive-sense circuits of the plurality of sets of drive-sense circuits are activated to generate other corresponding sets of sensed signals for other temporal periods distinct from the first temporal period.

12. The touch screen display of claim 4, wherein the operations further include:

determining to activate only the exactly one set of drive-sense circuits based on determining to minimize a number of active drive-sense circuits based on at least one of: a resource efficiency requirement; or detecting an unfavorable health of at least one resource.

13. The touch screen display of claim 4, wherein the operations further include:

determining to change activation from the exactly one set of drive-sense circuits to the more than one set of drive-sense circuits based on determining to increase a number of active drive-sense circuits in response to detecting a sensor increase triggering event, and wherein the processing module operates in the first mode until the sensor increase triggering event is detected.

14. The touch screen display of claim 13, wherein the sensor increase triggering event is detection of a user interaction by a user in proximity to the touch screen display in the first proximal interaction data.

15. A touch screen display comprises:

a display configured to render frames of data into visible images;

a plurality of sets of electrodes integrated into the display to facilitate touch sense functionality based on electrode signals having a drive signal component and a receive signal component, wherein each set of electrodes of the plurality of sets of electrodes includes a corresponding proper subset of non-neighboring ones of a plurality of row electrodes and a corresponding proper subset of non-neighboring ones of a plurality of column electrodes, wherein the plurality of row electrodes is separated from each the plurality of column electrodes by a dielectric material, and wherein the plurality of row electrodes and the plurality of column electrodes form a plurality of cross points;

a plurality of sets of drive-sense circuits, wherein each set of drive-sense circuits of the plurality of sets of drive-sense circuits includes a plurality of drive-sense circuits coupled to electrodes of a corresponding set of electrodes of the plurality of sets of electrodes, and wherein each set of drive-sense circuits is operable to generate a set of sensed signals indicating variations in capacitance associated with a proper subset of the plurality of cross points formed by the corresponding set of electrodes; and a processing module that includes at least one memory that stores operational instructions and at least one processing circuit that executes the operational instructions to perform operations to:

operate exactly one set of drive-sense circuits of the plurality of sets of drive-sense circuits in a first mode during a first temporal period to facilitate detection of first proximal interaction of a user;

operate more than one set of drive-sense circuits of the plurality of sets of drive-sense circuits in a second mode during a second temporal period after the first temporal period to facilitate detection of second proximal interaction of the user;

operate more than one set of drive-sense circuits of the plurality of sets of drive-sense circuits in a third mode, which includes both the first mode and the second mode, during a third temporal period after the second temporal period to facilitate detection of third proximal interaction of the user; and operate the sets of drive-sense circuits of the plurality of sets of drive-sense circuits in a multiple, different respective sensing modes of a plurality of possible sensing modes at multiple, different respective temporal periods to facilitate detection of multiple, different respective proximal interactions of the user.

16. The touch screen display of claim 15, wherein the processing module that includes the at least one memory that stores operational instructions and the at least one processing circuit that executes the operational instructions further configured to:

operate in the first mode during the first temporal period based on:

activating the exactly one set of drive-sense circuits of the plurality of sets of drive-sense circuits to generate a corresponding one set of sensed signals during the first temporal period;

receiving the corresponding one set of sensed signals from the exactly one set of drive-sense circuits during the first temporal period; and processing the corresponding one set of sensed signals to generate first proximal interaction data of the first proximal interaction of the user for the first temporal period; and operating in a second mode during a second temporal period after the first temporal period based on:

activating more than one set of drive-sense circuits of the plurality of sets of drive-sense circuits to generate a corresponding more than one set of sensed signals during the second temporal period;

receiving the corresponding more than one set of sensed signals from the more than one set of drive-sense circuits during the second temporal period; and processing the set of sensed signals to generate second proximal interaction data of the second proximal interaction of the user for the second temporal period.

17. The touch screen display of claim 15, wherein each of the plurality of drive-sense circuits includes a first conversion circuit and a second conversion circuit, and wherein, when the exactly one set of drive-sense circuits of the plurality of drive-sense circuits is enabled to monitor a corresponding electrode of the plurality of sets of electrodes based on being activated, each first conversion circuit of each drive-sense circuit of the exactly one set of drive-sense circuits is configured to convert the receive signal component into a sensed signal of the set of sensed signals and each second conversion circuit of each drive-sense circuit of the exactly one set of drive-sense circuits is configured to generate the drive signal component from the sensed signal of the set of sensed signals.

18. The touch screen display of claim 15, wherein the operations further include:

determining to activate only the exactly one set of drive-sense circuits based on determining to minimize a number of active drive-sense circuits based on at least one of: a resource efficiency requirement; or detecting an unfavorable health of at least one resource.

19. The touch screen display of claim 15, wherein the operations further include:

determining to change activation from the exactly one set of drive-sense circuits to the more than one set of drive-sense circuits based on determining to increase a number of active drive-sense circuits in response to detecting a sensor increase triggering event, and wherein the processing module operates in the first mode until the sensor increase triggering event is detected.

20. The touch screen display of claim 19, wherein the sensor increase triggering event is detection of a user interaction by a user in proximity to the touch screen display in first proximal interaction data of the first proximal interaction of the user for the first temporal period.

* * * * *